United States Patent [19]

Niimura et al.

[11] Patent Number: 5,450,209
[45] Date of Patent: Sep. 12, 1995

[54] BAND-COMPRESSED SIGNAL PROCESSING APPARATUS

[75] Inventors: Kazuharu Niimura, Fukaya; Masaru Sakurai, Yokohama, both of Japan

[73] Assignee: Kabushiki Kaisha Toshiba, Kawasaki, Japan

[21] Appl. No.: 954,037

[22] Filed: Sep. 30, 1992

[30] Foreign Application Priority Data

| Sep. 30, 1991 | [JP] | Japan | 3-250671 |
|---|---|---|---|
| Nov. 15, 1991 | [JP] | Japan | 3-300146 |
| Nov. 15, 1991 | [JP] | Japan | 3-326751 |
| Dec. 24, 1991 | [JP] | Japan | 3-355620 |
| Jan. 22, 1992 | [JP] | Japan | 4-009184 |
| Mar. 23, 1992 | [JP] | Japan | 4-094885 |
| Mar. 23, 1992 | [JP] | Japan | 4-094886 |
| Apr. 28, 1992 | [JP] | Japan | 4-110432 |
| Jul. 15, 1992 | [JP] | Japan | 4-209503 |
| Jul. 23, 1992 | [JP] | Japan | 4-197288 |

[51] Int. Cl.⁶ .................... H04N 5/783; H04N 5/92
[52] U.S. Cl. .................... 358/335; 358/312; 360/32
[58] Field of Search ............ 358/335, 312, 310, 342, 358/133, 135; 360/33.1, 32, 10.1; H04N 5/783, 5/92

[56] References Cited

U.S. PATENT DOCUMENTS

| 4,807,053 | 2/1989 | Heijnemans . | |
| 4,910,605 | 3/1990 | Sasaki et al. | 358/312 |
| 4,916,554 | 4/1990 | Takahashi et al. | 360/10.2 |
| 4,931,879 | 6/1990 | Koga et al. | 358/335 |
| 5,115,324 | 5/1992 | Tokimoto et al. | 358/335 |
| 5,140,437 | 8/1992 | Yonemitsu et al. | 358/342 |

FOREIGN PATENT DOCUMENTS

| 0367264 | 5/1990 | European Pat. Off. . |
| 4025756 | 2/1991 | Germany . |

OTHER PUBLICATIONS

Dig.Cipher HDTV System Description; GI:22 Aug. 1991, The Dig: Cipher system employs differential PCM coding (DPCM) pp. 1–13.

Technical Critique of American Television Alliance's CC DigiCipher HDTV System; GI. MIT:May 14, 1992 pp. 1–11.

"Draft Revision of Recommendation H.261: Video Codec for Audiovisual Services at px64kbit/s", Signal Processing: Image Communication, vol. 2, No. 2, Aug. 1990, pp. 221–239.

Paik, "Digiciphers(tm)–All Digital Channel Compatible, HDTV Broadcast System", IEEE Transactions on Broadcasting vol. 36, No. 4, Dec. 1990, New York, US, pp. 245–254.

Primary Examiner—Tommy P. Chin
Assistant Examiner—Huy Nguyen
Attorney, Agent, or Firm—Cushman Darby & Cushman

[57] ABSTRACT

A band compression signal processor designed to convert video signals or the like into digital signals and to perform band compression by effecting both intra-frame encoding and inter-frame encoding. The signal output by the processor is supplied to a recording/reproducing apparatus. In the apparatus, the signal is recorded on a magnetic tape and reproduced therefrom by helical scanning method. The signal intra-frame-encoded is arranged within such a region as to be read out in fast reproduction mode.

37 Claims, 136 Drawing Sheets

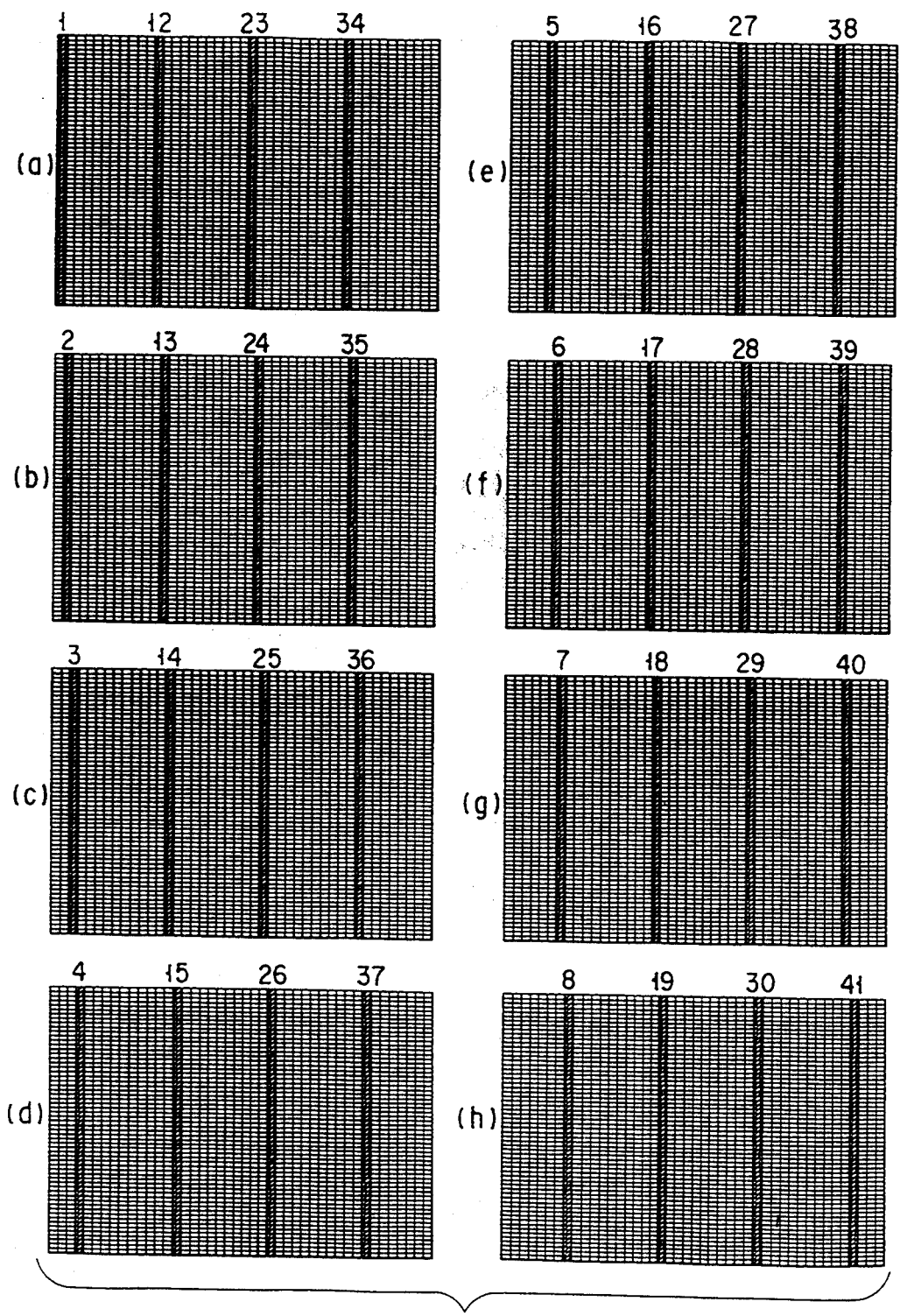
F I G. 3

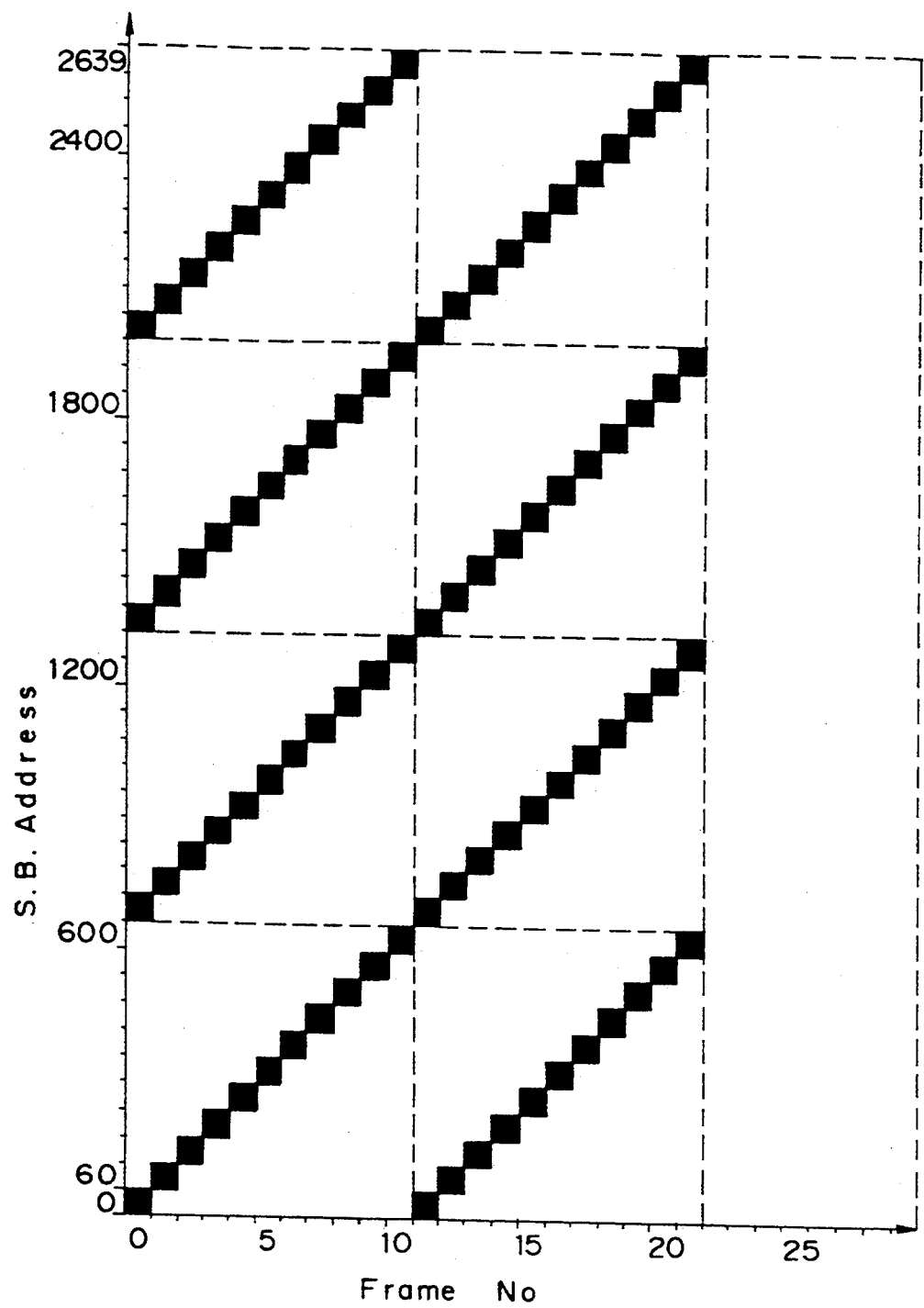
F I G. 16

|  | SPATIAL FREQUENCY IN HORIZONTAL DIRECTION | | | | | | |
|---|---|---|---|---|---|---|---|
| LOW → HIGH | | | | | | | |
| 0 | 2 | 3 | 9 | 10 | 20 | 21 | 35 |
| 1 | 4 | 8 | 11 | 19 | 22 | 34 | 36 |
| 5 | 7 | 12 | 18 | 23 | 33 | 37 | 48 |
| 6 | 13 | 17 | 24 | 32 | 38 | 47 | 49 |
| 14 | 16 | 25 | 31 | 39 | 46 | 50 | 57 |
| 15 | 26 | 30 | 40 | 45 | 51 | 56 | 58 |
| 27 | 29 | 41 | 44 | 52 | 55 | 59 | 62 |
| 28 | 42 | 43 | 53 | 54 | 60 | 61 | 63 |

(DC COMPONENT at top-left; SPATIAL FREQUENCY IN VERTICAL DIRECTION: LOW → HIGH)

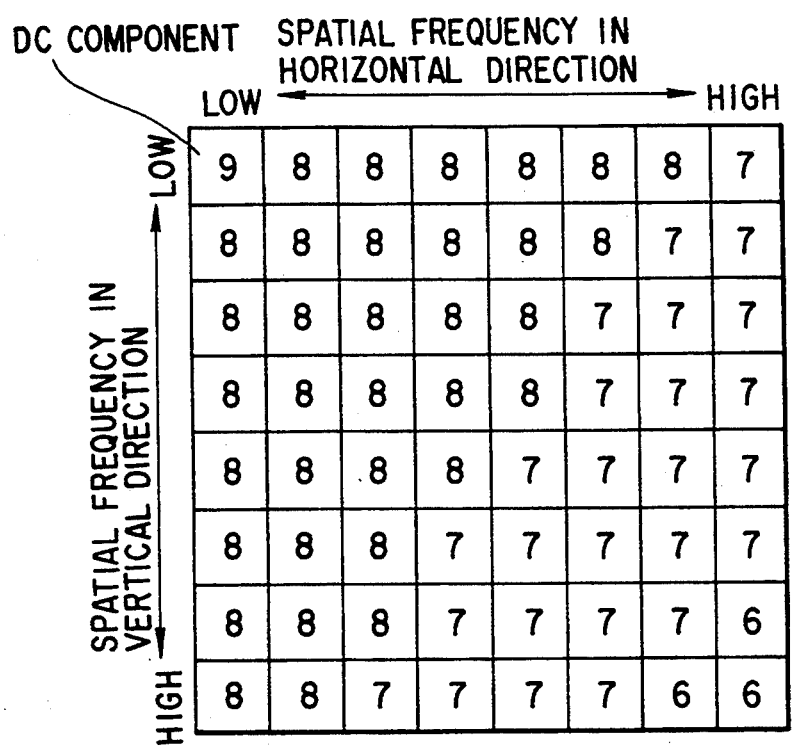
F I G. 21

FIG. 25
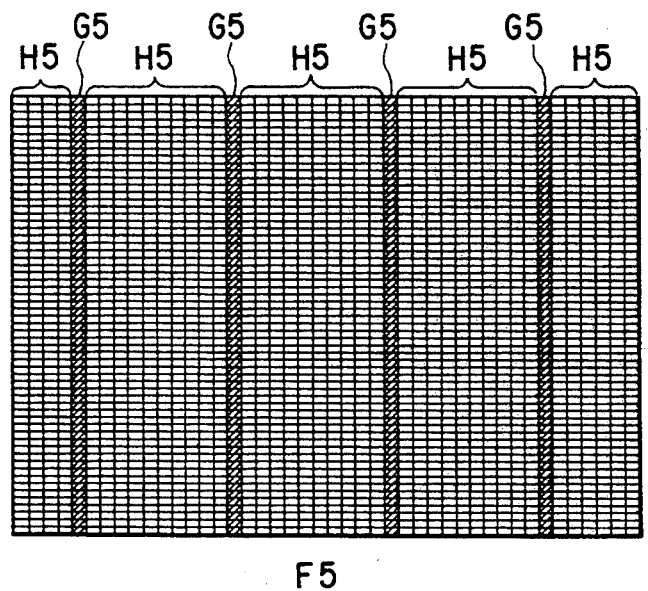
(a)
F5
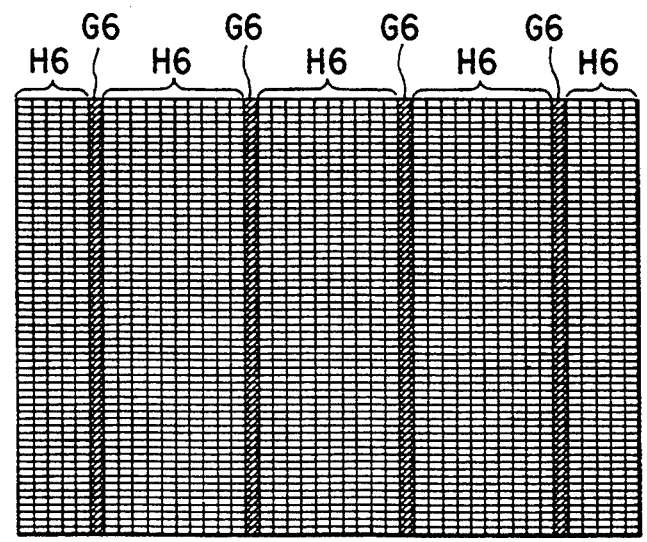
(b)
F6

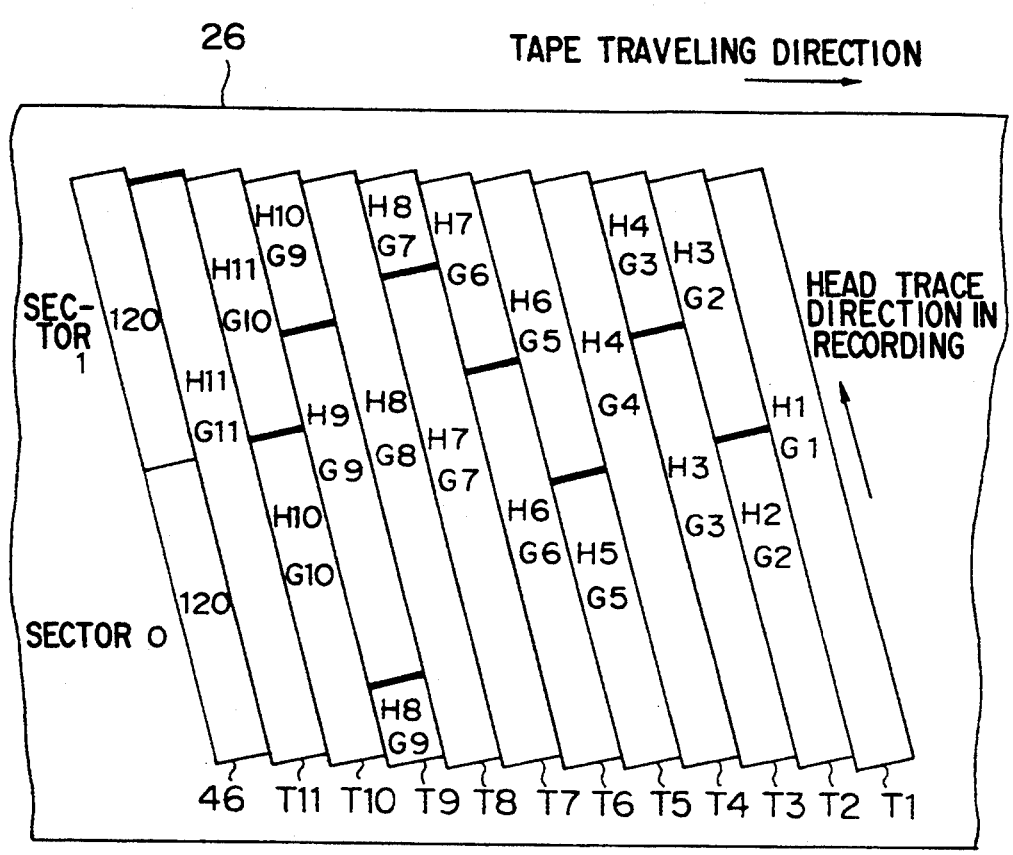
F I G. 26

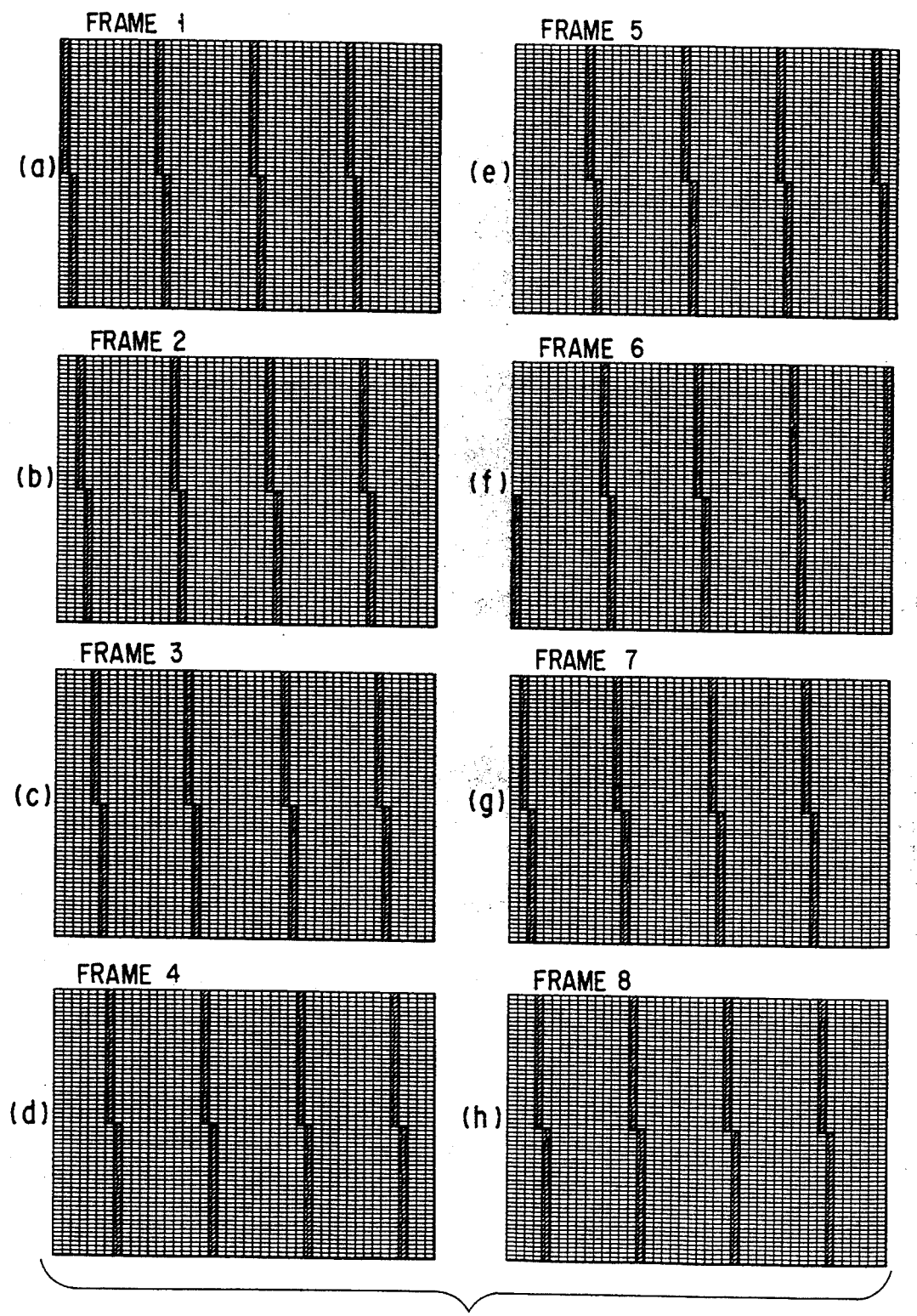
F I G. 28

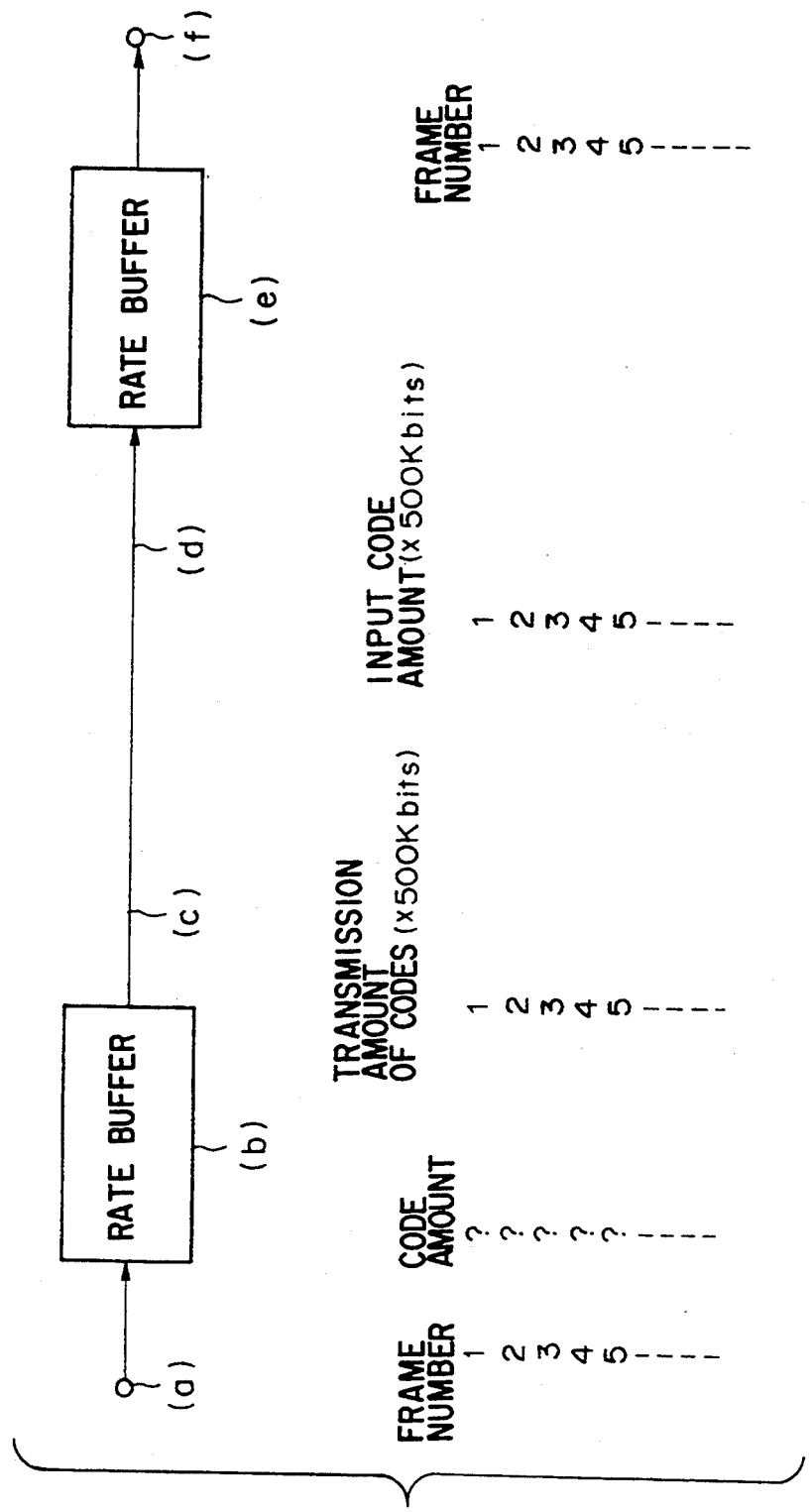
F I G. 32

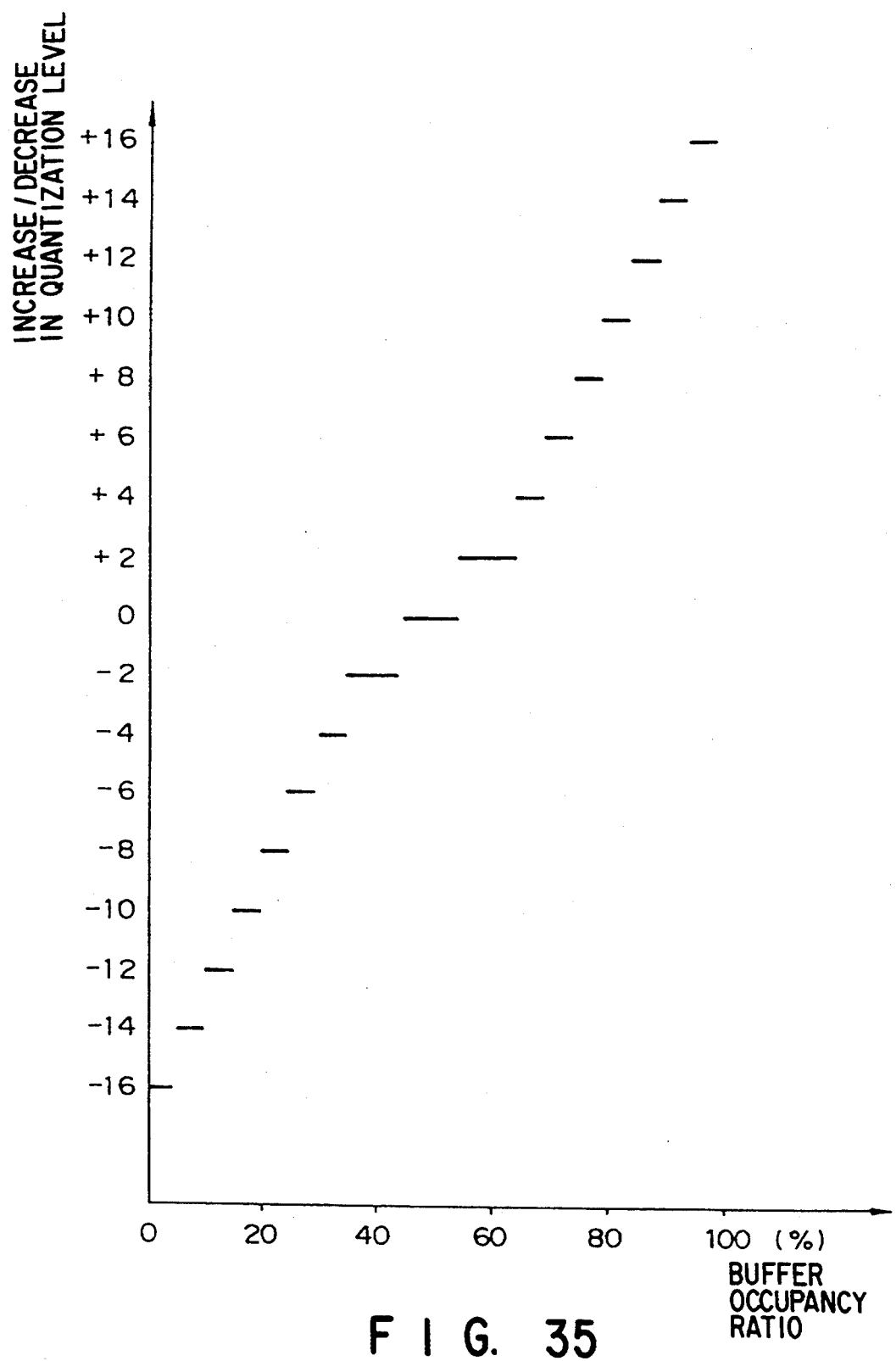
F I G. 35

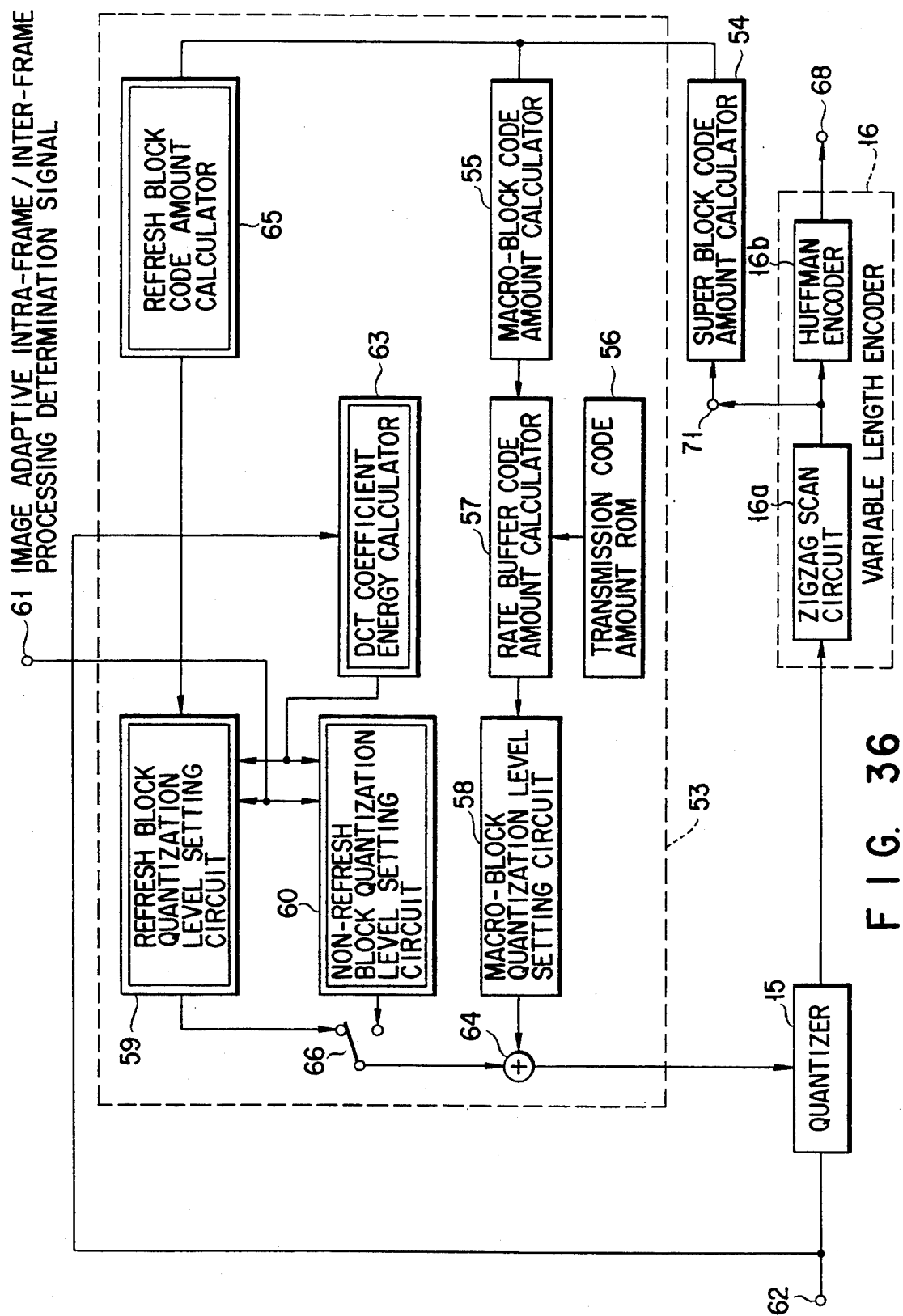
F I G. 36

| CONTINUOUS ZERO COEFFICIENT COUNT | AMPLITUDE | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| 0 | 2 | 3 | 5 | 5 | 6 | 7 | 7 | 8 | 8 | 9 | 9 | 9 | 10 | 10 | 10 | 10 |
| 1 | 3 | 5 | 6 | 8 | 8 | 9 | 10 | 11 | 11 | 12 | 12 | 13 | 13 | 14 | 14 | 14 |
| 2 | 4 | 7 | 8 | 9 | 11 | 11 | 12 | 13 | 14 | 14 | 15 | 15 | 16 | 16 | 17 | 17 |
| 3 | 5 | 8 | 10 | 11 | 12 | 13 | 14 | 15 | 16 | 16 | 17 | 18 | 20 | 19 | 18 | 19 |
| 4 | 6 | 9 | 11 | 13 | 14 | 15 | 16 | 17 | 18 | 19 | 20 | 21 | 21 | 21 | 22 | 20 |
| 5 | 6 | 10 | 12 | 13 | 15 | 16 | 18 | 18 | 20 | 20 | 22 | 22 | 22 | 22 | 21 | 22 |
| 6 | 7 | 10 | 13 | 14 | 16 | 18 | 19 | 20 | 22 | 21 | 22 | 22 | 22 | 22 | 22 | 21 |
| 7 | 7 | 11 | 13 | 15 | 16 | 17 | 20 | 20 | 21 | 22 | 22 | 21 | 21 | 18 | 20 | 22 |
| 8 | 8 | 12 | 14 | 16 | 18 | 20 | 20 | 21 | 22 | 22 | 22 | 22 | 22 | 22 | 22 | 22 |
| 9 | 8 | 13 | 16 | 18 | 20 | 20 | 22 | 22 | 22 | 22 | 22 | 22 | 22 | 22 | 22 | 22 |
| 10 | 9 | 13 | 17 | 19 | 20 | 19 | 18 | 20 | 22 | 22 | 22 | 22 | 22 | 22 | 22 | 22 |
| 11 | 9 | 13 | 16 | 16 | 20 | 21 | 22 | 21 | 22 | 22 | 22 | 22 | 22 | 22 | 22 | 22 |
| 12 | 9 | 15 | 18 | 21 | 22 | 22 | 22 | 22 | 22 | 22 | 22 | 22 | 22 | 22 | 22 | 22 |
| 13 | 10 | 16 | 20 | 22 | 22 | 22 | 22 | 22 | 22 | 22 | 22 | 22 | 22 | 22 | 22 | 22 |
| 14 | 10 | 17 | 20 | 22 | 22 | 22 | 22 | 22 | 22 | 22 | 22 | 22 | 22 | 22 | 22 | 22 |
| 15 | 11 | 18 | 21 | 22 | 22 | 22 | 22 | 22 | 22 | 22 | 22 | 22 | 22 | 22 | 22 | 22 |

FIG. 37

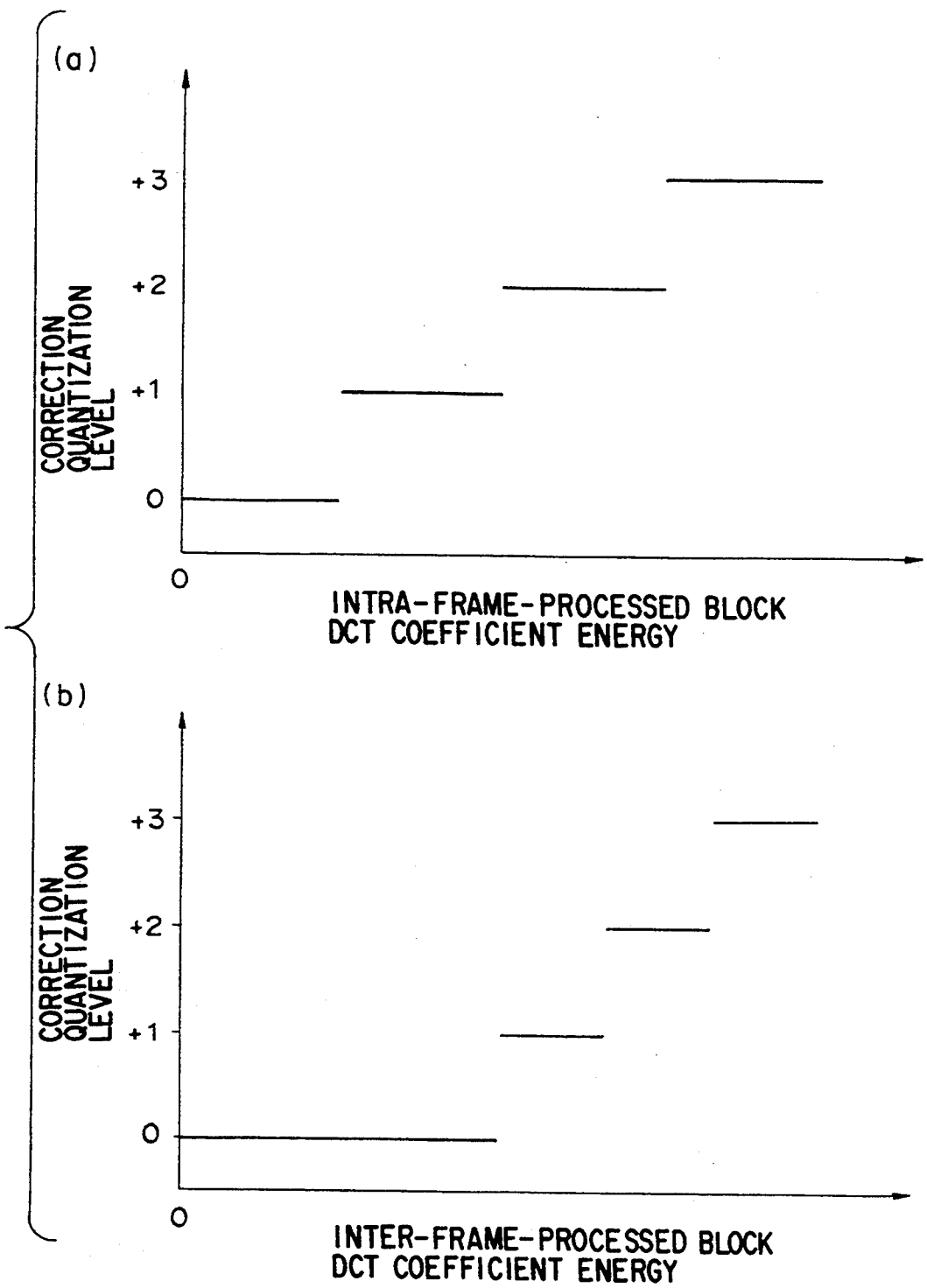
F I G. 38

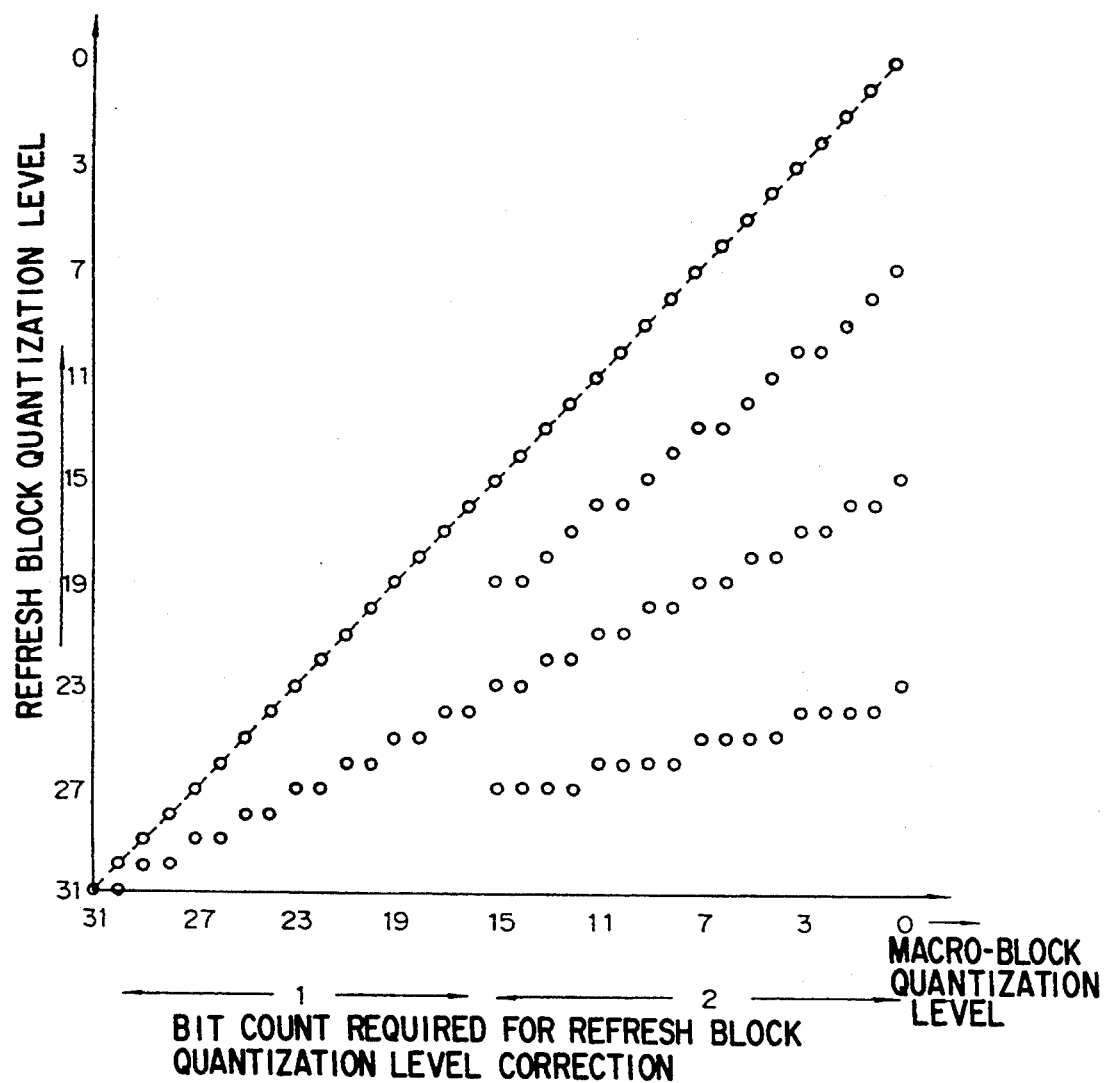
F I G. 40

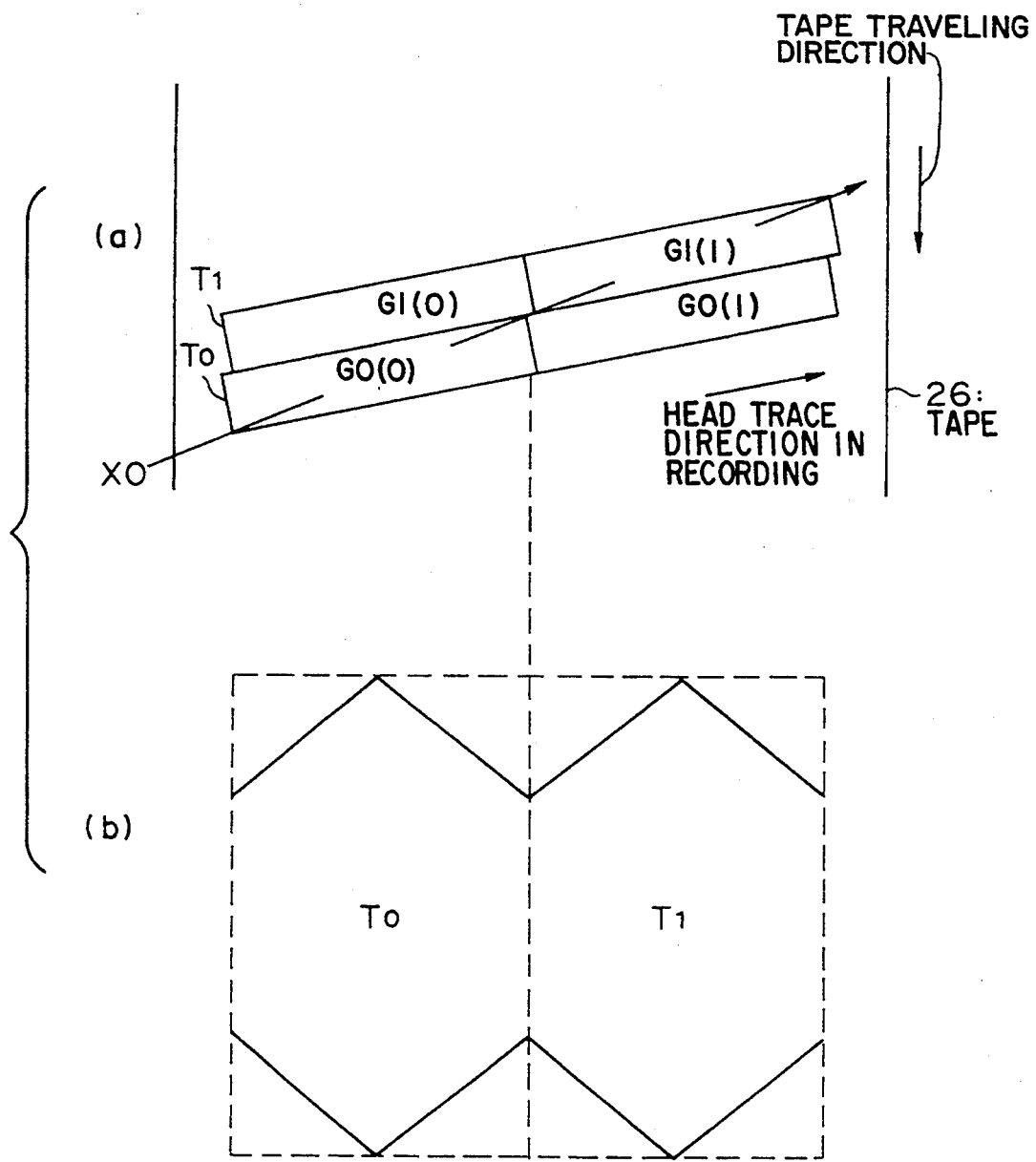
F I G. 57

| CIRCUIT \ INDEX / OVER-HEAD DATA | UNIT SYNC | (N-) R·B ID | (N-) R·B· FRAME | (N-) R·B· ADDRESS | (N-) R·B· POSITION | FRAME ID | PROCESSOR ID | (NON-) REFRESH BLOCK ID | (NON-) REFRESH BLOCK ADDRESS | MACRO QUANTIZATION LEVEL | CODE LENGTH | CORRECTION QUANTIZATION LEVEL | FIELD/FRAME DISCRIMINATION | PCM/DPCM DISCRIMINATION | MOTION VECTOR |
|---|---|---|---|---|---|---|---|---|---|---|---|---|---|---|---|
| DEBLOCKING CIRCUIT | | | | | | | | | | | | | | O | |
| SKIP PROCESSING | | | | | | | | | | O | | | | | |
| FRAME DELAY CIRCUIT — READ | | | | | | | | | | | | | O | | |
| FRAME DELAY CIRCUIT — WRITE | | | | O | | O | O | O | | | | | | | |
| MOTION COMPENSATION | | | | | | | | | | | | | | | O |
| INTRA/FRAME INTER/FRAME PROCESSING SWITCHING | | O | | | | | | | | | | | O | | |
| INVERSE DCT | | | | | | | | | | | | | | | |
| INVERSE QUANTIZATION | | | | | | | | | | O | | O | | | |
| VARIABLE LENGTH DECODING | | | | | | | | | | | O | | | | |
| CODE RE-SWITCHING CIRCUIT — READ | | | O | O | | O | | | O | | O | | | | |
| CODE RE-SWITCHING CIRCUIT — WRITE | | O | O | | O | O | O | | | | | | | | |
| OVER-HEAD DATA DETECTION | | | | | O | | | | | | O | | | | |
| CODE LENGTH DETECTION | | | | | O | | | | | | | | | | |
| INDEX DETECTION | O | | | | | | | | | | | | | | |

FIG. 59

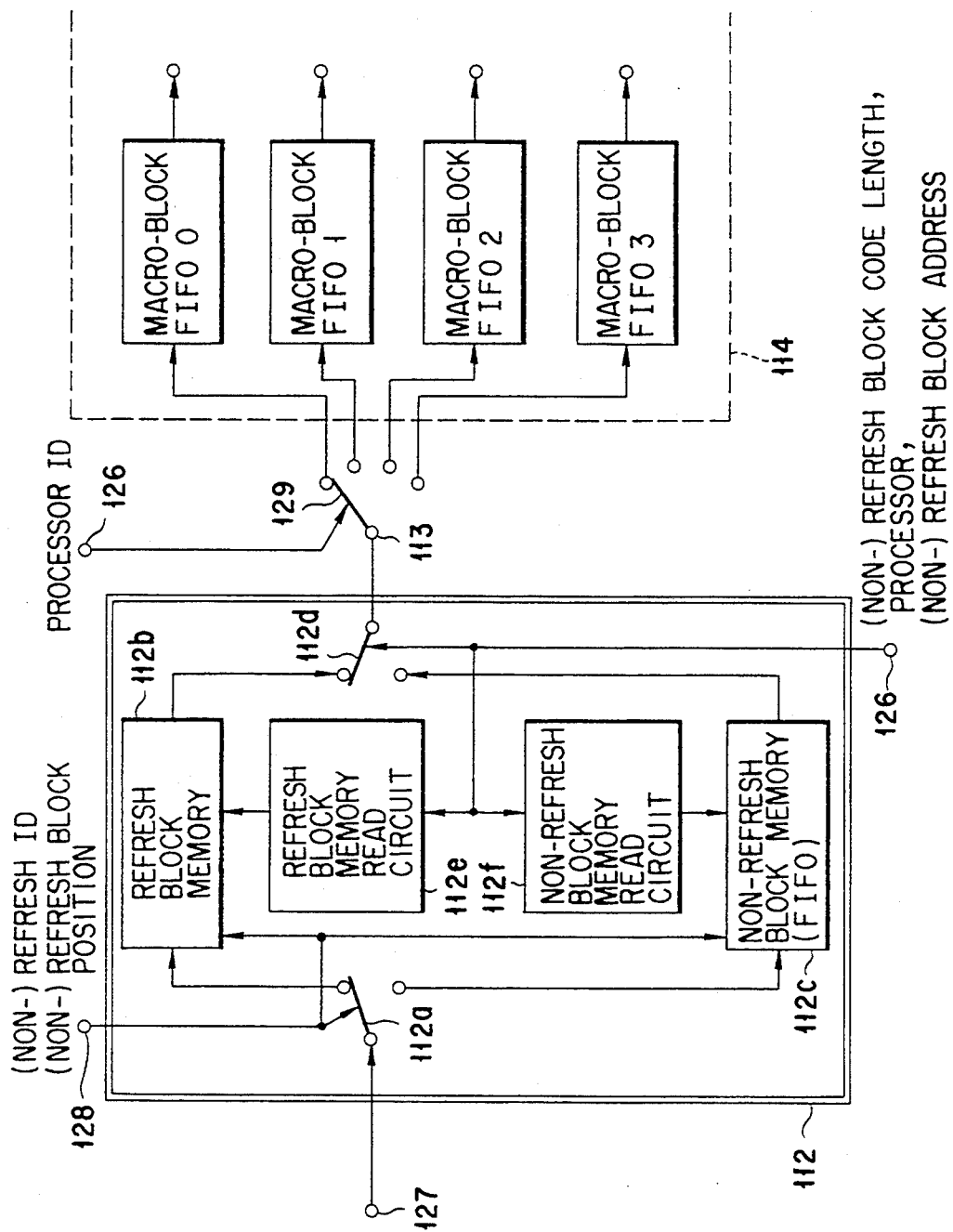
F I G. 60

| FAST INVERSE REPRODUCTION SPEED k=2-i | 0 | -1 | -2 | -3 | -4 | -5 | -6 | -7 | -8 | -9 | -10 | -11 | -12 | -13 | -14 | -15 | -16 | -17 | -18 | -19 | -20 |
|---|---|---|---|---|---|---|---|---|---|---|---|---|---|---|---|---|---|---|---|---|---|
| FAST REPRODUCTION SPEED i | 2 | 3 | 4 | 5 | 6 | 7 | 8 | 9 | 10 | 11 | 12 | 13 | 14 | 15 | 16 | 17 | 18 | 19 | 20 | 21 | 22 |
| (i×2) MOD i | 0 | 1 | 2 | 2 | 4 | 1 | 6 | 4 | 2 | 0 | 10 | 9 | 8 | 7 | 6 | 5 | 4 | 3 | 2 | 1 | 0 |
| FAST REPRODUCTION POSSIBLE | ○ | ○ | | ○ | | ○ | | ○ | | | | ○ | | ○ | | ○ | | ○ | | ○ | |

FIG. 69

|        | G1 | G2 | G3 | G4 | G5 | G6 | G7 | G8 | G9 | G10 | G11 |
|--------|----|----|----|----|----|----|----|----|----|-----|-----|
| Gn(0)  | 0  | 1  | 2  | 0  | 1  | 2  | 0  | 1  | 2  | 0   | 1   |
| Gn(1)  | 1  | 2  | 0  | 1  | 2  | 0  | 1  | 2  | 0  | 1   | 2   |
| Gn(2)  | 2  | 0  | 1  | 2  | 0  | 1  | 2  | 0  | 1  | 2   | 0   |
| Gn(3)  | 2  | 0  | 1  | 2  | 0  | 1  | 2  | 0  | 1  | 2   | 0   |
| Gn(4)  | 0  | 1  | 2  | 0  | 1  | 2  | 0  | 1  | 2  | 0   | 1   |
| Gn(5)  | 1  | 2  | 0  | 1  | 2  | 0  | 1  | 2  | 0  | 1   | 2   |

FIG. 70

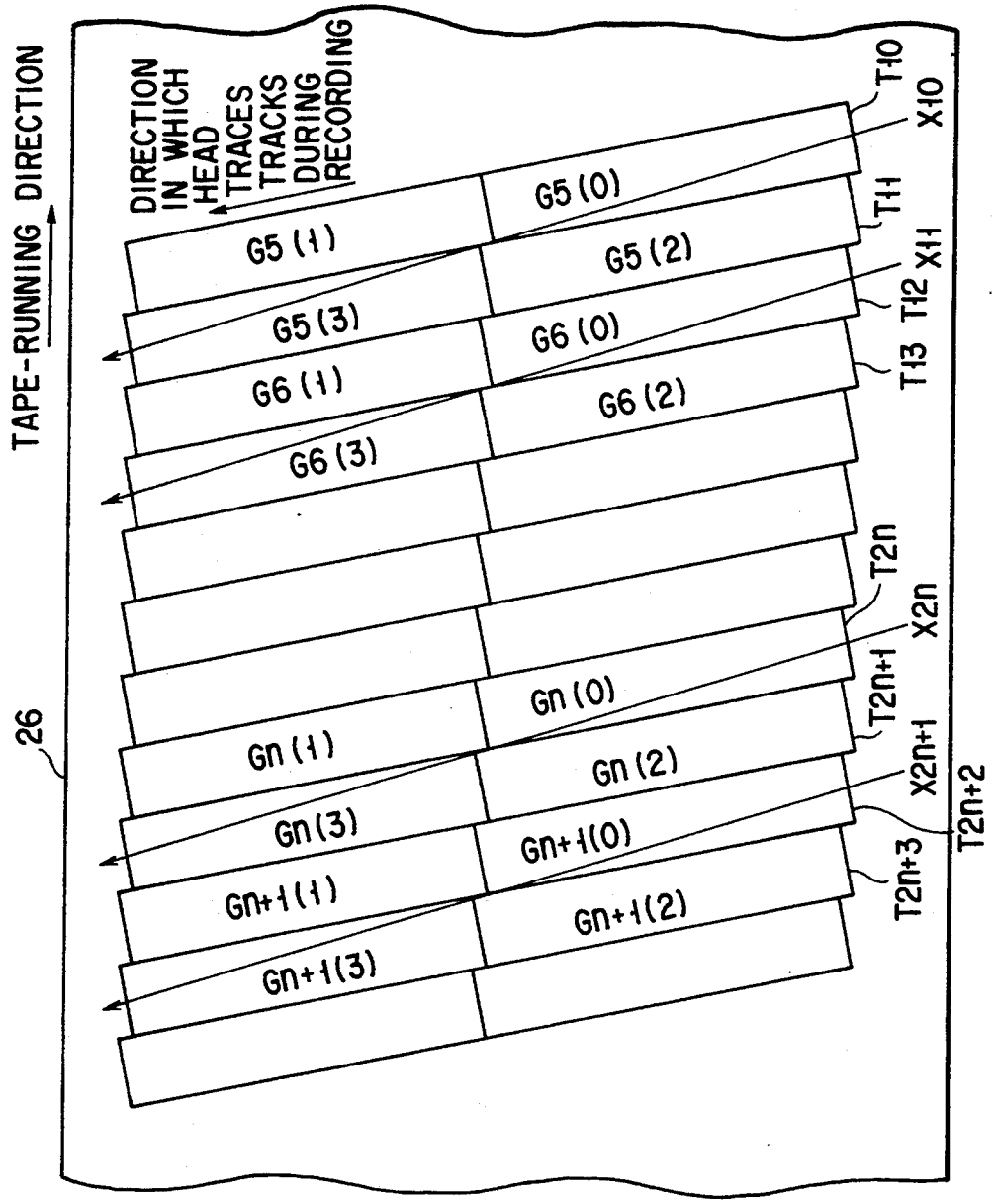
F I G. 72

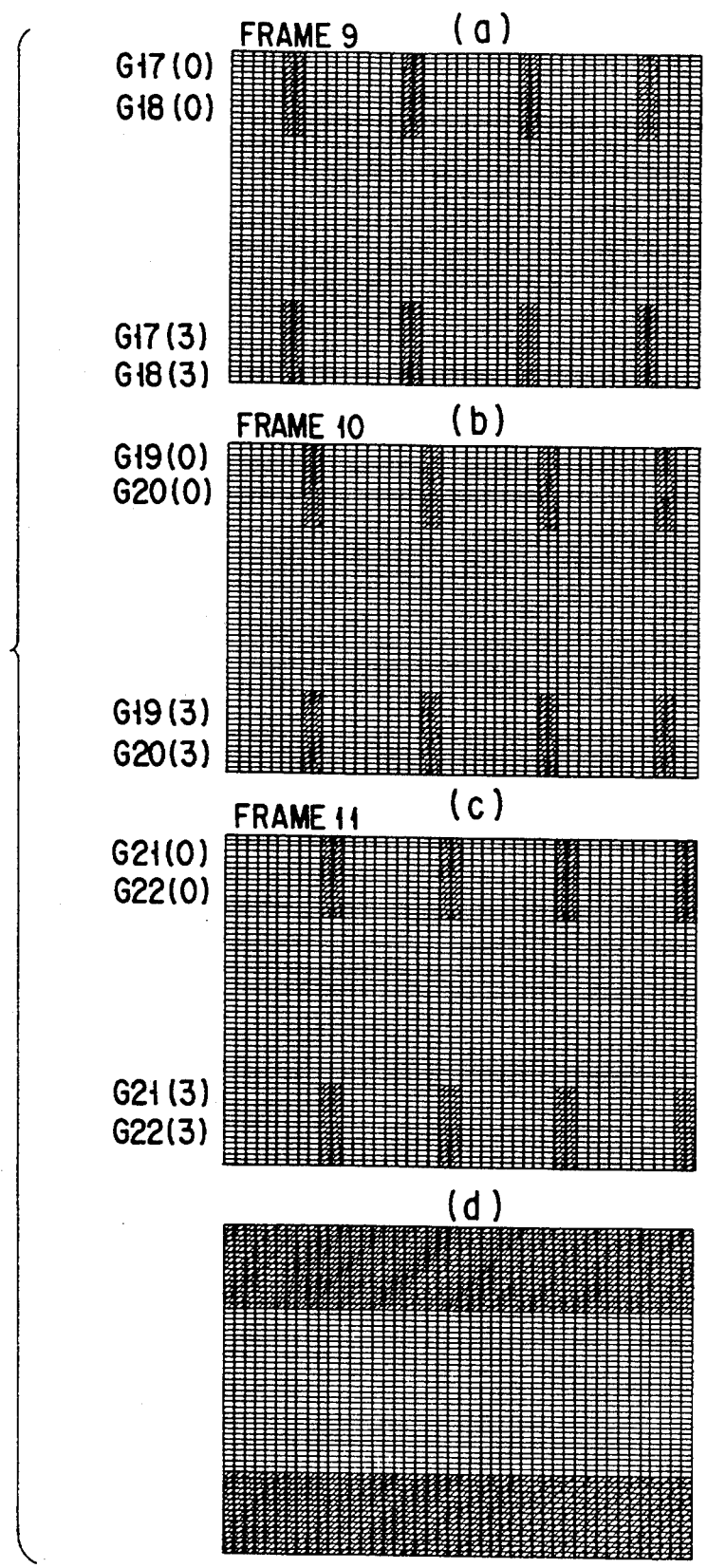
F I G. 74

| REFRESH NUMBER | G1 | | G2 | | G3 | | G4 | | G5 | | G6 | | G7 | | G8 | | G9 | | G10 | | G11 | |
|---|---|---|---|---|---|---|---|---|---|---|---|---|---|---|---|---|---|---|---|---|---|---|
| TRACK NUMBER | T2 | T1 | T4 | T3 | T6 | T5 | T8 | T7 | T10 | T9 | T12 | T11 | T14 | T13 | T16 | T15 | T18 | T17 | T20 | T19 | T22 | T21 |
| SECTOR NUMBER | | | | | | | | | | | | | | | | | | | | | | |
| S3(Gn( ))S1 | 3 | 1 | 3 | 1 | 3 | 1 | 3 | 1 | 3 | 1 | 3 | 1 | 3 | 1 | 3 | 1 | 3 | 1 | 3 | 1 | 3 | 1 |
| S2(Gn( ))S0 | 2 | 0 | 2 | 0 | 2 | 0 | 2 | 0 | 2 | 0 | 2 | 0 | 2 | 0 | 2 | 0 | 2 | 0 | 2 | 0 | 2 | 0 |

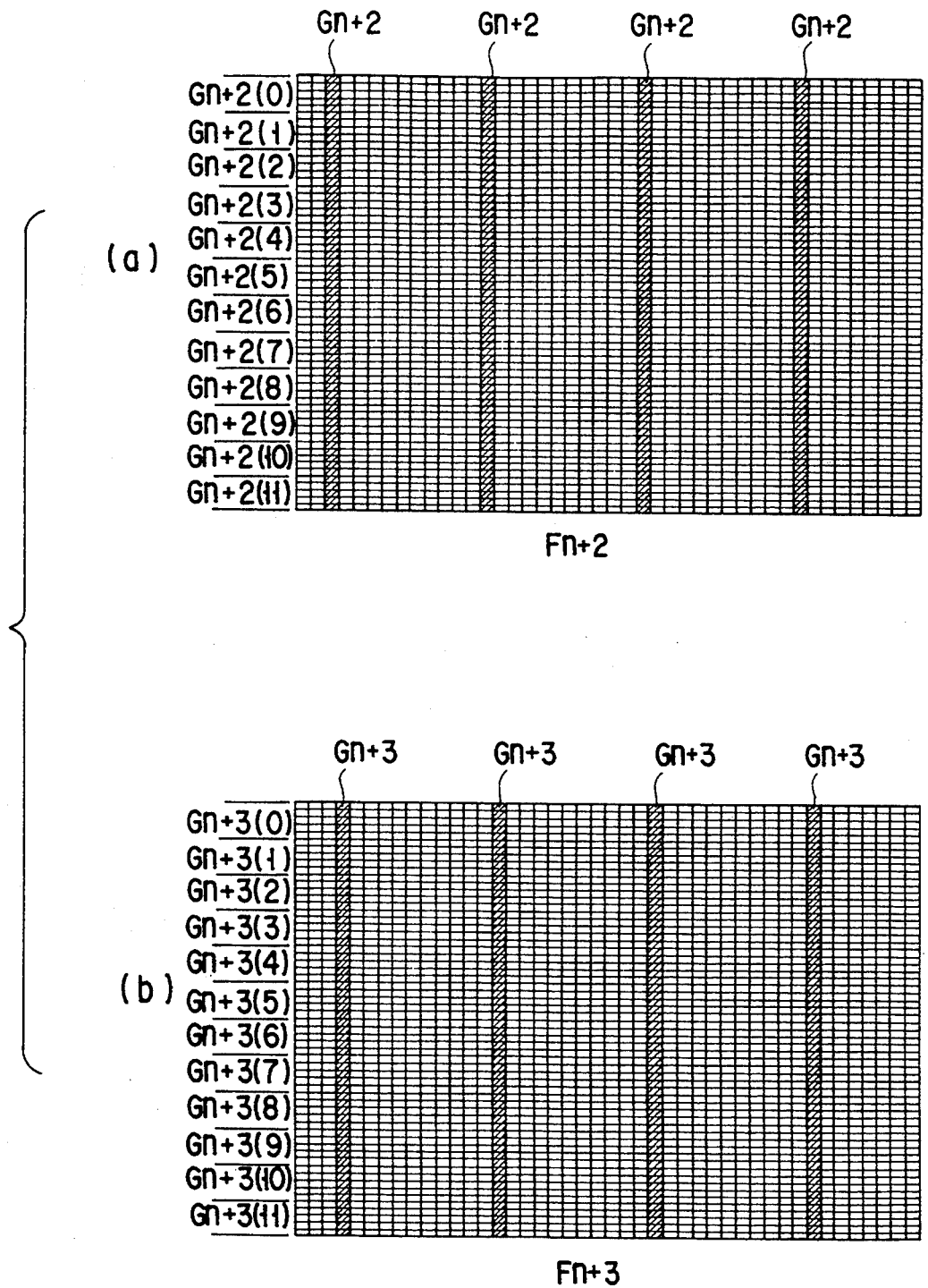
F I G. 81

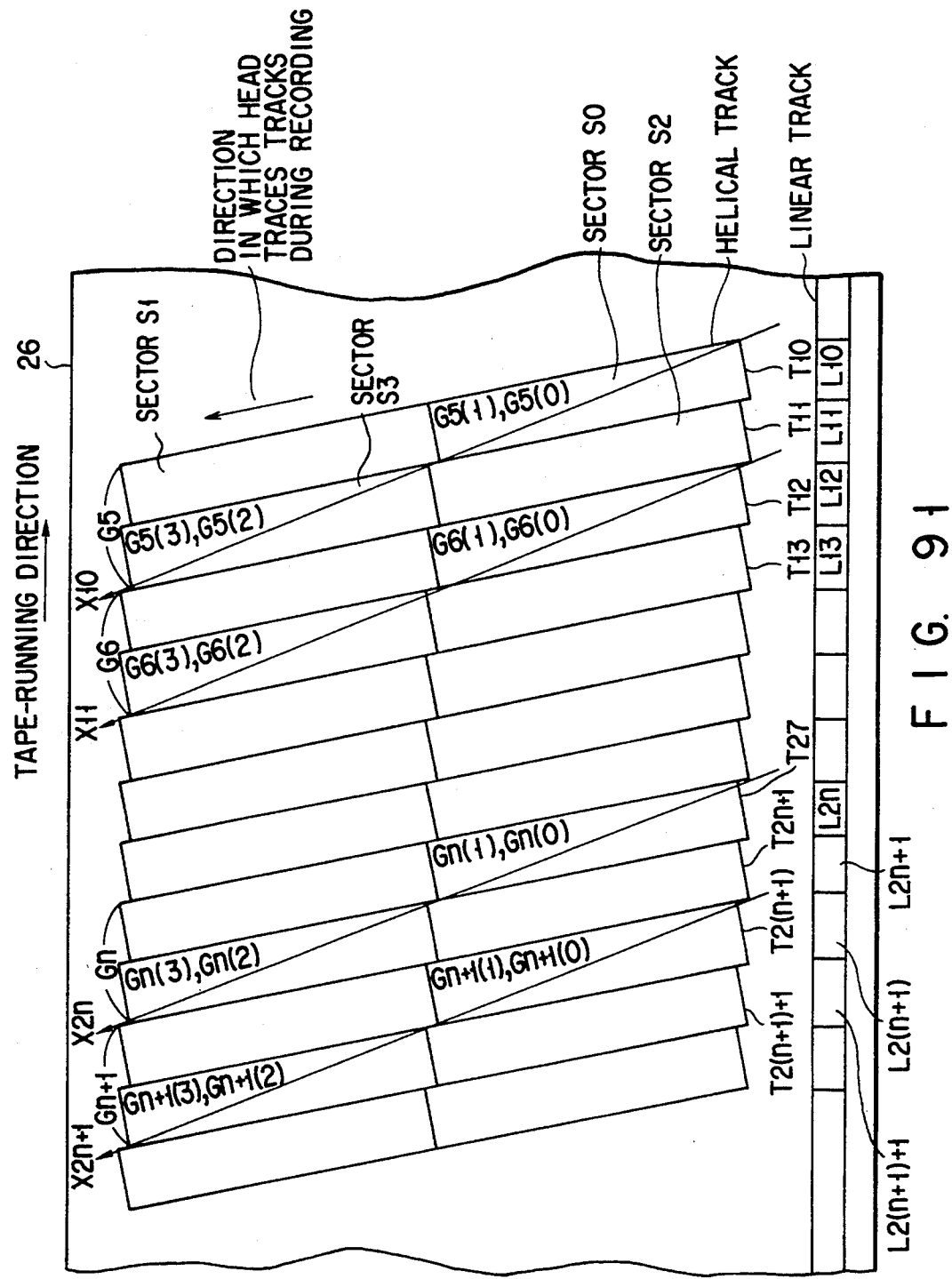
F I G. 91

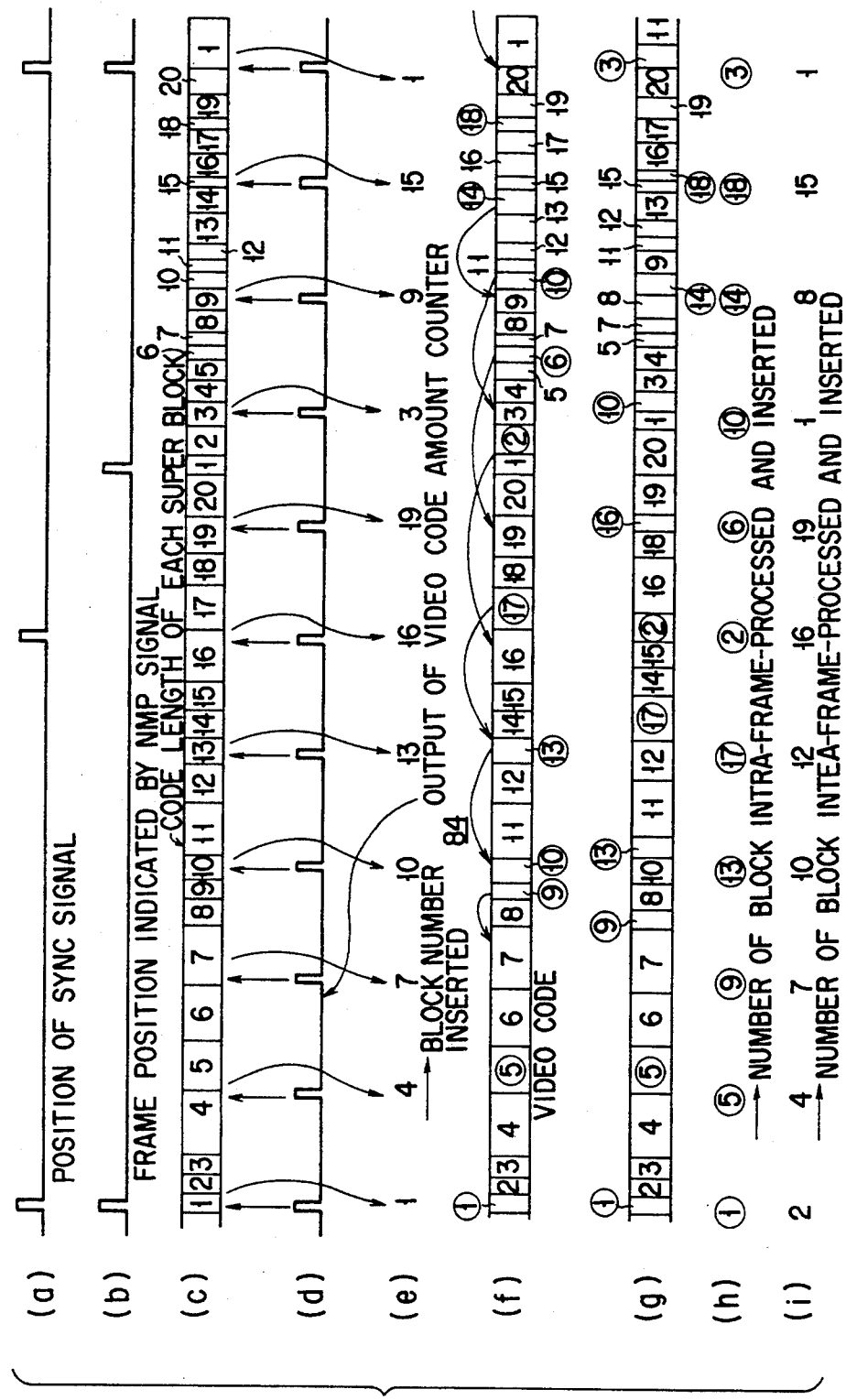
F I G. 117

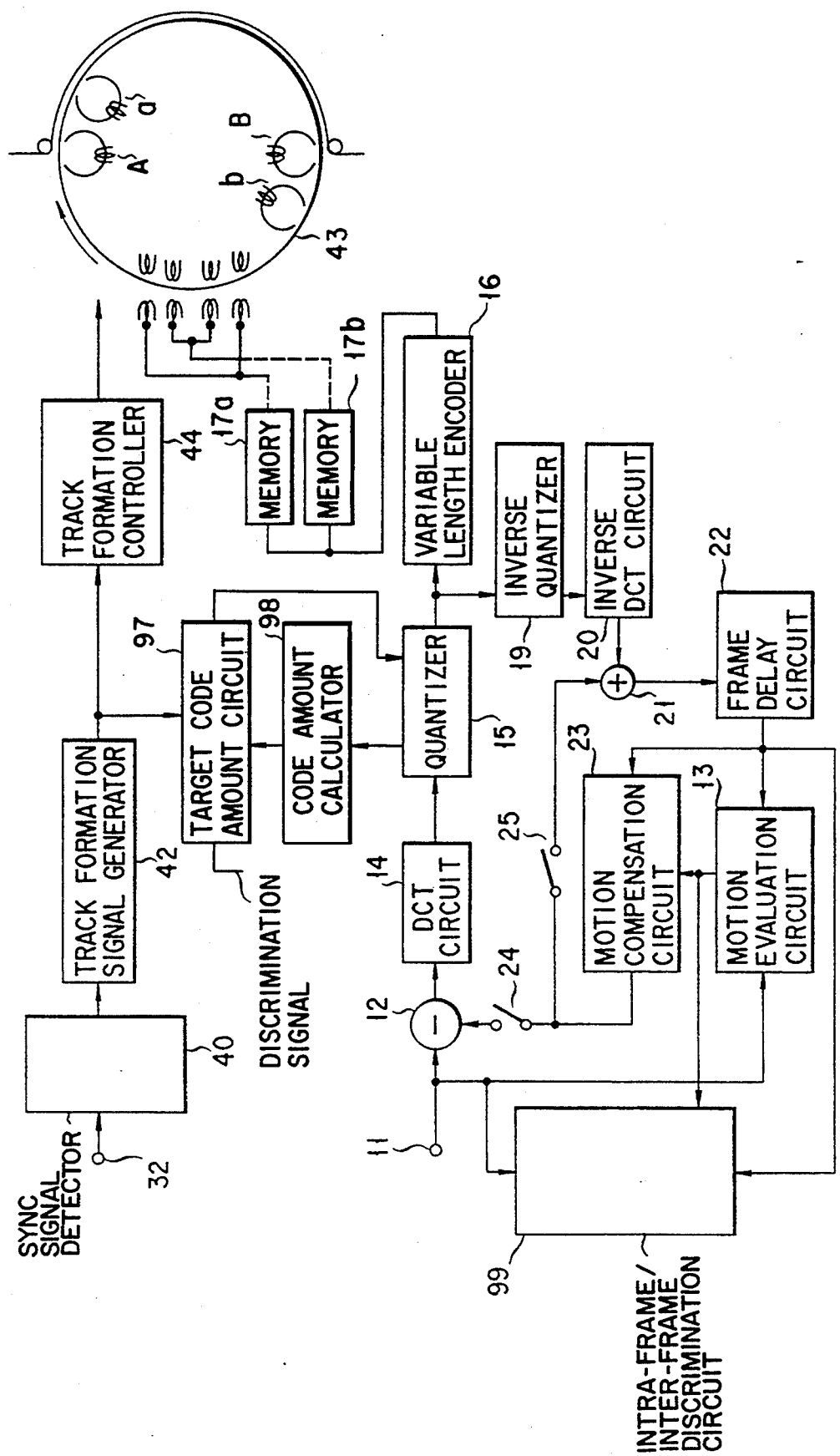
F I G. 124

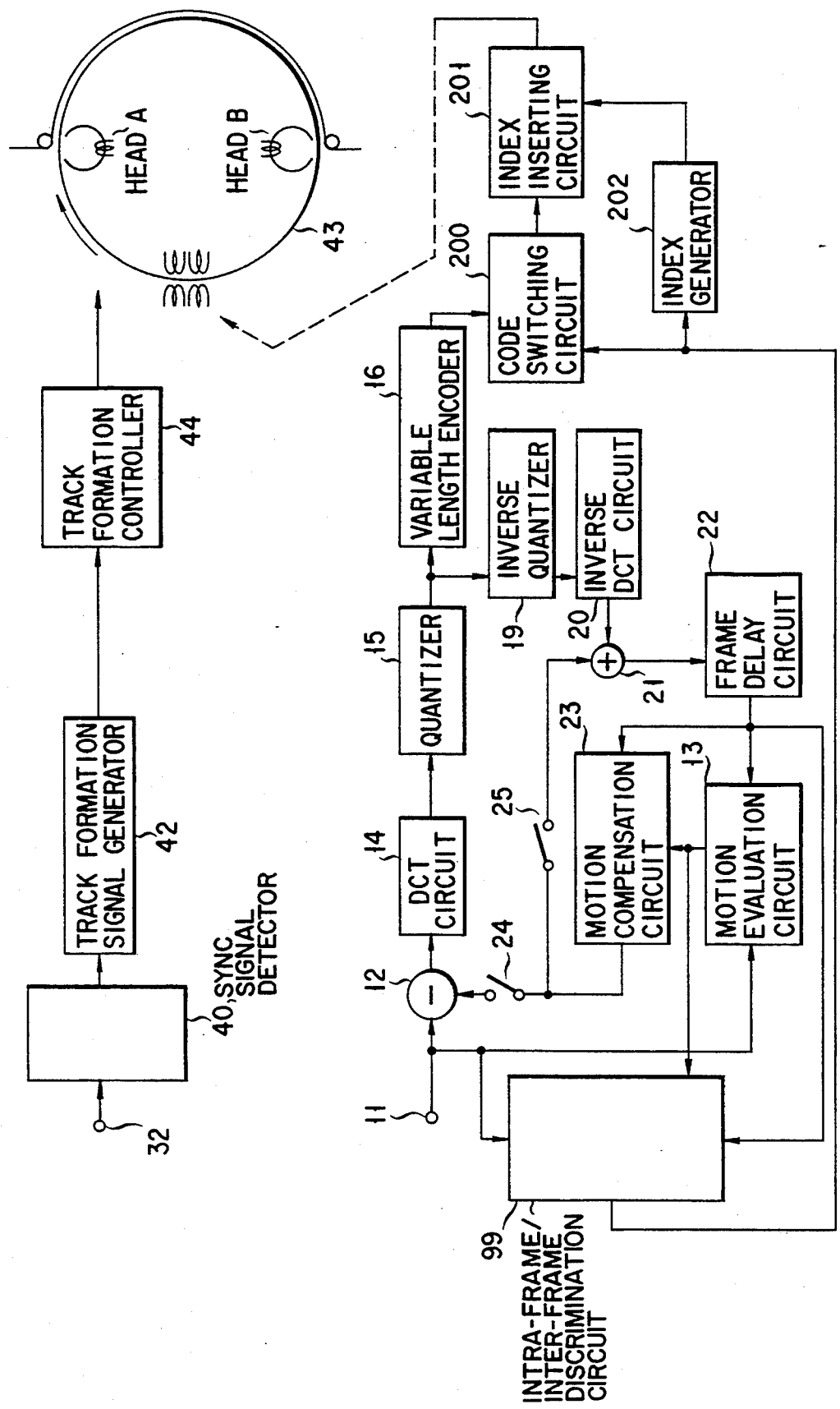
F I G. 127

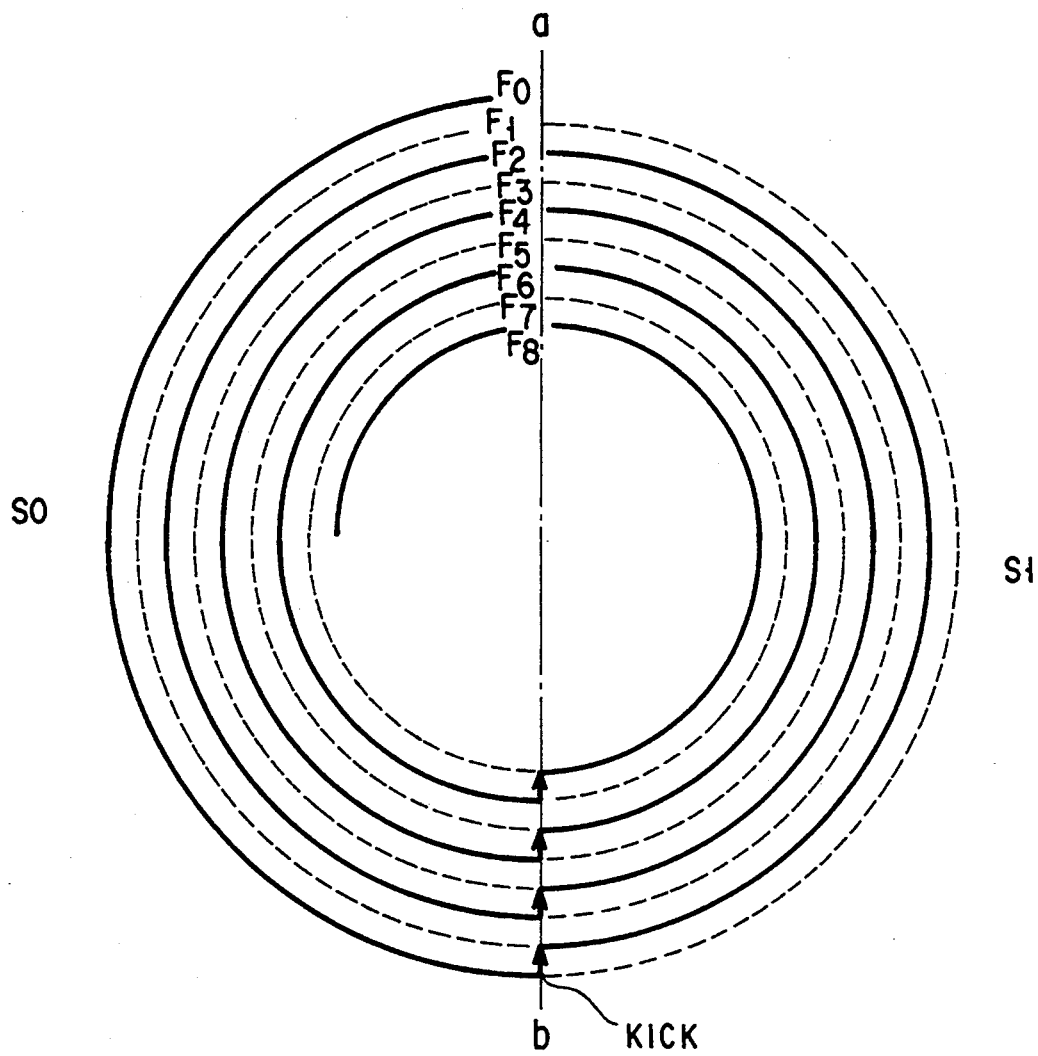
F I G. 130

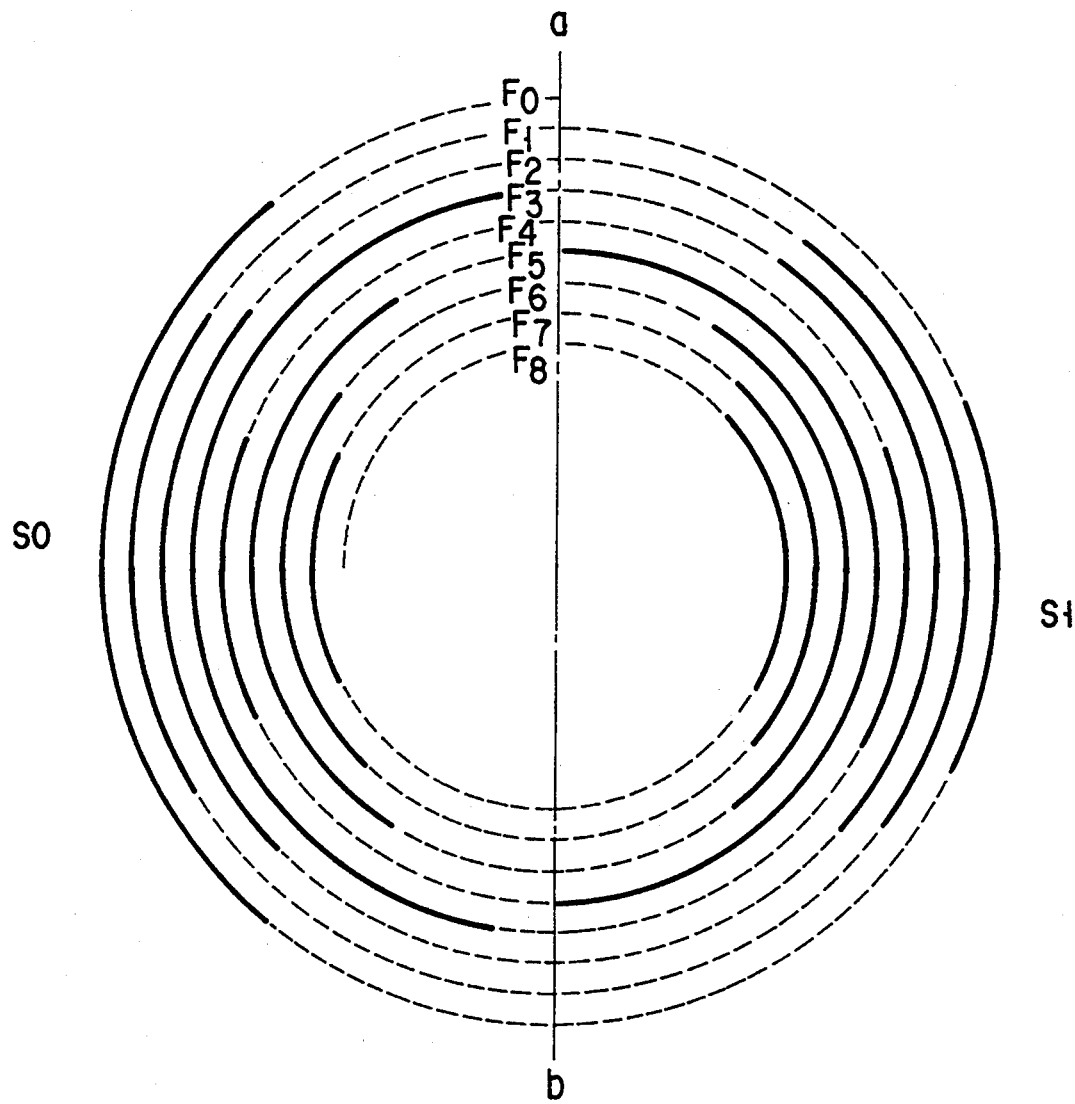
F I G. 131

BAND-COMPRESSED SIGNAL PROCESSING APPARATUS

BACKGROUND OF THE INVENTION

1. Field of the Invention

The present invention relates to an apparatus which is designed to convert a video signal or the like into a digital signal and perform band compression based on a combination of intra-frame coding and inter-frame coding, and which allows a recording/reproducing device to easily reproduce a good image, especially in the fast reproduction mode, from a signal output from the apparatus to the device and recorded by the device a tape in helical scan scheme. Also does this invention relate to an apparatus which can record signals in a wide band, used for a high-definition TV or the like, for a long period of time.

2. Description of the Related Art

As is generally known, various methods have been studied which achieve the digital transmission of video signals. Among these transmission methods are: a method which uses a variable length coding scheme, and a method in which intra-frame coding and inter-frame coding are performed to effect band compression. The method, wherein intra-frame coding and inter-frame coding are performed to effect band compression, is a band compression technique, as is disclosed in, for example, "Digital compatible HD-TV Broadcast system", Woo Paik, IEEE Trans. on Broadcasting Vol. 36 No. 4 December 1990. The characterizing features of this technique will be described below.

As is shown in FIG. 1, a video signal input to an input terminal 11 is supplied to a subtracter 12 and a motion evaluation circuit 13. The subtracter 12 performs subtraction (to be described later), generating an output. The output of the subtracter 12 is input to a DCT (discrete cosine transformation) circuit 14. The DCT circuit 14 receives data in units of blocks, each consisting of 8 pixels in the horizontal direction × 8 pixels in the vertical direction (8 × 8 pixels = 64 pixels). It transforms a pixel array, from a time axis region to a frequency region, thereby obtaining coefficients. A quantizer 15 quantizes the coefficients. The quantizer 15 has 32 different quantization tables. It quantizes each coefficient in accordance with a selected one of the quantization tables. The quantization tables are arranged in the quantizer 15 in order that the generation and transmission amounts of information may fall within a predetermined range.

The coefficient data output from the quantizer 15 is zigzag-scanned, from a low-frequency region to a high-frequency region, in units of blocks. It is then input to a variable length encoder 16 to be converted into a variable length code constituted by the number of continuous zero coefficients (run length) and a non-zero coefficient, which form one pair of coefficients. The encoder 16 is a variable length encoder designed to change the code length in accordance with the frequency at which Huffman codes and the like occur. The variable-length-coded data is input to a FIFO (fast-in/fast-out) circuit 17 and is output therefrom at a predetermined rate. It is subsequently supplied through an output terminal 18 to a multiplexer (not shown) provided at the next stage and designed to multiplex a control signal, audio data, sync data (SYNC), NMP (to be described later), and the like). The data is then sent to a transmission path. The FIFO circuit 17 serves as a buffer for cancelling out the difference between the amount of codes generated and the amount of codes transmitted. This difference has been made since the output rate of the variable length encoder 16 is variable, whereas the transmission rate in the transmission path is fixed.

Then output from the quantizer 15 is input to an inverse quantizer 19. The quantizer 19 inversely quantizes the output of the quantizer 15, producing an output. The output of the reverse quantizer 19 is input to an inverse DCT circuit 20. The circuit 20 restores to the output to the original signal. The signal is input via an adder 21 to a frame delay circuit 22, the output of which is supplied to a motion compensation circuit 23 and the motion evaluation circuit 13.

The motion evaluation circuit 13 compares the input signal from the input terminal 11 with the output signal from the motion compensation circuit 23, thereby detecting the overall motion of a corresponding image and controlling the phase position of the signal output from the motion compensation circuit 23. If the image is a still image, compensation is performed to make the current image and an image one frame ahead thereof coincide with each other. The output from the motion compensation circuit 23 is supplied to the subtracter 12 through a switch 24, and is also fed back from the adder 21 to the frame delay circuit 22 through a switch 25.

The basic operation of the above system will be described below. The basic operation of the system includes intra-frame coding and inter-frame coding. Intra-frame coding is performed as follows. During this processing, both switches 24 and 25 are kept off. A video signal input to the input terminal 11 is transformed from a time axis region to a frequency region by the DCT circuit 14 and is quantized by the quantizer 15. The quantized signal is variable-length-coded and is output to the transmission path through the FIFO circuit 17. The quantized signal is restored to the original signal by the inverse quantizer 19 and the inverse DCT circuit 20 and is delayed by the frame delay circuit 22. That is, intra-frame coding is equivalent to processing of directly converting the information of an input video signal into a variable length code. This intra-frame coding is performed in an appropriate cycle, for example, for every scene change of an input video signal, or in units of predetermined blocks. Periodic intra-frame processing will be described later.

The inter-frame coding will now be described. To start this processing, both switches 24 and 25 are turned on. As a result, the subtracter 12 generates a difference signal representing the difference between an input video signal and a video signal one frame ahead thereof. This difference signal is input to the DCT circuit 14 and is thereby transformed from a time axis region to a frequency region. The signal is then quantized by the quantizer 15. The adder 21 adds the difference signal and the video signal, producing a sum signal. The sum signal is input to the frame delay circuit 22. The delay circuit 22 generates a predictive video signal predicting the input video signal from which to generated the difference signal. The predictive video signal is input to the motion compensation circuit 23.

FIGS. 2 shows line signals sent to the transmission path. These signals gave been obtained by performing, in the above-described manner, intra-frame coding and inter-frame coding on a video signal used as a high-definition television signal. Each line signal is on the transmission path. It has been obtained by multiplexing a control signal, an audio signal, a sync signal (SYNC), a system control signal, an NMP, and the like. Shown at (a) in FIG. 2 is the first line signal. Shown at (b) in FIG. 2 is one of other line signals subsequent to the first line signal.

If this video signal has been obtained by intra-frame coding, a proper video signal can be produced by performing inverse conversion on the video signal. If the video signal has undergone inter-frame coding, inverse conversion of the signal will reproduce a difference signal. Therefore, if a video signal (or a predictive video signal) reproduced one frame ahead the current frame is added to this difference signal, a proper video signal can be reproduced.

According to the above-described system, all information represented by a signal which has been subjected to intra-frame coding is put to variable-length coding, and signals subjected to inter-frame coding in the subsequent frames represent difference information, thus realizing band compression.

The sets of pixels to be processed by the band compression system will be defined below:

Block: A block is a 64-pixel area constituted by 8 pixels in the horizontal direction×8 pixels in the vertical direction.

Super block: A super block is an area of a luminance signal constituted by 4 blocks in the horizontal direction and 2 blocks in the vertical direction. This area includes one block of a color difference signal U and one block of a color difference signal V. The image motion vectors obtained by the motion evaluation circuit 13 are set in units of super blocks.

Macro-block: A macro-block is constituted by 11 super blocks in the horizontal direction. When codes are to be transmitted, DCT coefficients in a block are transformed into codes determined by the number of continuous zero coefficient and the amplitudes of non-zero coefficients and are transmitted in sets. An end-of-block signal is added to the end portion of each block. Motion vectors obtained by motion compensation in units of super blocks are added and transmitted in units of macro-blocks.

Features especially associated with the transmission signals shown in FIG. 2 will be described in more detail. The sync signal (SYNC) of the first line is identical to a frame sync signal stored in a decoder. All timing signals for the decoder are generated from one sync signal per frame. The NMP signal of the first line indicates the number of video data items, counted from the end of the first line signal to a macro-block of the next frame. Since codes are generated by means of adaptively switching intra-frame coding and inter-frame coding, the number of codes for each frame differs from that for any other frame, and the positions of codes vary. For this reason, the NMP signal indicates the positions of codes corresponding to one frame.

Periodical intra-frame processing is performed to cope with a case where a user changes a channel. In this band compression system, as described above, 11 super blocks in the horizontal direction constitute one macro-block, and 44 super blocks are arranged in one frame in the horizontal direction. That is, four macro-blocks exist in the horizontal direction, and 60 macro-blocks in the vertical direction. Hence, 240 macro-blocks, in total, are present in one frame. In the band compression system, as shown in FIG. 4, refreshing every vertical array of super blocks in units of 4 macro-blocks, and also refreshing all the super blocks are for a 11-frame period. That is, when the refreshed super blocks of 11 frames are accumulated, the intra-frame coding in all the areas comes to completion, as shown in FIG. 62(d). Thus, in the normal reproduction mode of, for example, a VTR (video tape recorder), the above-described intra-frame coding is carried out for a 11-frame period, reproduced images can be seen without problems.

Head data is inserted ahead each of the macro-blocks described above. This head data includes a collection of the motion vectors of the respective super blocks, field/frame determination data, PCM/DPCM determination data, quantization levels, and the like.

The above-described band compression system is used as an encoder for band compression of a television signal. At the receiving end, use is made of a decoder which corresponds to the encoder. Consider a case where the above-described transmission signal is recorded by a VTR. A general VTR employs a recording scheme in which a one-field video signal is converted into a fixed-length code to generate a predetermined amount of information. The information is recorded on X tracks (X is a positive integer).

In order to record and reproduce a transmission signal obtained by the band compression system, directly by means of the VTR, a variable length code must be as a code processed by intra-frame coding and inter-frame coding. In this case, the position at which to record a code periodically intra-frame-coded is not fixed. Therefore, blocks left refreshed are generated in the fast reproduction mode.

FIG. 5 shows track pattern which are formed when the signal, variable-length-coded in the above described manner, is recorded on a magnetic tape 26 in a helical direction. In track patterns T1 to T11, thick lines indicate positions where frames F1 to F11 are switched. The switching positions of the frames F1 to F11 are not aligned with each other are not aligned with one another. This is because the data recorded has not been prepared by variable length coding. Since all the track patterns T1 to T11 of the magnetic tape 26 are sequentially scanned by a magnetic head, a proper video signal can be reproduced, in the normal reproduction mode of the VTR, without problems by decoding the reproduction output using a decoder. In other words, in the normal reproduction mode, all the codes processed by intra-frame coding and inter-frame coding and recorded on the magnetic tape 26 can be reproduced so that a proper image can be constructed by using all the codes.

In the VTR, however, only limited tracks are reproduced in some cases, as in the case where the VTR is operated in a double-speed reproduction mode, i.e., a special reproduction mode. In the double-speed reproduction mode, the magnetic head jumps over tracks to pick up recorded signals. If the intra-frame-coded signals recorded on the tracks are sequentially reproduced, no problems will arise. If inter-frame-coded signals recorded on tracks are reproduced, however, images can be reproduced from difference signals only.

FIG. 6 show the traces X1 to X11 along which the magnetic head moves in the double-speed reproduction mode. As is shown in FIG. 6, the intra-frame-coded signals separately recorded on frames F1 to F24. The position of an intra-frame-coded portion reproduced within a frame is therefore indefinite. The intra-frame-coded signals which can be reproduced in the double-speed reproduction mode are shown at (a) to (h) in FIG.

7 and at (a) to (c) in FIG. 8. When the signals for 11 frames are accumulated, as shown at (d) in FIG. 8, there are portions in which no codes obtained by periodical intra-frame coding are present (that is, refreshed super blocks are not present), thus generating portions in which reproduced images cannot be constructed.

SUMMARY OF THE INVENTION

The present invention has been made in consideration of the above situation, and has as its object to provide a band compression signal processor which can easily obtain a good reproduced image in a fast reproduction operation.

According to the present invention, there is provided a band compression signal processor which comprises a signal-processing circuit for forming an intra-frame-processed signal by intra-frame-coding a video signal using intra-frame information, and an inter-frame-processed signal by inter-frame-coding the video signal by using inter-frame difference information, for inter-frame-coding the video signal which has been intra-frame-coded, and for repeating above signal processing adaptively according to a motion evaluation on the input video signal, and in which the signal intra-frame-processed by said signal-processing circuit is arranged within such a region as to be read out in fast reproduction mode.

BRIEF DESCRIPTION OF THE DRAWINGS

FIG. 3 shows the refresh blocks in the frames 1 to 8, which can be reproduced in the normal reproduction mode of the processor shown in FIG. 1;

FIG. 16 is a diagram illustrating super block addresses, and explaining how the refresh operation is performed in each processor of DigiCipher;

FIG. 18 is a table showing a scanning sequence for zigzag-scanning DCT coefficients;

FIG. 19 is a set of quantization tables;

FIG. 21 is a table showing the maximum number of quantization bits required in the weighting table of FIG. 20;

FIG. 25 is a diagram representing the relationship between the refresh blocks and non-refresh blocks in frame numbers $F_5$ and $F_6$;

FIG. 26 shows the track pattern on the magnetic tape used in the processor of FIG. 1;

FIG. 28 shows the refresh blocks of frames 1 to 8, which can be reproduced in the double-speed reproduction mode;

FIG. 32 is a diagram explaining how the code amount of the macro-block is controlled, using a rate buffer;

FIG. 35 is a graph showing increases/decreases in buffer occupancy ratio and quantization level;

FIG. 36 is a block diagram showing, in detail, a quantization level setting circuit;

FIG. 37 is a chart showing the generation amounts of codes in variable length coding;

FIG. 38 is a graph showing the relationship between DCT coefficient energy and correction quantization level;

FIG. 40 is a graph showing quantization levels for macro-blocks and refresh blocks;

FIG. 57 is a diagram illustrating an envelope in the double-speed reproduction operation of the VCR;

FIG. 59 is a table showing the relationship between index/over-head data and each circuit;

FIG. 60 is a block diagram showing, in detail, a code re-switching circuit;

FIG. 69 is a table showing speeds at which fast reproduction can be performed;

FIG. 70 shows an image reproduced in the triple-speed reproduction mode;

FIG. 72 is a diagram showing the track pattern which will be formed on a magnetic tape if the invention is not applied;

FIG. 74 is a diagram showing the refresh blocks of frames 9 to 11 and the refresh blocks of 11 frames, which can be reproduced and accumulated, respectively, if the invention is not applied;

FIGS. 79 and 80 are diagrams representing the relationship which the head traces and the refresh blocks have in the double-speed reproduction mode;

FIG. 81 is a diagram illustrating the relationship between the refresh blocks and non-refresh blocks of frames $F_{n+2}$ and $F_{n+3}$;

FIGS. 83 and 84 are diagrams representing the relationship which the head traces and the refresh blocks have in the six-time-speed reproduction mode;

Figure 87:
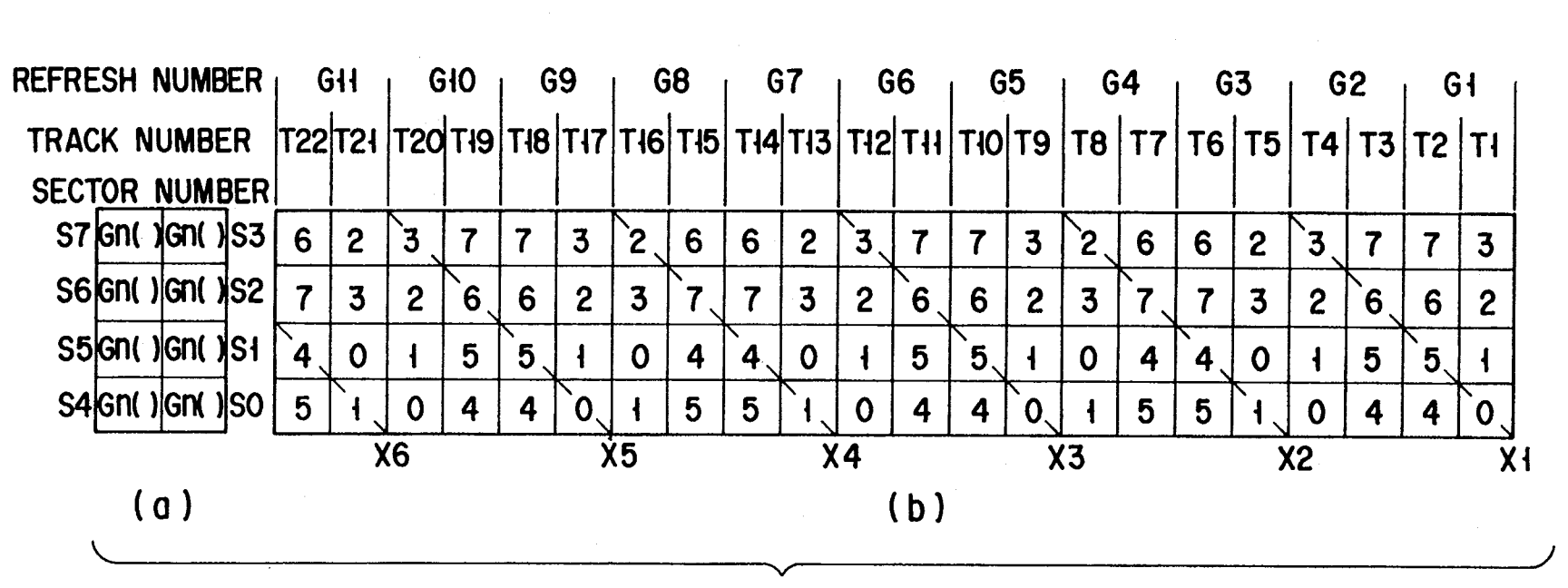
Figure 88:
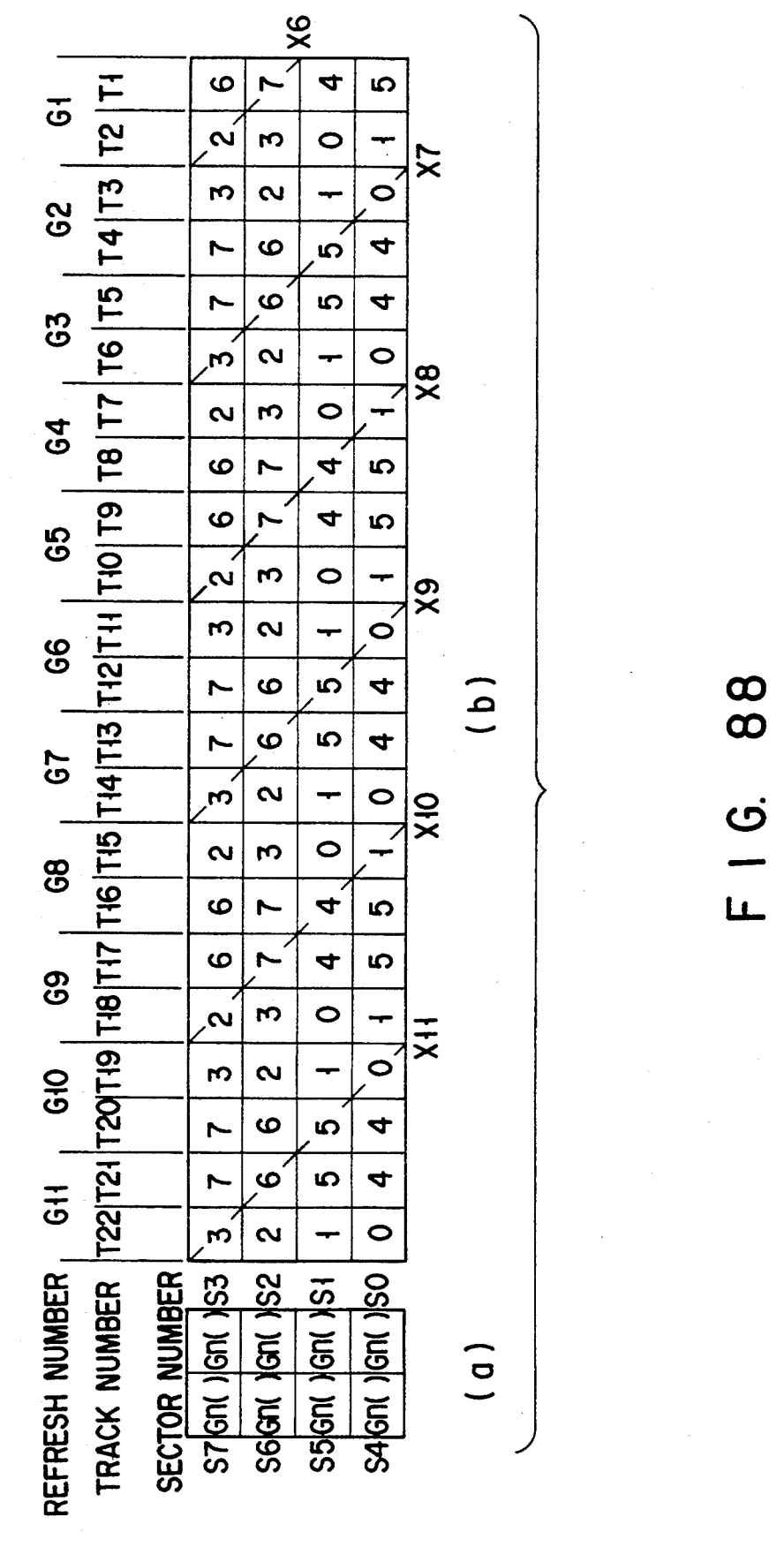
Figure 89:
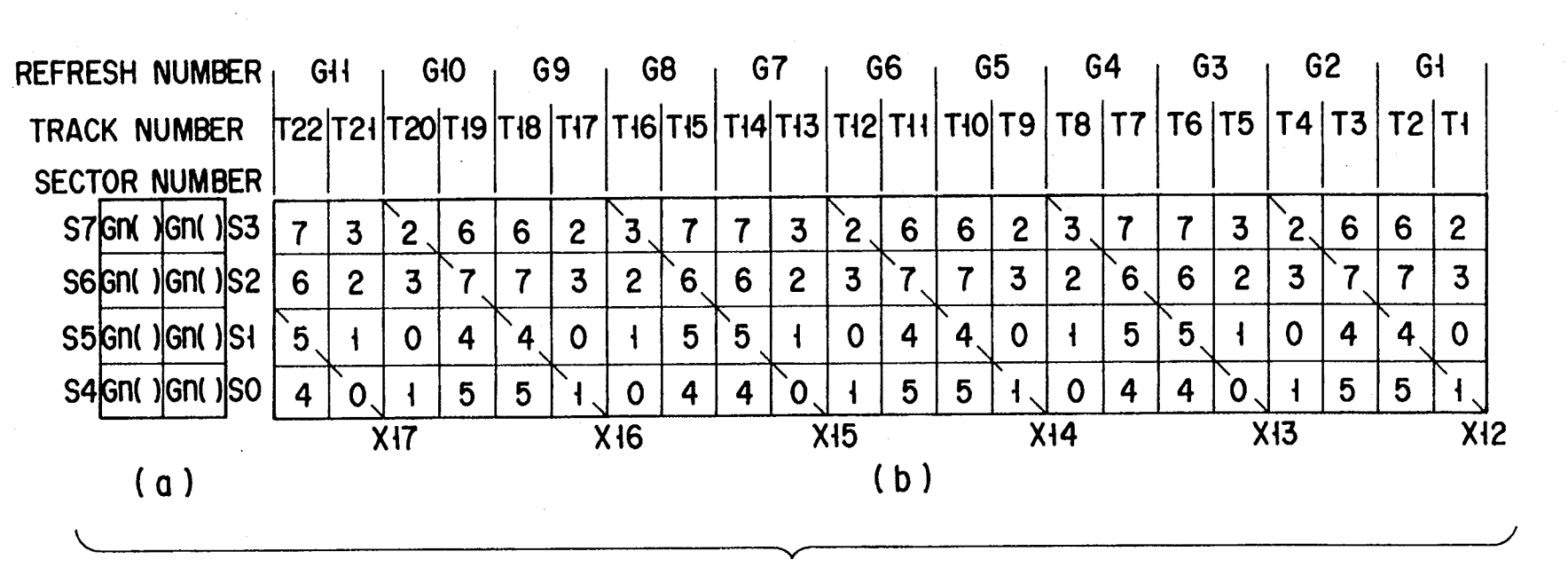
Figure 90:
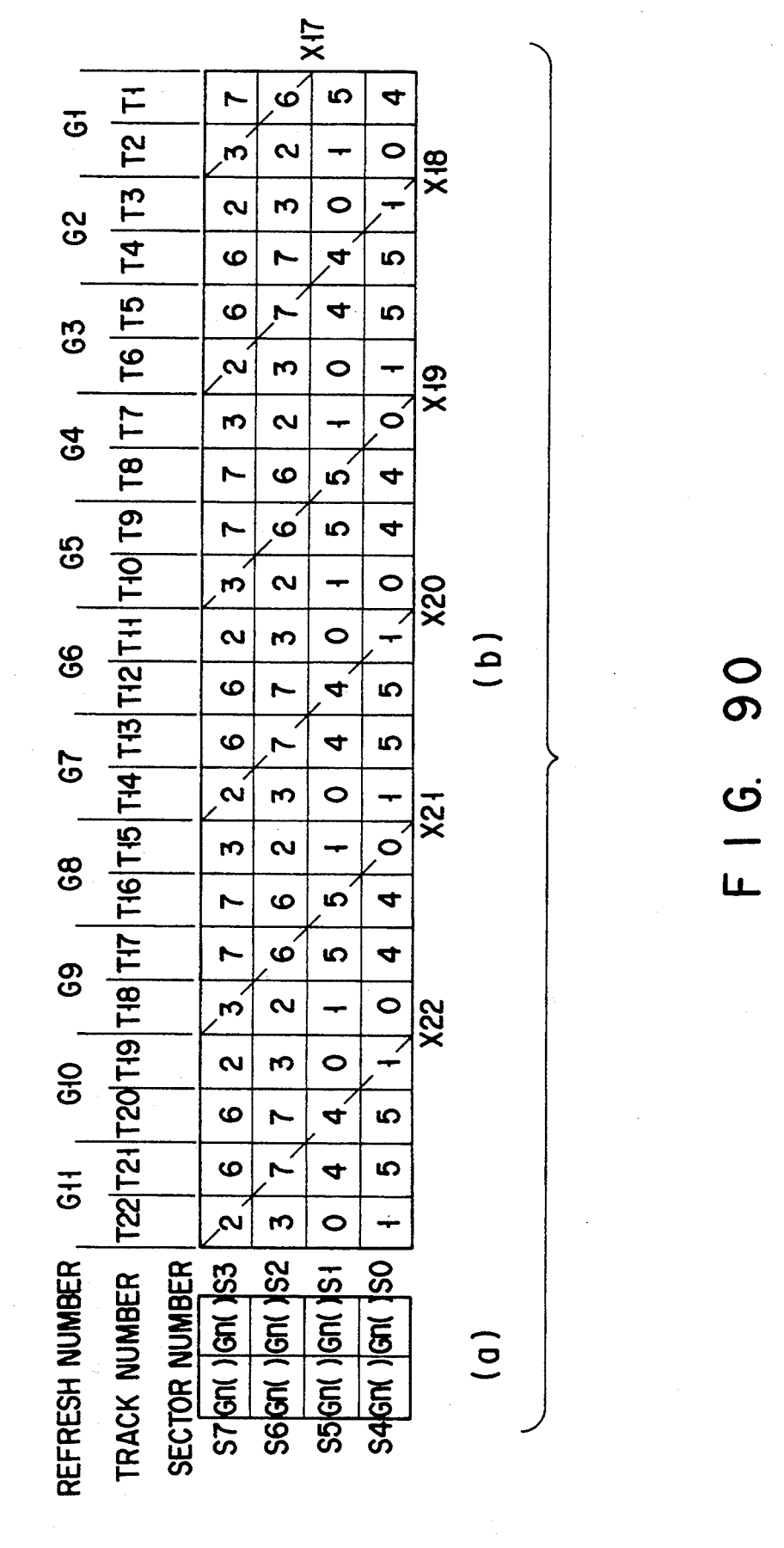

FIGS. 87 to 90 are diagrams representing the relationship which the head traces and the refresh blocks have in the quadruple-speed reproduction mode;

FIG. 91 is a diagram showing the track pattern on a magnetic tape;

FIGS. 100 and 101 are diagrams illustrating the relationship which the head traces and the refresh blocks have in the double-speed reproduction mode;

FIGS. 115 to 117 are timing charts explaining the band compression signal processor;

FIG. 124 is a block diagram showing another modification of the encoder side of the processor shown in FIG. 120;

FIG. 127 is a block diagram showing still another modification of the encoder side of the processor shown in FIG. 120;

FIG. 128 is a timing chart explaining the operation of the encoder side shown FIG. 127;

FIG. 129 is a diagram showing the traces of the magnetic head moving in a double-speed reproduction operation; and FIGS. 130 to 133 are diagram explaining how data is reproduced from a disk in the fast reproduction mode.

DETAILED DESCRIPTION OF THE PREFERRED EMBODIMENTS

Figure 1:
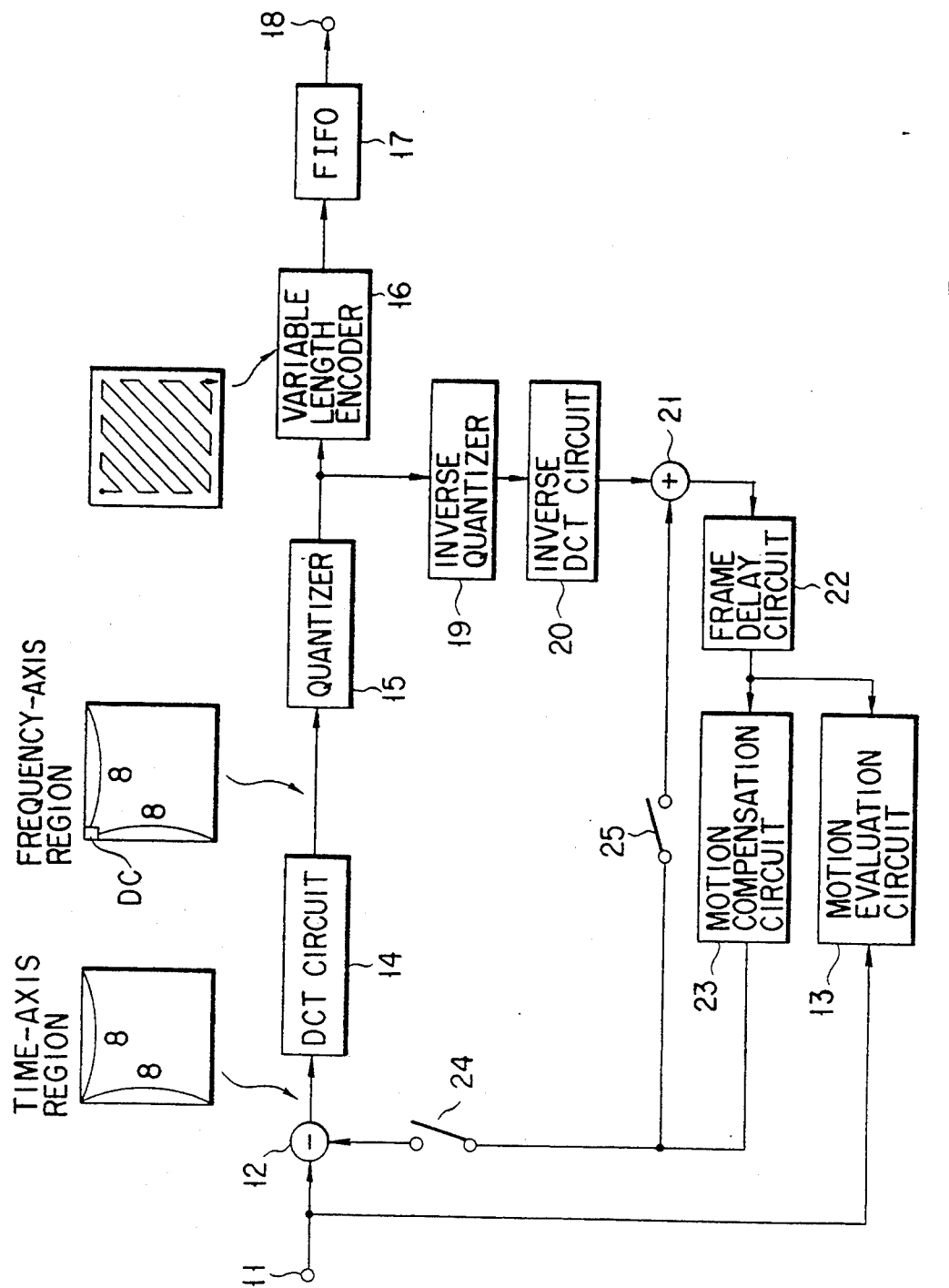
FIG. 1 is a block diagram showing a band compression signal processor according to an embodiment of the present invention.

An embodiment of the present invention will be described in detail below with reference to the accompanying drawings. In the drawings, the double-lined blocks indicate the novel features specific to the embodiment.

1. Basic Block Diagram

Figure 9:
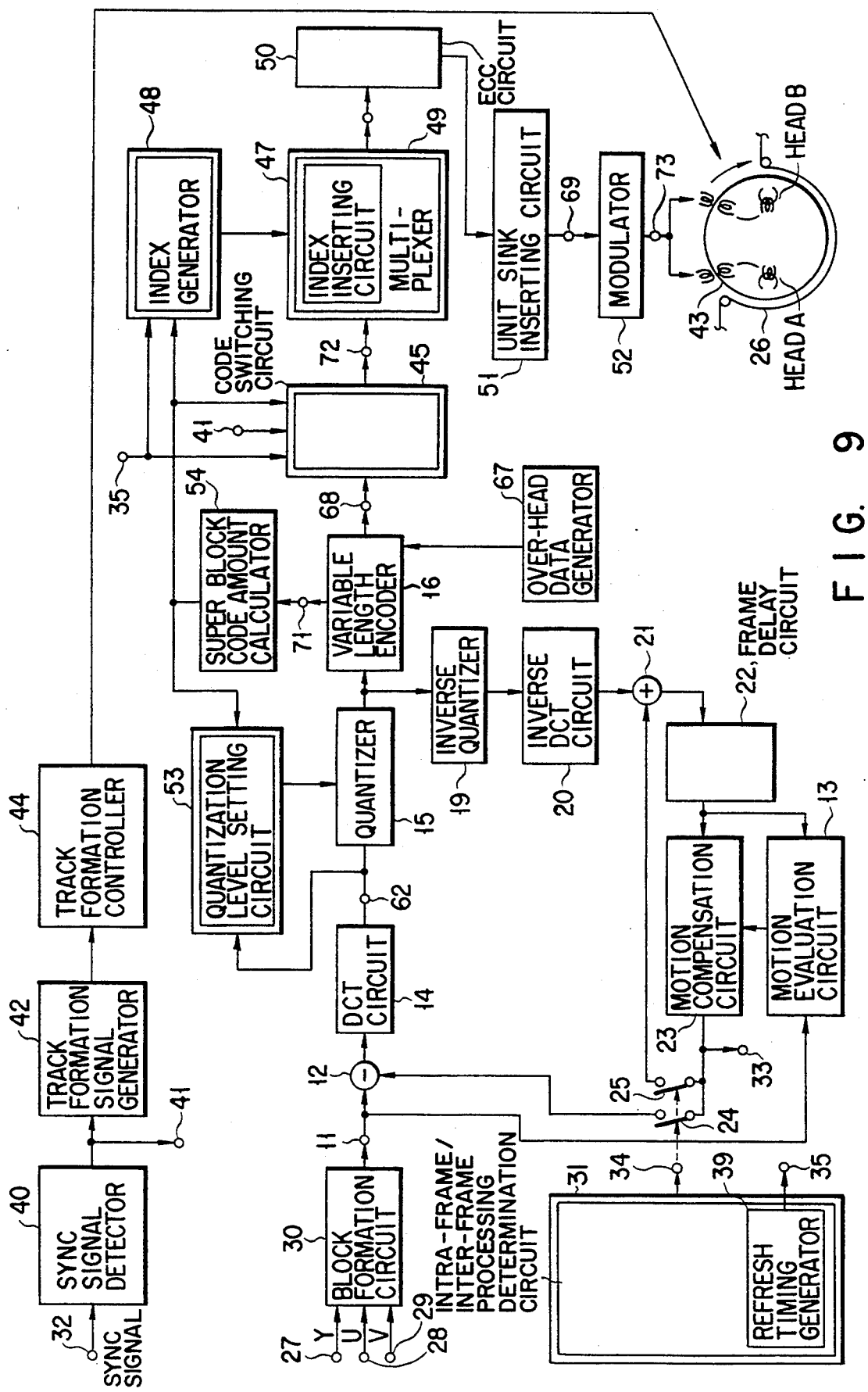
FIG. 9 is a block diagram showing the encoder-side section of another band compression signal processor according to the present invention.

FIG. 9 shows the basic block diagram of the embodiment of the present invention.

A luminance signal Y, a color difference signal U, and a color difference signal V, all being high-definition TV signals, are input to video input terminals 27, 28, and 29, respectively.

Having been pre-processing as is required, these signals are input to a blocking circuit 30. The circuit 30 processes the signals, thereby forming blocks having pixel arrangements (to be described later in Chapter 2). The blocks are input to an input terminal 11.

The video signal input to the input terminal 11 is supplied to a subtracter 12 and a motion evaluation circuit 13. The subtracter 12 performs subtraction which will be described later, producing data. The data output by the subtracter 12 is input to a DCT (discrete cosine transformation) circuit 14. The DCT circuit 14 receives the data in units of blocks, each consisting of 8 pixels in the horizontal direction × 8 pixels in the vertical direction (8 × 8 pixels = 64 pixels). The DCT circuit 14 transforming a pixel array from a time axis region to a frequency region, thereby generating coefficients. The coefficients are supplied to a quantizer 15. The quantizer 15 has 10 or 32 types of quantization tables. The quantizer 15 quantizes each of the coefficient, in accordance with a selected one of the quantization table. The quantization tables are arranged such that the amount of information generated and the amount of information transmitted fall within a predetermined range.

The coefficient data output from the quantizer 15 is zigzag-scanned, from a low-frequency region to a high frequency region, in units of blocks. The data, thus scanned, is input to a variable length encoder 16. The encoder converts the data into a variable length code consisting of a zero coefficient count (run length) and a non-zero coefficient. The encoder 16 is a variable length encoder designed to change the code length in accordance with the frequency of occurrence of Huffman codes or the like. The data output by the encoder 16, i.e., variable-length-coded data, is input to a FIFO (first-in/first-out) circuit 17. The FIFO circuit 17 reads the data at a predetermined rate. The data is then supplied to a multiplexer provided at the next stage, for multiplexing a control signal, audio data, sync data (SYNC), NMP (to be described later), and the like,) and is hence sent to a transmission path. The FIFO circuit 17 serves as a buffer for canceling out the difference between the amount of codes generated and the amount of codes transmitted. Said difference has resulted since the output rate of the variable length encoder 16 is variable, whereas the rate of the transmission path is fixed.

In the meantime, the output of the quantizer 15 is input to an inverse quantizer 19. The quantizer 19 inversely quantizes the output of the quantizer 15 and generates an output. The output of the inverse quantizer 19 is input to an inverse DCT circuit 20. The DCT circuit 20 restores the input signal to the original signal. The signal is input via an adder 21 to a frame delay circuit 22. An output from the frame delay circuit 22 is supplied to a motion compensation circuit 23 and the motion evaluation circuit 13.

The motion evaluation circuit 13 compares the signal supplied from the input terminal 11 with the signal supplied from the frame delay circuit 22, thereby detecting the overall motion of a corresponding image. The overall motion, thus detected, is used to control the phase position of the signal output from the motion compensation circuit 23. If the image is a still image, compensation is performed, causing a current image and an image one frame ahead thereof to coincide with each other. An output from the motion compensation circuit 23 is supplied to the subtracter 12 through a switch 24, and is fed back from the adder 21 to the frame delay circuit 22 through a switch 25.

A basic operation of the system described above will be explained.

2. Pixel Arrangement

The signal input to the input terminal 11 constitutes blocks, super blocks, and macro-blocks, each consisting of a plurality of effective pixels within a frame. This block arrangement is based on DigiCipher. Nonetheless, any other block arrangement such as the arrangement used for MPEG or the arrangement for DSC-HDTV: Zenith+ATT, or the like may be employed. The block arrangement will be defined with reference to FIG. 10.

Frame: FIG. 10(a)

A frame is constituted by 1,050 scanning lines, which are interlaced.

Effective pixels are constituted by 1,408 pixels in the horizontal direction and 960 pixels in the vertical direction.

A video signal for one frame is processed by four processors.

Figure 11:
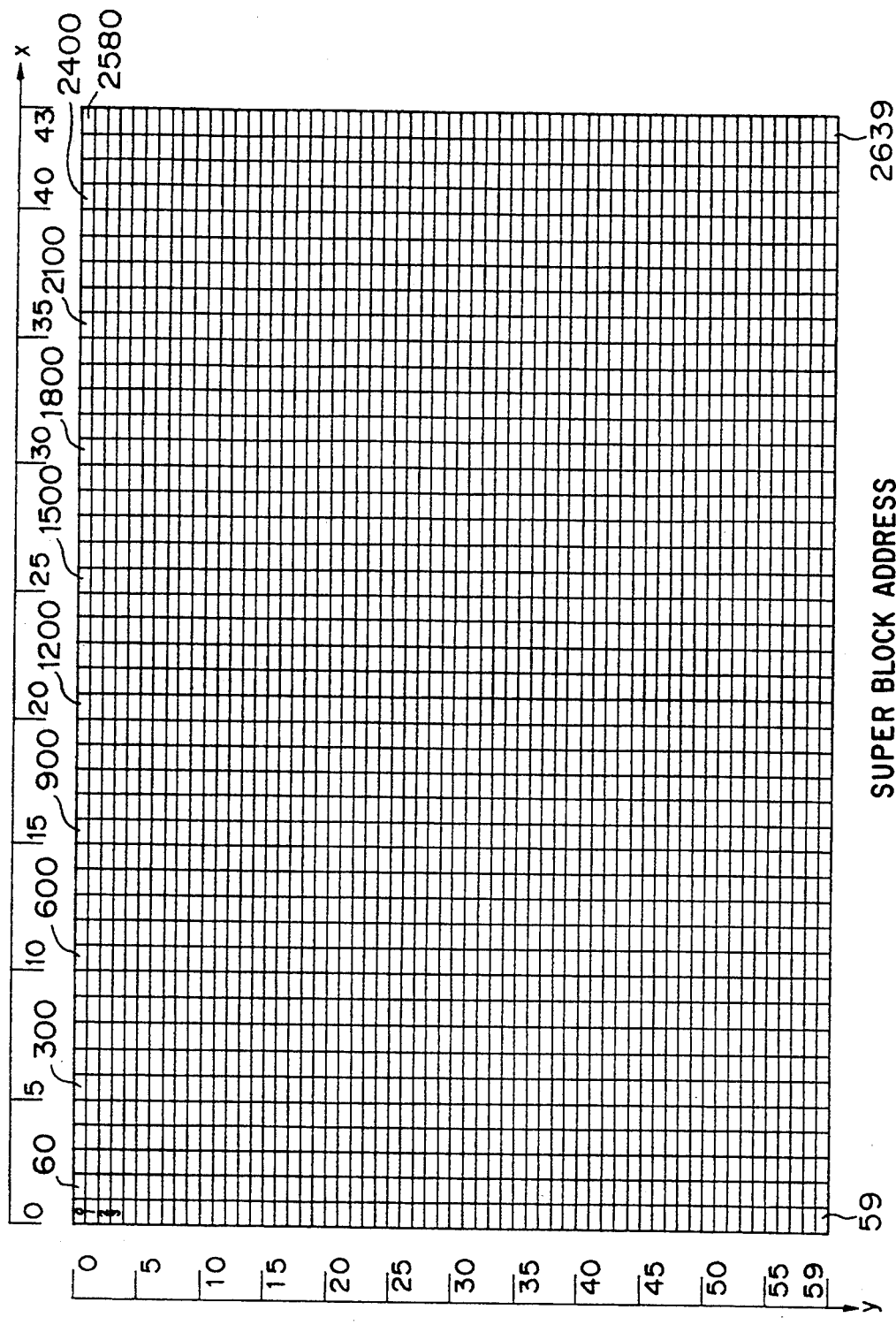
FIG. 11 is a diagram explaining super blocks.

FIG. 11 shows the relationship between one frame and super block addresses (to be referred to as S.B.As=Super Block Addresses hereinafter).

There are 44 super blocks in the horizontal direction, and 60 super blocks in the vertical direction. That is, 2,640 super blocks are present in one frame. S.B.As are assigned to the respective super blocks.

If super block addresses in the horizontal and vertical directions are respectively represented by x and y, their relationship is expressed as follows:

$$S.B.A = 60 \, x + y$$

Block: As shown in FIG. 10(d), a block is a 64-pixel area constituted by 8 pixels in the horizontal direction × 8 pixels in the vertical direction.

Super block: As shown in FIG. 10(c), a super block is an area of a luminance signal constituted by 4 blocks in the horizontal direction × 2 block in the vertical direction. This area includes one block of a color difference signal U and one block of a color difference signal V. The image motion vectors obtained by the motion evaluation circuit 13 can be set in units of super blocks.

Macro-block: As shown in FIG. 10(b), a macro-block is constituted by 11 super blocks in the horizontal direction. In transmission of codes, the DCT coefficients of a block are transformed into codes determined by zero coefficient counts and the amplitudes of non-zero coefficients, and the codes are transmitted in sets, with an end-of-block signal added to the end of the block. Motion vectors for motion correction set in units of super blocks are added and transmitted as over-head data in units of macro-blocks.

As has been described, in this band compression system, a set of 11 super blocks in the horizontal direction is called a macro-block. In one frame, 44 super blocks are present in the horizontal direction. That is, 4 macro-blocks in the horizontal direction × 60 macro-blocks in the vertical direction, i.e., 240 macro-blocks in all are present in one frame. In the band compression system, as shown at (a) to (h) in FIG. 12, and at (a) to (c) in FIG. 13, refreshing is performed for every vertical array of super blocks in units of 4 macro-blocks, and all the super blocks are refreshed at a period of 11 frames. In other words, when the refreshed super blocks of 11 frames are accumulated, intra-frame processing in all areas is completed, as shown in FIG. 13(d).

3. Intra-frame/inter-frame Coding

The basic operation of the system includes intra-frame coding and inter-frame coding.

Intra-frame coding is performed as follows. During this processing, both switches 24 and 25 are kept off. A video signal input to the input terminal 11 is transformed, from a time axis region to a frequency region, by the DCT circuit 14, and is quantized by the quantizer 15. The quantized signal is variable-length-coded and is output to the transmission path through the FIFO circuit 17. The quantized signal is restored to the original signal by the inverse quantizer 19 and the inverse DCT circuit 20 and is delayed by the frame delay circuit 22. Hence, intra-frame coding is equivalent to processing of directly converting the information of an input video signal into a variable length code. This intra-frame coding is effected at a proper period, e.g., for every scene change of an input video signal or in units of predetermined blocks. Periodic intra-frame coding will be described later.

Inter-frame processing will now be described. To initiate this processing, both switches 24 and 25 are turned on. As a result, the subtracter 12 generates a signal corresponding to the difference between an input video signal and a video signal one frame ahead thereof. The difference signal is input to the DCT circuit 14 to be transformed from a time axis region to a frequency region. The signal is then quantized by the quantizer 15. The adder 21 adds the difference signal and the video signal, producing a sum signal. The sum signal is input to the frame delay circuit 22. As a result, a predictive video signal predicting the input video signal which is the basis of the difference signal is generated and input.

In general, the amount of codes generated in intra-frame processing is larger than that in inter-frame processing.

4. Intra-frame/inter-frame Switching Processing

4.1 Image adaptive intra-frame processing

An intra-frame/inter-frame processing switching operation is controlled by an intra-frame/inter-frame processing determination circuit 31. Two types of control methods are available for this operation.

In the first method, a signal having an inter-frame correlation is subjected to inter-frame processing, and a signal having no inter-frame correlation is subjected to intra-frame processing, either signal in accordance with the contents of the video signal input. When a scene change occurs, intra-frame processing is performed.

The intra-frame/inter-frame processing determination circuit 31 compares the predicted error energy between the current frame signal from the input terminal 11 and the predictive signal output from the motion compensation circuit 23 with the energy of the current signal.

Figure 14:
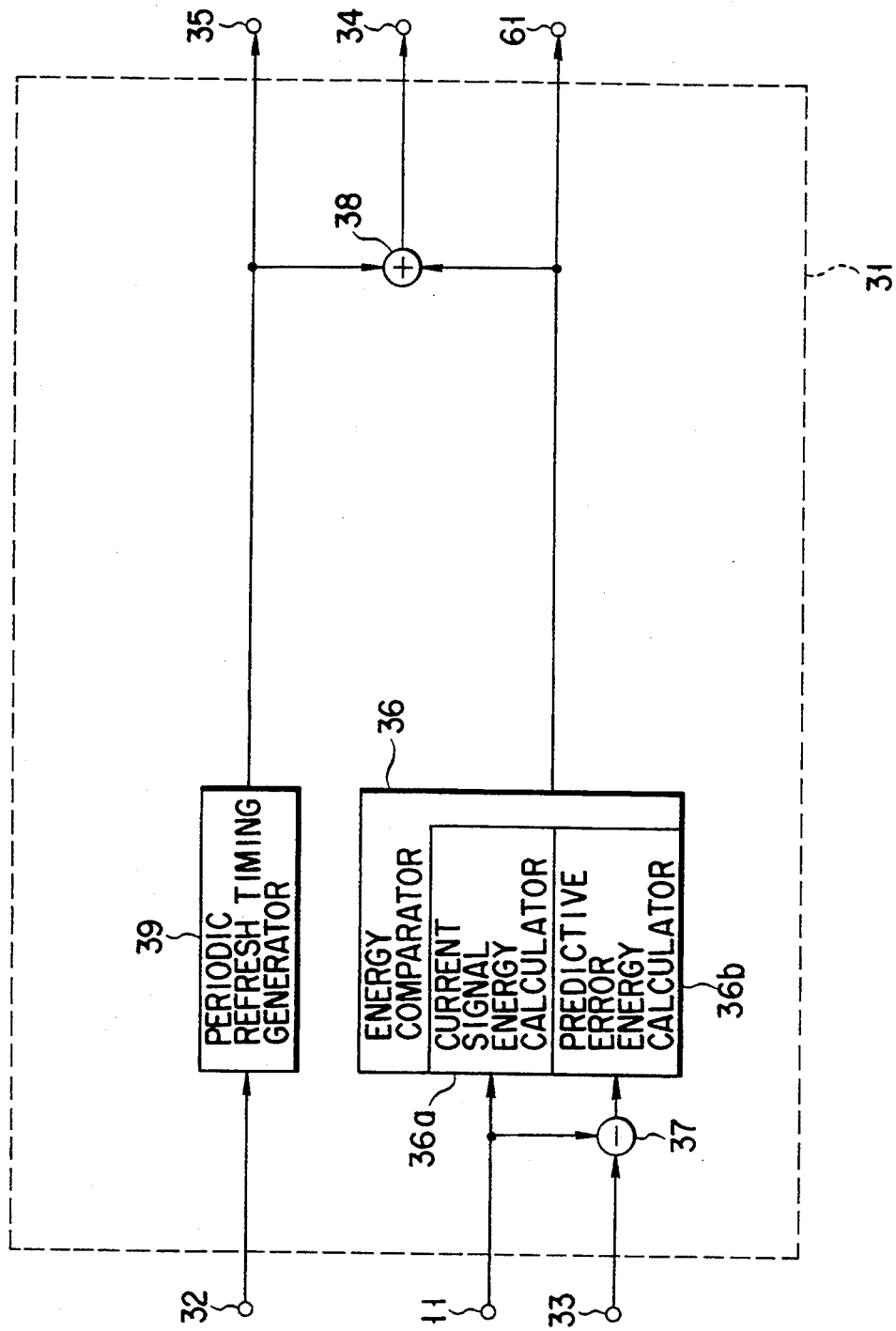
FIG. 14 is a block diagram showing the intra-frame/inter-frame processing determination circuit incorporated in the process of FIG. 9.

In FIG. 14, input terminals 11, 32, and 33 and output terminals 34 and 35 are the same as input terminals 11, 32, and 33 and output terminals 34 and 35—all shown in FIG. 9.

The current signal is input to the input terminal 11. More precisely, the current signal is input to an energy comparator 36 and a subtracter 37. A predictive signal output from the motion compensation circuit 23 is input to terminal 33. The subtracter 37 produces a predicted error which is the difference between the current signal and the predictive signal.

The energies of the current signal and the predicted error are respectively calculated by a current signal energy calculator 36a and a predicted error energy calculator 36b to be compared with each other. The energies of the current signal and the predicted error are calculated according to the following equations:

The energy of the current signal:

$$O = \frac{\sum_{k=0}^{7} \sum_{l=0}^{7} O(k,l)^2}{64} - \left\{ \frac{\sum_{k=0}^{7} \sum_{l=0}^{7} O(k,l)}{64} \right\}^2 \quad (a)$$

The energy of the predicted error $$\epsilon = \frac{\sum_{k=0}^{7} \sum_{l=0}^{7} \{S(k,l) - O(k,l)\}^2}{64} \quad (b)$$

In the equations, O(k, l) is the coefficient of the current signal, S(k, l) is the coefficient of the block motion-compensated, k is the position of the block measured in the horizontal axis, and l is the position of the block in the vertical axis.

Figure 15:
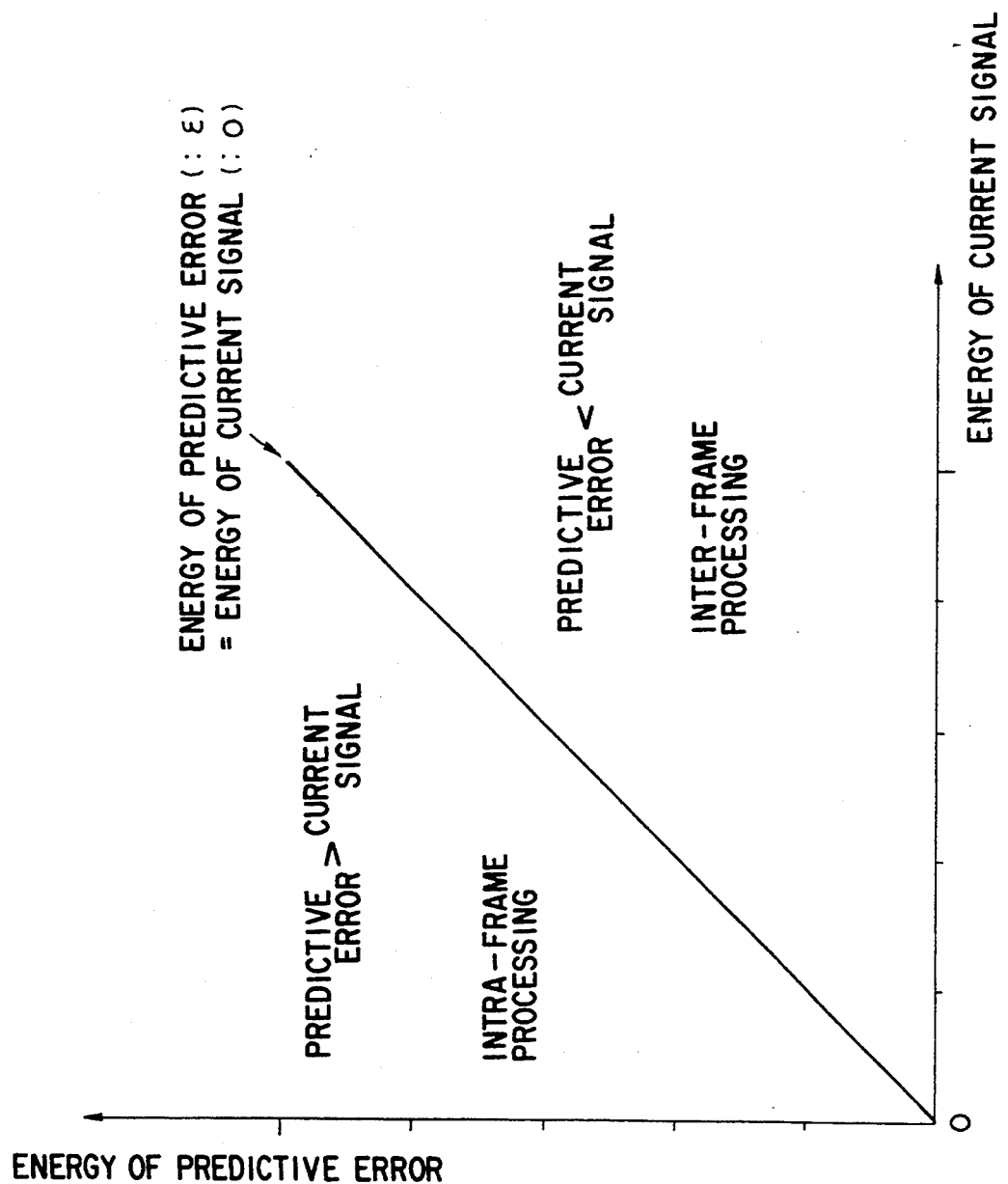
FIG. 15 is a graph showing intra-frame/inter-frame determination characteristics of the circuit shown in FIG. 14.

FIG. 15 shows an intra-frame/inter-frame processing determination method in the energy comparator 36.

In FIG. 15, the energy of the current signal is plotted on the abscissa, and the energy of the predicted error on the ordinate. The solid line obliquely extending from origin O indicates the case where the energy of the predicted error is equal to the energy of the current signal.

In a region below the solid line, since the energy of the prediction error is lower than that of the current signal, inter-frame processing is performed. In a region above the solid line, since the energy of the current signal is lower, intra-frame processing is carried out.

The energy comparator 36 outputs an intra-frame/inter-frame processing determination signal in accordance with the input signal. The output signal of the comparator 36 is synthesized by an adder 38 and is output from the output terminal 34.

4.2 Forcible intra-frame processing (refresh)

In the second method, intra-frame processing is forcibly performed regardless of the correlation of a video signal. In this case, intra-frame processing is periodically performed with respect to a predetermined area of a frame.

This forcible intra-frame processing is performed for the two purposes described below:

1. To allow a user to recognize an image within a predetermined period of time, when he or she changes the channel.
2. To accomplish special reproduction in the case where a recording medium such as a VTR or a disk is utilized.

Such forcible intra-frame processing is generally known as "refreshing". The time required to refresh a predetermined area is called "refresh time".

As is shown in FIG. 14, a periodic refresh timing generator 39 is used to effect this refreshing operation. The timing generator 39 is designed to receive a sync signal through the input terminal 32 and generate an intra-frame selection signal in a predetermined period, in synchronism with this sync signal. The adder 38 adds the selection signal to the intra-frame/inter-frame processing determination signal output from the energy comparator 36, forming an intra-frame/inter-frame processing switching signal. The switching signal is output from the terminal 34.

5. Refreshing

Refreshing in each scheme will be described in detail below.

5.1 Digicipher refreshing

In DigiCipher, as has been described, a set of 11 super blocks arranged in the horizontal direction is called "macro-block," and 44 super blocks are present in the horizontal direction in one frame. That is, 4 macro-blocks in the horizontal direction × 60 macro-blocks in the vertical direction, i.e., 240 macro-blocks in total, are present in one frame. In the band compression system, as shown at (a) to (h) in FIG. 12, and at (a) to (c) in FIG. 13, refreshing is performed for every vertical array of super blocks in units of 4 macro-blocks, and all the super blocks are refreshed at a period of 11 frames. That is, when the refreshed super blocks of 11 frames are accumulated, intra-frame processing in all the areas is completed, as shown at (d) in FIG. 13.

The merit of this refreshing is that only a small-capacity rate buffer is required since refreshing is evenly performed in each frame.

FIG. 16 represents refreshing in DigiCipher by using super block addresses in FIG. 11.

In FIG. 16, the ordinate represents super block addresses, and the abscissa indicates frame numbers. The black marks indicate portions on which intra-frame processing is performed. FIG. 16 shows only the case of refreshing.

Referring to FIG. 16, refreshing is performed with respect to all the super blocks in each of 11 frames having frame numbers F0 to F10.

Since the same processing is performed by four processors, refreshing in DigiCipher will be described below by exemplifying a refreshing operation by one processor as in FIG. 16, with reference to FIG. 16 and FIG. 17A.

That is, portions corresponding to S.B.As=0 to 659 will be described below.

Figure 17A:
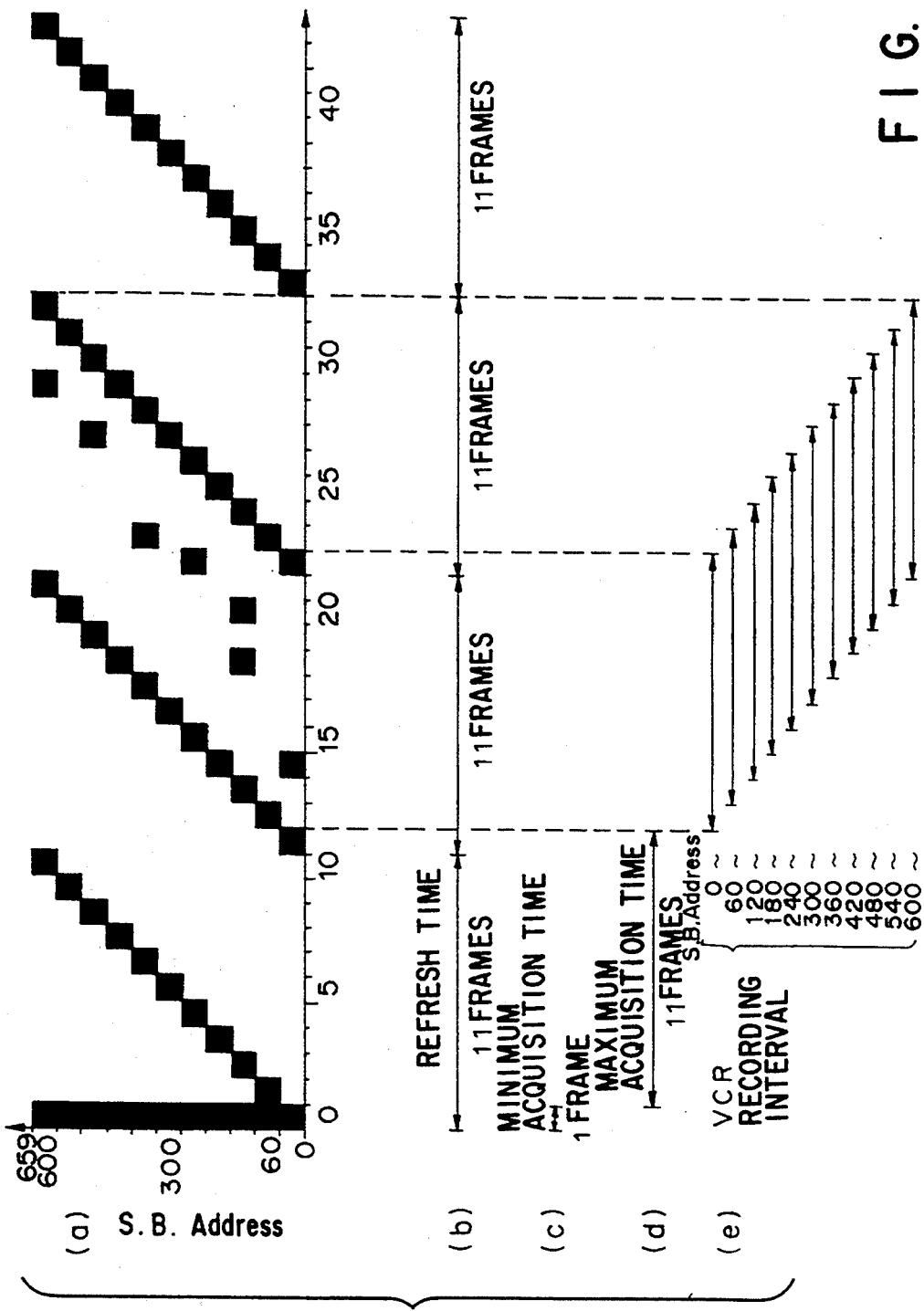
FIG. 17A is a diagram explaining how the refresh operation is effected in DigiCipher.

Black marks at (a) in FIG. 17A represent portions on which refreshing and image adaptive intra-frame processing are performed.

For frame F0, for example, intra-frame processing is effected with respect to all the areas indicated by S.B.As 0 to 659 on the assumption that a scene change occurs. For frame F14, intra-frame processing is performed with respect to areas indicated by S.B.As 0 to 59.

Shown at (b) in FIG. 17A is the refresh time in DigiCipher. Part of each frame is refreshed, and one refresh processing is completed at a period of 11 frames. Therefore, 11 frames correspond to the refresh time. Refreshing of one frame is completed in any 11-frame period. That is, refreshing is completed either in the period of 11 frames F0 to F10 or in the period of 11 frames F1 to F11.

As shown at (c) in FIG. 17A, the minimum acquisition time is a one-frame period, which is obtained when a scene change occurs and initialization is started.

Shown at (d) in FIG. 17A is the maximum acquisition time which is obtained when no image adaptive intra-frame processing is performed. The maximum acquisition time is an 11-frame period.

Assume that data is recorded by a VCR, and fast reproduction is realized by using only refresh blocks. In this case, as shown at (e) in FIG. 17A, the recording interval of the VCR corresponds to 11-frame periods shifted from each other in terms of time at the respective refresh block addresses.

5.2 Refreshing in MPEG

First, the refreshing performed in MPEG will be described with reference to FIG. 17B.

In MPEG, refreshing is performed in units of a frame. Any frame refreshed is called "I picture." The period of the I picture, i.e., the refresh period, is set for each frame, and 12, 15, . . . , or frame is selected.

This will be described, assuming, for simplicity, that there are 1050 scanning lines. Needless to say, the following description can apply to any other block structure.

Figure 17B:
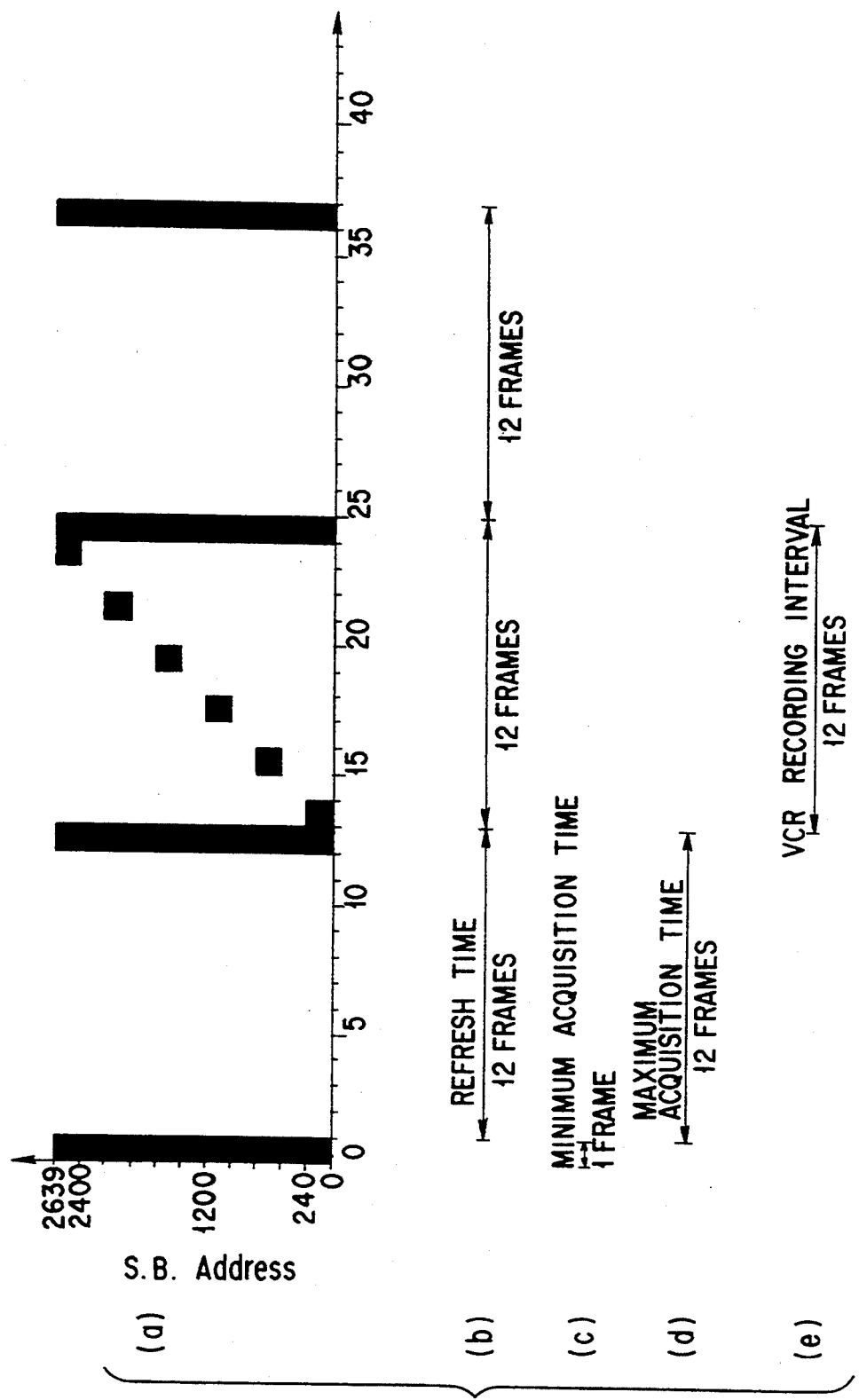
FIG. 17B is a diagram explaining low referring is performed in MPEG.

At (a) in FIG. 17B, the ordinate indicates a super block address. The super block address corresponds to the super block address defined in FIG. 11. At (a) in FIG. 17, the abscissa indicates frame numbers. The black-out rectangles represent the portions which have been intra-frame-processed. Frame numbers 0, 12, 24, 36, . . . indicate the intra-frame-processed image. The black-out portions of frame numbers 13, 15, 17, 19, 21, and 23 correspond to the image-adapted portions which have been intra-frame-processed.

In this instance, the refresh time is of 12 frames, as is illustrated at (b) in FIG. 17B.

In the case where the user changes the channel at the initialization, intra-frame processing must be effected for all regions of an image in order to acquire the whole image. The acquisition time is defined as follows:

Acquisition time: A period of time required for completing intra-frame processing for all regions of one image The acquisition time depends on the time the user changes the channel.

Shown at (c) in FIG. 17B is the minimum acquisition time. The minimum acquisition time is a period during which the initialization starts and the refresh or seen change takes place at the same time. A whole image is acquired during a one-frame period.

Shown at (d) in FIG. 17B is the maximum acquisition time. The maximum acquisition time is a period during which the initialization starts. In this case, a whole image is acquired during a 12-frame period.

Assume special reproduction on a recording medium such as VCR is conducted on refresh blocks which have been subjected periodical intra-frame processing. Since the 12-frame period refreshing is the basic scheme, the recording interval of VCR refresh blocks is 12 frames long.

7. DCT

A two-dimensional DCT circuit (i.e., block 14 shown in FIG. 9) will be described below.

An image is divided into small blocks constituted by N pixels in the horizontal direction × N pixels in the vertical direction (N×N pixels). Each block is then subjected to two-dimensional DCT. In this case, the value of N is set to be 8 to 16 on the basis of transformation efficiency. In this embodiment, N=8.

A transformation coefficient of two-dimensional DCT is given by the following equation (1), and its inverse transformation coefficient is given by the following equation (2):

$$F(u,v) = \frac{4C(u)C(v)}{N^2} \sum_{j=0}^{N-1} \sum_{j=0}^{N-1} (j,k) \quad (1)$$

$$\cos\left(\frac{(2j+1)u\pi}{2N}\right)\cos\left(\frac{(2k+1)v\pi}{2N}\right)$$

$$f(j,k) = \sum_{u=0}^{N-1} \sum_{u=0}^{N-1} C(u)C(v)F(u,v) \quad (2)$$

$$\cos\left(\frac{(2j+1)u\pi}{2N}\right)\cos\left(\frac{(2k+1)v\pi}{2N}\right)$$

where:

$$C(\omega) \sqrt{\frac{1}{2}}, \omega = 0 \quad (3)$$
$$1, \omega = 1, 2, \ldots, N-1$$

In this case, F(0,0) represents a coefficient of a DC component. The greater u is, the more horizontal frequency components having high frequencies. The greater v is, more vertical frequency components having high frequencies F(u,v) includes.

The characteristics of the coefficient F(0,0) of a DC component will be described first. F(0,0) corresponds to a DC component representing an average luminance value in an image block. In general, its average power is considerably higher than that of other components.

If a DC component is coarsely quantized, noise (block distortion) unique to quadrature transformation is caused, resulting in a perceptible deterioration in image quality. For this reason, a large number of bits (generally, 8 bits or more) are assigned to F(0,0) to perform uniform quantization.

The characteristics of the transformation coefficient F(u,v) excluding the DC component will be described next. The average value of F(u,v), excluding the DC component F(0,0), is "0" according to equation (1).

Coding is performed by assigning a predetermined number of bits to each small block of an image, in order to efficiently perform coding. In this case, a large number of coding bits are assigned to a transformation coefficient of a low-frequency component, and a small number of coding bits are assigned to a transformation coefficient of a high-frequency component. The deterioration in image quality can thereby be reduced, and coding can thereby be performed at a high compression ratio.

If an image is converted into small blocks each constituted by 8 pixels in the horizontal direction × 8 pixels in the vertical direction, i.e., 8×8=64 pixels, and two-dimensional DCT is performed with respect to the small blocks, 8×8=64 two-dimensional coefficients are obtained in correspondence with the transformed frequency components, as shown in FIG. 18. In FIG. 18, the upper left block is a DC coefficient (DC component), and the remaining 63 blocks are AC coefficients (AC components). The spatial frequency increases toward the lower right block. Since the AC components two-dimensionally spread, they are converted into one-dimensional components by sequentially performing zigzag scanning from block 0 to block 63 in coding and transmission.

Assume that the 64 DCT coefficients are represented by DCTi [i=0 to 63].

When an image signal is to be processed, each pixel is quantized by using 8 bits as a quantization bit count in many cases.

A DCT coefficient obtained by performing DCT processing of this 8-bit pixel is sometimes expressed by 12 bits.

8. Quantization

The quantizer 15 (shown in FIG. 9) will be described below.

The above-mentioned 64 DCT coefficients are linearly quantized in different step sizes at the respective coefficient positions by using a quantization table in which quantization step sizes are set in units of coefficients.

Although there are two quantization step setting methods, they basically use the same technique.

In the first method, a quantization table containing the quantization step each of the 64 DCT coefficients is used, and a code representing the quantization table is transmitted.

Figure 19:
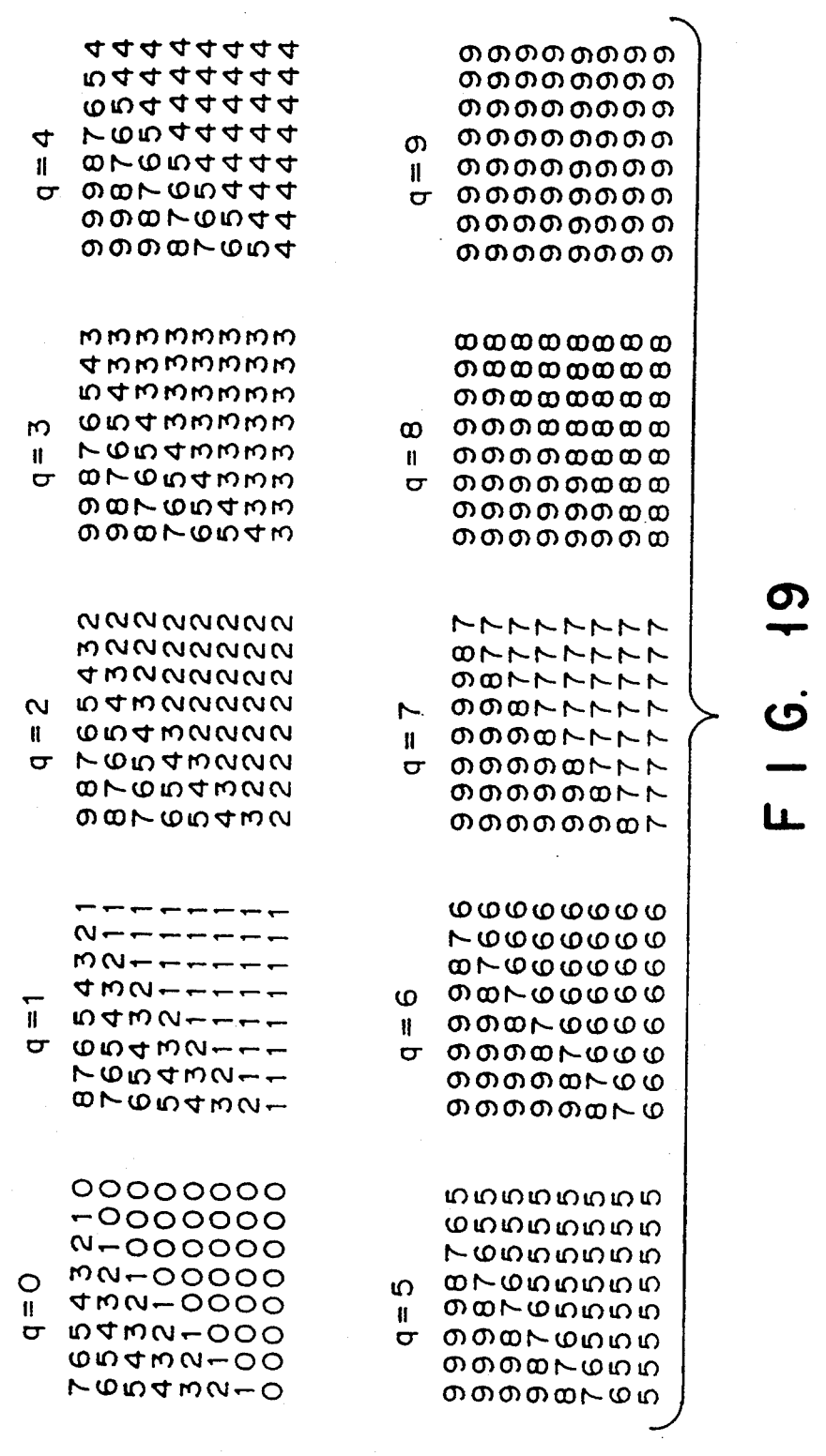

FIG. 19 shows quantization tables, in which q=0 to q=9 are quantization table codes representing the quantization tables. When such a code is transmitted, a decoder can perform inverse quantization.

In FIG. 19, the 64 numbers arranged in the form of a square represent quantization bit counts, which respectively correspond to the 64 two-dimensional coefficients shown in FIG. 18. For example, "7" located at the upper left portion in the quantization table represented by q=0 indicates that the DC component is quantized in 7 bits.

Subsequently, each coefficient is quantized with a corresponding bit count indicated by the quantization table in the same manner as described above.

In the second method, the 64 DCT coefficients are weighted by using a weighting matrix.

Thereafter, the respective coefficients are uniformly divided by using quantization width data QS (Quantize-Scale), and the resultant coefficients are quantized. When the quantized coefficients are transmitted, a code corresponding to the quantization width data is transmitted. In addition, the default values of the weighting matrix are predetermined. A special type of weighting matrix can also be transmitted.

In MPEG.I, for example, 5 bits are assigned to the code representing the quantization width data QS so that 32 types of codes can be designated. This value is given by:

QSj [j=0 to 31]

Quantization width data QSj will be defined below.

A case wherein a DCT coefficient value is quantized with the maximum quantization bit count is represented by j=0.

$QS_0 = 1$

In addition, j=31 indicates a case wherein no DCT coefficient value is transmitted. In this case, a quantization bit count (to be described later) is given by:

$QL_{31} = 0$

In this case, j is called a quantization level.

Figure 20:
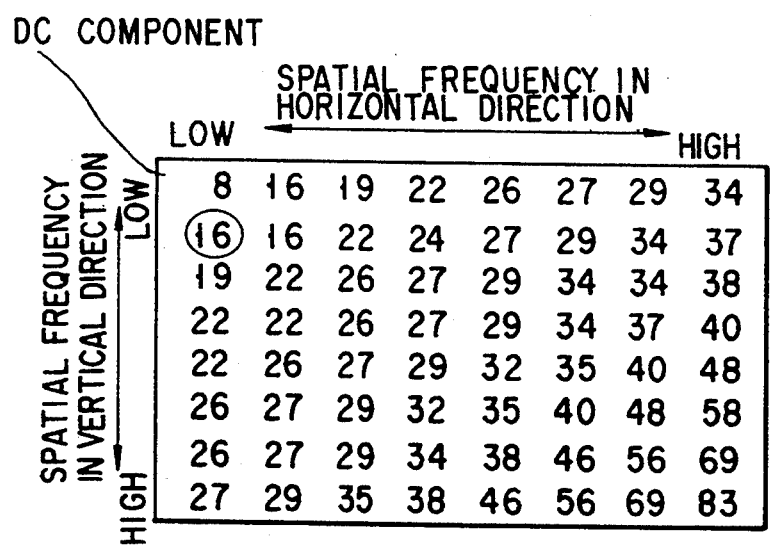
FIG. 20 shows a weighting table.

FIG. 20 shows the default values of a weighting matrix for a luminance signal, which is used in MPEG.I.

Figure 12:
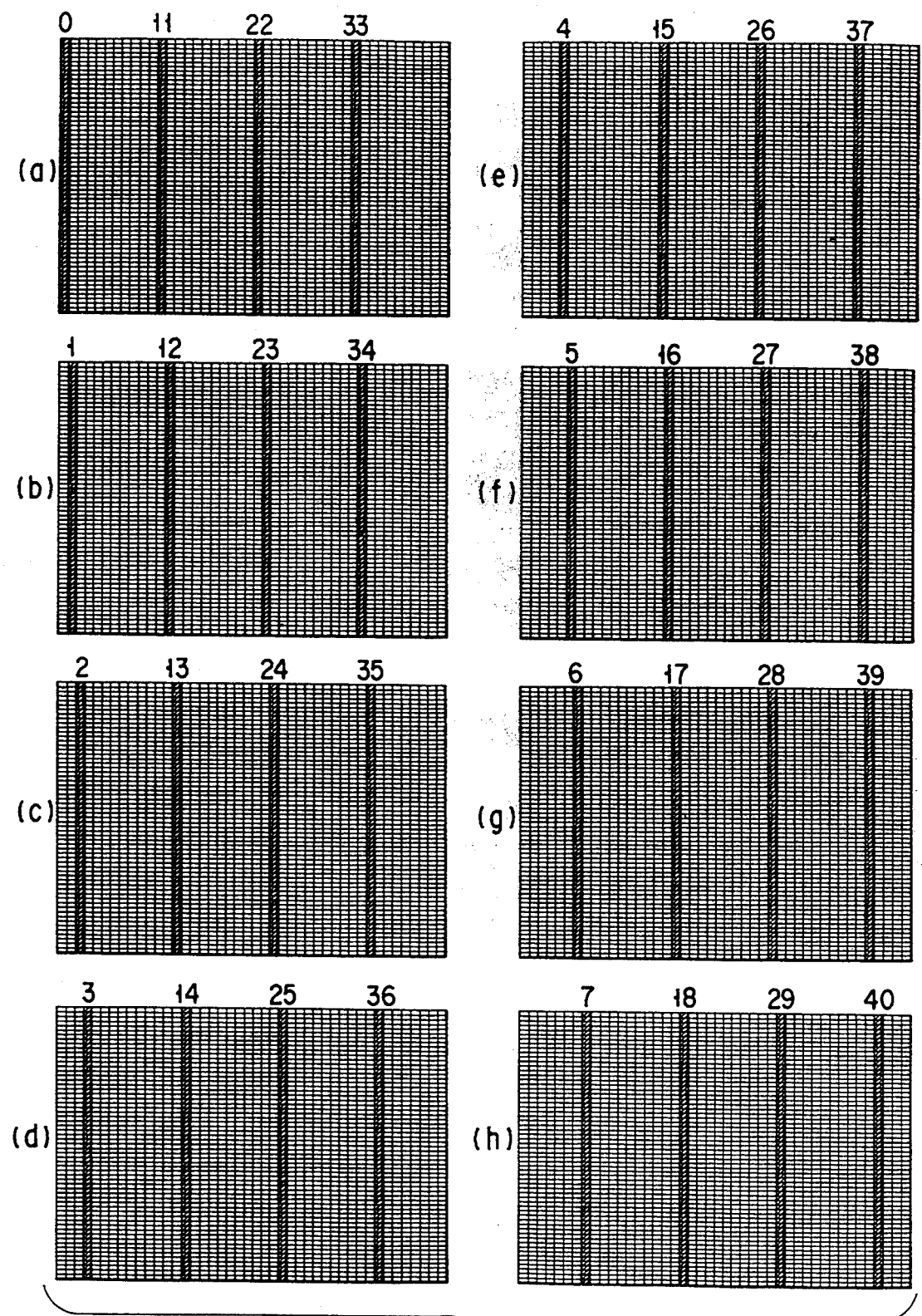
FIG. 12 shows the refresh blocks in the frames 1 to 8, which can be reproduced in the processor shown in FIG. 9.
Figure 13:
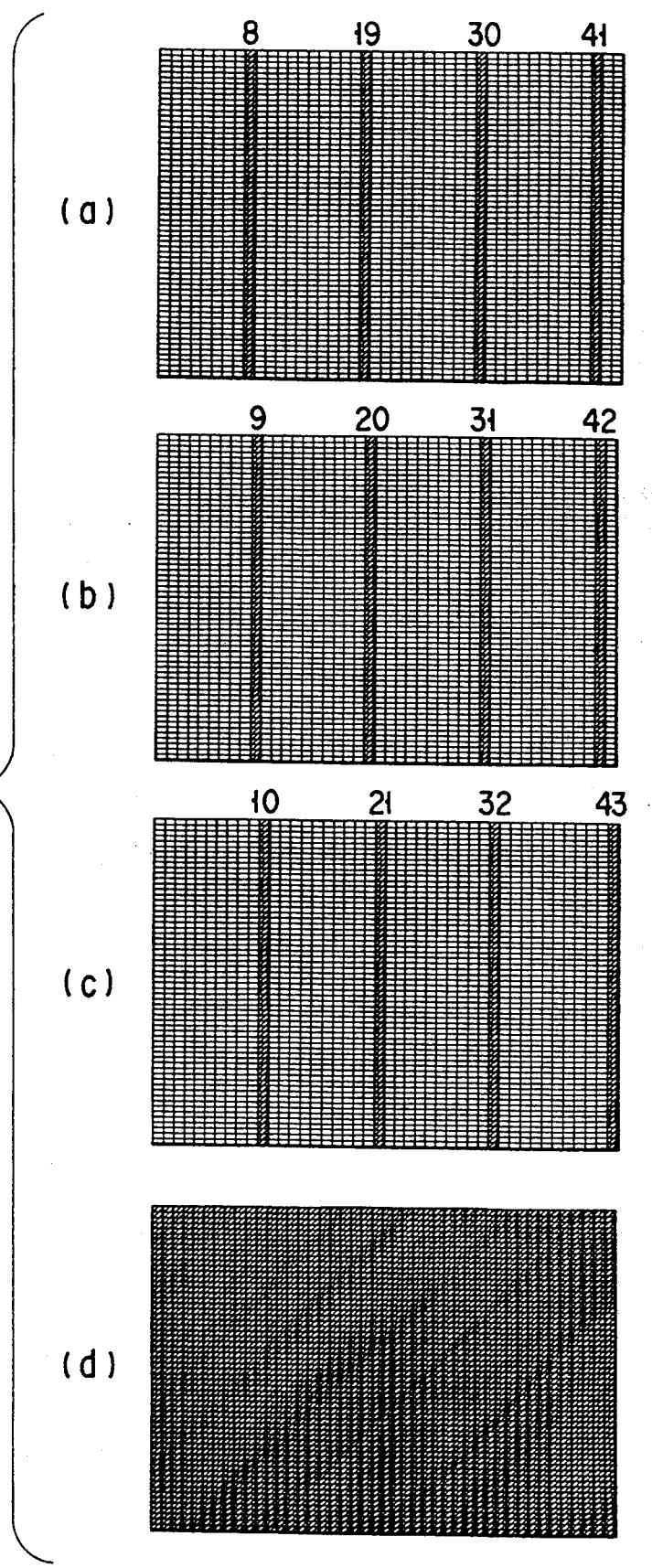
FIG. 13 is a diagram showing the refresh blocks in the frames 9 to 11, which can be reproduced in the processor shown in FIG. 9, and also the accumulated refresh blocks of 11 frame.

Referring to FIG. 12, 8×8=64 numbers correspond to the 64 two-dimensional coefficients shown in FIG. 18 and represent the weights of the respective DCT coefficients.

In an encoder, the respective DCT diaphragms are divided by the corresponding weights and the quantization width data QS.

If the 64 DCT coefficients are represented by DCTi [i=0 to 63]; the respective values of the weighting matrix, WEIGHTi [i=0 to 63]; and the respective quantized values, Qi [i=0 to 63], their relationship is represented by:

$$Q_i = \frac{1}{QS_j} \times \frac{DCT_i}{WEIGHT_i} \quad (i = 0 \text{ to } 63) \quad (4)$$

Each quantization bit count in this processing can be given by:

$$\begin{aligned} QL_i &= \log_2\left(\frac{1}{QS} \times \frac{DCT_i}{WEIGHT_i}\right) \\ &= \log_2 DCT_i - \log_2 QS - \log_2 WEIGHT_i \end{aligned} \quad (5)$$

An example will be described below.

The first AC component of a luminance signal in MPEG.I in the vertical direction is represented by the coefficient DCT1 described with reference to FIG. 18. A value in the weighting matrix which corresponds to the coefficient DCT1 is WEIGHT1=16. This value corresponds to the portion indicated by the circle in FIG. 20. If quantization width data QS0=1, the following equation is established:

$$\begin{aligned} Q &= \frac{1}{QS_j} \times \frac{DCT_l}{WEIGHT_l} \\ &= \frac{1}{QS_j} \times \frac{DCT_l}{16} \\ &= \frac{DCT_l}{16} \end{aligned}$$

Since the coefficient DCTi is expressed by 12 bits, the maximum value of log2DCTi is 12. In this case, the quantization bit count is given by:

$$\begin{aligned} QL_i &= \log_2 DCT_i - \log_2 WEIGHT_l \\ &= \log_2 DCT_i - 4 \\ &= 12 - 4 \\ &= 8 \text{ bits} \end{aligned}$$

FIG. 21 show the maximum quantization bit counts required after weighting is performed by using the weighting matrix for the case of QS0=1. FIG. 21 shows a matrix indicating 8×8=64 quantization bit counts, each of which indicates a quantization bit count corresponding to the position of a corresponding one of the DCT coefficients shown in FIG. 18.

Figure 22:
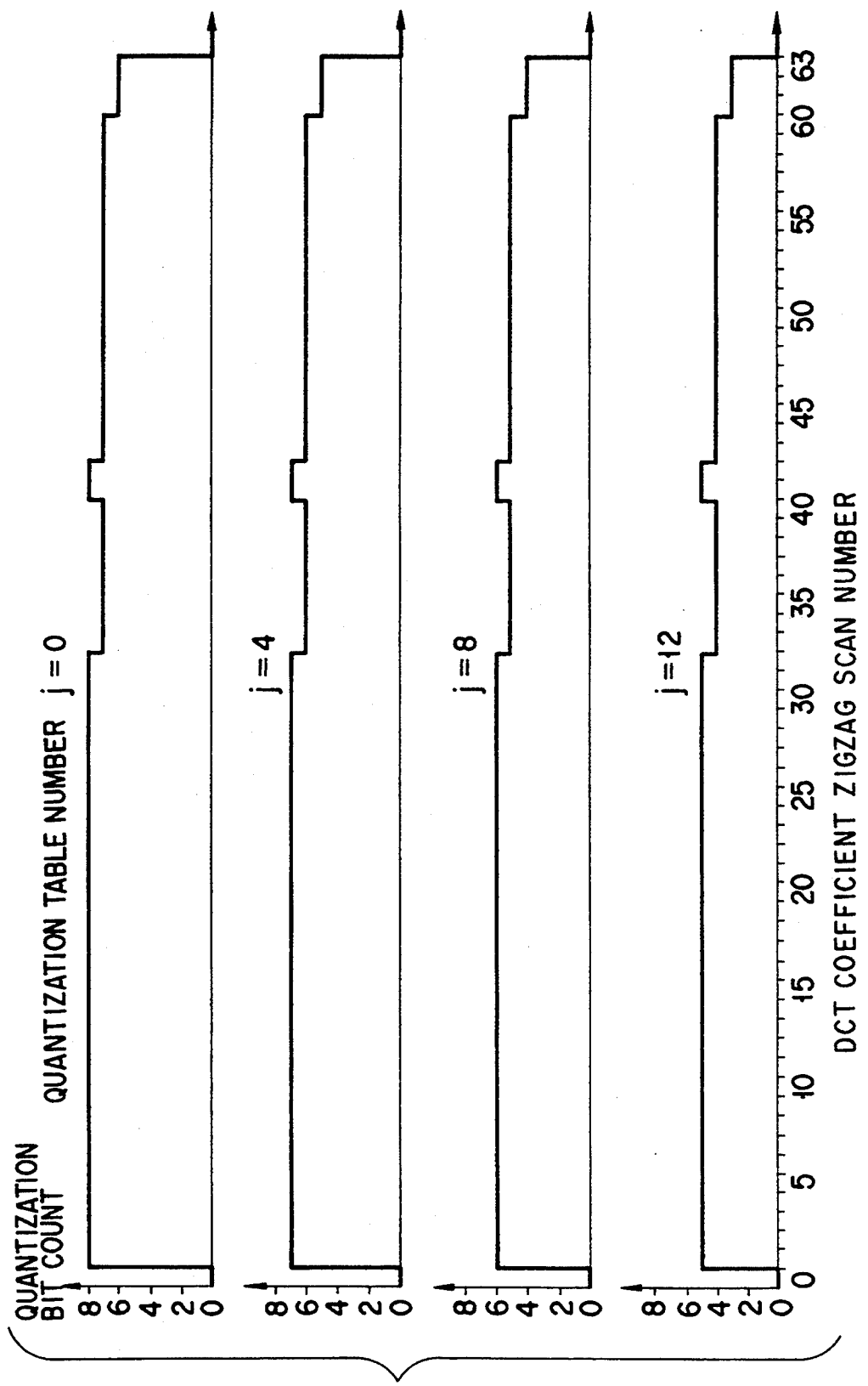
FIGS. 22 and 23 is a chart showing the numbers of bits generated by the quantization tables of FIG. 19.
Figure 23:
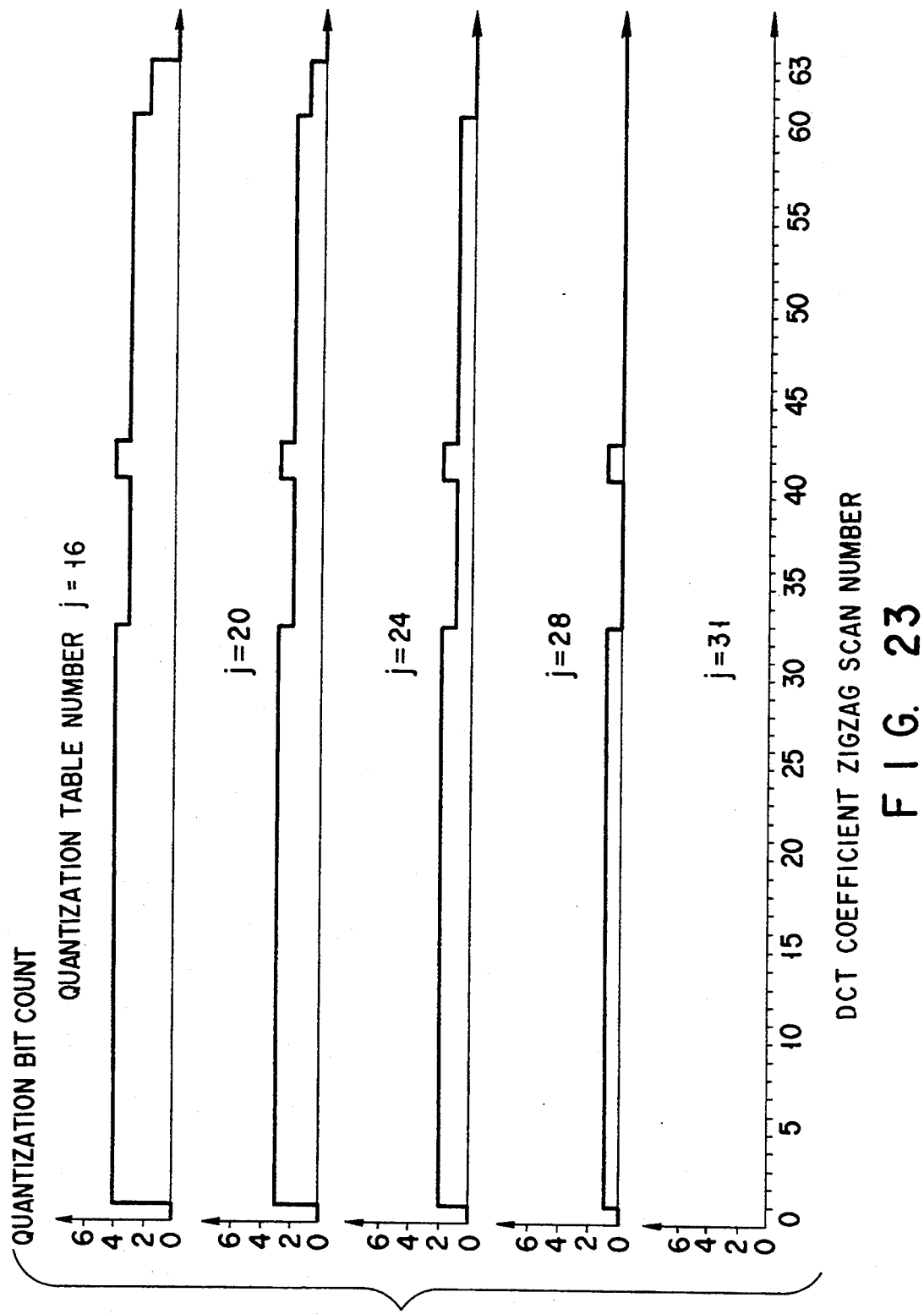

FIGS. 22 and 23 quantitatively show 9 types of typical quantization tables of quantization tables obtained when 32 types of quantization width data QSj are set.

A case wherein the second method associated with quantization table will be described below on the assumption that these tables are based on the quantization width data QS.

In the case, $j=31$ indicates a case wherein no data is generated, which corresponds to processing of quantizing all the coefficients in 0 bit. In addition, since $j=0$ corresponds to a case wherein since quantization width data $QS0=1$, quantization is performed by using a weighting table. That is, in this case, bits are assigned according to the weighting table shown in FIG. 21.

Referring to FIGS. 22 and 23, the abscissa represents 64 DCT coefficients, which correspond to the zigzag scan sequence in FIG. 18, and the ordinate represents the number of bits to be transmitted at each DCT coefficient.

Note that in quantization of DCT coefficients, bits from the MSB (Most Significant Bit) to the LSB (Least Significant Bit) are present. When the number of bits to be transmitted is to be limited, the MSB is transmitted in preference to other bits, as naturally understood.

As described above, if the quantization bit count for a DC component is reduced, block distortion becomes conspicuous. In some case, therefore, a DC component is independently processed, and a predetermined quantization bit count is assigned to it. Assume, in this case, that 8 bits are assigned to a DC component.

As described above, in the case of a luminance signal in MPEG.I, the maximum value of an AC component is 8 bits.

Quantization bit counts and quantization width data will be quantitatively described below with reference to FIGS. 22 and 23.

The generation amount of codes is maximized when $j=0$. With an increase in j, the generation amount of codes decreases. When $j=31$, the generation amount of codes becomes 0, and hence no codes are generated.

By controlling this quantization width data, the generation amount of codes can be controlled.

9. Requirements for Fast Reproduction

Requirements for fast reproduction will be described next.

9.1 Refresh block code switching

The simplest case will be described first.

In the prior art, since intra-frame coding is performed with respect to 2,640 areas of one frame at a period of 11 frames, an area count a in one frame=2,640 and an intra-frame-coding period f=11 frames. A case wherein one track is divided into two tracks, and an average video code of one frame is recorded on one track will be described below on the assumption that a division count d of one track is 2 and a track count c for recording an average video code of one frame is 1. In this case, a recording medium area count $d \times c \times f = 2 \times 1 \times 11 = 22$. The correspondence between refresh block frame areas and recording medium areas will be described by exemplifying a case wherein they have a one-to-one correspondence. A frame area count e arranged in one recording medium area is given by $e = a/d \times c \times f = 2640/2 \times 1 \times 11 = 120$. A case wherein $e=120$ are made to correspond to each of $d \times c \times f = 22$ areas will be described.

Figure 24:
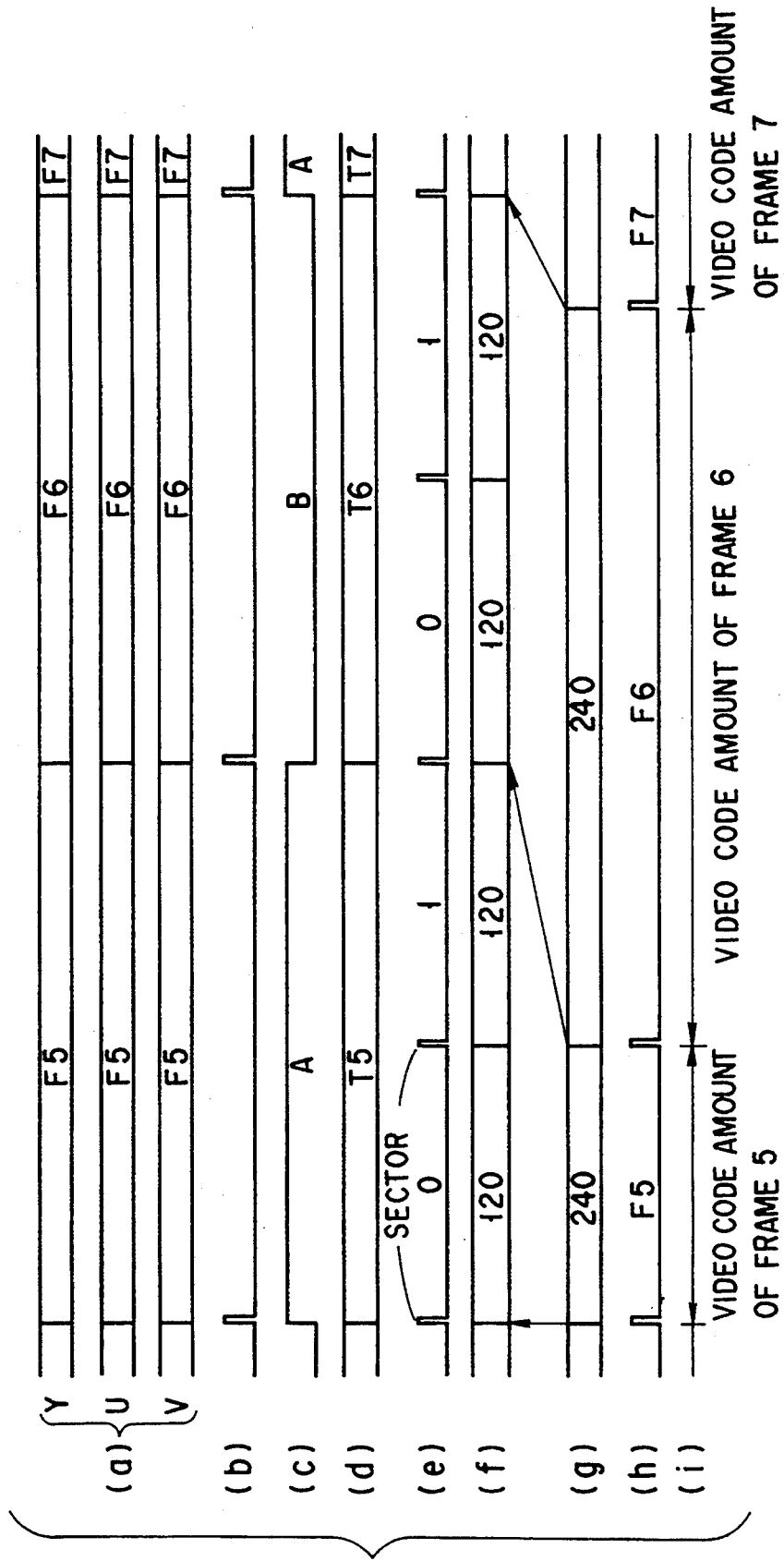
FIG. 24 is a timing charts explaining how the processor of FIG. 1 perform its function.

FIG. 24 shows an operation timing of this system.

A description will be made with reference to FIG. 9. A sync signal of an input video signal is supplied to the input terminal 32. This sync signal is input to a sync signal detector 40 to be detected. The sync signal detector 40 outputs sync pulses in synchronism with the sync signal from the output terminal 41 and supplies it to a track formation signal generator 42.

Shown at (a) in FIG. 24 is the input video signal. At (a) in FIG. 24, symbol Y denotes a luminance signal, and U and V, chrominance signals. The numbers shown at (a) in FIG. 24 indicate frame numbers. Shown at (b) in FIG. 24 is the sync pulses obtained by the sync signal detector 40 and output from the output terminal 41, which pulses are generated in synchronism with the frame switching points of the input video signal shown at (a) in FIG. 24.

Shown at (c) in FIG. 24 is the track formation signal obtained by the track formation signal generator 42. At (c) in FIG. 24, reference symbols A and B denote periods during which heads A and B of a rotary drum 43 alternately form tracks. The heads A and B are mounted on the rotary drum 43 to be opposite each other and 180° apart. In this embodiment, the generation timing of the sync pulses shown at (b) in FIG. 24 is synchronized with the switching timing of the track formation signal shown at (c) in FIG. 24. Shown at (d) in FIG. 24 is the tracks formed by the heads A and B. The numbers shown at (d) in FIG. 24 indicate track numbers.

The track formation signal output from the track formation signal generator 42 is supplied to a track formation controller 44. The track formation controller 44 controls the rotational phase of the rotating drum 43. The recording signal supply timings of the heads A and B are controlled by inputting the sync pulses, obtained by the sync signal detector 40, to a code switching circuit 45.

A code switching method used in this embodiment to allow a VTR to perform fast reproduction will be described below. The luminance signal Y and the chrominance signals U and V supplied to the input terminals 27, 28, and 29 are combined by the block formation circuit 30, and the resultant signal is supplied, as an input video signal, to the subtracter 12 and the motion evaluation circuit 13 through the input terminal 11. As a result, band-compressed video codes are output from the variable length encoder 16.

In the conventional band compression system shown in FIG. 1, the video signal is variable-length-coded. Therefore, as shown at (i) in FIG. 24, the frame switching points of the video codes vary depending on frames. The NMP signal shown at (h) in FIG. 24 indicates the frame switching points of this video signal. In the conventional system, 2,640 super blocks are present in one frame, and these 2,640 super blocks are present in a one-frame period indicated by the NMP signal shown at (h) in FIG. 24.

Figure 10:
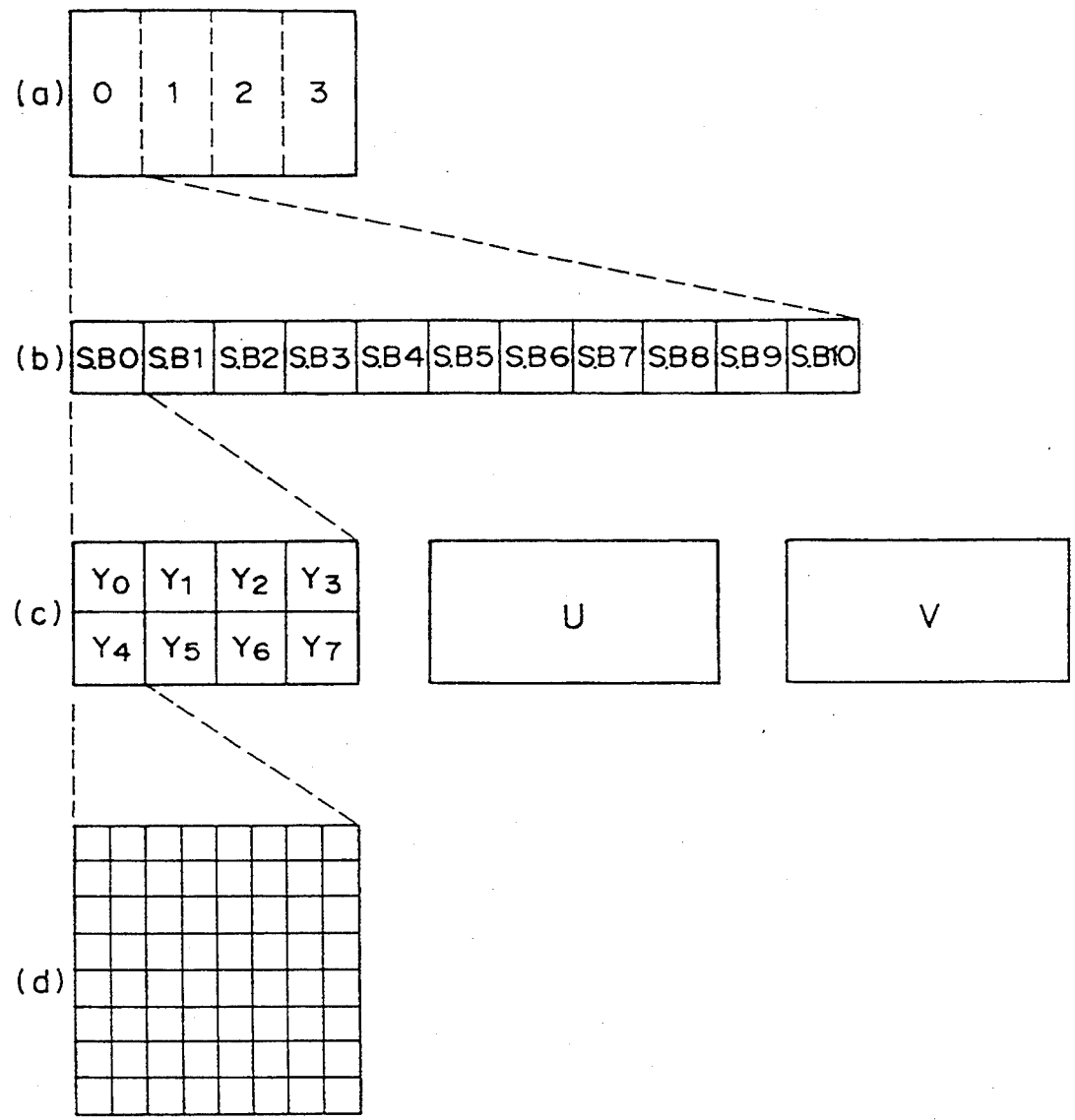
FIG. 10 is a diagram illustrating the arrangement of blocks in one image.

In the conventional system, four macro-blocks are present in the horizontal direction on one frame, and each macro-block is constituted by 11 super blocks. One of the super blocks of each macro-block is forcibly subjected to intra-frame processing per frame. Furthermore, the sequence of this forcible use of intra-frame processing is included in the system control signal shown in FIG. 2. In this case, a super block which is subjected to this intra-frame processing is forcibly performed is called a refresh block, and a super block which is not forcibly subjected to intra-frame processing is called a non-refresh block. FIG. 10 shows the relationship between macro-blocks, refresh blocks, and non-refresh blocks.

Refresh and non-refresh blocks are defined as follows.

Refresh block: When intra-frame processing is forcibly performed in units of super blocks in macro-blocks in a one-frame period, each super block which is subjected to intra-frame processing is called a refresh block. Since each macro-block is constituted by 11 super blocks, intra-frame processing is forcibly performed at a period of 11 frames.

Non-refresh block: Super blocks other than the above-described refresh blocks are called non-refresh blocks. These super blocks include blocks which have been subjected to intra-frame processing and blocks which have been subjected to inter-frame processing. Whether each block has been subjected to intra-frame or inter-frame processing depends on the contents of an image. For example, if a scene change or the like occurs in an input video signal, a corresponding block may be subjected to intra-frame processing. This block is also defined as a non-refresh block.

There are 240 (=2,640÷11) refresh blocks in a one-frame period. In the conventional system, as shown in at (g) in FIG. 24, 240 refresh blocks are present in a one frame period shown at (h) in FIG. 24. If a conventional signal is directly recorded by a VTR, the positions of the refresh blocks are not specified, and fast reproduction cannot be performed, as described above.

Shown at (a) and (b) in FIG. 25, respectively, are video signals corresponding to frame numbers F5 and F6. In FIG. 24, the portions indicated by reference symbols G5 and G6 correspond to refresh blocks. A refresh block number of a frame having frame number Fn (n is an integer) is denoted by reference symbol Gn, and a non-refresh block number is denoted by reference symbol Hn.

In the present invention, refresh blocks and non-refresh blocks are differently arranged on a track.

Figure 8:
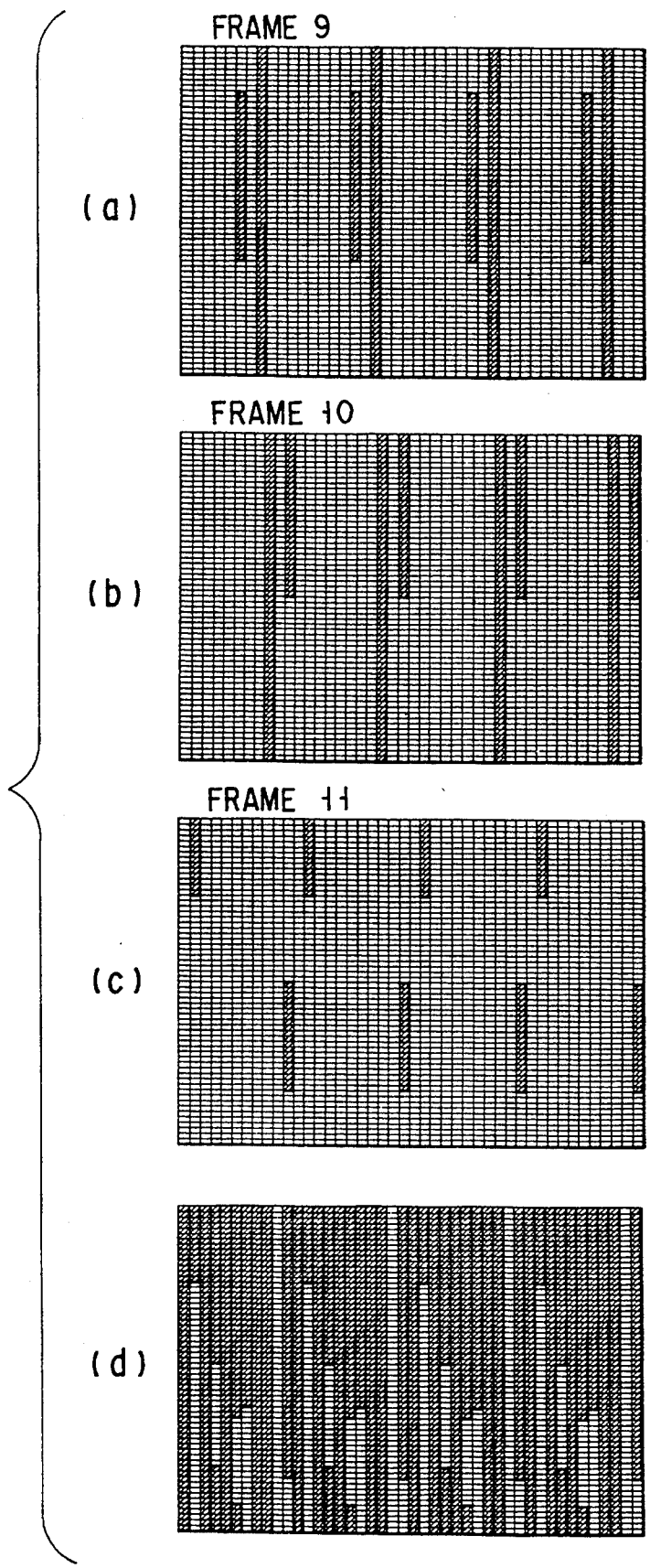
FIG. 8 is a diagram showing the refresh blocks in the frames 9 to 11, which can be reproduced in the double-speed reproduction mode of the processor shown in FIG. 1, and also the accumulated refresh blocks of 11 frames.

This embodiment exemplifies a case wherein recording is performed while one track is divided into two portions. If one track is divided into two portions, fast reproduction, up to double speed reproduction, can be performed. If, however, fast reproduction is performed at a speed three times or more the normal speed, all the refresh blocks cannot be reproduced, there are some regions in which images cannot be constructed, similar to the case shown at (d) in FIG. 8. If a fast reproduction mode realizing reproduction at a speed 20 times the normal speed is to be added to the specifications of a VTR, one track may be divided into 20 portions. If faster reproduction is to be realized, refresh blocks may be arranged at equal intervals on a track.

Shown at (e) in FIG. 24 is a timing pulse signal for dividing one track into two portions, which signal serves to divide a one-track period, shown at (b) and (c) in FIGS. 24, into two almost equal periods. Each of the divided periods is called a sector.

That is, a sector is defined as follows.

Sector: A sector is a period obtained by almost equally dividing a one-track period into d (two in this case).

In this embodiment, 120 refresh blocks are set in one sector, as is shown at (f) in FIG. 24. With this arrangement, since one track is constituted by two sectors, 240 refresh blocks are inserted in one track, which refresh block count coincides with a refresh block count of one frame of a video signal. That is, if the number of super blocks for which intra-frame processing is periodically performed is represented by e, and b intra-frame-processed signals are recorded on c tracks, a refresh block count e in one sector is given by $e = b/c \times d$ (240/2×2×120 in this case).

By performing the above-described code switching operation, refresh blocks of one frame can be arranged in a one-track period, unlike the conventional system in which refresh blocks of one frame are arranged in a one-frame period.

FIG. 26 shows a track pattern. More specifically, reference symbols G1 to G11 in tracks T1 to T11 on a magnetic tape 26 correspond to refresh block numbers Gn described above. Refresh blocks and tracks Tn are related to each other in such a manner that a refresh block having number Gn is recorded on a track Tn. In addition, reference symbols H1 to H11 in the tracks T1 to T11 correspond to non-refresh block numbers Hn. The switching points of these non-refresh blocks are indicated by the thick lines on the tracks T1 to T11.

A track 46 in FIG. 26 exemplifies the relationship between a track and sectors. The track 46 is divided into two portions, i.e., d=2 sectors. In each sector, e=120 refresh blocks are arranged. Non-refresh blocks are arranged between refresh blocks.

The tracks T5 and T6 as examples will be described in detail below. The refresh block G5 of the frame F5 is recorded on the track T5. The refresh block G6 of the frame F6 is recorded on the track T6. Non-refresh blocks are recorded on the remaining portions. The non-refresh blocks H5 and H6 are recorded on the track T5, and the non-refresh blocks H6 and H7 are recorded on the track T6.

In order to realize the above-described recording form, the band-compressed video code obtained by the variable length encoder 16 shown in FIG. 1 is supplied to the code switching circuit 45. The refresh timing generator 39 generates a code position signal for the above-described refresh blocks and outputs it from the output terminal 35. This code position signal is supplied to the code switching circuit 45. The circuit 45 switches the positions of refresh blocks and non-refresh blocks in accordance with the sync pulse signal for variable length codes and the code position signal for refresh blocks.

More specifically, 120 refresh blocks of one frame are inserted in each of the two sectors set in one track. This processing is performed as follows. Codes are temporarily stored in a memory (not shown). The codes are then read out from the memory such that 120 refresh blocks are inserted in one sector.

An output from the code switching circuit 45 is supplied to an index inserting circuit 47. The index inserting circuit 47 inserts an index signal in the control data portion of each sector so that it can be detected during reproduction that part of a non-refresh block is separated and recorded. The index signal has been generated by an index generator 48 from the code position signal output from the refresh timing generator 39. An output from a multiplexer 49 including the index inserting circuit 47 is recorded on the magnetic tape 26 through an ECC circuit 50, a unit sync inserting circuit 51, and a modulator 52.

Figure 27:
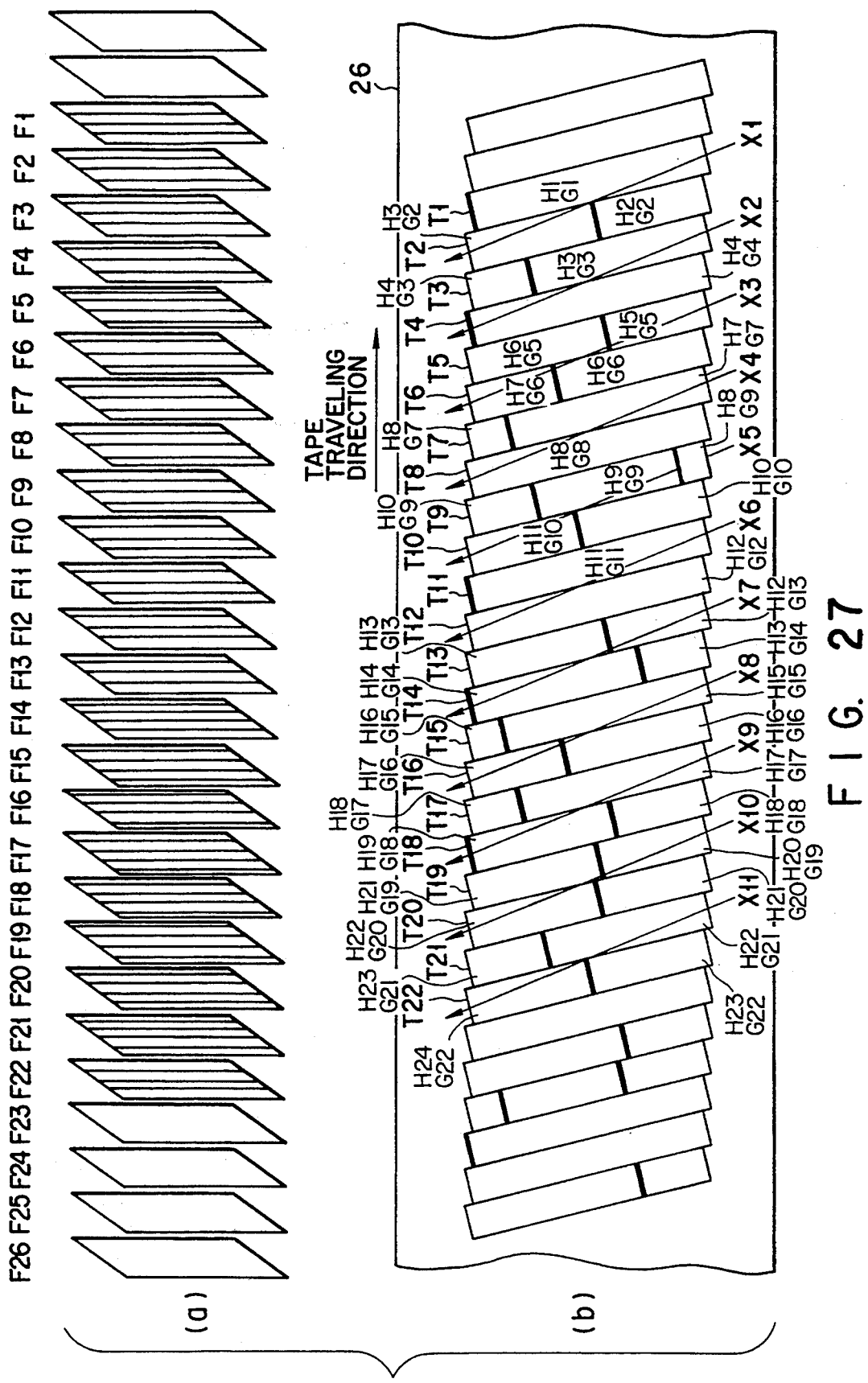
FIG. 27 illustrates the traces of the magnetic head operating in the double-speed reproduction mode.
Figure 29:
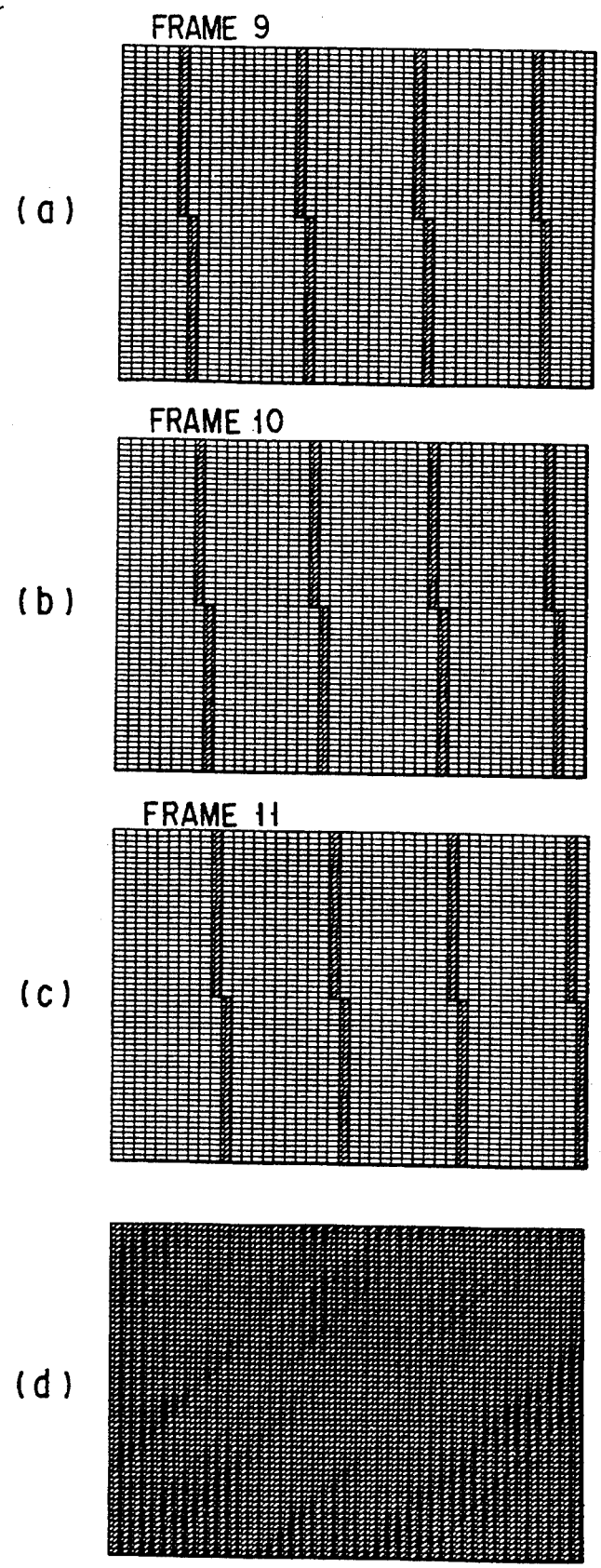
FIG. 29 shows the refresh blocks of frames 9 to 11, which can be reproduced in the double-speed reproduction mode, and the accumulated refresh blocks of 11 frames.

Shown at (a) and (b) in FIG. 27 are traces X1 to X11 of a head in the double-speed reproduction mode. Note that refresh blocks Gn and non-refresh blocks Hn are respectively indicated in tracks T1 to T22, similar to FIG. 26. Refresh blocks which can be reproduced by the head tracing operation in the double-speed reproduction mode shown at (a) and (b) in FIG. 27 are shown at (a) to (h) in FIG. 28 and at (a) to (c) in FIG. 29. Frames 1 to 11 shown in at (a) to (h) in FIG. 28 and at (a) to (c) in FIG. 29 indicate refresh blocks which can be reproduced along the head traces X1 to X11 in the double-speed reproduction mode shown at (b) in FIG. 27.

For example, in the frame 1, by making the head trace X1, a refresh block G1 can be displayed on the upper half of the frame, while a refresh block G2 can be displayed on the lower half of the frame. Similarly, in the frames 2 to 11, refresh blocks G2 to G22 can be reproduced. Therefore, if refresh blocks, of the frames 1 to 11, which can be reproduced are accumulated, the codes in all the frame areas can be reproduced, as shown at (d) in FIG. 29.

Codes which are intra-frame-processed in accordance with inter-frame-processed codes and the contents of an image are inserted between codes which are periodically intra-frame-coded. Theses codes exhibit no correspondence between a picture area and a recording medium area.

Note that a recording medium is not limited to the magnetic tape 26. The present invention can be applied to a video disk. In this case, for example, one rotation of the disk corresponds to one track of the tape.

9.2 Code amount of refresh block

Although fast reproduction can be performed by setting refresh blocks in predetermined areas on the tracks of a VTR, it is necessary to prevent a code amount from exceeding the recordable code amount of a predetermined area.

If the code amount of a predetermined refresh block exceeds the recordable code amount of a predetermined area on a recording medium, refreshing is not performed at a position on an image which corresponds to the area in which the recordable code amount is exceeded.

Even if no measures are taken to prevent such a situation, since refreshing is performed at a given position on an image, it is highly possible to determine the contents of the image. However, in order to perform refreshing more reliably, the generation amount of codes of each refresh block must be controlled. The code amount of a refresh block will be described in detail first.

9.3 Code amount of refresh block

Assume that a video signal is recorded by performing head scanning $c=1$ times per frame without using a DTF as a servo of a VT, and a reproduction speed $i=2$ times the normal speed is realized as a special reproduction speed, and that a refresh block code amount is calculated in units of $1/c \times i = \frac{1}{2}$-areas of a one-frame image. In this case, if the maximum amount of codes which can be recorded on a $P=1$ track formed by one scan is represented by $\alpha$, this refresh block code amount of a $\frac{1}{2}$ area of one frame is controlled to be $/c \times i = \alpha/2$ or less. A case wherein an average a mount of codes of a one-frame video signal is recorded by one scan of the VTR will be described in detail below. In addition, a case wherein a double speed is realized as a special reproduction speed will be described. In the embodiment, since 240 refresh blocks are present in each frame, 120 refresh blocks are recorded per sector.

Figure 30:
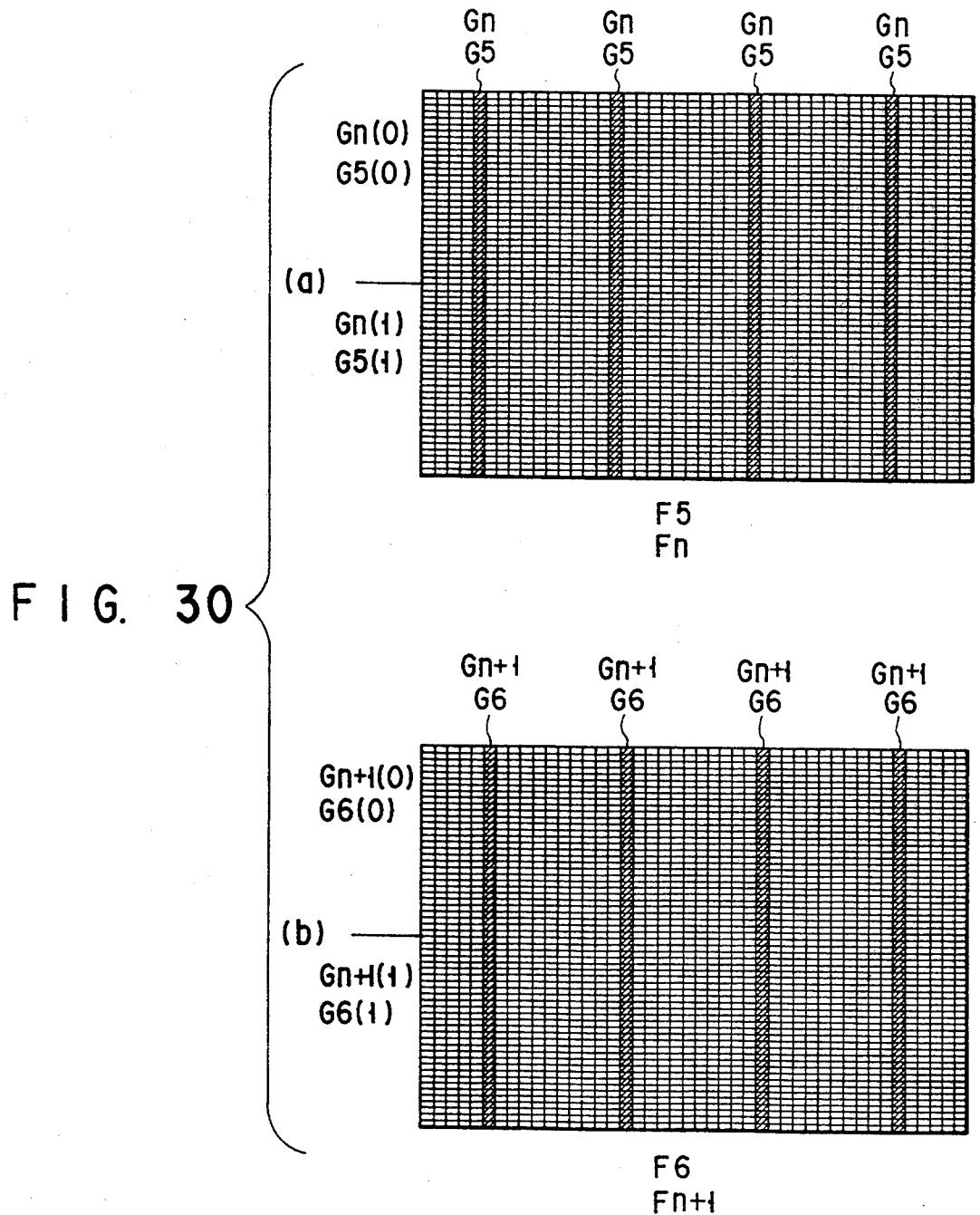
FIG. 30 is a diagram representing the relation ship between the refresh blocks and the non-refresh blocks, all belonging to frames $F_n$ and $F_{n+1}$.

Shown at (a) and (b) in FIG. 30 are, respectively, refresh blocks in one frame, and a method of dividing each refresh block. At (a) in FIG. 30, reference symbol $Fn$ denotes an nth frame; and $Gn$, refresh blocks in the nth frame. As is shown, 240 refresh blocks are present in this frame. "$Gn(0)$" and "$Gn(1)$" on the left side of the frame respectively indicate the upper and lower halves of each refresh block, of the 240 refresh blocks, which is divided into two equal portions in the vertical direction. More specifically, $Gn(0)$ indicates 120 refresh blocks, of the Gn refresh blocks, which are located in the upper half of the frame, whereas $Gn(1)$ indicates 120 refresh blocks located in the lower half of the frame. Shown at (b) in FIG. 30 are refresh blocks corresponding to frame number $Fn+1$. The definitions of $Gn+1(0)$ to $Gn+1(1)$ are the same as those described with reference to (a) in FIG. 30.

Figure 31:
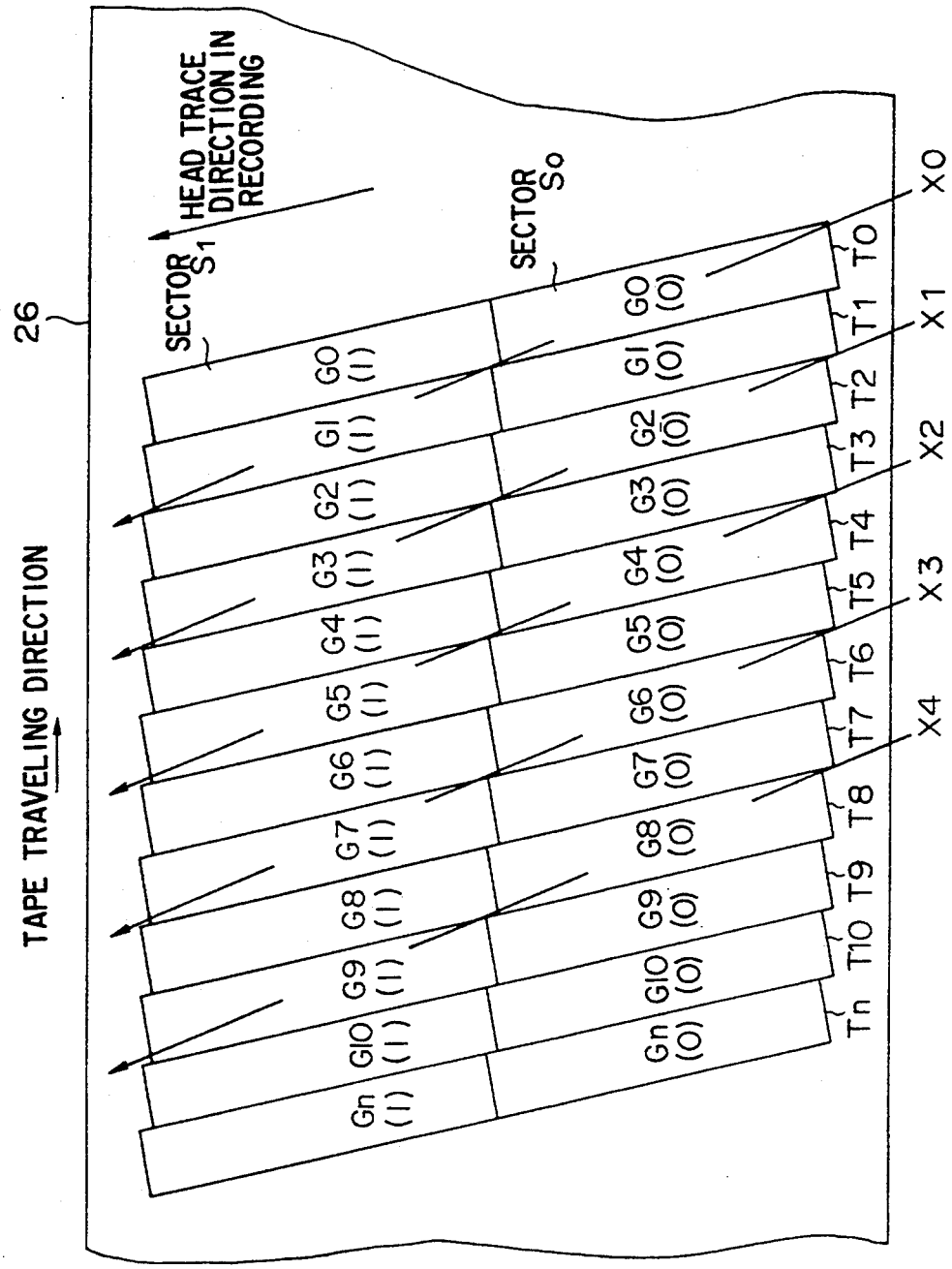
FIG. 31 shows the traces of the magnetic head moving in a double-speed reproduction operation.

The track pattern of the VTR will be described next. FIG. 31 shows the track pattern of the magnetic tape 26. Reference symbols T0 to T11 denote tracks on which codes are recorded by using the rotary drum 43. Assume that the average generation amount of codes of one frame are recorded on one track. That is, a case of $c=1$ will be described. This case corresponds to the case wherein $b=240$ refresh blocks are recorded on one track. That is, the refresh blocks Gn corresponding to frame number Fn are recorded on the track Tn.

In this arrangement, when double-speed reproduction is to be performed, the reproduction head crosses two tracks. Therefore, while $\frac{1}{2}$ areas obtained by dividing one track into two almost equal areas are reproduced, reproduction signals are obtained from two tracks. If one of two divided areas is called a sector, since each frame constitutes one track, two sector numbers S0 and S1 are assigned, as shown in FIG. 31.

Assume that each area obtained by dividing one track by d is generally termed a sector.

In order to realize fast reproduction at a speed i times the normal speed, since the head crosses i tracks, a $1/i$ area of one track is reproduced. If the maximum reproduction speed is represented by $i_{max}$, $i_{max} \leq d$ is set. Sector names are represented by S0 to S$d-1$.

The relationship between refresh blocks and a sector will be described below. When the refresh blocks Gn corresponding to frame number n are recorded on one track Tn, recording is performed in the order of $G_n(0) \ldots S_0, G_n(1) \ldots S_1$.

Assume that a uniform number of refresh blocks are inserted in each sector. In this case, the number of refresh blocks inserted in one sector is set as follows. If the number of refresh blocks per frame is represented by b; the number of tracks on which the b refresh blocks are recorded, c; the division count of a track, d; and the number of refresh blocks inserted in one sector, e, then $e=b/c \times d$. That is, $e=240/1 \times 2=120$.

Referring to FIG. 31, the head traces $X_0$ to $X_4$ indicate head traces in the double-speed reproduction mode. More specifically, along the head trace $X_0$, the sector $S_0$ (refresh block $G_0(0)$) of the track $T_0$, the sector $S_1$ (refresh block $G_1(1)$) of the track $T_1$, and the sector $S_0$ (refresh block $G_2(0)$) of the track $T_2$ can be reproduced.

In this case, since the recordable capacity of each of the sectors $S_0$ and $S_1$ of the recording medium on the tape 26 is predetermined, the generation amount of codes of the refresh blocks group $G_n(0)$ and $G_n(1)$ must be limited to the recordable amount or less.

Assume that a DTF is not used. In this case, if the reproduction speed is set to be a speed i times the normal speed, a $1/i$ area of each of p tracks formed by one scan is traced.

As described above, if the maximum amount of codes which can be recorded on p tracks formed by one scan is represented by $\alpha$, and a video signal is recorded by performing a scan operation c times for each frame, the maximum code amount of a $1/c \times i$ area of refresh blocks of one frame must be limited to $\alpha/i$ or less. Note that in this case, as a special reproduction head, a head having an excessively large head width is not used.

Assume that a DTF as a servo scheme for a VTR is used. In this case, if the maximum amount of codes which can be recorded on p tracks formed by one scan is represented by $\alpha$, and a video signal is recorded by performing a head scan operation c times for each frame, the maximum code amount of refresh blocks in a $1/c$ area of a one-frame image must be limited to $\alpha$ or less.

10. Code Amount Control

There are two code amount control methods. In the first method, the quantization level is controlled in the same manner as described above. In this case, since the generation amount of codes of refresh blocks is suppressed, the image quality of each refresh block inevitably deteriorates. However, since the difference between an intra-frame-processed signal of refresh blocks and a video signal of the next frame is sent to the next frame, a deterioration in image quality occurs only instantly. This method will be described in detail later.

In the second method, a quantized code is divided into two portions so that the code amount of an MSB or a low-frequency component is limited to a code amount allowing the codes to be read out when fast reproduction is performed by a recording medium such as a VTR. This method will be described in detail Chapter 11.

Control of a coded information amount by using the first method will be described next.

10.1 Macro-block code amount control

If highly efficient coding of a video signal is performed by using the variable length coding scheme, the generation amount of information generally varies. This is because the information amount of the video signal varies with time.

When a transmission system with a fixed rate is to be used, coding control is required to limit the coded information amount to a constant level.

According to a general technique for realizing a fixed rate, a buffer memory is prepared at the output of an encoder so that data is input to the buffer memory at a variable rate, and data is output at a fixed rate to level the coded information amount. Since the amount of data in the buffer memory varies depending on the amount of input information, an overflow or an underflow may occur. In order to prevent such a situation, a coding parameter is changed to decrease or increase the coded information amount when an overflow or an underflow tends to occur. For example, the quantization levels may be decreased or increased.

Although the leveling effect is enhanced with an increase in capacity of the buffer memory, limitations are improved on the capacity in terms of coding delay or cost.

Since a relatively small buffer memory can perform fine coding control in accordance with a local characteristic of an image, a buffer memory having a capacity corresponding to about one frame is used in some case.

Macro-block amount control will be described in detail below.

Macro-block code amount control is performed by using the capacities of rate buffers. In the method using the rate buffers, as shown in FIG. 32, each of an encoder and a decoder incorporates a rate buffer having the same capacity.

The input/output code amounts and occupancy ratios of the buffers will be described with reference to FIG. 32. In FIG. 32, reference symbol a denotes an input signal to a rate buffer b of the encoder. This signal is an output signal from the variable length encoder 16. The signal is characterized as follows. The respective blocks are input at a predetermined period. However, since the generated codes of each block are variable length codes, a variable length rate is set. In addition, an output signal c from the rate buffer of the encoder is transmission data, and the corresponding codes are output at a fixed rate. Furthermore, an input signal d to a rate buffer e of the decoder is a code input to be input at a fixed rate. An output signal f is a code output to be output at a variable rate.

Figure 33:
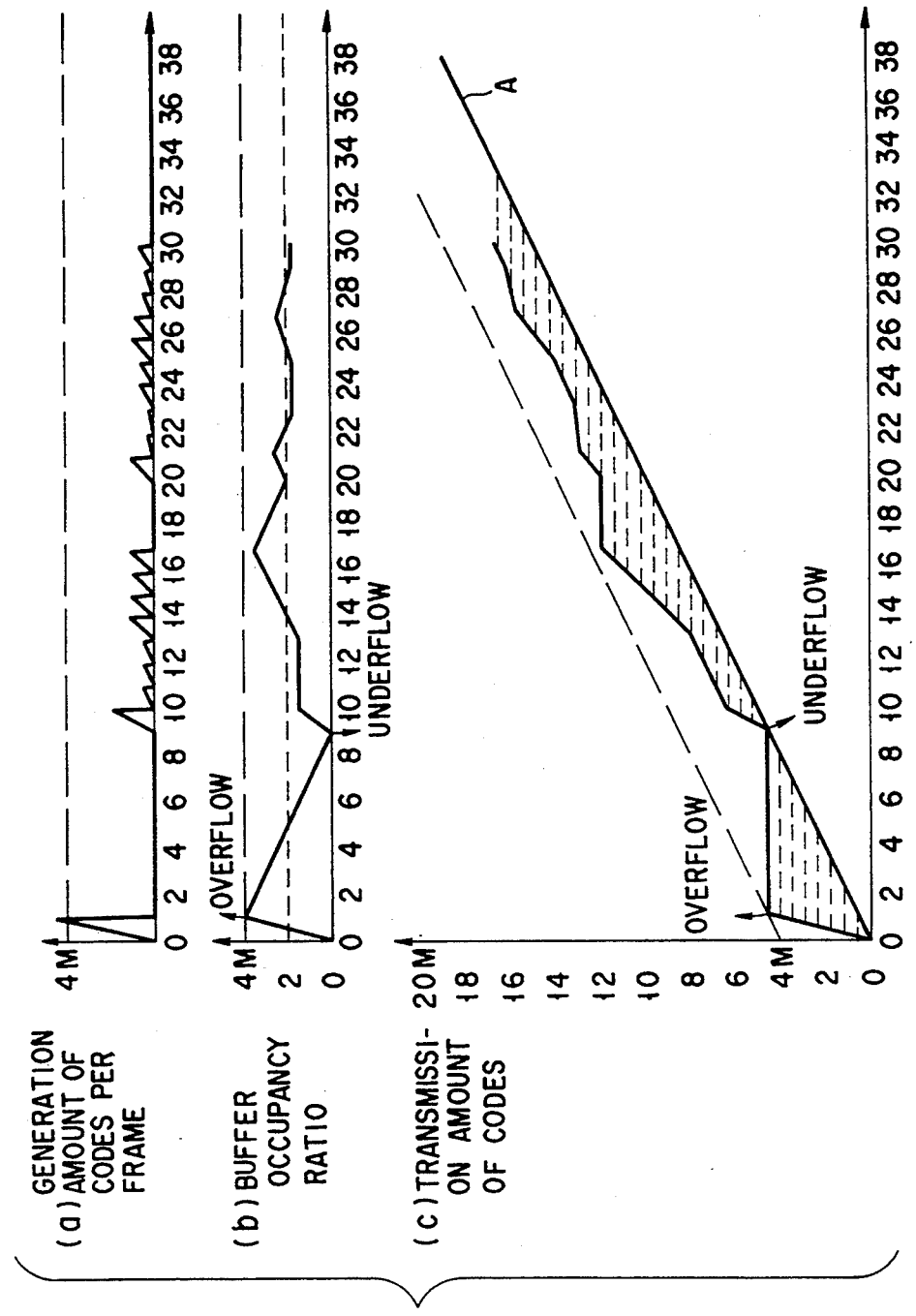
FIG. 33 is a graph explaining an operation of a rate buffer on the encoder side.
Figure 34:
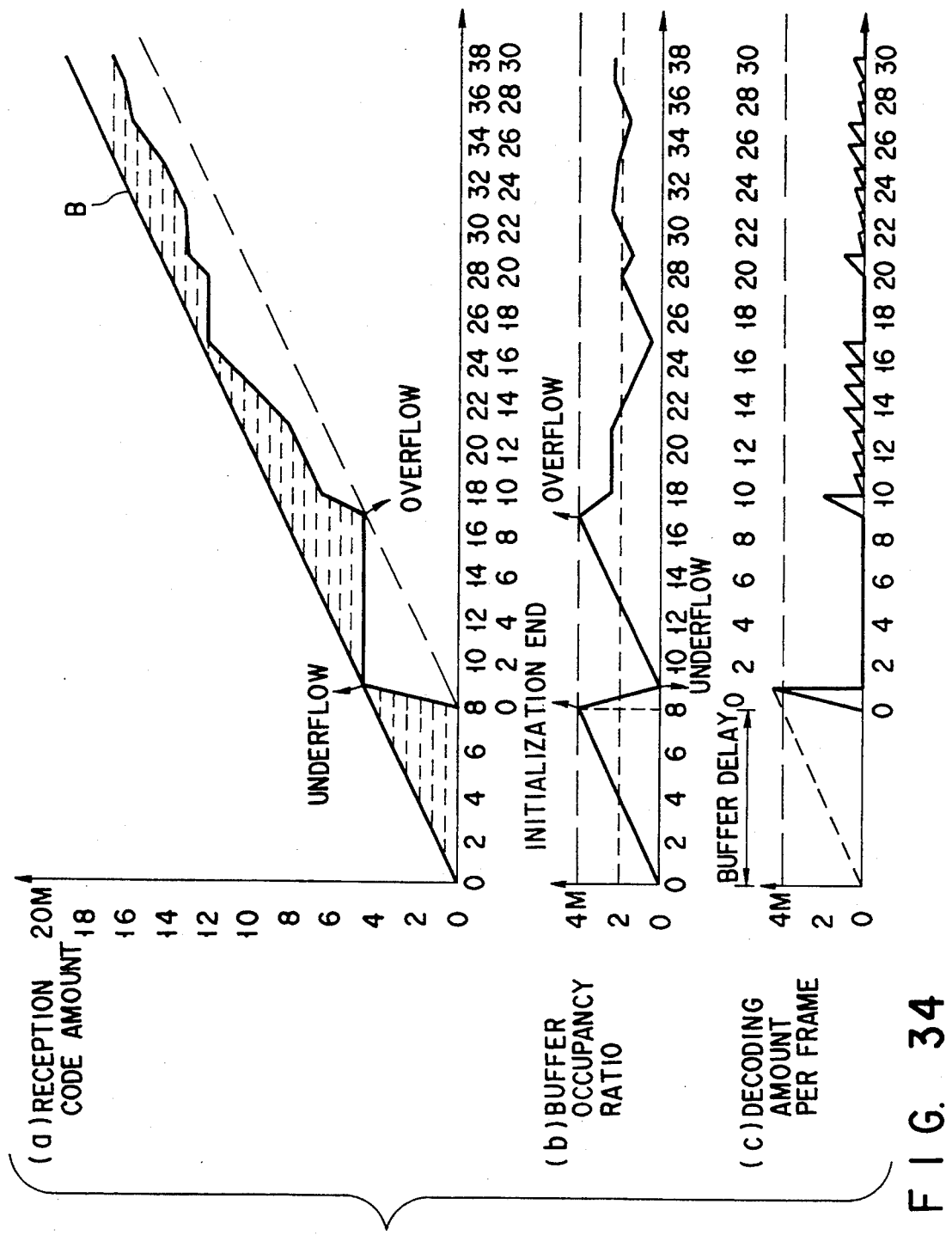
FIG. 34 is a graph explaining an operation of a rate buffer on the decoder side.

Encoder- and decoder-side characteristics will be described in detail below, with reference to FIGS. 33 and 34. At (a) to (c) in FIGS. 33, and at (a) and (b) in FIG. 34, the abscissas indicate frame numbers. In FIGS. 33 and 34, the frame numbers coincide with the frame numbers of inputs. However, the frame numbers shown at (c) in FIG. 34 are shifted from them by 8 frames. This shift is required to absorb variations in delay of transmission codes from the encoder and the decoder due to the use of variable length codes.

At (a) to (c) in FIG. 33, and at (a) to (c) in FIG. 34, the ordinate indicate code amounts. In this case, the capacity of each rate buffer is 4 Mbits, and the transmission amount of codes per frame is 0.5 Mbits/frame. Shown at (a) to (c) in FIGS. 33 are the encoder-side characteristics, and shown at (a) to (c) in FIG. 34 are the decoder-side characteristics.

Shown at (a) in FIG. 33 is the generation amount of codes per frame. The broken line shown at (a) in FIG. 33 indicates the capacity of the rate buffer as a reference. Since variable length codes are used, the generation amounts of codes of the respective frames vary. At $F_1$ to $F_9$ as frame numbers $F_n$, generation amounts of codes which cause an overflow and an underflow in the buffer are indicated. At $F_1$, codes of 4.5 Mbits are generated. At $F_2$ to $F_9$, no codes are generated.

The maximum generation amount of codes of each frame is determined by the sum of the capacity of the buffer and the transmission amount of codes. In this embodiment, since the capacity of each buffer is 4 Mbits and the transmission amount of codes per frame is 0.5 [M bits/frame], the maximum generation amount of codes per frame is 4.5 Mbits. At $F_{20}$ to $F_{30}$, the generation amount of codes of each frame is controlled in accordance with the occupancy ratio of the buffer.

Shown at (b) in FIG. 33 is the occupancy ratio of the buffer of the encoder. In this case, the capacity of the buffer is set to be 4 Mbits, and the capacity is indicated by the broken line. Since a large number of codes are generated in the frame having frame number $F_1$, the buffer overflows at a time corresponding to $F_1$. Since no codes are generated in the interval from $F_2$ to $F_9$, the buffer underflows at a time corresponding to $F_9$.

Shown at (c) in FIG. 33 is the amount of codes transmitted from the encoder. The solid line A shown at (c) in FIG. 33 obliquely extending from the origin indicates the accumulated transmission amount of codes. The gradient of the line indicates the transmission amount of codes per frame. In this case, 0.5 Mbits are transmitted per one-frame time. If the frame rate is 30 [Hz], the transmission amount of codes is $30 \times 0.5$ [Mbits/Frame] = 15 [Mbps]. In addition, the broken line in FIG. 33(c) indicates the maximum value determined by the maximum capacity of the buffer.

The zigzag line shown at (c) in FIG. 33 indicates the accumulated generation amount of codes, which amount corresponds to the integral value of the generation amount of codes per frame, shown at (a) in FIG. 33. When the zigzag line indicating this accumulated generation amount codes comes into contact with the broken line, the buffer overflows. When the polygonal line comes into contact with the solid line, the buffer underflows. In addition, the horizontal broken lines drawn between the polygonal line indicating the accumulated generation amount of codes and the solid line indicating the accumulated transmission amount of codes indicate delays in the encoder buffer in transmitting the generated codes. A longer broken line indicates a longer period of time it takes to perform transmission. The solid line B shown at (a) in FIG. 34 indicates the accumulated reception amount of codes. This solid line B coincides with the solid line A shown at (a) in FIG. 34. The zigzag line indicates the decoding amount of codes of each frame when an image is output. This amount corresponds to the integral amount of the decoding amount of codes per frame shown at (c) in FIG. 34. In addition, the horizontal broken lines indicate delays in decoding received codes. The sum of the delays in the encoder and the delays in decoder is equal to the buffer delay shown at (b) in FIG. 34.

Shown at (b) in FIG. 34 is the occupancy ratio of the buffer of the decoder. When (b) in FIG. 33 is compared with (b) in FIG. 34, it is found that if the plot at (b) in FIG. 33 is shifted by an amount corresponding to the buffer delay, the plots at (b) in FIGS. 33 and (b) in FIG. 34 have an inverse relationship in the vertical direction. That is, when the encoder overflows, the decoder underflows, and vice versa.

Shown at (c) in FIG. 34 is the decoding amount of codes per frame. The timing shown at (c) in FIG. 34 is delayed from that shown at (a) in FIG. 33 by the buffer delay between the encoder and the decoder.

When a subscriber changes the channel, a video signal can be output after a required number of codes are accumulated in the buffer of the decoder. This accumulation amount is equal to the accumulation amount of received codes for the period of time indicated by the broken line shown at (a) in FIG. 34. This value has correlation with an NMP signal in the conventional system. That is, a video signal may be output from the decoder after codes are accumulated in the buffer for the period of time determined by the NMP signal.

If the maximum amount of codes are generated in the first frame as indicated by $F_1$ at (a) in FIG. 33, the maximum buffer delay is caused in the buffer of the decoder. In this case, a proper video signal can be output after received codes are accumulated for the period of time corresponding to "buffer delay" shown at (b) in FIG. 34. In this case, after the buffer of the decoder is filled with received codes, a proper video signal can be output.

More specifically, received codes are accumulated in the interval between $F_0$ and $F_8$, and a proper video signal is output after the buffer memory is filled with the codes to complete initialization. When video codes are output at $F_1$ shown at (c) in FIG. 34, the buffer of the decoder underflows. When no video codes are output in the interval between $F_1$ and $F_9$, the buffer of the decoder overflows at $F_9$. This state is equivalent to a state wherein the buffer state of the encoder is delayed by 8 frames, and the overflow and underflow are inverted.

When the subscriber changes the channel, in order to output a proper video signal, the buffer of the decoder must accumulate codes for the period of time determined by the NMP signal. However, an imperfect image can be output at the time of initialization, as indicated by the broken line shown at (c) in FIG. 34.

FIG. 35 shows a relationship between the occupancy ratio of the buffer and an increase/decrease in quantization level set in units of macro-blocks. While the occupancy ratio of the buffer is kept at a predetermined value, the quantization level is not changed. If it exceeds a predetermined value, the quantization level is changed. As is shown in FIG. 35, while the occupancy ratio of the buffer is 45 to 55%, the quantization level is not changed. If it exceeds 45 to 55%, the quantization level is changed. With this operation, rate control of the buffer can be performed.

As the value of j is increased, coarser quantization is performed, and the generation amount of codes is reduced. Therefore, the quantization level is lowered with a decrease in the occupancy ratio of the bugger, and vice versa.

FIG. 36 shows an arrangement for realizing the above-described operation.

In order to determine a macro-block quantization level, a quantization level setting circuit 53 and a super block code amount calculator 54 are used.

A method of calculating a super block code amount will be described in detail first with reference to FIG. 36.

An output from the quantizer 15 is input to the variable length encoder 16. In the circuit 16, a zigzag scan circuit 16a reads $8 \times 8$ DCT coefficients by the scan method shown in FIG. 18, combines zero coefficient counts and the amplitudes non-zero coefficients, and supplies the resultant sets to a Huffman encoder 16b.

In addition, the zero coefficient counts and the amplitudes of non-zero coefficients are input to the super block code amount calculator 54. The super block code amount calculator 54 calculates the amount of generated codes by using a ROM storing the table shown in FIG. 37.

The table shown in FIG. 37 is also used in the conventional system. The abscissa indicates the amplitudes of non-zero coefficients, and the ordinate indicates the number of continuous zero coefficients. The numbers in FIG. 37 indicate code bit counts. The generation amounts of codes are calculated in units of super blocks by adding these code bit counts.

In addition, in order to determine a quantization level for macro-blocks, a macro-block code amount is calculated by adding the code amounts of 11 super blocks.

A transmission code amount stored in a transmission code amount ROM 56 is subtracted from the calculated value, and the occupancy ratio of the rate buffer included in the code switching circuit 45 is calculated by a rate buffer code amount calculator 57.

Quantization levels are set in units of macro-blocks by the macro-block quantization level setting circuit 58 on the basis of this rate buffer occupancy ratio and the graph shown in FIG. 35.

10.2 Super block code amount control

Code amount control in units of super blocks can only be performed in the direction in which the number of quantization levels is smaller than that of quantization levels determined by macro-blocks.

This is because, if, for example, an intra-frame-processed super block is present, a code amount obtained after intra-frame processing is larger than a code amount obtained after inter-frame processing, and the code amount of the intra-frame-processed super block may greatly increase.

According to the human visual characteristics, if, for example, a scene change occurs or a portion hidden by an object appears (this phenomenon is called "covered back"), the eyes cannot quickly respond to the definition of the appearing image, and it takes a predetermined period of time for adjustment.

Hence, even if the number of quantization levels is decreased with respect to an intra-frame-processed portion produced by a change in content of an image, a deterioration in image quality is difficult to discriminate. That is, the code amount of a portion which has undergone image adaptive intra-frame processing can be reduced.

An arrangement for realizing this operation will be described below with reference to FIG. 36.

A refresh block quantization level setting circuit 59, which corresponds to a super block quantization level setting circuit, and a non-refresh block quantization level setting circuit 60 receive an image adaptive intra-frame/inter-frame processing determination signal output from the energy comparator 36 in the intra-frame/inter-frame processing determination circuit 31 through an input terminal 61. In addition, an output signal from the DCT circuit 14 is input to a DCT coefficient energy calculator 63 via an input terminal 62. The calculator 63 calculates the energy of DCT coefficients. A correction level for the quantization level is determined on the basis of the calculated energy. An adder 65 adds this value is added to the macro-block quantization level, and the resultant value is input to the quantizer 15. Shown at (a) in FIG. 38 is the relationship between the energy and the correction level.

If an intra-frame-processed super block has an excessively high energy, it means that the block includes many high-frequency components. In this case, it is also difficult to discriminate a deterioration in image quality. Therefore, coarse quantization can be set. In this case, a correction level is set, as shown is shown at (b) in FIG. 38.

10.3 Refresh block code amount control

As described in Chapter 9, Paragraph 9.2, the generation amount of codes of a refresh block must be limited to a predetermined code amount determined by a recording medium such as a VCR.

In order to realize this, in this embodiment, the code amounts of refresh blocks are independently calculated, and quantization levels for the refresh blocks are set by using the calculated values. For this purpose, a refresh block code amount calculator 65 and the refresh block quantization level setting circuit 59 are used.

The generation amounts of codes of refresh blocks are output from the super block code amount calculator 54. The code amounts of the refresh blocks are sequentially added by the refresh block code amount calculator 65. In this embodiment, the code amounts are repeatedly added in a period of 120 super blocks set in one sector on the tape 26.

By inputting the resultant value to the refresh block quantization level setting circuit 59, a correction value is determined from the macro-block quantization level.

The refresh block quantization level setting circuit 59 is used, also to realize the super block code amount control method described in Paragraph 10.2.

An output from the refresh block quantization level setting circuit 59 is input to the quantizer 15 through a switch 66 and the adder 64 for adding a correction value to the macro-block quantization level.

Figure 39:
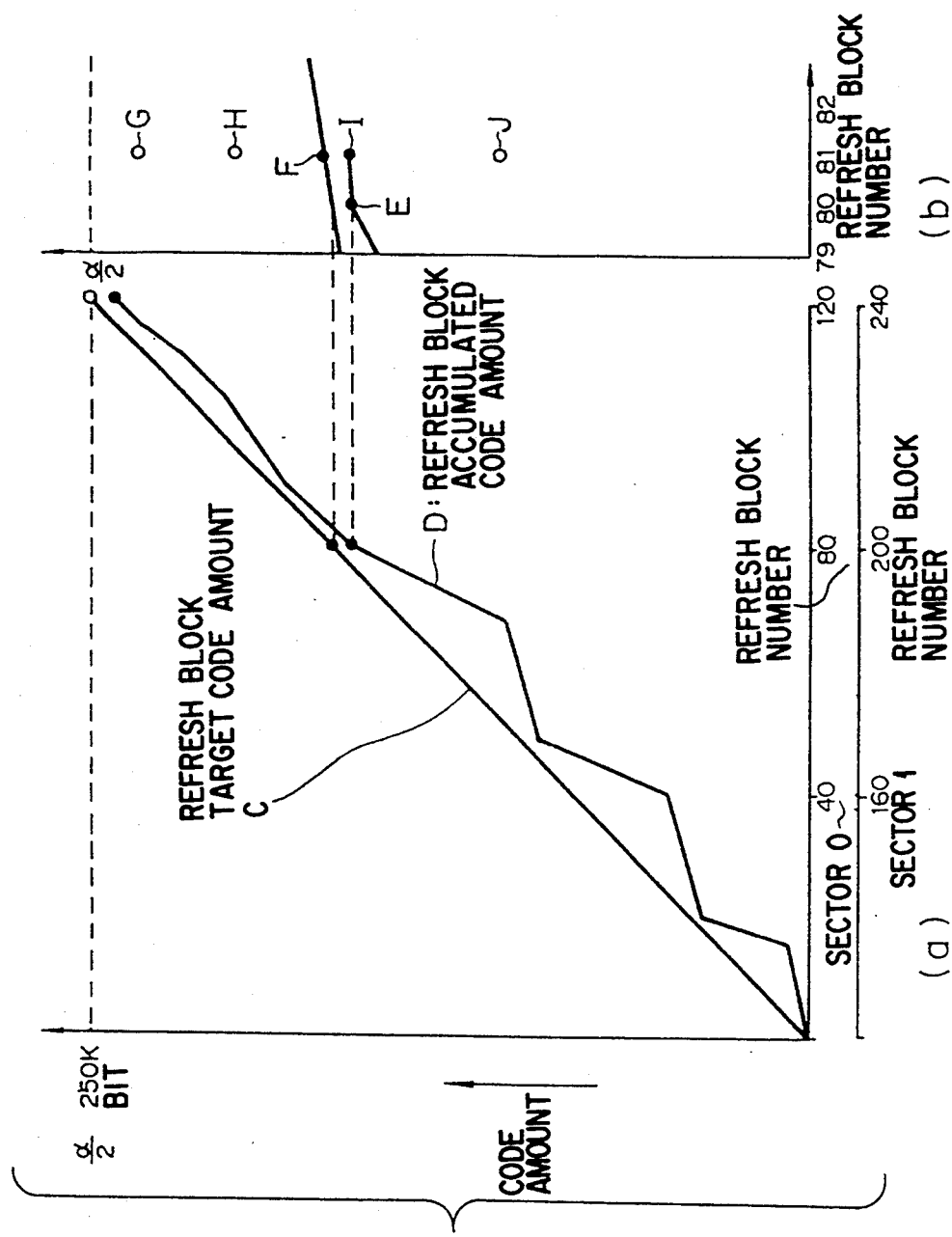
FIG. 39 is a graph explaining a control of the code amount of refresh blocks.

FIG. 39 shows a method of setting a refresh block quantization level.

In to FIG. 39, the abscissa indicates refresh block numbers. In the embodiment, since the refresh blocks of one frame are recorded on two sectors, refresh block numbers corresponding to sectors 0 and 1 are exemplified. In this case, 120 refresh blocks are set so as not to exceed the recording code amount $\alpha/2$ of one sector.

The ordinate in FIG. 39 indicates the code amounts of the refresh blocks. As described above, the maximum code amount is set to be $\alpha/2$. Assume that $\alpha/2=250$ Kbits. The solid line C shown at (a) in FIG. 39 represents the target code amount of a refresh block. A generation amount of codes is controlled so as not to exceed this line. Note that the solid line C is an example used for control, and hence need not be a straight line. It is only required that the generation amount of codes per sector be limited to $\alpha/2$ or less. A polygonal line D represents changes in accumulation amount of refresh block codes. The polygonal line D corresponds to an output signal from the refresh block code amount calculator 65. A quantization level is determined so as not to exceed the target refresh block code amount (solid line C).

An operation of setting a macro-block quantization level and a refresh block quantization level will be described below with reference to FIG. 40.

As shown in FIG. 36, a macro-block quantization level is determined on the basis of the occupancy ratio of the buffer memory. This macro-block quantization level is increased as needed to set a refresh block quantization level only in the direction in which the generation amount of codes is reduced. A quantization level correction level indicating the quantization level difference between the macro-block quantization level and the refresh block quantization level can be transmitted as additional data.

In FIG. 40, the abscissa indicates macro-block quantization levels $j=31$ to 0. When $j=31$, no codes are generated. When $j=0$, codes are generated in an maximum amount. In addition, numbers written below the quantization levels indicate bit counts used to indicate quantization level correction levels.

The ordinate, shown in FIG. 40, indicates refresh block quantization levels $j=31$ to 0. The circles in FIG. 40 represent quantization levels which can be set as levels assigned to refresh blocks. Each refresh block quantization level is assigned such that the generation amount of codes is smaller than that based on a corresponding macro-block quantization level.

Since an output from the DCT circuit 14 is input to the refresh block quantization level setting circuit 59, a quantization table can be selected so as not to exceed a target refresh block code amount, by comparing the output signal with a refresh block accumulation code amount.

This operation will be described in detail below with reference to item (b) in FIG. 39.

Item (b) in FIG. 39 is an enlarged view of the abscissa shown at (a) in FIG. 39. The process of determining a quantization level in the interval between refresh block numbers 80 and 81 will be described with reference to item (b) in FIG. 39. Assume that a code amount up to refresh block number 80 is calculated by the refresh block code amount calculator 65, and that reference symbol E shown at (b) in FIG. 39 indicates the calculated code amount. A target code amount is determined by a refresh block number. Assume that reference symbol F shown at (b) in FIG. 39 indicates a target code amount at refresh block number 81.

Assume that a macro-block quantization level $j=15$ is set. In this case, according to the quantization level relationship shown in FIG. 40, as a refresh block quantization level, $j=15$, 19, 23, and 27 can be set.

Since a coefficient signal obtained by performing DCT of a video signal is input, as an output signal from the DCT circuit 14, to the refresh block quantization level setting circuit 59, amounts of codes generated when the quantization level $j=15$, 19, 23, and 27 can be calculated. Assume that the calculation results are respectively represented by G, H, I, and J. In these generation amounts G, H, I, and J are compared with the target code amount F, the refresh block quantization level $j=23$ with which the code amount I is obtained can be selected.

By controlling the code amount of each refresh block in this manner, and inputting and recording the result in the code switching circuit 45 and the index inserting circuit 47 refreshing can be reliably performed when fast reproduction is performed.

11. Code Decision

Two method is available for controlling code amounts. The first method is to control the level of quantization in such a way as has been described in Chapter 10. In the first method, the generation amount of codes of refresh blocks is suppressed, and the image quality of each refresh block inevitably deteriorates. Nonetheless, since the difference between an intra-frame-processed signal of refresh blocks and a video signal of the next frame is sent to the next frame, the image quality is degraded, but instantly.

In the second method, a quantized code is divided into two portions so that the code amount of an MSB or a low-frequency component is limited to a code amount allowing the codes to be read out when fast reproduction is performed by a recording medium such as a VTR. This method will be described in detail Chapter 35, as is employed in another embodiment of the present invention.

13. Bit Stream Structure

The bit stream structure of each block will be described below.

Referring to FIG. 9, over-head data output from an over-head data generator 67 is added to an output from the variable length encoder 16, and the resultant data is output to an output terminal 68.

A package medium such as a VCR or a video disk requires the code switching circuit 45 in order to realize fast reproduction. In transmitting a broadcast wave, however, code switching is not necessarily required.

In addition, a code switching technique is dependent on the rotational speed of the drum of a VCR, the number of heads, the tape format, the recording code amount per track, and the special reproduction speed.

Figure 44:
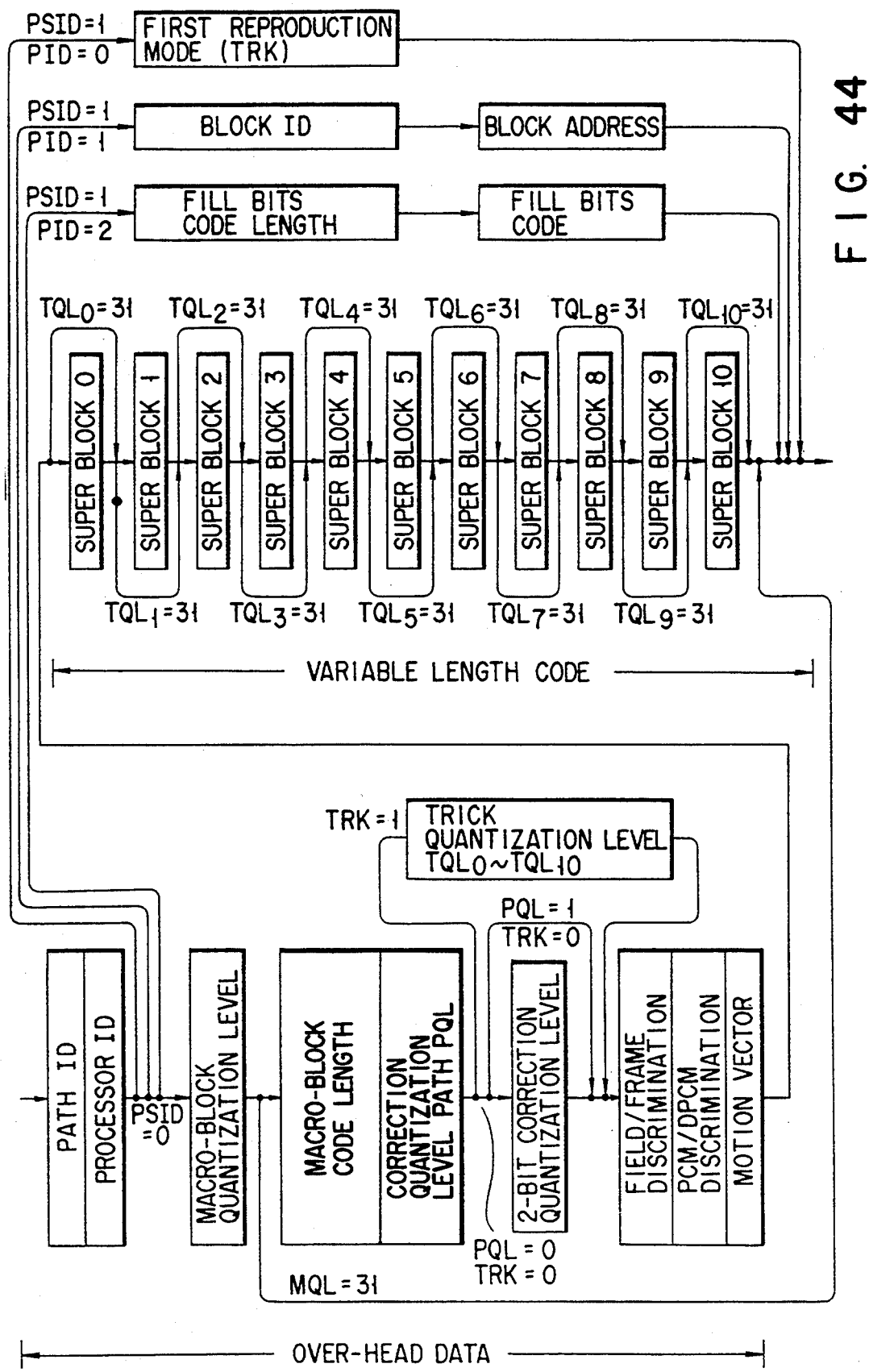
FIGS. 44A and 44B showing a macro-block bit stream structure.
Figure 47:
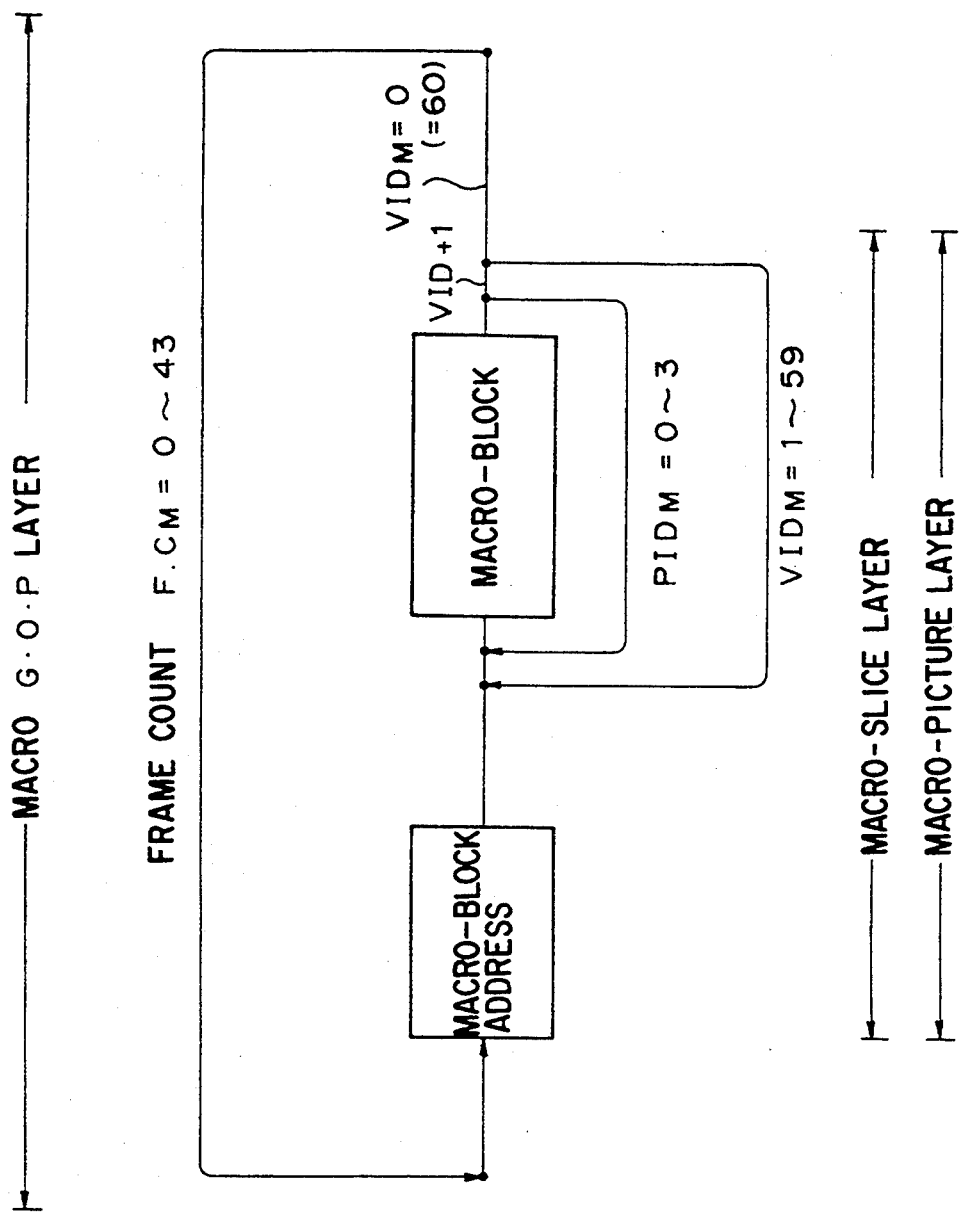
FIG. 47 is a diagram illustrating the structure of a macro-slice layer, a picture layer, and a G.O.P layer.

For this reason, the bit stream of a broadcast wave is transmitted by using the bit stream of a macro-block shown in FIGS. 44 and 47.

In addition, the bit stream of the VCR, as an output from the code switching circuit 45, is transmitted by using the bit stream of (non-) refresh blocks shown in FIGS. 45 and 46 and FIGS. 48 to 51.

Hereinafter the term "(non-) refresh" will be used to mean both "refresh" and "non-refresh".

14. Bit Stream Structure of Block Layer

A block is constituted by 64 DCT coefficients obtained by performing DCT of $8 \times 8$ pixels which are adjacent to each other in terms of luminance or color difference. 64 DCT coefficients are subjected to zigzag scanning in the order shown in FIG. 18 and to two-dimensional Huffman coding to be converted into codes, each constituted by a zero coefficient count as a run length and the amplitude of a non-zero coefficient, thereby forming a bit stream. EOB, a Huffman code, is added to the end of the codes of one block subjected to DCT.

15. Bit Stream Structure of Super Block Layer

A super block is constituted by ten blocks, i.e., eight adjacent luminance blocks (4 in the horizontal direction $\times$ 2 in the vertical direction), and color difference blocks U and V at the same position on an image. The transmission order is $Y_0, Y_1, Y_2, Y_3, Y_4, Y_5, Y_6, Y_7,$ U, and V. In addition, the difference between the luminance signal DC components of adjacent blocks is calculated, and the calculated value is transmitted.

16. Macro-block and (non-refresh) Refresh Block Addresses

As described in Chapter 9, Paragraph 9.1, in order to realize fast reproduction in a VCR, the rearrangement of refresh blocks is required. A description associated with this rearrangement will be made below.

Figure 42:
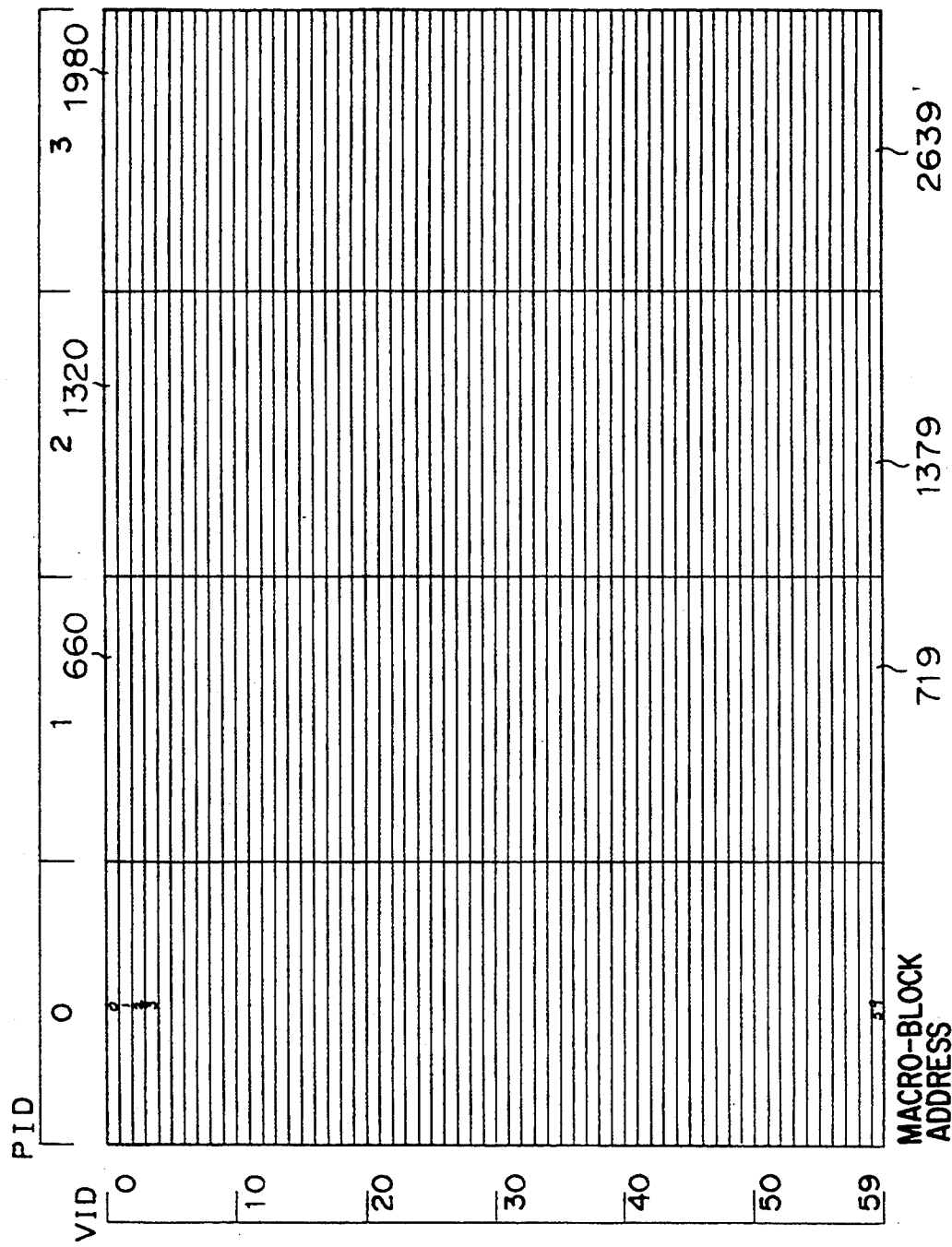
FIG. 42 is a chart explaining how macro-block addresses are set.
Figure 43:
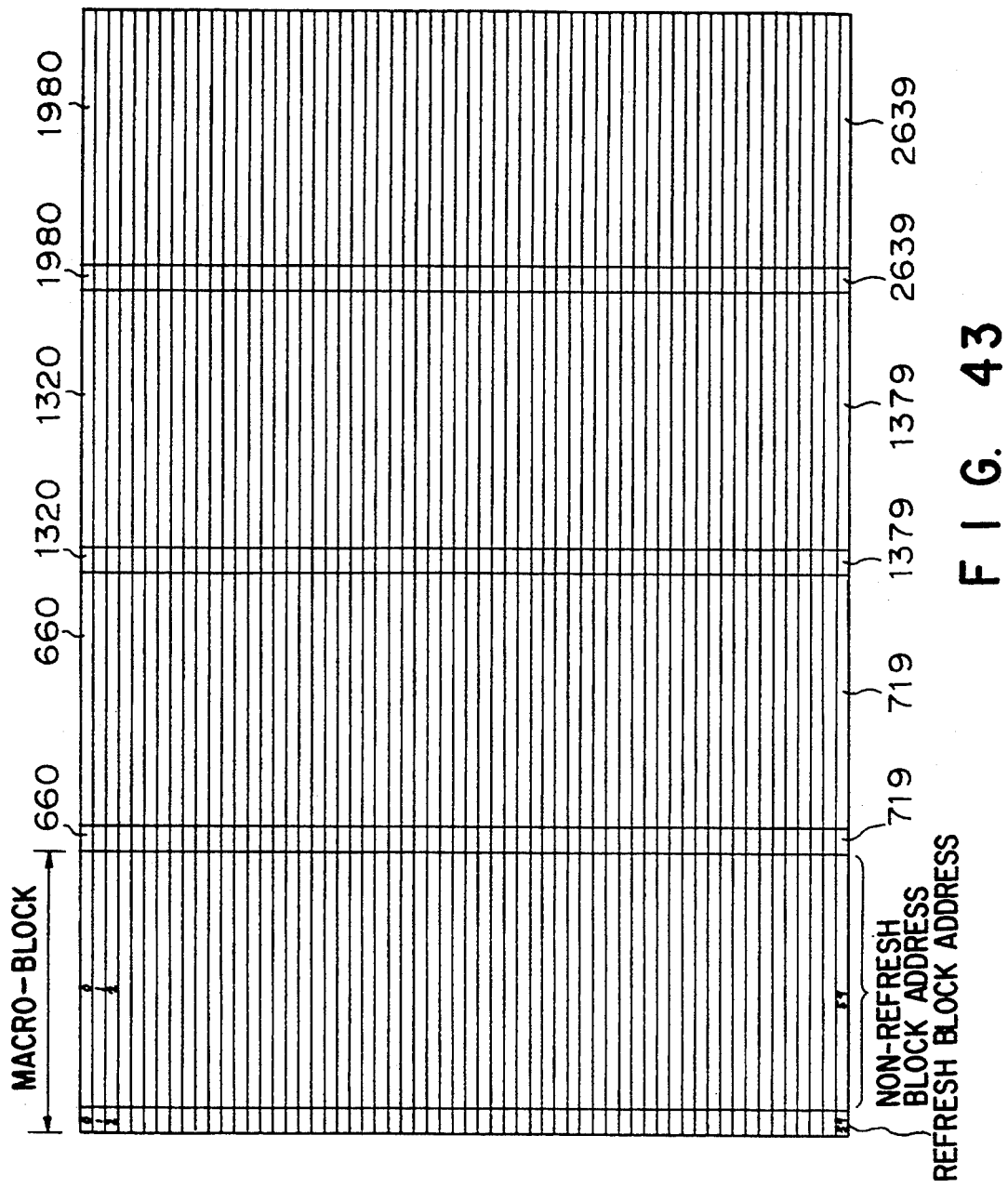
FIG. 43 is a diagram explaining (non-) refresh block addresses.

The relationship between the positions of a macro-block and (non-) refresh block on a frame and their addresses will be defined first. FIGS. 42 and 43 show a method of setting addresses.

Figure 41:
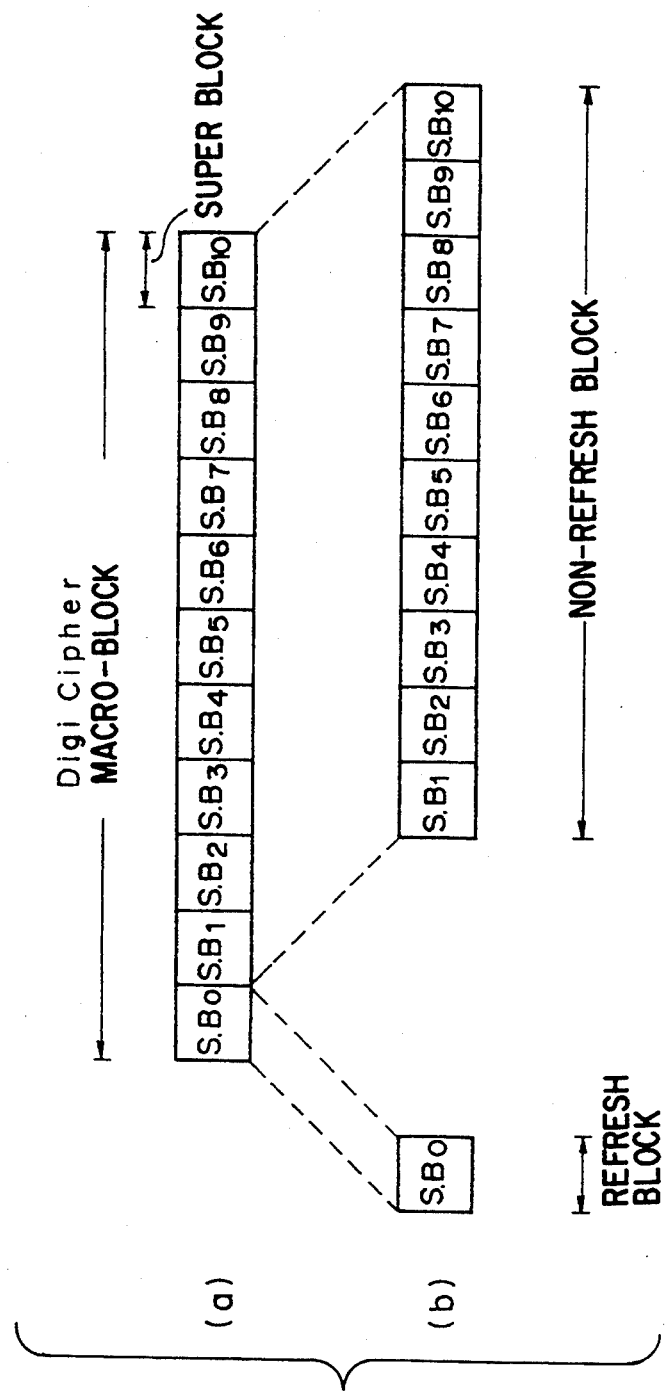
FIG. 41 is a chart showing macro-blocks and (non-) refresh blocks.

As shown in FIG. 41, a macro-block is constituted by 11 super blocks, more particularly, one refresh block and 10 non-refresh blocks. In addition, super block addresses on one frame are set according to FIG. 11.

16.1 Macro-block address

As shown in FIG. 42, as the address of a macro-block, the same address value as that of the first super block of the macro-block is assigned.

16.2 Refresh-block address

If a macro-block address is set as in Paragraph 16.1, since the first block of the macro-block is a refresh block, as shown in FIG. 41, the address value of the refresh block coincides with the address value of the macro-block as is shown in FIG. 43.

16.3 Non-refresh block address

As the address of each non-refresh block, an immediately preceding address value in the horizontal direction of the non-refresh blocks is used.

That is, the same address value is used as the addresses of a macro-block and (non-) refresh block.

16.4 Address value

This address value, as shown in FIG. 11, can be represented by:

$$S.B. Address = 60x + y$$

where x is the position of a super block in the horizontal direction, and y is the position of the super block in the vertical direction.

In DigiCipher, since four processors are used in the horizontal direction, ID identifying each processor is represented by PID, and ID indicating the vertical position of each processor is represented by VID. In this case, address values are represented as follows:

M.B.A (Macro Block
Address)=(60·11)·PID+60·x0+VID

R.B.A (Reference Block
Address)=(60·11)·PID+60·x0+VID

N.R.B.A (Non Refresh Block
Address)=(60·11)·PID+60·x0+VID

In this case, $x_0$ indicates the horizontal position of a macro-block/(non-) refresh block when PID=0 and VID=0.

Although FIGS. 42 and 43 show the case of $x_0=0$, it is clear that $x_0=0$ to 43 can be set. Furthermore, the value $x_0$ corresponds to a frame count in the conventional system.

Figure 44A:
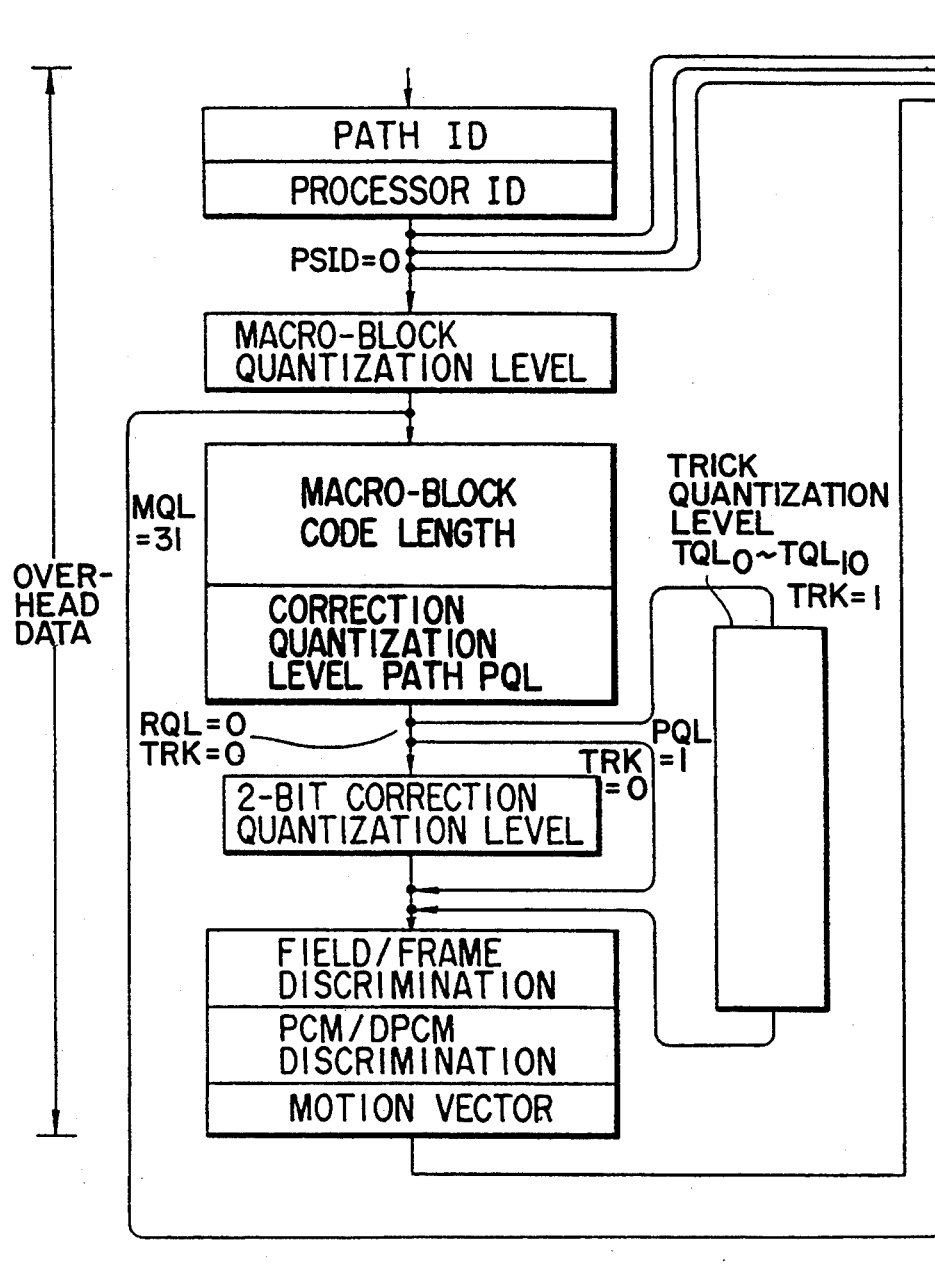
Figure 44B:
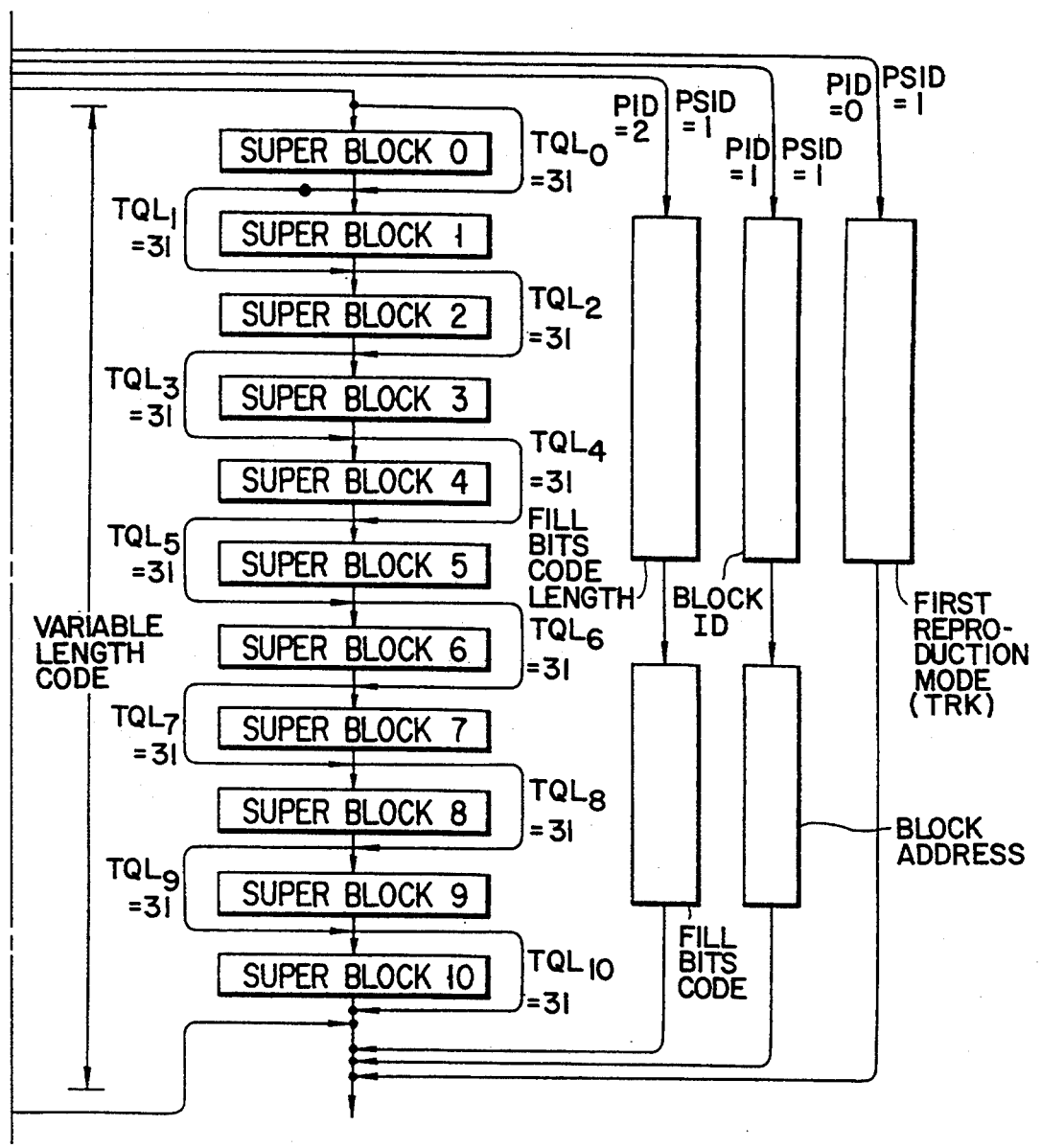

17. Macro-block/(non-) Refresh Block Bit Stream Structure 17.1 Macro-block bit stream structure FIGS. 44A and 44B show a macro-block bit stream structure. In this structure, the record format converter of the VCR needs to have a circuit for decoding the variable-length codes of the refresh block. Also it is necessary to detect all over-head data.

A broadcast wave bit stream can be formed by setting only necessary data in a broadcast wave. In this case, the format converter of the VCR only needs to have circuits required to form a bit stream (FIGS. 34 and 45 and FIGS. 48 to 51) necessary for the VCR. Hence, the format converter has an over-head data detecting circuit 111 and a variable-length code decoding circuit 114, both to be described later.

The bit stream shown in FIGS. 44A and 44B will be described, first with reference to items conventionally employed. The description is based on the following two literatures:

(a) "DigiCipher Description", Aug. 22, 1991
(b) "Channel compatible Digicipher HDTV System", Apr. 3, 1992

Each item of the bit stream will be described in detail below.

As is shown in FIGS. 44A and 44B, the macro-block bit stream is constituted by over-head data and variable-length codes.

Processor ID: Since four processors are used in DigiCipher, each processor number is expressed by 2 bits (b).

Macro-block quantization level (MQL): A quantization level QL is represented by 5 bits.

As the value increases, coarser quantization is performed. Macro-block quantization level MQL=31 indicates a state wherein no codes are generated. When MQL=31, as shown in FIGS. 44A and 44B, the flow of control skips over "over-head data" and "variable length code" after QML and advances to the next macro-block.

2-bit correction quantization level: A correction quantization level is set in the direction in which coarser quantization is performed as compared with the macro-block quantization level MQL (a). In addition, this correction quantization level is constituted by 2 bits per super block (b). Furthermore, this level is set for 11 super blocks (a). The 2-bit correction quantization level corresponds to the correction quantization level described in Chapter 10, Paragraphs 10.2 and 10.3.

Correction quantization level path PQL: If the quantization level for all super blocks is the same as that of a macro-block, all the 2-bit correction quantization levels are set to be "0". In this case, no 2-bit correction quantization level is set. That is, when PQL=1, a path to 2-bit correction quantization level data is not taken, but when PQL=0, the path indicating 2-bit correction quantization level data is taken (b).

Field/frame discrimination: Field/frame discrimination data is set to designate whether a DCT pixel arrangement of 8×8 pixels uses field pixels or frame pixels, which data is set in units of super blocks (a).

PCM/DPCM discrimination: PCM/DPCM discrimination data is used to discriminate whether each super block is intra-frame-processed (PCM) or inter-frame-processed (DPCM) (a).

Motion vector: Motion vector data indicates the motion vector of each super block (a).

A new bit stream structure will be described next.

Path ID (PSID): When PSID=0, a path in which macro-block quantization level data is present is taken. When PSID=1, the path in which macro-block quantization level data is present is not taken, but one of the following paths designated by processor ID (PID) is taken.

If PID=0, a path in which the fast reproduction mode (TRK) is present is taken.

If PID=1, a path in which block ID and block address data are present is taken.

If PID=2, a path in which Fill Bits code length data and Fill Bits codes are present is taken.

Trick quantization level TQL: When the VCR operates in the fast reproduction mode, only refresh blocks can be used. In addition, a plurality of refresh blocks may be present in one macro-block. If a plurality of refresh blocks are present, the following two requirements must be satisfied.

First, if a plurality of refresh blocks of different frames are present in one macro-block, 5-bit quantization levels are required for the respective refresh blocks.

Second, the position of each refresh block in the macro-block must be designated.

In order to designate this position, a skip operation must be performed in units of super blocks. For this reason, in the fast reproduction mode of the VCR, a path in which the trick quantization level TQL is present is taken.

The trick quantization level TQL has a 5-bit absolute quantization level in units of super blocks. That is, 55-bit quantization level data is set for 11 super blocks.

If TQL=31 is set, a skip operation of variable length codes can be performed in units of super blocks.

With this operation, refresh block variable length codes can be arranged at arbitrary positions in a macro-block.

As shown in FIGS. 44A and 44B, the trick quantization levels TQL and the variable length codes of the respective super blocks have the following correspondence:

TQL 0   corresponds to super block 0.
TQL 1   corresponds to super block 1.
  .
  .
TQL 10  corresponds to super block 10.

In the fast reproduction mode, of super blocks 0 to 10, refresh block variable length codes are arranged only at the super block position where refresh blocks are arranged. At the remaining super block positions, trick block quantization level TQL=31 is set to perform a skip operation in units of super blocks.

In the recording and normal reproduction modes, with regard to the variable length codes of the bit stream of a broadcast wave, super block 0 corresponds to refresh block 0, and super blocks 1 to 10 correspond to non-refresh blocks 1 to 10.

Fast reproduction mode (TRK): When the bit stream of a broadcast wave is to be transmitted, or a bit stream in the normal reproduction mode is to be transmitted, TRK=0 is set, and a path in which 2-bit correction quantization level (PQL=0) data or 2-bit unused correction quantization level (PQL=1) data is present is taken.

In the fast reproduction mode of the VCR, TRK=1 is set, and a path in which the above-described trick quantization level data is present is taken.

Block ID: This is ID data discriminating a macro-block and a (non-) refresh block.

Block address: A block address is an address indicating the absolute position of a macro-block or a (non-) refresh block on a frame.

The block address makes it possible to supply image-output position data to the decoder so that the image may be restored, even while the VCR is reproducing the image or even if an error is made in the fast reproducing mode.

When PSID=1 and PID=2, a path indicating a Fill bits code length and Fill bits codes is taken. Fill bits will be described here. Since the transmission amount of codes is fixed, predetermined codes which complement the transmission amount of codes are forcibly inserted if the amount of band-compressed codes is smaller than the transmission amount of codes. Such codes are called "Fill bits codes," and the length of the codes is called "Fill bits code length".

Fill Bits code: When the generation amount of variable length codes is small, a predetermined amount of codes are forcibly inserted. The forcibly inserted codes are called Fill Bits. Especially in the fast reproduction mode of the VCR, since only refresh blocks are used, but non-refresh blocks are not used, it is highly possible that the generation amount is reduced. Since the transmission amount of codes is fixed, Fill Bits must be forcibly inserted.

Fill Bits code amount: If the code length of the above-mentioned Fill Bits is set before the Fill Bits, the end point of the Fill Bits can be clearly detected. With this operation, a clear boundary can be set between macro-blocks.

Macro-block code length: The sum of the code length of the macro-block over-head data and that of the macro-block variable length code, both present in the macro-block shown in FIGS. 44A and 44B.

The bit stream described above is used as bit stream of a broadcast wave. The decoder which is used to receive the broadcast wave can thereby receive also the signal which has been reproduced by the VCR in a special way.

By using the above-described bit stream, the format converter of the VCR can realize special reproduction by simply detecting the over-head data of each macro-block and switching refresh block codes.

Vertical ID ($VID_M$): Although not present in the bit stream, $VID_M$ is defined as an ID which represents a vertical position in one frame. The value of $VID_M$ ranges from 0 to 59 since there are 60 micro-blocks arranged in the vertical direction.

Figure 45:
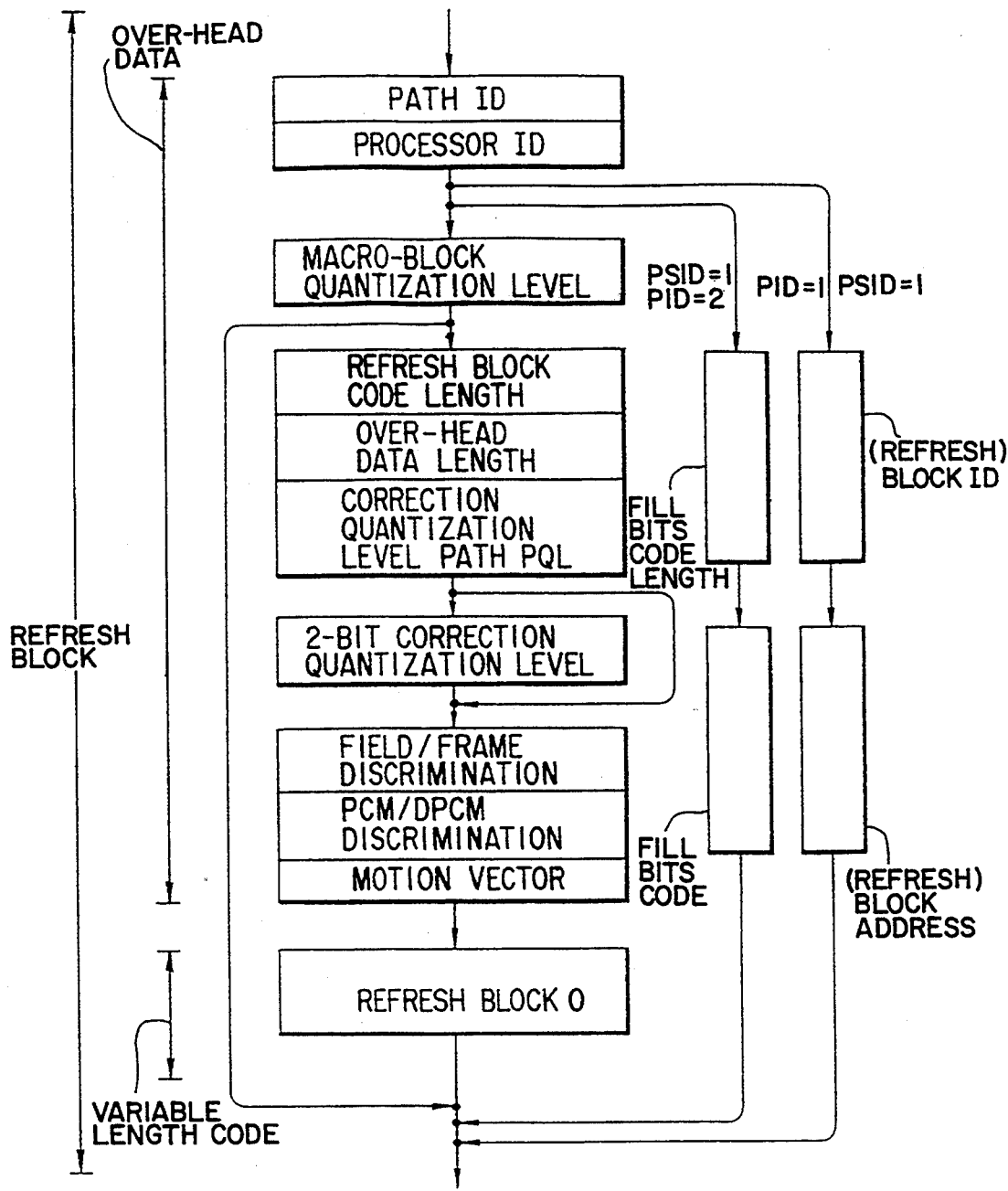
FIG. 45 is a diagram illustrating a refresh block bit steam structure.

17.2 Refresh block bit stream structure (FIG. 45)

A refresh block bit stream structure (FIG. 45) is constituted by over-head data, and a refresh block variable length code 0.

Although the over-head data is basically the same as that described in Paragraph 17.1, its characterizing features will be described below.

Block ID: This is an ID which has the ID of a refresh block. The block address has a refresh block address.

Refresh block code length: This indicates the over-head data and the total length of the variable-length codes of the refresh blocks.

Over-head data length: This is the length of the over-head data, starting with the correction quantization level path PQL to the motion vector.

The variable-length codes include:
 a refresh block variable-length code (refresh block 0);
 and a variable-length code of any of the 11 super macro-blocks that will be refreshed and that corresponds to super block 0 shown in FIGS. 44A and 44B.

Figure 46:
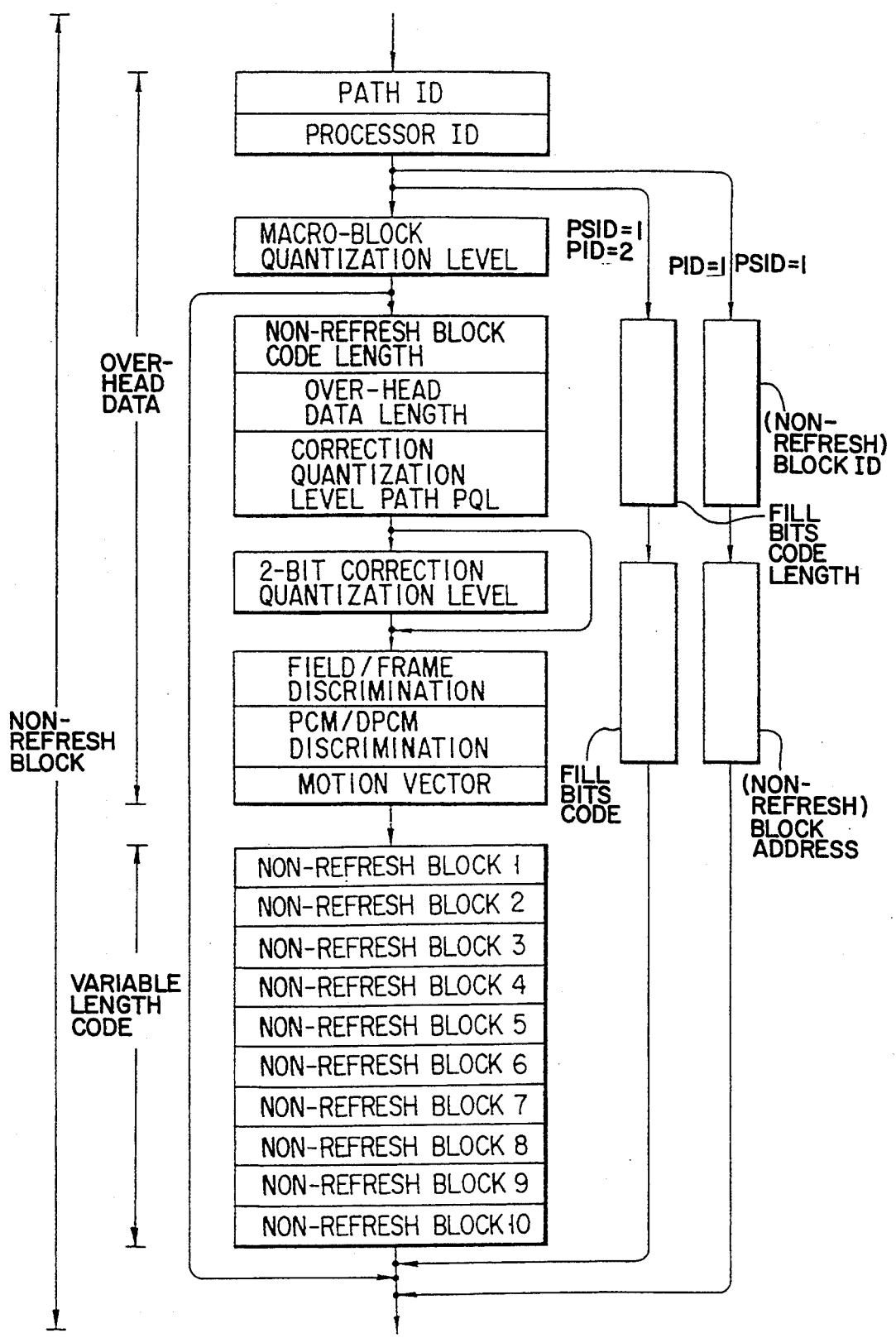
FIG. 46 is a diagram showing a non-refresh block bit stream structure.

17.3 Non-refresh block bit stream structure (FIG. 46)

A non-refresh block bit stream structure (FIG. 46) is constituted by over-head data and ten non-refresh block variable length codes 1 to 10.

The non-refresh block over-head data is similar to that described in Paragraph 17.1. Its specific or characterizing features will be described below.

Block ID: This includes the ID data of the non-refresh blocks, and an "address" which is a non-refresh block address.

Non-refresh block code length: This a total code length of the data length of the non-refresh block over-head data and the code length of the ten non-refresh blocks.

2-bit correction quantization level: This is identical to the 2-bit correction quantization level which has been described in Paragraph 17.1.

Over-head data length: This is the length of the over-head data, starting with the correction quantization level path PQL to the motion vector.

Non-refresh variable-length codes are variable-length codes, including the variable-length codes of non-refresh blocks 1 to 10. More specifically, non-refresh block variable length codes are the variable length codes of the ten of the 11 super blocks, which have not been refreshed. The super blocks correspond to super blocks 1 to 10 shown in FIGS. 44A and 44B.

18. Slice Layer, Picture Layer, and G.O.P Layer 18.1 Slice layer

A slice layer is constituted by one or a plurality of macro (non-) refresh blocks.

A head portion of a slice includes discrimination data for discriminating a macro-slice, a refresh slice, and a non-refresh slice and an address value indicating the position of the slice in an image. That is, a slice is designed to allow the use of data even in fast reproduction or at the time of occurrence of an error.

Such discrimination data and address value of a slice can be set by setting PSID and PID, in the macro and (non-) refresh block bit stream structures shown in FIGS. 44A, 44B, 45 and 46, to be predetermined values, and selecting a path indicating block ID and an address value.

18.2 Picture layer

A picture, i.e., an image, is constituted by at least one or a plurality of slices.

18.3 G.O.P layer (group-of-picture layer)

A G.O.P is constituted by a plurality of picture layers. In DigiCipher, 44 super blocks are present in the horizontal direction, and the position of each macro-block is determined on the basis of a frame count value (F.C). Therefore, 44 pictures are included in one G.O.P layer.

19. Macro-slice Layer, Picture Layer, and G.O.P Layer

A macro-slice layer indicates the transmission order of macro-blocks in transmission of a broadcast signal in DigiCipher (FIG. 47).

Since this macro-slice layer is processed with respect to one frame, it becomes identical to a macro-picture layer. One macro-block address is inserted for one frame. This macro-block address can be obtained by selecting a path indicating a macro-block address when path ID and processor ID are set to be predetermined values in FIGS. 44A and 44B. In addition, since macro-block addresses are set in units of frames, the addresses have a one-to-one correspondence with frame count values $F \cdot C_M$ of macro-blocks.

The macro-blocks of a macro-slice layer are sequentially transmitted in units of processors $PID_M=0$ to 3, from the top to the bottom of a frame, according to $VID_M=0$ to 59.

That is, in the case of the macro-block addresses shown in FIG. 42, after a macro-block address value is transmitted, macro-blocks are transmitted according to the following macro-block addresses:

```
0,  660, 1320, 1980
1,  661, 1321, 1981
.   .    .    .
.   .    .    .
```

For the next frame, the horizontal direction $x_0$ of a macro-block is shifted by one. After the resultant macro-block address value is transmitted, macro-blocks are sequentially transmitted according to the following macro-block addresses:

```
60,  720, 1380, 2040
61,  721, 1381, 2041
.    .    .    .
.    .    .    .
```

After the horizontal position $x_0$ is sequentially shifted from 0 to 43, $x_0=0$ is set again. Assume that a macro-G.O.P layer is constituted by these 44 images. This value is the same as the period at which one processor processes the entire area of one frame and corresponds to the frame count $F \cdot C_M$. These values also have a relationship defined by $x_0 = f(F \cdot C_M)$.

Since one frame is constructed by four processors, refreshing is performed at an interval of 11 frames.

In the normal reproduction mode in a recording medium such as a VCR, images are output from the recording medium by using the bit stream structures of such macro-slice layers, picture layers, and G.O.P layers.

20. Refresh Slice Layer, Picture Layer, and G.O.P Layer

As described in Chapter 9 ("Requirements for fast reproduction"), Paragraph 9.1 ("Refresh block code switching"), in order to realize fast reproduction in a VCR, recording must be performed such that a predetermined number of refresh blocks are arranged in a sector on the tape pattern of the VCR.

A refresh slice layer indicates the arrangement of this predetermined number of refresh blocks. More specifically, a refresh slice layer indicates the positions of refresh blocks on a frame and the number and arrangement of refresh blocks set in the refresh slice.

Figure 48:
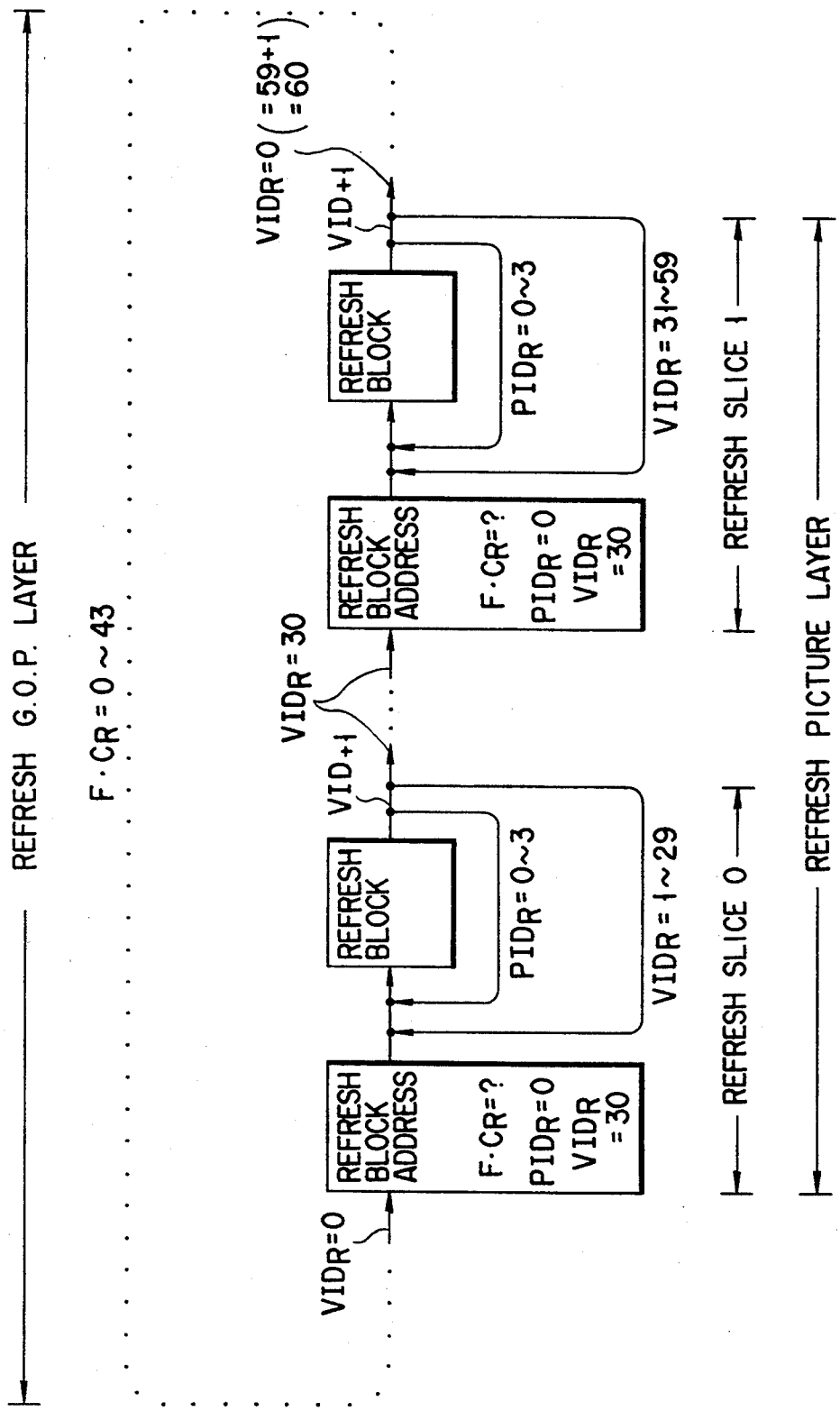
FIG. 48 is a diagram showing the structure of a refresh slice layer, a picture layer, and a G.O.P layer No. 1.
Figure 49:
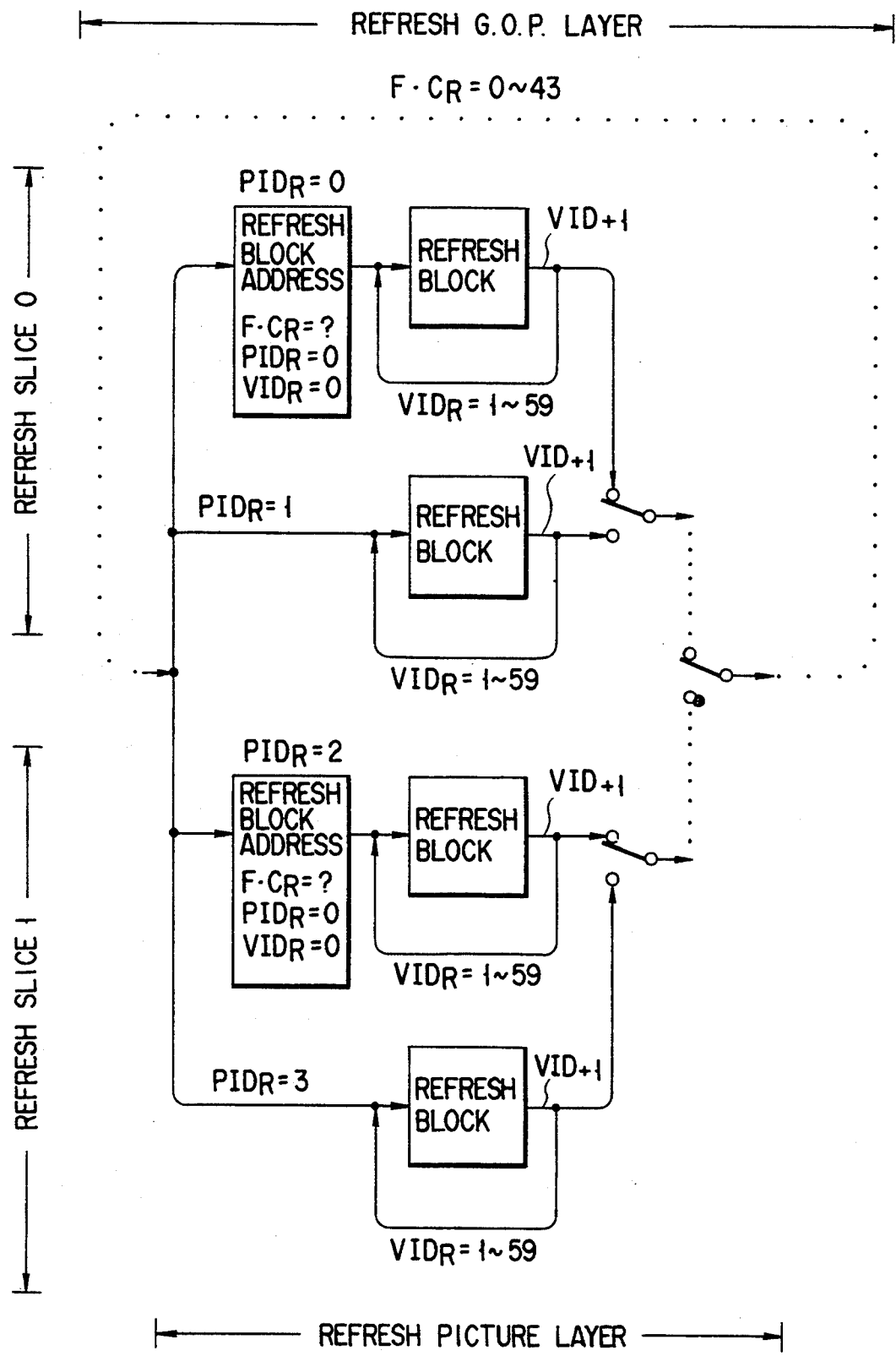
FIG. 49 is a diagram showing the structure of a refresh slice layer, a picture layer, and a G.O.P layer No. 2.

The specifications of fast reproduction are determined by the arrangement of a refresh slice. FIGS. 48 and 49 show a refresh slice layer.

A refresh picture layer indicates refresh blocks of one frame. A refresh G.O.P layer is constituted by refresh picture layers of 44 frames. Since refreshing of one frame is completed at a period of 11 frames, and the entire area of one frame is scanned by each processor at an interval of 44 frames. Therefore, a G.O.P layer is formed at a period of 44 frames indicated by frame count $F \cdot C_R = 0$ to 43.

The number of refresh blocks in one sector on the tape 26, i.e., one refresh slice layer, is determined by the number of tracks on which an average number of codes per frame are recorded, the rotational speed of the drum, the number of heads per scan, and a fast reproduction speed.

The simplest case will be described below.

When the tape format shown in FIGS. 26 and 31 is used, i.e., one frame is recorded on one track to realize double-speed reproduction, one refresh picture layer has two refresh slice layers. Since the number of refresh blocks in one frame is 240, in order to insert 120 ($=240 \div 2$) refresh blocks in one sector, 120 refresh blocks are set in a refresh slice layer. There are two methods of obtaining such refresh blocks, which will be described in Paragraph 20.1 and Paragraph 20.2, respectively.

If the number of tracks per frame, the rotational speed of the drum, and the fast reproduction speed are determined otherwise, a predetermined number of refresh blocks may as well be set in one refresh picture layer.

If a system for a VCR is determined, the number of refresh blocks in a refresh slice is uniquely determined. In addition, the number of refresh slices in a refresh picture layer is also uniquely determined.

20.1 Refresh slice layer structure No. 1

FIG. 48 shows the first method of arranging refresh blocks in a refresh slice layer.

The refresh block address of the first refresh block of a refresh slice is set at the start portion in a refresh slice layer.

Since refresh slice 0 is the first refresh slice of the refresh slice layer, this refresh block address coincides with the macro-block address in the macro-slice layer described in Chapter 19.

Subsequently, refresh blocks are arranged.

The refresh blocks are arranged in the refresh slice in such a manner that while processors $PID_R=0$, 1, 2, and 3 are sequentially transmitted, refresh blocks are transmitted according to vertical ID $VID_R=0$ to 29. This means that while four refresh blocks in the horizontal direction on a frame are sequentially transmitted, refresh blocks are transmitted from the top to bottom in the vertical direction.

With this operation, 120 refresh blocks corresponding to the upper half of a frame are transmitted. Upon transmission of the refresh blocks through the refresh slice 0, $PID_R=0$ to 3 are transmitted up to $VID_R=31$ to 59 through the refresh slice 1.

A refresh block address determined by $PID_R=0$, $VID_R=30$, and $F \cdot C_R$ is inserted in the start portion of the refresh slice 1.

At the decoder, the initial position of a refresh block can be recognized by using a refresh block address. In addition, the positions of refresh blocks in the horizontal direction can be recognized by using $PID_R=0, 1, 2, 3$, and the positions of refresh blocks in the vertical direction by counting $PID_R$.

Although a refresh slice delimiter is set at each switching point of $VID_R$ in FIG. 48, a refresh slice delimiter may be set at each switching point of $PID_R$.

20.2 Refresh slice layer structure No. 2

FIG. 49 shows the second method of arranging refresh blocks. In this method, refresh blocks adjacent to each other in the vertical direction for each processor are sequentially transmitted.

In this case, while $PID_R$ is fixed, refresh blocks are transmitted in the order of $VID_R=0$ to 59. There after, $PID_R$ is changed, and refresh blocks are transmitted in the order of $VID_R=0$ to 59.

The second method is advantageous in terms of image quality at a high reproduction speed because adjacent refresh blocks in the same frame can be transmitted. This is because adjacent areas in the same frame can be reproduced as a large image.

In the decoder, the initial position of a refresh block can be recognized by using a refresh block address, and the positions of refresh blocks in the vertical direction can be recognized by counting $PID_R$ for a certain fixed period of time. In addition, when $PID_R$ is changed, a shift amount in the horizontal direction can be recognized by using $PID_R=0$ to 3.

21. Non-refresh Slice Layer, Picture Layer, and G.O.P Layer

21.1 Structure of non-refresh slice layer

Figure 50:
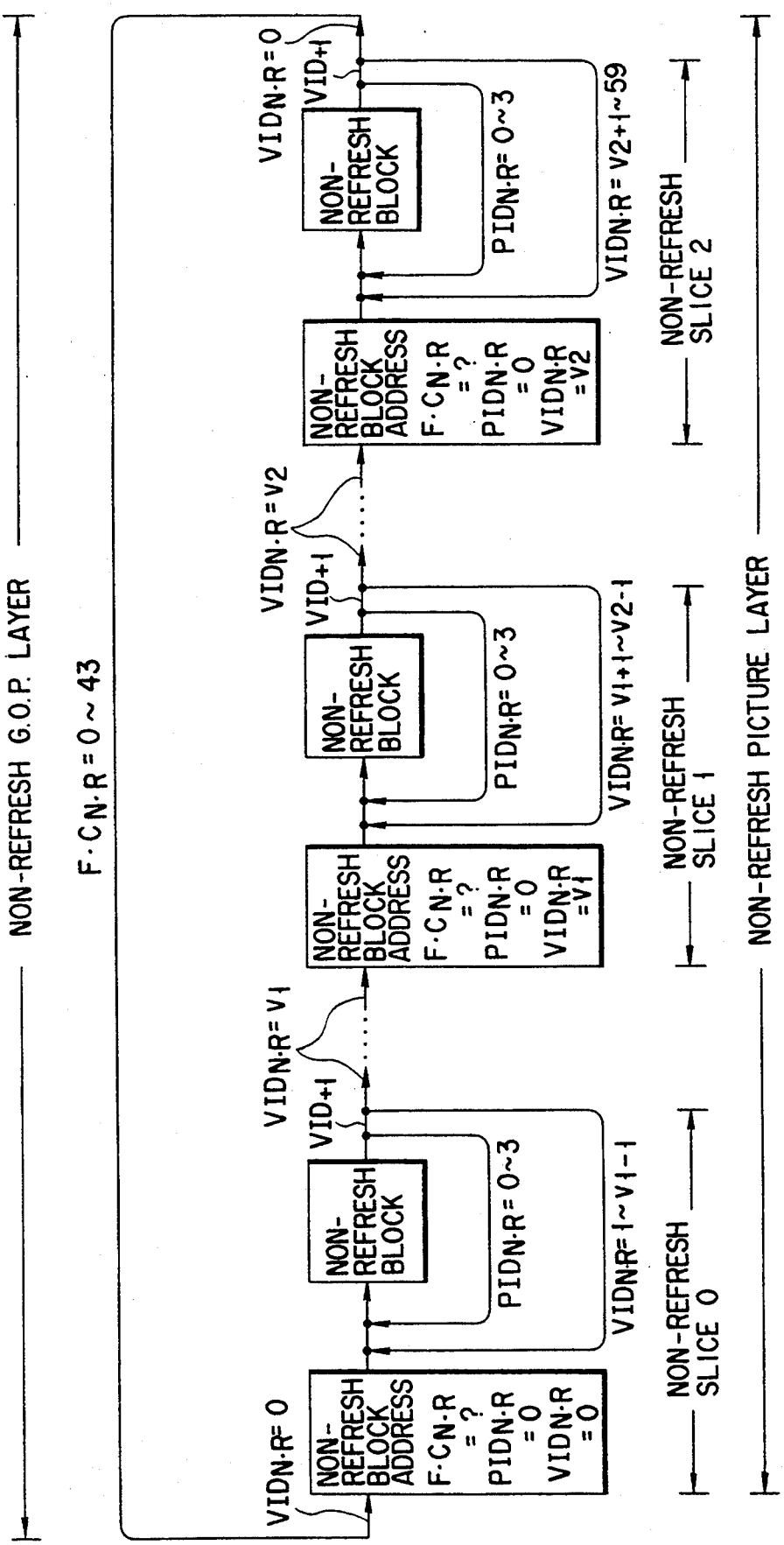
FIG. 50 is a diagram showing the structure of a non-refresh slice layer, a picture layer, and a G.O.P layer.

A non-refresh slice layer indicates a transmission order and transmission delimiters in transmitting the non-refresh blocks shown in FIG. 50.

The transmission order of non-refresh blocks is always the same as that of macro-blocks, and $PID_{N \cdot R}$ is sequentially and repeatedly set to be 0, 1, 2, and 3 in the order named. In addition, transmission is performed in the order of $VID_{N \cdot R}=0$ to 59.

In the case shown in FIG. 50, non-refresh blocks are transmitted in the order of non-refresh block addresses 0, 660, 1320, 1980, 1, 661, 1321, 1981, .... For the next frame, the horizontal position x s shifted by an amount corresponding to one super block, and non-refresh blocks are transmitted in the order of addresses 60, 720, 1380, 2040, 61, 721, 1381, 2041, ....

By making the transmission order of macro-blocks coincide with that of non-refresh blocks, signal processing in the normal reproduction mode is simplified. In addition, in order to satisfy this condition, refresh slice layers are sequentially transmitted as in the order of refresh slices 0 to 2.

21.2 Non-refresh slice layer delimiters

Non-refresh slice layer delimiters will be described next.

One or more non-refresh slices are included in a non-refresh picture including non-refresh blocks of one frame. There are two types of delimiters for delimiting the non-refresh slice.

The first-type non-refresh slice delimiter is set at a switching point of a frame, thus dividing a non-refresh picture layer. The second-type non-refresh slice delimiter is set, thereby realizing fast reproduction in a VCR.

As described in Chapter 9 ("Requirements for fast reproduction"), Paragraph 9.1 ("Refresh block code switching"), in order to realize fast reproduction in a VCR, refresh slices must be arranged in each sector on the tape pattern of the VCR.

In order to realize this arrangement, non-refresh slice layer delimiters must be set such that refresh slices are arranged in each sector.

The number of refresh blocks in a refresh slice layer is arbitrarily changed in accordance with the amount of codes assigned to a non-refresh slice layer.

A non-refresh block address is set at the start portion of a non-refresh slice layer.

22. VCR Picture Layer and G.O.P Layer

When recording is to be performed with respect to a VCR, the above-described refresh slices and non-refresh slices are transmitted in sets.

Figure 51:
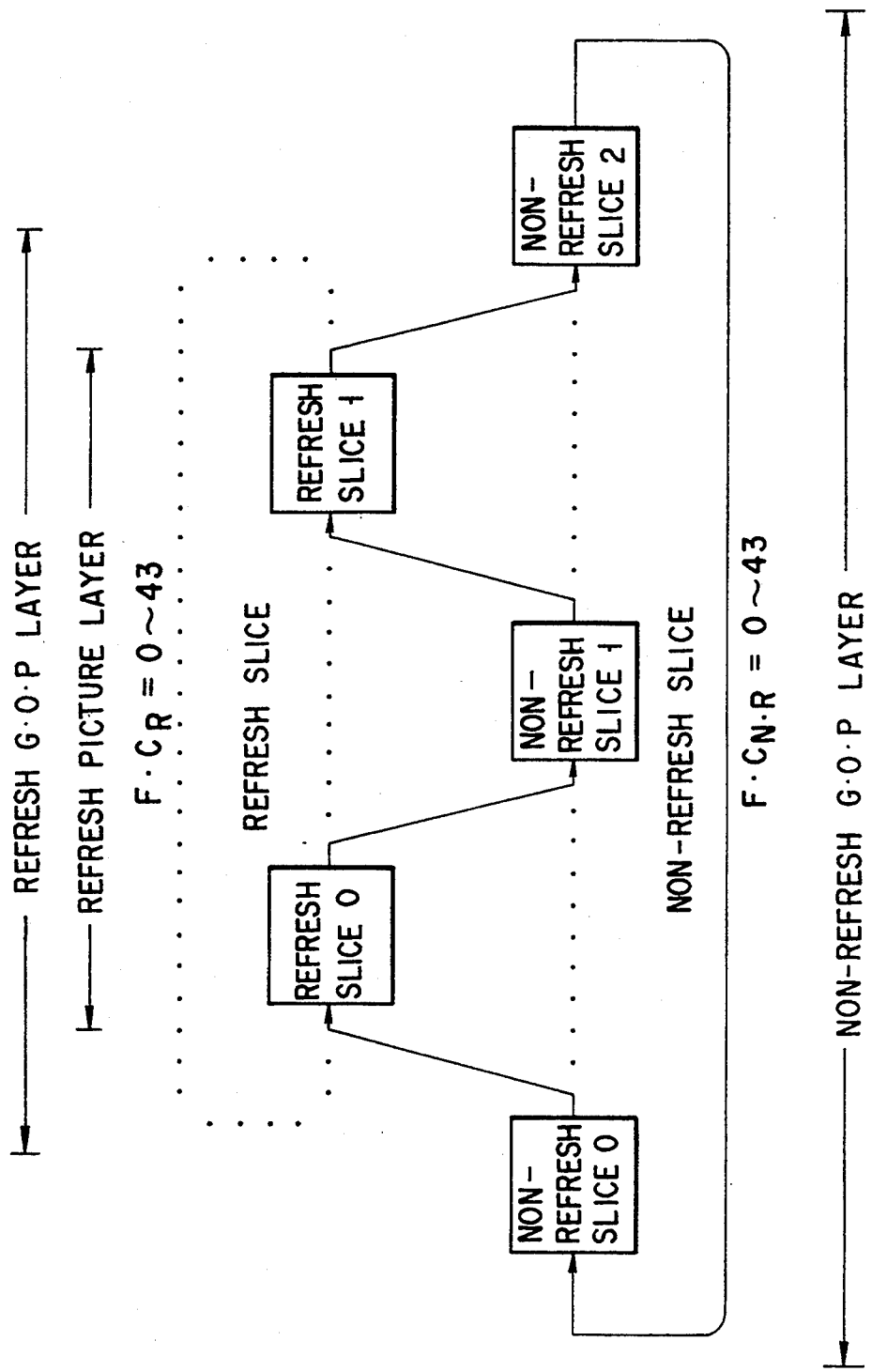
FIG. 51 is a diagram explaining how to combine refresh slices and non-refresh slices.

FIG. 51 shows a method of combining such slices. In this method, code transmission is performed in the manner indicated by the solid lines.

As described in Chapter 21, the non-refresh slices 0, 1, and 2 are transmitted in the order named.

Refresh slices are inserted between these non-refresh slices. If non-refresh and refresh slices are respectively represented by NRS (Non Refresh Slice) and RS (Refresh Slice), transmission is performed in the order of:

NRS0, RS0, NRS1, RS1, and NRS2.

Although the non-refresh slices 0, 1, and 2 are always transmitted in the order named, refresh slices may be transmitted in the order of:

NRS0, RS1, NRS1, RS0, and NRS2.

The transmission order of refresh slices is determined by the method employed to design a reproduced image in the fast reproduction mode of the VCR.

In FIG. 51, the portions indicated by the broken lines represent the relationship between the picture layer and the G.O.P layer of the refresh slices and the non-refresh slices in transmitting recording codes to the VCR.

Refresh slices are arranged, considering that they are recorded in each sector of the VCR, and non-refresh slices are arranged between the refresh slices. Nonetheless, the switching points of the respective picture layers can be independently set. The respective picture layers are transmitted in the order of Frame-Count refresh: $F \cdot C_R=0$ to 43 and Frame-Count non-refresh: $F \cdot C_{NR}=0$ to 43.

23. Data Multiplex Format

In order to record the bit streams described in Chapters 13 to 22 by means of the heads A and B through the output terminal 69 in FIG. 9, necessary signals are added to the VCR.

Figure 52:
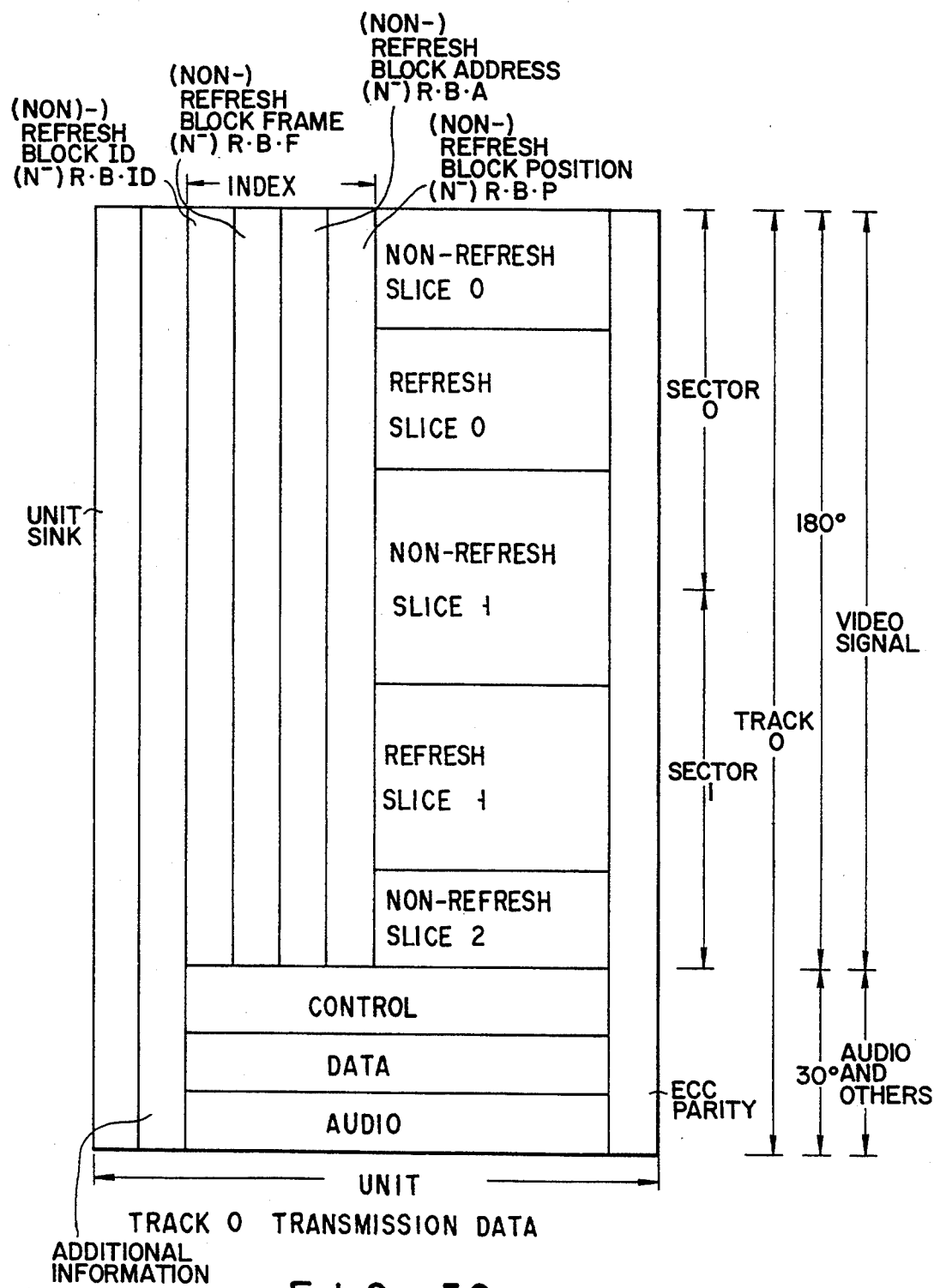
FIG. 52 is a chart showing the data multiplex format of the VCR.

FIG. 52 shows a VCR data multiplex format.

More specification FIG. 52 illustrates transmission data for a track 0. In this figure, the abscissa spans a one-unit unit period (to be defined later), and the ordinate denotes a unit count recorded on one track. The ordinate is also made to correspond to the average amount of codes of one frame, so that it will be described how to record the average number of codes of one frame on one track.

A switching point between a video signal and an audio signal, and a switching point between sectors are exemplified at the right end in FIG. 52.

In the non-refresh block bit stream structure shown in FIG. 50, $VID_{N.R} = v_1$ and $VID_{N.R} = v_2$ are determined in such a manner that the refresh slice 0 is set in a sector $S_0$ of the track $T_0$, and a refresh slice 1 is set in a sector $S_1$ of the track $T_0$.

After the non-trick blocks and the trick blocks are arranged in the manner described above, a sync signal, (non-) refresh block position data, non-refresh block address data, other additional information, an error correction signal, and the like are added and recorded as is shown in FIG. 52, there by performing a recording operation.

23.1 Unit sync

In a VCR, since jitter due to instable rotation of the cylinder, a track jump in a special reproduction mode, and the like tend to occur, unit sync signals must be added at a predetermined period. In this case, one period of this sync signal is termed one unit.

Definition of term

Unit: A unit is one period of a sync in transmission data to the VCR. In this period, a sync, additional information, a non-refresh block position code, (N-) R.B.P, a non-refresh block address code (N-) R.B.P, a (non-) refresh slice code, an error code, and the like are added.

A signal for the VCR, set in this unit period, shall be called "unit sync".

Definition of term

Unit sync: A unit sync is a sync for the VCR, set in a unit. After a unit sync, additional information for the VCR and the like are recorded.

Additional information includes a unit sync number, video/audio identification data, a track number, a unit number, and the like.

Furthermore, an error correction parity is added to correct an error in the VCR.

23.2 (Non-) refresh block ID (Non-) refresh block ID indicates (N-) R.B.ID=0, when a block indicating the (non-) refresh block frame address position described in Paragraph 23.3 to Paragraph 23.5 is a non-refresh block, and indicates (N-) R.B.ID=1, when the block is a refresh block.

23.3 (Non-) refresh block frame

A (non-) refresh block frame indicates the frame number of a block designated by a (non-) refresh block position.

23.4 (Non-) refresh block address (N-) R.B.A (Non-) refresh block address (N-) R.B.A represents coding position information of each block.

Since each block is constituted by variable length codes, the switching point of each block is not fixed. For this reason, address (N-) R.B.A of the first (non-) refresh block set in each unit is indicated.

23.5 (Non-) refresh block position (N-) R.B.P

Since variable length codes and inter-frame DPCM processing are used, the start point of each block is not fixed. Hence, each start point is indicated by (non-) refresh block position data.

To arrange a refresh slice between non-refresh slices, a refresh block position code is inserted, indicating the position of the first of the refresh blocks.

A plurality of refresh blocks or non-refresh blocks may be present in a unit. In this case, the position represented by a refresh block position code indicates the position of a (non-) refresh block which appears first.

For this purpose, the start block of a refresh slice is arranged to appear first in a unit.

If a recordable code amount is greater than a transmission data code amount, a free area may be set so that the start block of a refresh slice may be set at the start position in a unit. In a fast reproduction operation, a head crosses and traces tracks, and the maximum envelope is therefore obtained when the head completely coincides with a track. Otherwise, the envelope is always reduced. This means that the error rate has increased, which may cause a reproduction failure.

On the other hand, in order to use a refresh slice as a reproduction signal, the start position of the start code of the refresh slice must be obtained. To this end, the (N-) R.B.P signal must be reproduced. In order to detect this (N-) R.B.P signal, a unit sync signal must be detected.

If a refresh block is arranged from the start position in a unit, the influence of a decrease in envelope can be minimized.

If a free area is set, and the start block of a (non-) refresh slice is arranged at the start position in a unit, refresh blocks and non-refresh blocks can be distributed to different FIFO memories by using (non-) refresh block ID data only, in a code switching operation performed by the decoder. Therefore, code switching can be easily accomplished.

23.6 Detailed example

Figure 53:
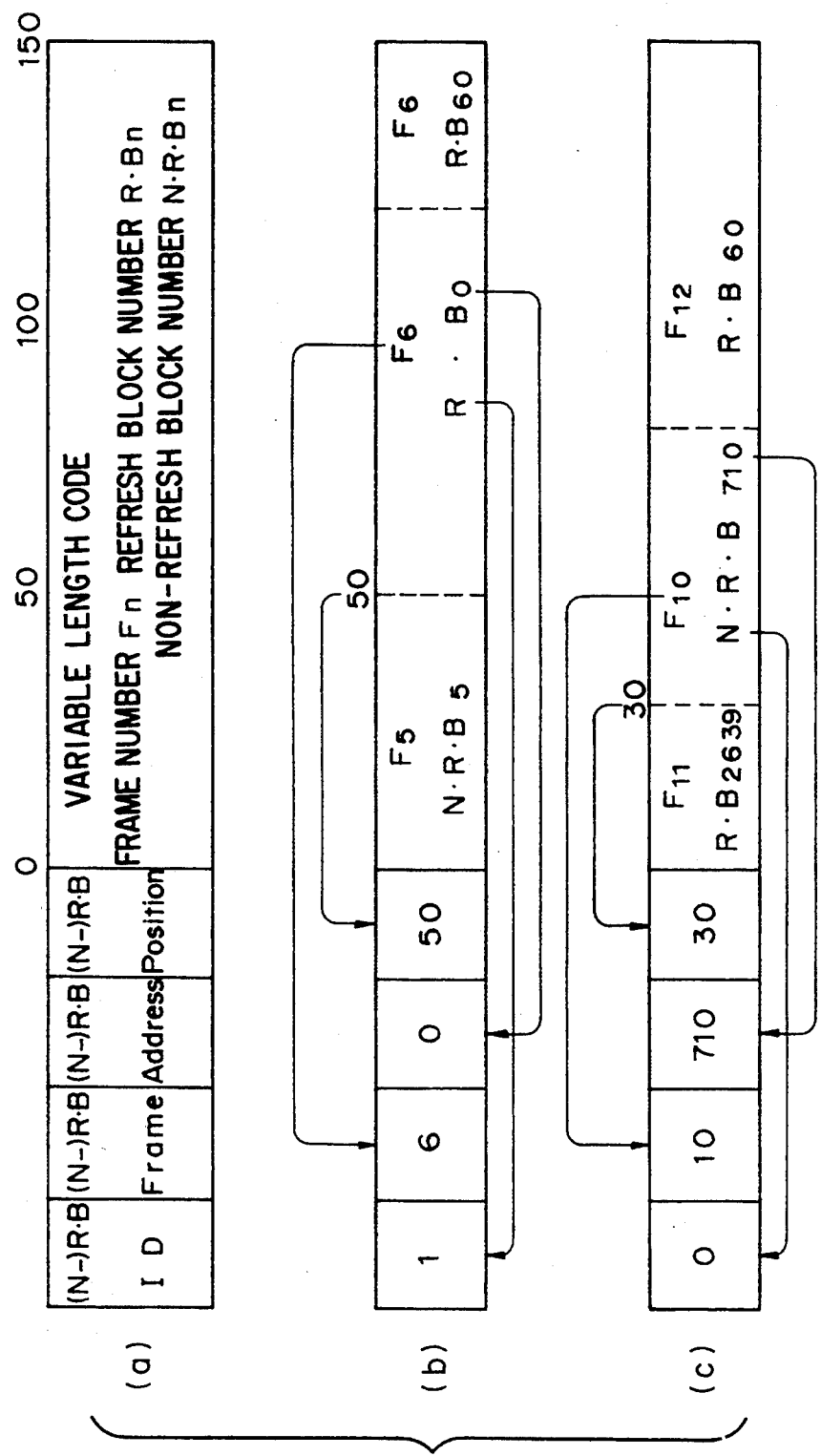
FIG. 53 is a diagram showing a (non-) refresh block ID, a frame, an address, and a position index signal.

FIG. 53 show a detailed example of an index signal containing (non-) refresh block ID data, frame data, address data, and position data.

Shown at (a) of FIG. 53 is an enlarged view of a unit associated with the video signal shown in FIG. 52. More specifically, the insertion positions of the following data contained in the index signal are illustrated at (a) in FIG. 53:

(non-) refresh block ID [(N-) R.B.ID]
(non-) refresh block frame [(N-) R.B. Frame]
(non-) refresh block address [(N-) R.B. Address]
(non-) refresh block position [(N-) R.B. Position]

Also shown at (a) in FIG. 53 are the insertion positions of variable length codes. Positions 0 to 150, or the positions of the codes, are shown, indicating the switching positions of the blocks in the unit.

Shown at (b) in FIG. 53 are the values of an index signal to be inserted when a refresh block $R.B_0$ corresponding to frame number F6 is the start block in the unit. The values are:

R.B.ID=1
R.B.F=6
R.B.A=0
R.B.P=50

Shown at (c) in FIG. 53 are the values of an index signal to be inserted when a non-refresh block N.R.B 710 corresponding to frame number F10 becomes the start block in the unit. The values are:

R.B.ID=0
R.B.F=10
R.B.A=710
R.B.P=50

According to the VCR data multiplex format, only additional information such as index data is added, but there is no requirement for video signal coding processing in terms of the format.

For this reason, the content of video information is not degraded by the format.

23.7 Additional information

As the additional information shown in FIG. 52, a unit number, a track number, and the like are set. By setting these pieces of information, slow reproduction can be realized by rearranging units in accordance with unit numbers.

Furthermore, this unit number is used to reproduce data at a specific position on a track. That is, servo processing is performed to maximize the envelope at the position where a refresh slice is arranged.

24. Code Switching Circuit

Figure 54:
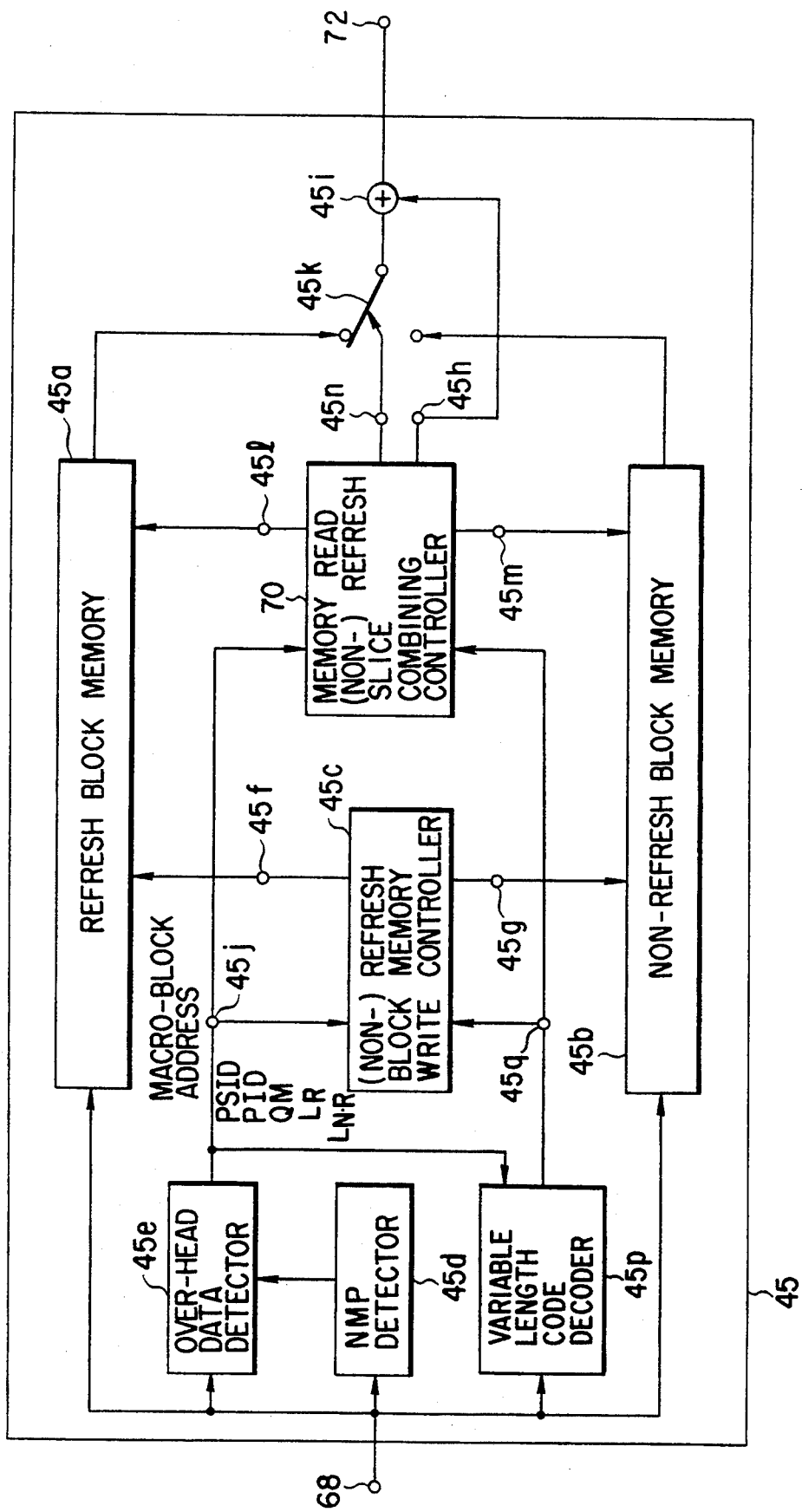
FIG. 54 is a block diagram showing, in detail, a code switching circuit.

The arrangement of the code switching circuit 45 used in the recording mode will be described in detail below, with reference to FIG. 54.

A case wherein a bit stream to be transmitted with a broadcast wave is input to the output terminal 68 will be described below. If the bit stream of a broadcast wave is input and corresponding processing can be performed, requirements for recording of data only on a VCR are included. Therefore, this case will be described below.

Since the bit stream input to the output terminal 68 has the macro-block format shown in FIGS. 44A and 44B, this macro-block is separated into a refresh block and non-refresh blocks. These separated (non-) refresh blocks are stored in (non-) refresh block memories 45a and 45b.

In order to perform this separation, a required timing signal is generated by a (non-) refresh block memory write controller 45c.

In order to generate this timing signal, the start position of a frame is detected first by an NMP detector 45d, and over-head data including path ID (PSID), processor ID (PID), a macro-block quantization level $Q_M$ (identical to "MQL"), a refresh block code length, and the like is detected by an over-head data detector 45e.

The over-head data and the variable length code in the bit stream are input to a variable length code decoder 45p. The decoder 45p decodes the variable length code, detecting the EOB, i.e., the end of the variable length code of the block and finding the point where the refresh block is switched to the variable length code of the non-refresh block. The switching point, thus found, is input to the (non-) refresh block memory write controller 45c.

A (non-) refresh block memory write controller 45c generates write timing signals required for the (non-) refresh block memories 45a and 45b by using these over-head data and the switching point of the refresh blocks, and outputs the signals from terminals 45f and 45g.

This write timing will be described below with reference to FIG. 55.

Figure 55:
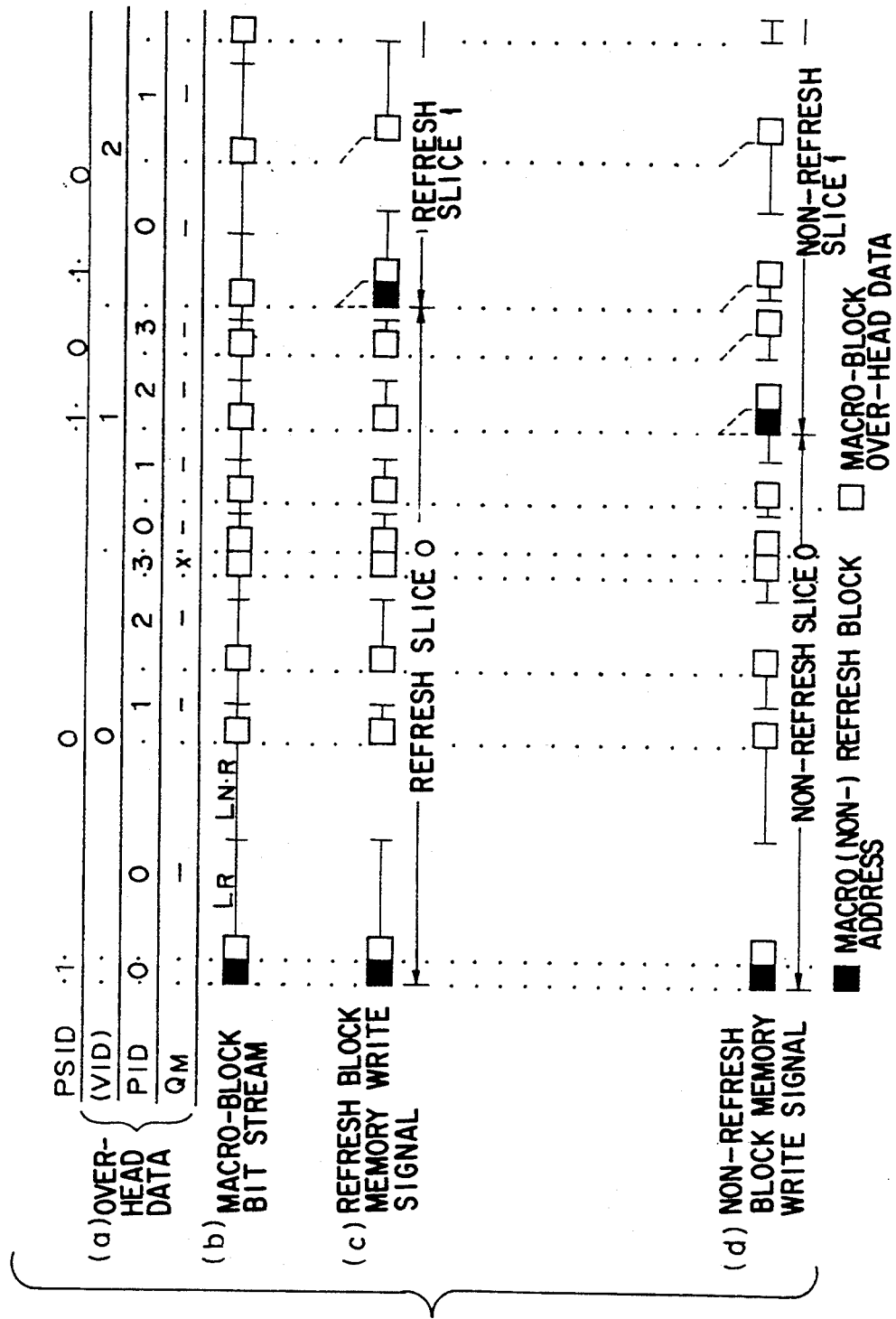
FIG. 55 is a chart illustrating the write control timing of a (non-) refresh block memory.

Shown at (a) and (b) in FIG. 55 is show a bit stream transmitted as a broadcast wave. More specifically, shown at (a) in FIG. 55 is over-head data. Reference symbol PSID denotes a path in the bit stream, and VID and PID are ID data items identical to those shown in FIG. 42. The data VID is not set in the bit stream. When the macro-block quantization level MQL=31, a skip operation is performed.

At (b) in FIG. 55, the black square indicates a macro (non-) refresh block address; and the white squares, macro-block over-head data. In addition, reference symbol $L_R$ denotes the code length of a refresh block, and $L_{N.R}$ denotes the code length of a non-refresh block.

Only the bit streams shown at (c) and (d) in FIG. 55 are extracted from the macro-block bit stream shown at (b) in FIG. 55 and are respectively stored in the (non-) refresh block memories 45a and 45b.

Shown at (c) in FIG. 55 is a signal written in the refresh block memory 45a. That is, a macro-block address, macro-block over-head data, refresh block over-head data, and a variable length code are written in the memory 45a.

Since an address is inserted in the start portion of a slice layer, a refresh block address is inserted in the start portion of a refresh slice layer as indicated in the refresh slice 1. This operation is performed as follows. An address is generated first by a (non-) refresh block address generator 70a. The address is then output from a terminal 45h and is inserted in a refresh slice layer by an address inserting circuit 45i which is shown in FIG. 54.

Shown at (d) in FIG. 55 is a signal written in the non-refresh block memory 45b. That is, a macro-block address, macro-block over-head data, non-refresh block over-head data, and a variable length code are written in the memory 45b.

Figure 56:
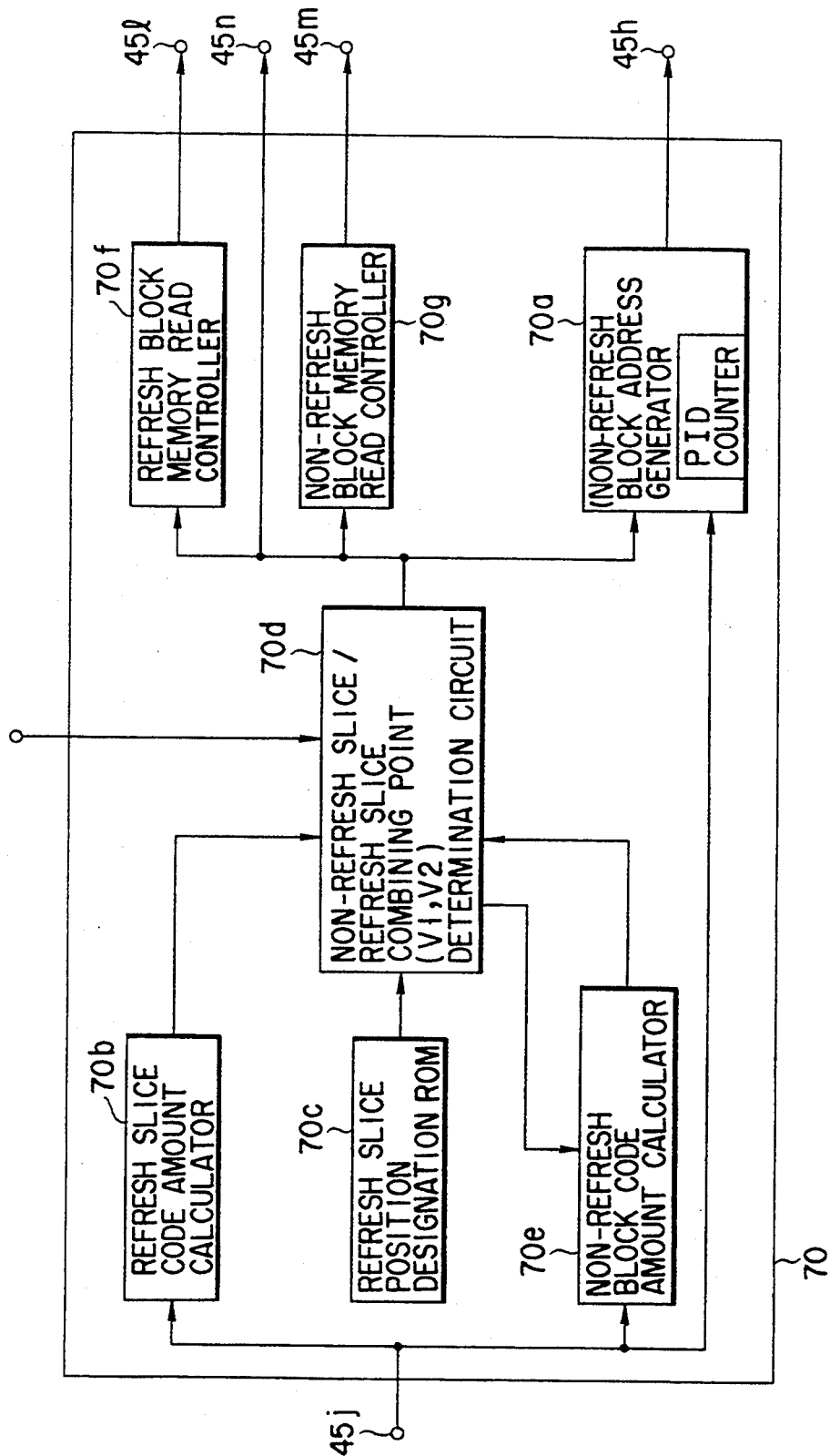
FIG. 56 is a block diagram showing the arrangement of a memory read (non-) refresh slice combining controller.

As is indicated in the (non-) refresh slice 1, a refresh block address is inserted in the head portion of a non-refresh slice. The insertion of this (non-) refresh block address is performed by using the refresh block address generator 70a and the address inserting circuit 45i, both illustrated in FIG. 56.

A memory read (non-) refresh slice combining controller 70 will now be described.

The main points of a (non-) refresh slice combining operation will be explained first. FIG. 57 shows an envelope obtained when the VCR operates in the fast reproduction mode.

Shown at (a) in FIG. 57 is a part of the tape, the tracks, and the head trace in the double-speed reproduction operation shown in FIG. 31. The corresponding envelope is shown at (b) in FIG. 57.

The solid lines shown at (b) in FIG. 57 indicate the shape of the envelope which can be reproduced by the head. The error rate is reduced with an increase in magnitude of the envelope.

Therefore, in arranging a refresh slice between non-refresh slices, it is required that the refresh slice be arranged around a point where the envelope is maximized.

In the recording mode, a refresh slice is arranged at a predetermined position on a track, as the center. In the fast reproduction mode, servo control is performed to cause the head to trace the central value of each refresh slice.

In the memory read (non-) refresh slice combining controller 70, a refresh slice code amount is calculated first by a refresh slice code amount calculator 70b using the refresh block length $L_R$ input from a terminal 45q.

The recording code amount per sector and the position of each track where the head traces in the fast reproduction mode are stored in a refresh slice position designation ROM 70c.

A (non-) refresh slice/refresh slice combining point determination circuit 70d determines a switching point between a refresh slice and a non-refresh slice by using refresh slice code amount data and refresh slice position data. In order to perform this determination, a non-refresh block code amount calculator 70e calculates the sum total of the code amounts of the respective non-refresh blocks. By using this sum total data, (non-) refresh slice combining points $v_1$ and $v_2$ shown in FIG. 50 are determined so that the center of each refresh slice is arranged at a predetermined position on a track.

By using these (non-) refresh slice combining points, (non-) refresh block memory read controllers 70f and 70g read out the corresponding codes from the (non-) refresh block memories 45a and 45b, respectively.

In accordance with this operation, a switch 45k is operated.

The above-mentioned (non-) refresh block address generator 70a generates (non-) refresh block addresses by using the (non-) refresh slice combining points. These addresses are inserted in a bit stream by the address inserting circuit 45i.

25. Basic Block Diagram of Decoder

The basic block diagram of the decoder will be described in detail below with reference to FIG. 58.

A VCR mode signal designating the normal reproduction/fast reproduction mode or the like, which is input by the user, is supplied to a reproduction speed setting circuit 102 through a terminal 101.

A tape feed controller 103 and a track reproduction controller 104 perform servo control of the VCR to control the rotational phase of the drum and a tape feed rate phase. Especially, in the fast reproduction mode, servo control is performed to read out data from an area where a refresh slice is recorded.

A signal recorded on the tape 26 is read by the heads A and B. The read signal is input to an error correction circuit 106 and a unit sync detector 107 through a switch 105 after it undergoes reproduced waveform equalization.

The unit sync detector 107 detects a sync signal inserted in each unit. With this operation, adverse effects such as jitter on the VTR are removed. Each unit is detected by detecting this sync signal, and the index signal shown in FIG. 52 is detected by the index detector 108. The start point of a (non-) refresh block is detected in accordance with the (non-) refresh block position signal detected by the index detector 108. In addition, it is discriminated on the basis of (non-) refresh block ID whether a non-refresh block or a refresh block is started from the start point.

Furthermore, by detecting a (non-) refresh block frame and an address, the decoding position of each (non-) refresh block and the decoding sequence of frames can be known.

A code length detector 109 detects the head position of a (non-) refresh block by using a (non-) refresh block position [(N-) R.B.P] input from a terminal 110, thus detecting a (non-) refresh block code length by demodulating the variable length code.

A (non-) refresh block delimiter can be detected by using this (non-) refresh block code length so that over-head data can be sequentially detected, and the position of each variable length code can be detected.

Figure 58:
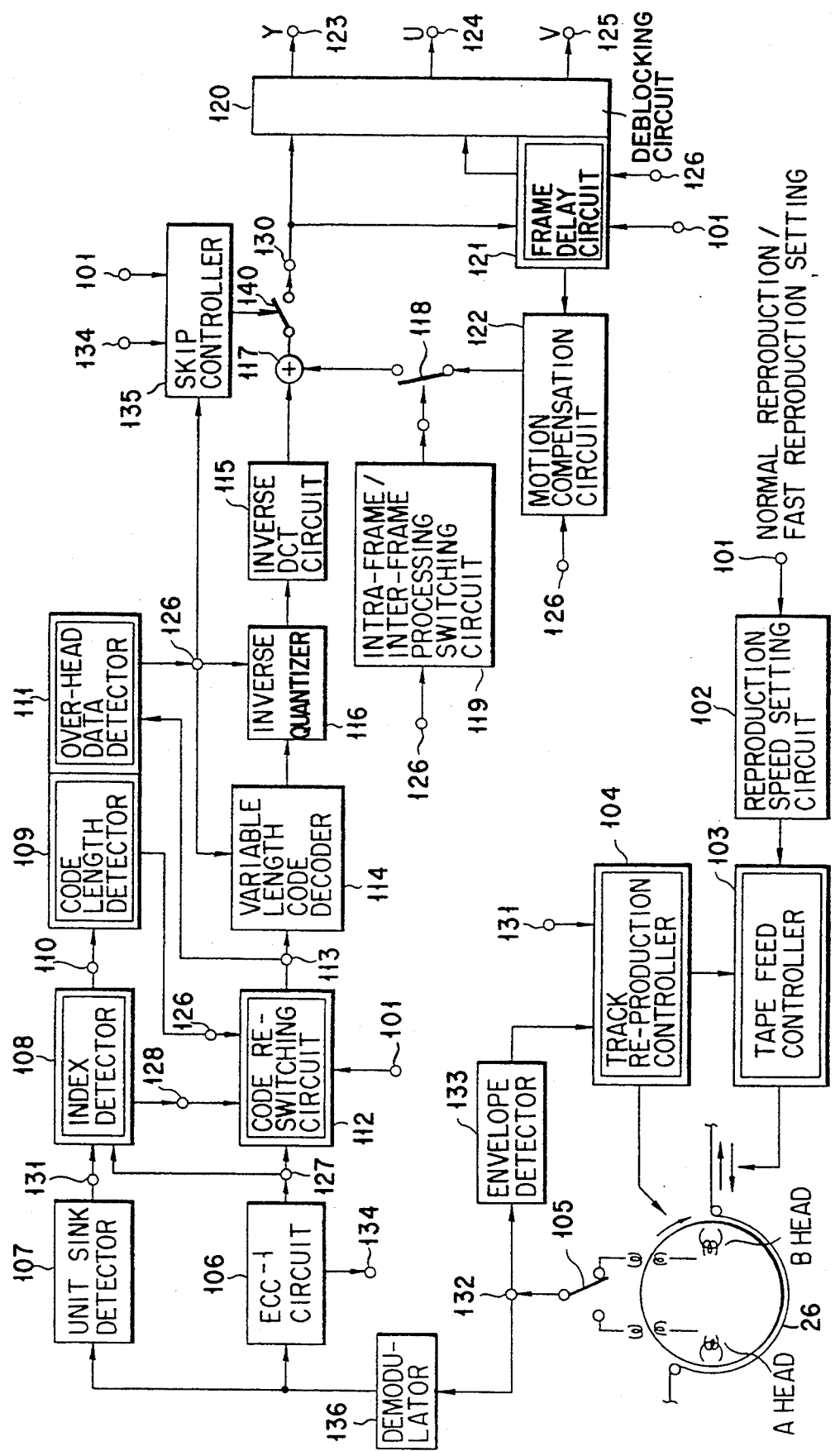
FIG. 58 is a block diagram showing the arrangement of an embodiment of the decoder side of the band compression signal processor according to the present invention.

In FIG. 58, the code length detector 109 and an over-head data detector 111 are separately arranged. Nonetheless, the code length detector 109 is actually incorporated in the over-head data detector 111.

FIG. 59 shows the relationship between index data and over-head data used by each circuit. In each circuit, signal processing is performed by using index data and over-head data indicated by circles.

A code re-switching circuit 112 separates the (non-) refresh slices and refresh slices from the VCR picture layer bit stream shown in FIGS. 48 to 51 by using (non-) refresh block ID.

The separated (non-) refresh slices are respectively stored in a refresh memory and a non-refresh memory in the code re-switching circuit 112.

In the normal reproduction mode, a read operation is performed while the refresh memory and the non-refresh memory having the same (non-) refresh block addresses in the code re-switching circuit 112 are switched between each other, and the read non-refresh and refresh blocks are combined with each other to constitute a macro-block. The macro-block is then output from the code re-switching circuit 112 through a terminal 113.

In the VCR, a bit stream for normal reproduction has the same macro-block arrangement as that of a bit stream of a broadcast wave. This is why a bit stream of a broadcast wave is input through the terminal 113.

When a broadcast wave bit stream is to be processed, over-head data is detected by the over-head data detector 111, and decoding is performed. Since an operation in the normal reproduction mode is the same as an operation of decoding a broadcast wave, this operation will be described first.

Of the macro-block bit stream at the terminal 113, which is shown in FIGS. 44A and 44B, the variable length codes of the (non-) refresh blocks are input to a variable length code decoder 114. These variable length codes are extracted from the bit stream by using (non-) refresh block code length data in the over-head data and decoding the over-head data. The variable length code decoder 114 sequentially detects Huffman codes by comparing a Huffman table with the codes from the start position of the variable length codes. By using the detected Huffman codes, a zero coefficient count (run length) and a non-zero coefficient (amplitude) of quantized DCT coefficients are obtained. Since these coefficients are arranged in the order in which they are zigzag-scanned, the order of the coefficients are rearranged in accordance with the need of an inverse DCT circuit 115.

A signal obtained by decoding the variable length codes is input to an inverse quantizer 116. The inverse quantizer 116 corrects the macro-block quantization level with a (non-) refresh block correction quantization level, thus obtaining a quantization level in units of super blocks.

Subsequently, 64 coefficients of each block are multiplied by weighting values according to a weighting table.

The 64 coefficients are then multiplied by quantization scale values according to quantization levels in units of super blocks, thus performing inverse quantization and obtaining DCT coefficients. (Note that in this case, the second quantization method described in Chapter 8 is exemplified.)

The 64 DCT coefficients are processed by the inverse DCT circuit 115 to be transformed from the frequency region to the time axis region, thus obtaining a 64-pixel signal (8 pixels in the horizontal direction × 8 pixels in the vertical direction).

The output from the inverse DCT circuit 115 is input to an adder 117.

The adder 117 also receives a signal from a switch 118 and adds it to the output signal from the inverse DCT circuit 115. The switch 118 is controlled by an intra-frame/inter-frame processing switching circuit 119. The output signal from the adder 117 is input to a deblocking circuit 120 and a frame delay circuit 121.

The frame delay circuit 121 is constituted by a frame memory. An output signal from this frame memory is input to a motion compensation circuit 122 and the deblocking circuit 120.

An output signal from the motion compensation circuit 122 is input to the switch 118.

The deblocking circuit 120 performs processing to make band compression signal processing coincide with the scanning sequence of the scanning lines of a TV by using the signals output from the adder 117 and the frame delay circuit 121, and outputs a luminance signal and color difference signals U and V from output terminals 123 to 125.

The operation of the decoder includes intra-frame processing and inter-frame processing. When the switch 118 is turned off, intra-frame processing is performed. When the switch 118 is turned on, inter-frame processing is performed. ON/OFF control of the switch 118 is performed by the intra-frame/inter-frame processing switching circuit 119.

A PCM/DPCM determination signal in over-head data is input to the intra-frame/inter-frame processing switching circuit 119 through a terminal 126. In this case, PCM and DPCM respectively indicate intra-frame processing and inter-frame processing. The switch 118 is turned off and on in response to PCM and DPCM, respectively. As described in Chapter 3, intra-frame/inter-frame processing includes image adaptive intra-frame processing and refreshing (forcible intra-frame processing).

Intra-frame processing will be described first. When intra-frame processing is to be performed, an output signal from the inverse DCT circuit 115 is input to the frame delay circuit 121 and the deblocking circuit 120, and the luminance signal Y and color difference signals U and V are output.

Inter-frame processing will be described next.

In this case, a predictive signal one frame ahead of the current frame is read out from the frame delay circuit 121 and is input to the motion compensation circuit 122.

In addition, a motion vector of over-head data is input to the motion compensation circuit 122 through a terminal 126 to shift the position of the predictive signal on a frame. The motion compensation circuit 122 outputs a predictive signal whose position coincides, on the frame, with the position of an output signal from the inverse DCT circuit 115. The output signal is then input to the adder 117 through the switch 118. The adder 117 adds the output from the inverse DCT circuit 115 to the predictive signal, and supplies the resultant signal to the frame delay circuit 121 and the deblocking circuit 120. Subsequently, the luminance signal Y and the color difference signals U and V are separated from each other and are respectively output from the terminals 123 to 125.

In the normal reproduction mode using a broadcast wave and a recording medium, the above-described write processing with respect to the variable length code decoder 114, the inverse quantizer 116, the inverse DCT circuit 115, and the frame delay circuit 121 is always performed in units of macro-blocks.

That is, processing of these circuits per processor is based on sequential processing of 11 super blocks in a macro-block, and macro-blocks are sequentially processed from the top to bottom of a frame.

26. Fast Reproduction

The code re-switching circuit 112 reads data only from the refresh memory in which a refresh slice of a bit stream is stored.

Since this refresh slice includes a refresh block address, frame ID, and processor ID, a decoding position can be obtained by detecting the over-head data of the refresh slice through the over-head data detector 111. Also, an decoding position can be obtained by detecting the refresh block address contained in the index signal described in Chapter 25 and illustrated in FIG. 52.

With this operation, the position of an image written in the frame memory in the frame delay circuit 121 and a corresponding write memory address can be determined.

In the fast reproduction mode, only a refresh block is effective as decoding data but non-refresh block data is not effective. For this reason, write processing with respect to the variable length code decoder 114, the inverse quantizer 116, the inverse DCT circuit 115, and the frame delay circuit 121 is performed on the basis of only refresh blocks.

Since a refresh block is always subjected to intra-frame processing, the intra-frame/inter-frame processing switching circuit 119 designates intra-frame processing. That is, the switch 118 is kept off.

Only one refresh block is present in a macro-block. For this reason, in one frame, a refresh block is transmitted every 11 super blocks arranged in the horizontal direction, or refresh blocks are consecutively transmitted in the vertical direction. This transmission order is different from the order in which to read the pixels arranged along the scanning lines. In the fast reproduction mode, therefore, refresh block data are sequentially written in the frame memory of the frame delay circuit 121. Thereafter, the data stored in the frame memory of the frame delay circuit 121 are read out in the transmission order of pixels according to the scanning lines, thus obtaining a reproduced image in the fast reproduction mode.

27. Code Re-switching Circuit

FIG. 60 shows the arrangement of the code re-switching circuit 112. A signal obtained by performing error correction of a reproduction bit stream from the VCR is input to a terminal 127.

This bit stream structure is identical to that shown in FIGS. 45 and 46 and FIGS. 48 to 51. First, a refresh slice and a non-refresh slice are separated through a switch 112a. The switch 112a is changed over by inputting (non-) refresh block ID and (non-) refresh block position signal, as index data of the VCR data multiplex format shown in FIG. 52, from a terminal 128.

The refresh slice and the non-refresh slice are, thereby, stored in the refresh block memory 112b and the non-refresh block memory 112c, respectively.

In the normal reproduction mode, signals are read out from the refresh block memory 112b and the non-refresh block memory 112c through a switch 112d by using a refresh block memory read circuit 112e and a non-refresh block memory read circuit 112f.

In this case, a read operation is performed such that the refresh block address and the non-refresh block address shown in FIG. 43 coincide with each other.

With this operation, in the normal reproduction mode, a signal having the same arrangement as that of macro-block variable length codes is output to the terminal 113, as shown in (a) in FIG. 41 and FIG. 42.

The non-refresh block memory read circuit 112f calculates the address of each refresh block on the basis of the non-refresh block address and processor ID of a refresh slice layer. By using the calculated addresses, a macro-block is formed. In addition, codes are read out from the non-refresh block memory 112c on the basis of each non-refresh block code length.

The refresh block memory read circuit 112e calculates the address of a refresh block on the basis of a refresh block address and processor ID of a refresh slice layer. There are two methods of arranging a refresh slice, as shown in FIGS. 48 and 49. In either method, the refresh block memory read circuit 112e generates addresses so that an output from the refresh block memory 112b can constitute a macro-block bit stream. That is, the refresh block memory circuit 112e can switch refresh blocks.

To carry out this read operation, the refresh block memory read circuit 112e performs processing by using refresh block code length data.

In the fast reproduction mode, the switches 112a and 112d select only the refresh block memory 112b so that only refresh blocks are transmitted from the terminal 113.

To transmit the refresh blocks to only the decoder which receives a broadcast wave, the refresh blocks are transmitted in the basic form of the bit stream structure illustrated in FIGS. 44A and 44B.

First, a macro-block address is sent to the decoder through the terminal 126. Using this macro-block address as starting point, the refresh blocks are transmitted to in the basic form of the bit steam structure shown in FIGS. 44A and 44B.

In the fast reproduction mode, two or more refresh blocks may be reproduced in the macro-block. If this is the case, refresh block variable length codes are arranged at the super block position within the micro-block shown in FIGS. 44A and 44B, where refresh blocks are arranged. Trick block quantization levels $TQL_0$ to $TQL_{10}$ are set at the remaining super block positions. Alternatively, a trick block quantization level TQL of 31 can be set, thereby performing a skip operation in units of super blocks. In the arrangement described above, data are separately distributed to the four processors by means of a switch 129.

Figure 61:
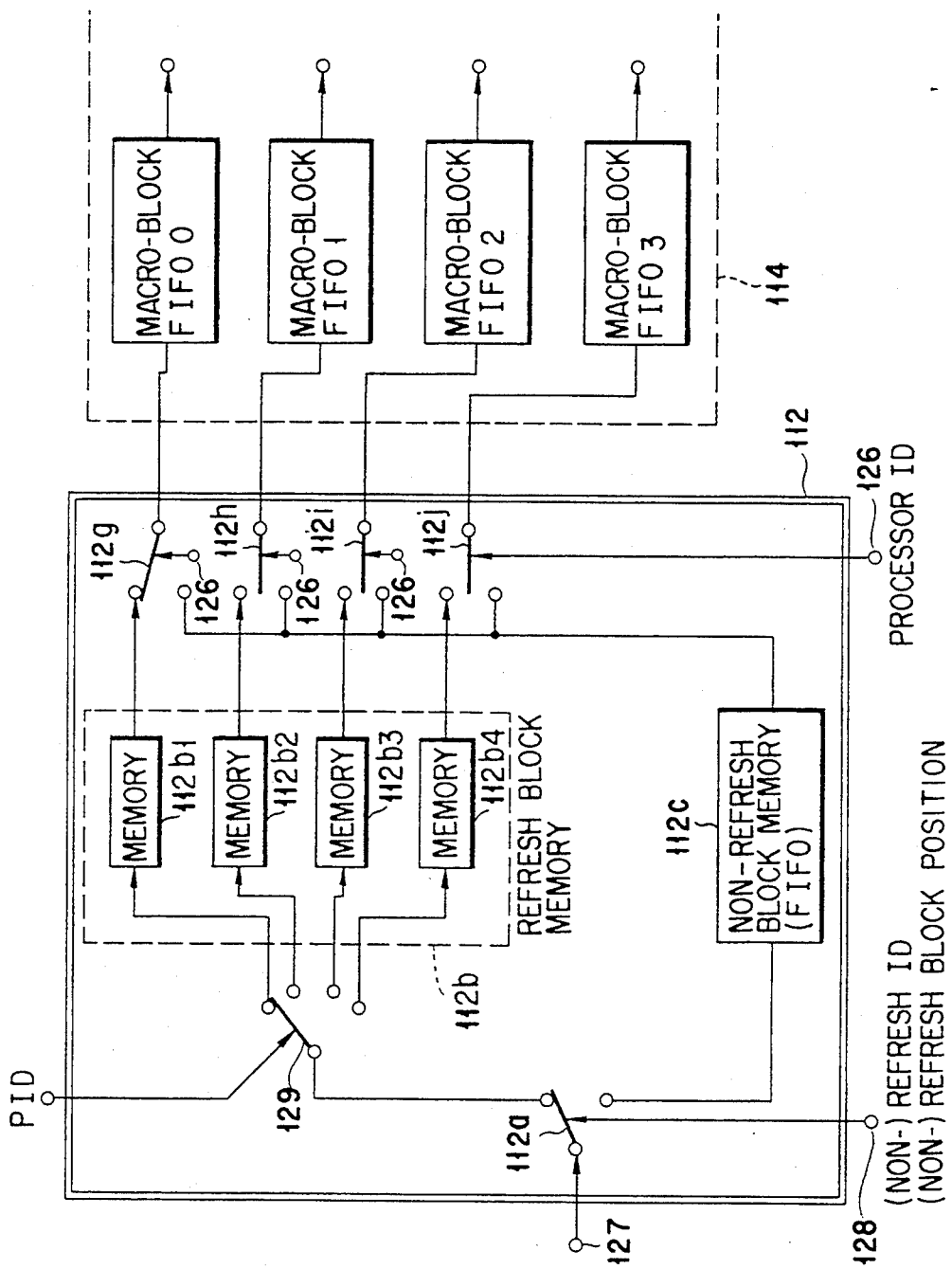
FIG. 61 is a block diagram showing another example of the code re-switching circuit.

FIG. 61 shows another embodiment of the code re-switching circuit 112. This circuit arrangement is suitable for the refresh slice layers shown in FIG. 49.

Referring to FIG. 49, in each refresh slice layer, refresh blocks are consecutively arranged to be adjacent to each other in the vertical direction. For this reason, a refresh block memory 112b in the code re-switching circuit 112 includes refresh block memories 112b 1 to 112b 4 assigned to the respective processors. Each memory stores a refresh block corresponding to each processor. When a read operation is performed in the normal reproduction mode, the refresh blocks are combined with non-refresh blocks through switches 112g to 112j, thereby constituting a macro-block.

In the fast reproduction mode, the switch 112a selects only refresh blocks and writes them in the refresh block memory 112b. In addition, the switches 112g to 112 memory 112b.

Two methods are available for transmitting two or more refresh blocks, if any within the macro-block, to the decoder.

The first method is to re-arrange the refresh blocks in the macro-block in accordance with the macro-block address, to set the trick quantization level at TQL of 31 for that part of the macro-block where no refresh blocks are present, and to effect a skip operation in the decoder.

In the first method, the refresh blocks are rearranged by the refresh block memory read circuit 112e, in order to read the refresh blocks from the refresh block memory 112b which is incorporated in the code re-switching circuit 112.

In the skip operation, the switch 140 is open, and no data is written into the frame memory in corporated in the circuit 121. The data stored in the frame memory is read out to the terminals 123 to 125.

The second method is to insert a refresh block at the head position within the macro-block, and to set trick block quantization levels TQL of 31 at all remaining super block positions, thereby carrying out a skip operation. Then, a macro-block address is sent, designating the positions of the refresh blocks. If two or more refresh blocks exist in the macro block, two or more macro addresses are designated. In this case, the super block address are designated repeatedly in one-frame period. The repeated address-designating process gives rise to no problems, provided that the skip has been detected before the super block address is designated.

28.1 Frame delay circuit

Figure 62:
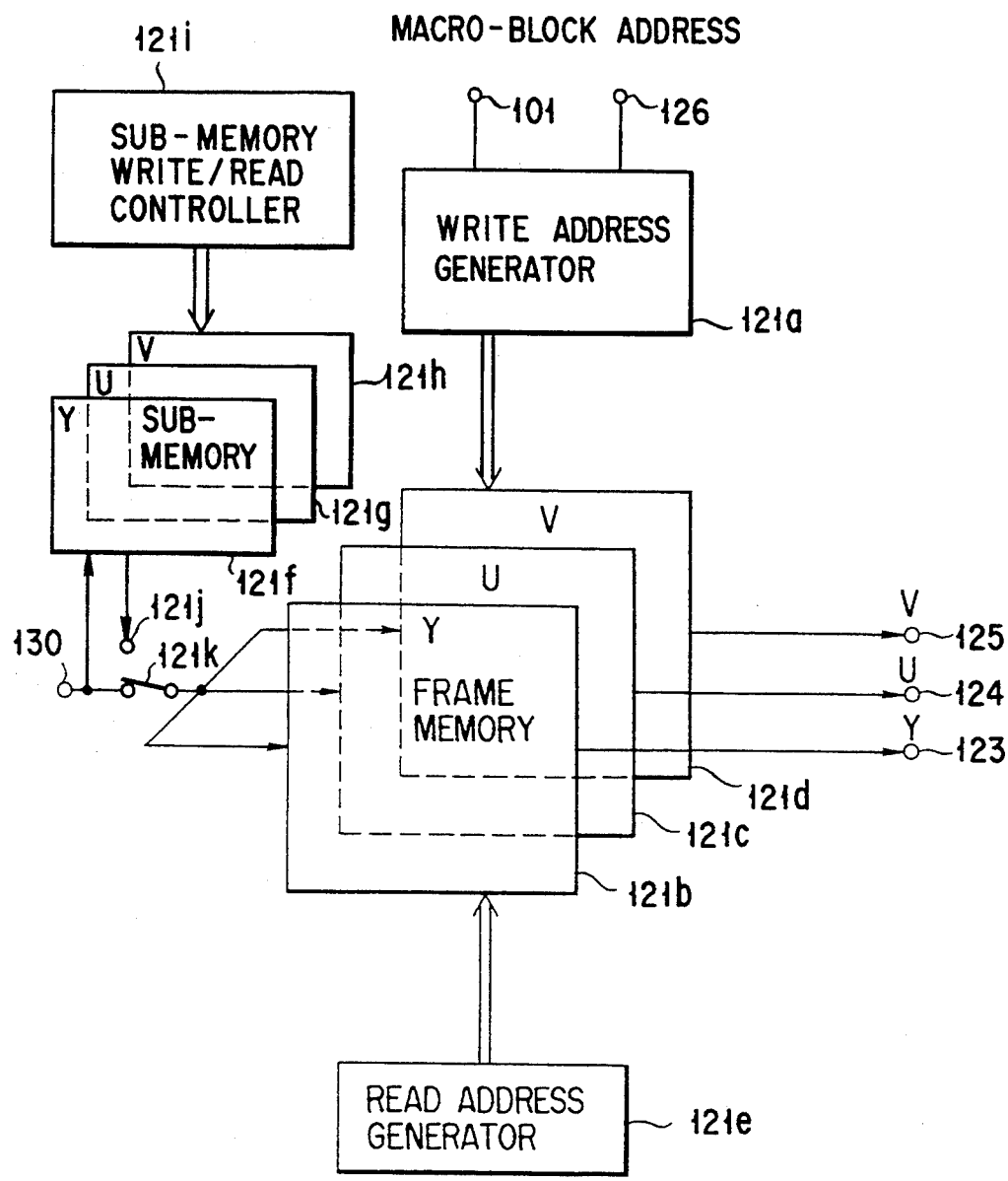
FIG. 62 is a block diagram showing a frame delay circuit, in detail.

The frame delay circuit 121 has a memory write address generators 121a, as is shown in FIG. 62.

In DigiCipher, four processors are used to perform processing, and four macro-blocks are present in the horizontal direction. Therefore, each processor processes one macro-block.

That is, in each processor, a macro-block is processed, from the top to bottom, in units of 11 super blocks.

A circuit for performing processing by using four processors is constituted by the variable length code decoder 114, the inverse quantizer 116, the inverse DCT circuit 115, the adder 117, the motion compensation circuit 122, the intra-frame/inter-frame processing switching circuit 119, the switch 118, and the write address generator 121a incorporated in the frame delay circuit 121.

The codes are distributed to the four processors by the processor ID (PID) data included in macro-block over-head data.

Since the four processors operate in the same manner, an operation of one processor will be described below.

The bit stream in the normal reproduction mode is identical to the macro-block bit stream shown in FIGS. 44 and 47. The first decoding position is, therefore, determined by using a macro-block address located at the start portion of a macro-picture layer, i.e., a macro-slice layer. Thereafter, addresses for the normal reproduction mode are sequentially generated by using the processor ID data.

Figure 63:
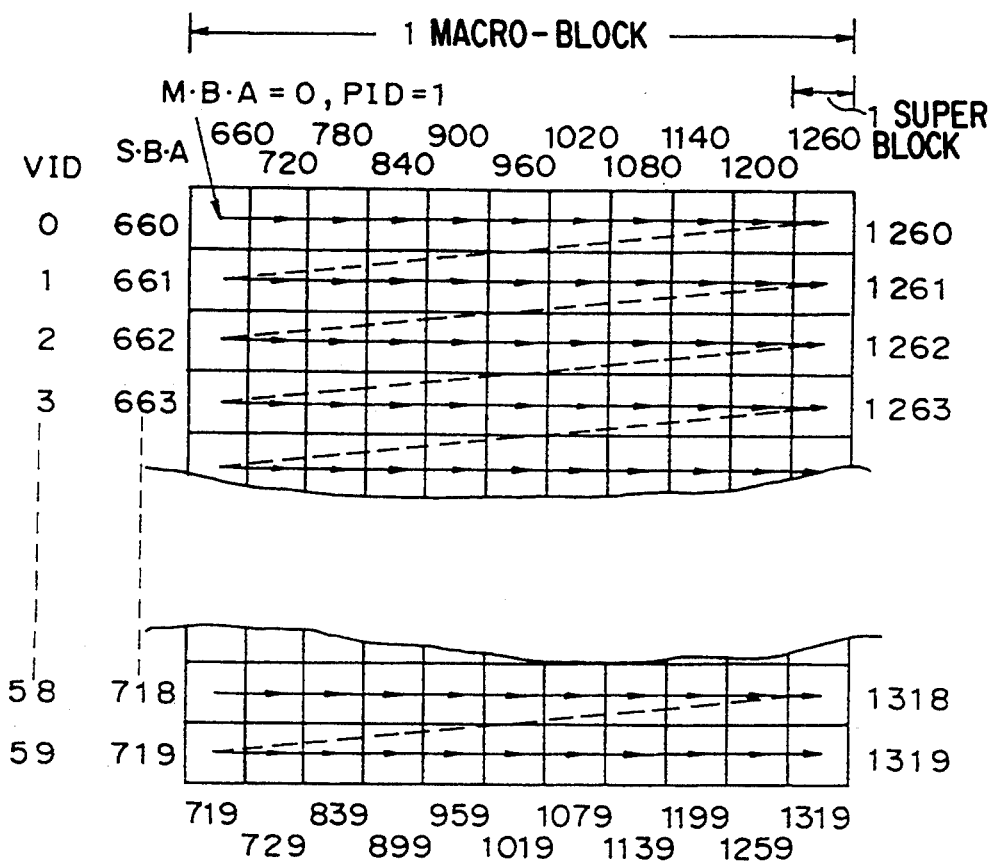
FIG. 63 is a chart for explaining an operation of the frame delay circuit in a normal reproduction operation.

FIG. 63 shows an operation of the normal reproduction write address generator 121a.

A macro-block address at the head portion of a macro-slice layer is detected by the over-head data detector 111. The detected address is then input to the normal reproduction write address generator 121a through the terminal 126.

FIG. 63 shows the case of a processor 1.

First, M.B.A=0 in a bit stream is read out. M.B.A=0 indicates the decoding position of the first super block of the macro-block of a processor 0.

Since the decoding position of the first super block on the macro-block of processor PID is given by the following equation, if processor PID=1, the start super block address of the macro-block is 660:

$$\begin{aligned} S.B.A &= M.B.A + 660 \times PID \\ &= 0 + 660 \times 1 \\ &= 660 \end{aligned}$$

In a normal reproduction operation, as indicated by the arrows in FIG. 63, one macro-block, i.e., 11 super blocks up to S.B.A=660, 720, ..., 1260, is processed in the horizontal direction, and macro-blocks are processed one by one in the vertical direction. That is, after S.B.A=1260, processing is performed according to S.B.A=661, 721, ..., 1261.

In the fast reproduction mode, only intra-frame-processed blocks are effective, and only the refresh block data is written by the write address generator 121a.

In the fast reproduction mode, the code re-switching circuit 112 outputs only refresh blocks from the terminal 113. The variable length code decoder 114, the inverse quantizer 116, and the inverse DCT circuit 115 process only these refresh blocks, and supply only the refresh blocks to the frame memories 121b to 121d through a terminal 130.

In the fast reproduction mode, only the bit stream of the refresh slice layer shown in FIGS. 48 and 49 is used. Since a refresh block address (R.B.A) indicating the first decoding position of the refresh slice is set in the start portion of the bit stream of the refresh slice layer, the initial position of fast reproduction signal processing in each processor is obtained by using this R.B.A and processor ID (PID).

The case shown in FIG. 64 will be described below. Refresh block address R.B.A of over-head data is input to the fast reproduction write address generator 121a through the terminal 126. Consider that the following correspondence is set between the refresh slices shown in FIG. 48 and the refresh blocks $G_n$ of the track pattern shown in FIG. 31, and that the trace $x_0$ for double-speed reproduction is made:

refresh slice 0: $G_n(0)$
refresh slice 1: $G_n(1)$

In this case, as refresh block addresses, R.B.A=0 in the refresh slice 0, and R.B.A=90 in the refresh slice 1 are reproduced. R.B.A=0 and R.B.A=90 respectively indicate the decoding positions of the first refresh blocks in the processor 0.

The decoding positions of the first super blocks of the refresh blocks of processor PID are given by the following equations. If processor PID=1, the start super block address of the refresh blocks is S.B.A=660 in the refresh slice 0, and S.B.A=750 in the refresh slice 1.

$$\begin{aligned} S.B.A_0 &= R.B.A + 660 \times PID \\ &= 0 + 660 \times 1 \\ &= 660 \\ S.B.A_1 &= R.B.A + 660 \times \\ &= 90 + 660 \times 1 \\ &= 750 \end{aligned}$$

The macro-block initial address formed on these S.B.As is input to the write address generator 121a through the terminal 126. Using this macro-block initial address as initial value, the write address generator 121a operates.

In the fast reproduction mode, the write address generator 121a is operated in one of two methods in order to write data into the frame memories 121b, 121c, and 121d, in accordance with the operation of the code re-switching circuit 112 described in Chapter 27.

In the first method, the refresh blocks in the macro-block are re-arranged by means of the code re-switching circuit 112. In this case, the operation may be identical to the write-address generating operation performed during normal reproduction.

More specifically, as is shown in FIG. 63, the macro-block is processed as basic structure. At this time, the macro-block contains the variable length code of that refresh block of a super block which is refreshed. In the super block which is not refreshed, a skip signal exists at the trick quantization level of the over-head data.

In other words, in the bit stream (FIGS. 44A and 44B) supplied from the VCR to the decoder, trick quantization level TQL is set at the position where refresh blocks exist, and a skip, i.e., TQL=31, is set at the position where no refresh blocks exist. Thereafter, the refresh blocks are written in accordance with TQL.

In the second method, the refresh blocks in the macro-block are not re-arranged by means of the code re-switching circuit 112. In this case, the variable length codes of the refresh blocks exist in super block 0 of the bit stream (FIGS. 44A and 44B) but not in super blocks 1 to 10, at the time the codes are transmitted from the VCR to the decoder.

The trick quantization level $TQL_0$ indicates the variable length codes of the refresh blocks, and trick quantization levels $TQL_1$ to $TQL_{10}$ are set at the value of 31 which represents a skip.

This macro-block bit stream structure can be realized, merely by setting the trick quantization level in the bit stream of the refresh blocks, which is shown in FIG. 45. The bit stream can, therefore, be changed in the fast reproduction mode.

Figure 64:
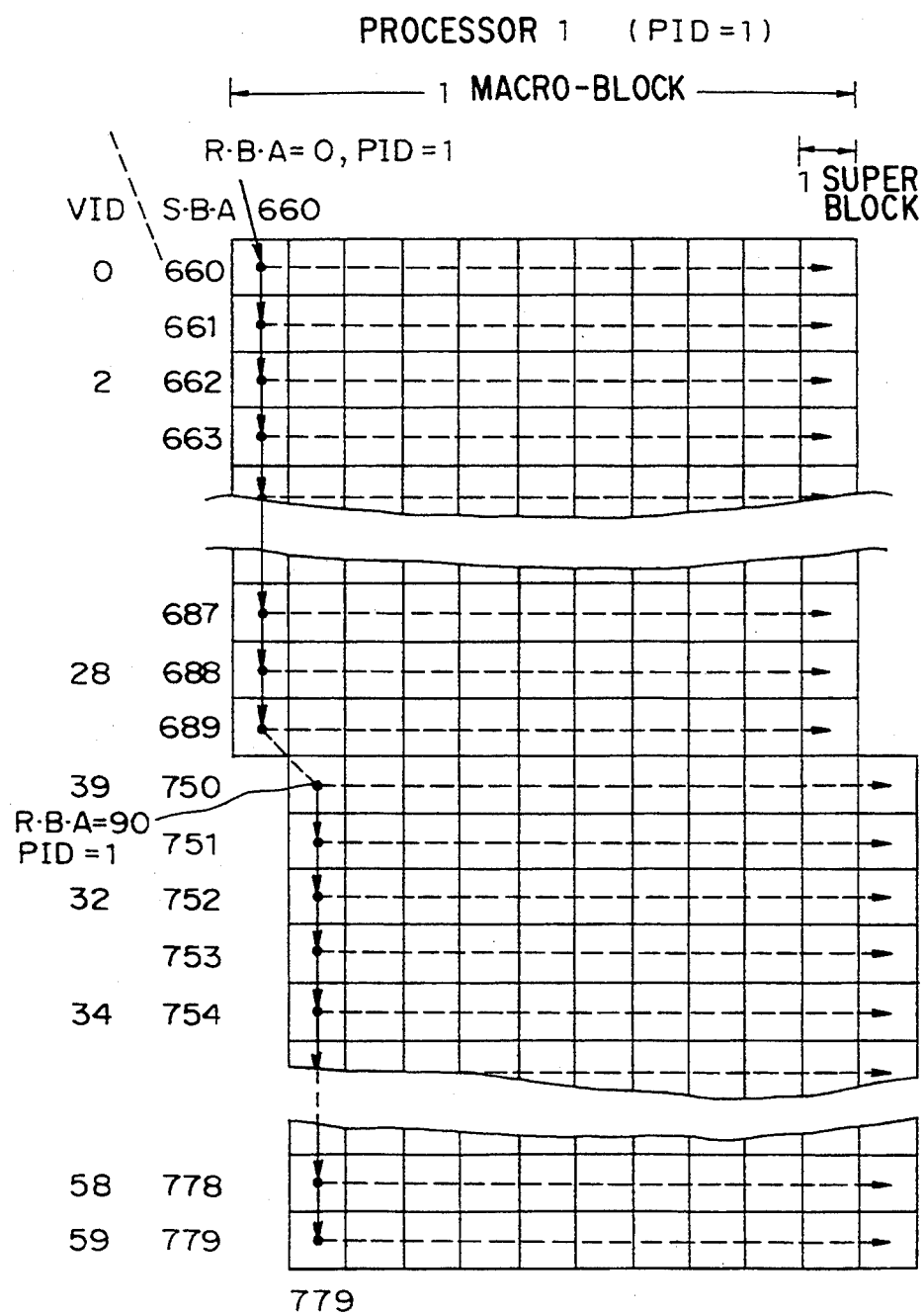
FIG. 64 is a chart for explaining an operation of the frame delay circuit in a fast reproduction operation.

With reference to FIG. 64, it will be described how the write address generator circuit performs its function. First, the write address generator 121a incorporated in the frame delay circuit 121 of the decoder determines that all trick quantization levels $TQL_1$ to $TQL_{10}$ are in skip state in the macro-block bit stream shown in FIG. 44. Hence, it is determined that the super blocks 1 to 10 in the macro-block are skip portions. This means that data is not written into the frame memory 121b, 121c or 121d. No addresses are generated from these skip portions. As a result, addresses are generated from only those portions where refresh blocks exist. Addresses are generated in the vertical direction. FIG. 64 illustrates how this takes place in the case of DigiCipher.

In DigiCipher, since refresh blocks are always arranged in the vertical processor for each processor, the fast reproduction address generator 121a generates super block addresses in the vertical direction. That is, super block addresses are generated in the following order:

$S.B.A_0$: 660, 661, ..., 687, 688, 689
$S.B.A_1$: 750, 751, ..., 777, 778, 779

A read address generator 121e reads the luminance signal Y and the color difference signals U and V in accordance with the scanning line order of a TV.

The frame delay circuit 121 and the memory write-/read address generators 121a and 121e also serve as the deblocking circuit 120.

28.2 Frame delay circuit, and sub-memory

To write data into, and read data from, the frame memories in this way, the read addresses are read sequentially in the horizontal direction, and the write addresses are written in the vertical direction. For this reason, it is required in some case that the same chip memory be set in both write mode and read mode, and it is also necessary in some case that two addresses be set in the same chip memory.

In the memories of the type commonly used, a read/write control signal R/W is controlled by one bit. It is impossible to set a plurality of addresses by means of one memory element.

This is why sub-memories 121f, 121g, and 121h are used as is shown in FIG. 62. The sub-memory 121f is to store the luminance signal Y, and the sub-memories 121g and 121h are to store the color difference signals U and V.

Data must be sent to the TV monitor in the order of scanning lines. The read address of the read address generator 121e is generated, in any case, in the order of scanning lines. In the case where both the read address and the write address must be set in the same chip memory incorporated in each of the frame memories 121b, 121c and 121d, data is written after other data has been read out.

More specifically, data is temporarily stored in the sub-memories 121f, 121g and 121h which are used to store the luminance signal Y, the color difference signal U and the color difference signal V, respectively. A sub-memory write/read controller 121i controls the write and read addresses of the sub-memories 121f, 121g and 121h.

The signals input to the sub-memories 121f, 121g and 121h are identical to those input to the frame memories 121b, 121c and 121d. The signal output by the adder 117 is applied to an inverse DCT signal.

The signals output from the sub-memories 121f, 121g and 121h are input to the frame memories 121b, 121c and 121d, respectively, through a terminal 121j and a switch 121k. Data is written into one element of each of the frame memories 121b, 122c and 121d after other data has been read from that element.

The switch 121k usually selects the signal at the terminal 130. It selects the signal at the terminal 121j only when data is to be transferred from the sub-memories 121f, 121g and 121h to the frame memories 121b, 121c and 121d, respectively.

29. Track Reproduction Controller

Since a refresh slice is recorded at a predetermined position on a track with the predetermined position being considered as the center in the recording mode, tape feed processing and the rotational phase of the drum are controlled to reproduce data at the predetermined position in the fast reproduction mode. This control can be achieved by any one of the following methods:

1. A position where the head is to trace in the fast reproduction mode is recorded on a linear track.
2. A signal identifying a track is recorded on a helical track. As this identification signal, a pilot signal or the like may be used.
3. A track number and a unit number are recorded on a helical track, and servo control is performed such that the envelope is maximized at the unit number at which data is to be read in the fast reproduction mode.

The third method will now be described in detail.

First, a unit number and a track number are read as additional information arranged after the unit sync in the VCR transmission data shown in FIG. 52. The data are read out from a terminal 131 in FIG. 58. In the refresh slice position designation ROM 70c in FIG. 56, a refresh slice is recorded at a predetermined position on a track with the predetermined position considered as the center. This predetermined position is determined by a track number and a unit number. In the fast reproduction mode, an RF signal reproduced from the head is input to an envelope detector 133 through a terminal 132.

The envelope detector 133 detects an envelope shape shown at (b) in FIG. 57 in the fast reproduction mode. The track reproduction controller 104 controls the rotational phase of the drum and tape feed processing such that the envelope is maximized, said envelope having been defined by the track number and the unit number at which the central position of the above-mentioned refresh slice is located, is maximized.

30. Tape Pattern 1

The refresh blocks are switched by operating the circuits as has been described in Chapters 1 to 29. The essence of this invention resides in that $f \times c$ and i have such relationship that each is an element to the other, where f is the refresh period, c is the number of head scannings required for recording the average amount of codes generated for one frame, and i is the fast reproduction speed. An operation scheme where $f=11$, $c=2$, and $i=3$.

The phase "relationship that each is an element to the other" means that there is not a conjugate number between $f*c$ and i.

Figure 65:
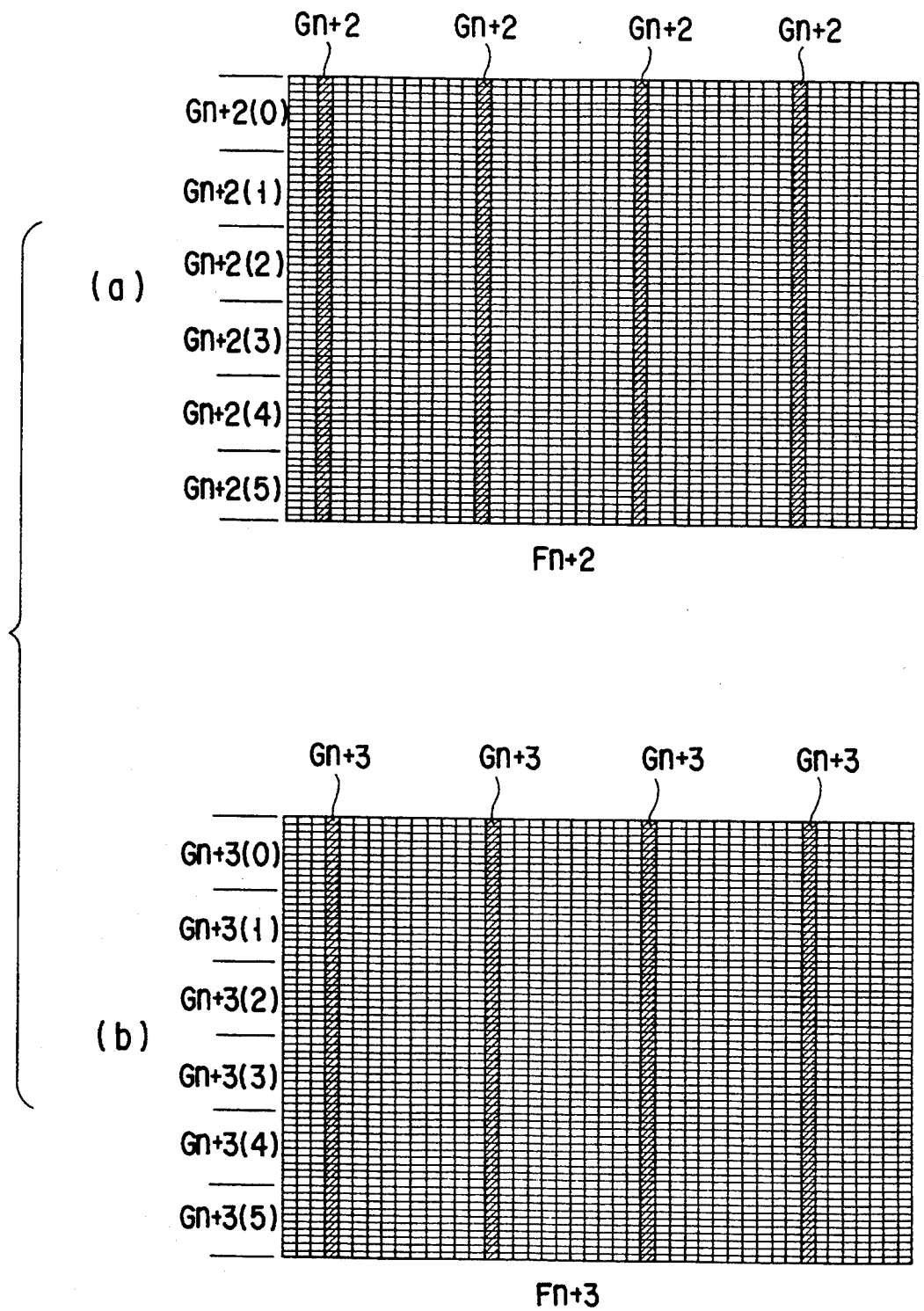
FIG. 65 is a diagram showing the relationship between the fresh block and non-refresh blocks of frames $F_{n+2}$ and $F_{n+3}$.

FIGS. 65 illustrates a method of dividing the refresh blocks in one image. $Fn+2$ shown at (a) in FIG. 65 is the image of the $n+2$th frame. $Gn+2$ shown at (a) in FIG. 65 indicates the refresh blocks present in the $n+2$th frame. There are 240 refresh blocks in the $n+2$th frame. The refresh blocks are divided into six groups $Gn+2(0)$ to $Gn+2(5)$. The group $Gn+2(0)$ includes the first 40 refresh blocks. The other groups, i.e., $Gn+2(1)$ to $Gn+2(5)$, include 40 refresh blocks each. Shown at (b) is the image of the refresh blocks present in the $n+3$th frame. Groups $Gn+3(0)$ to $Gn+3(5)$ are of the same definition as groups $Gn+2(0)$ to $Gn+2(5)$ forming the $n+2$th frame.

Figure 66:
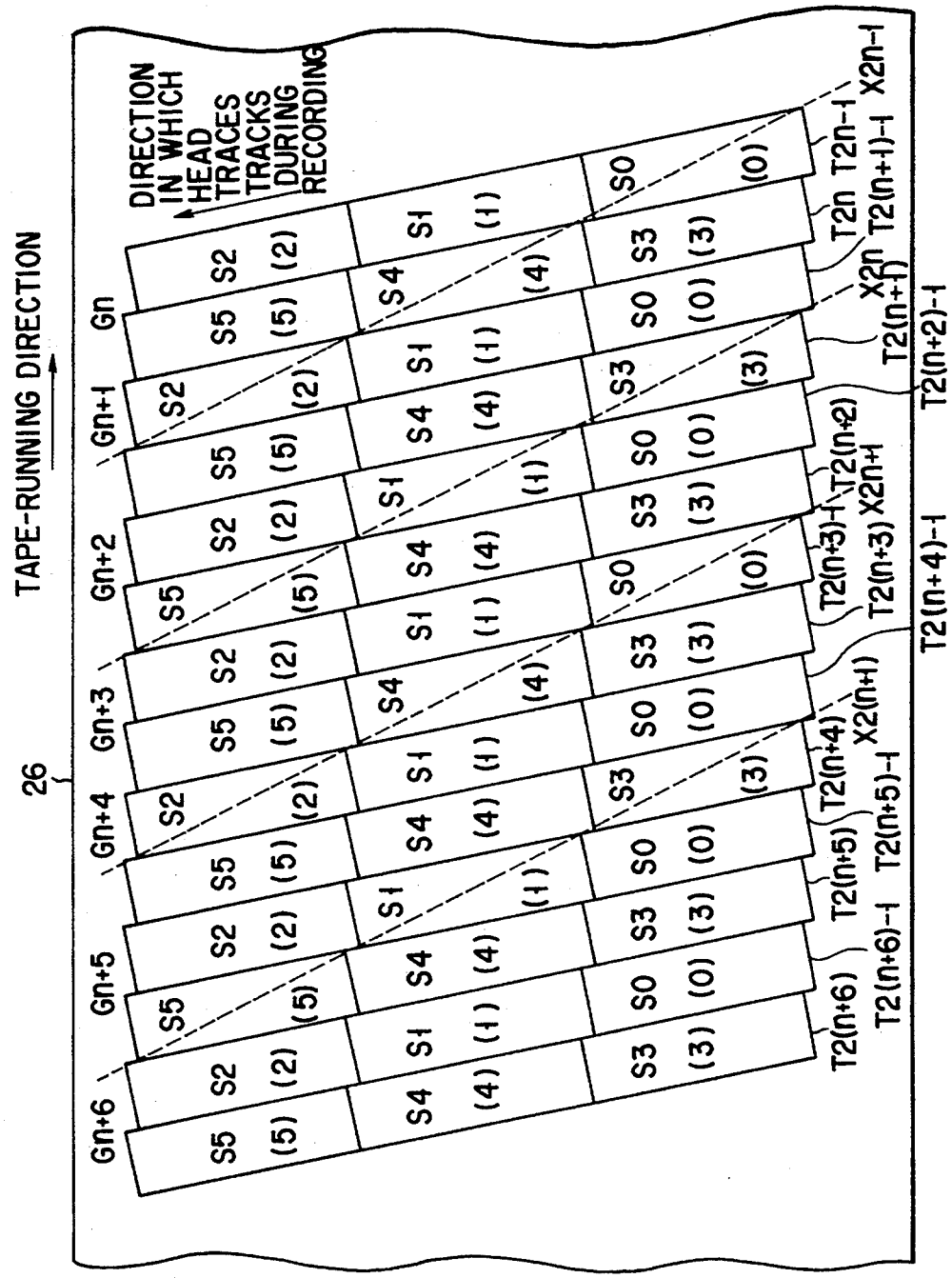
FIG. 66 is a diagram showing the track pattern on a magnetic tape.

The track pattern of the VTR will be described. FIG. 66 shows the track pattern of the magnetic tape 26. In FIG. 66, $T2n-1$ to $T2(n+6)$ are the tracks on which codes are recorded by using the rotary drum 43. Assume that the average generation amount of codes per frame are recorded on two tracks, that is $c=2$. This case corresponds to the case wherein $b=240$ refresh blocks are recorded on two tracks. In other words, refresh blocks $Gn+2$ of frame $Fn+2$ are recorded on tracks $T2(n+2)-1$ and $T2(n+2)$.

In this arrangement, to perform triple-speed reproduction, the reproduction head crosses three tracks. Therefore, while ⅓ areas obtained by dividing one track into three almost equal areas are reproduced, reproduction signals are obtained from three tracks. Each of three divided areas is called a sector. Since each frame constitutes two tracks, six sectors S0 to S5 are assigned, as shown in FIG. 66. Generally, each area obtained by almost equally dividing one track by d is called "sector."

To realize fast reproduction at a speed i times the normal speed, since the head crosses i tracks, a 1/i area of one track is reproduced. If the maximum reproduction speed is represented by $i_{max}$, $i_{max} \leq d$ is set. Sector names are represented by S0 to Sd−1.

The relationship between refresh blocks and a sector will be described below. The refresh blocks group Gn+2 of the frame n+2 are recorded two tracks T2(n+2)−1 and T2(n+2), in the order of Gn+2(0) . . . S0, Gn+2(1) . . . S1, Gn+2(2) . . . S2, Gn+2(3) . . . S3, Gn+2(4) . . . S4, and Gn+2(5) . . . S5. In FIG. 66, the refresh blocks groups are identified by "Gn" to "Gn+6" indicated above the respective refresh blocks, and the six refresh-blocks-groups are identified by (0) to (6) written within the track.

Thus, each refresh block group and each sector have one-to-one relationship. This relationship is fixed, never changing with time. In the conventional method, a refresh block and a sector do not have such relationship, and the position where refresh block exists is determined record arbitrarily. Hence, in the conventional method, some parts of the tape will remain not refreshed after the fast reproduction has been effected, and high-quality images cannot be reproduced in the fast reproduction mode.

Assume that refresh blocks are inserted in each sector, in the same number. In this case, the number e of refresh blocks inserted in one sector is given as follows:

$$e = b/(c \times d)$$

where b is the number of refresh blocks per frame, c is the number of tracks on which the b refresh blocks are recorded, and d is the division count of a track, and e is the number of refresh blocks inserted in one sector. It is not absolutely necessary to insert the same number of refresh blocks in each sector. What is required is that each refresh block and each sector be set in a fixed relationship.

In FIG. 66, X2n−1 to X2(n+1) indicate the traces along which the magnetic head moves in the triple-speed reproduction mode. As the head moves along the trace X2n−1, data can be reproduced from the sector S0 (i.e., refresh block Gn(0)) of track T2n−1, the sector S4 (i.e., refresh block Gn(4)) of track T2n, and the sector S2 (i.e., refresh block Gn+1(2)) of track T2(n+1)−1.

Figure 67:
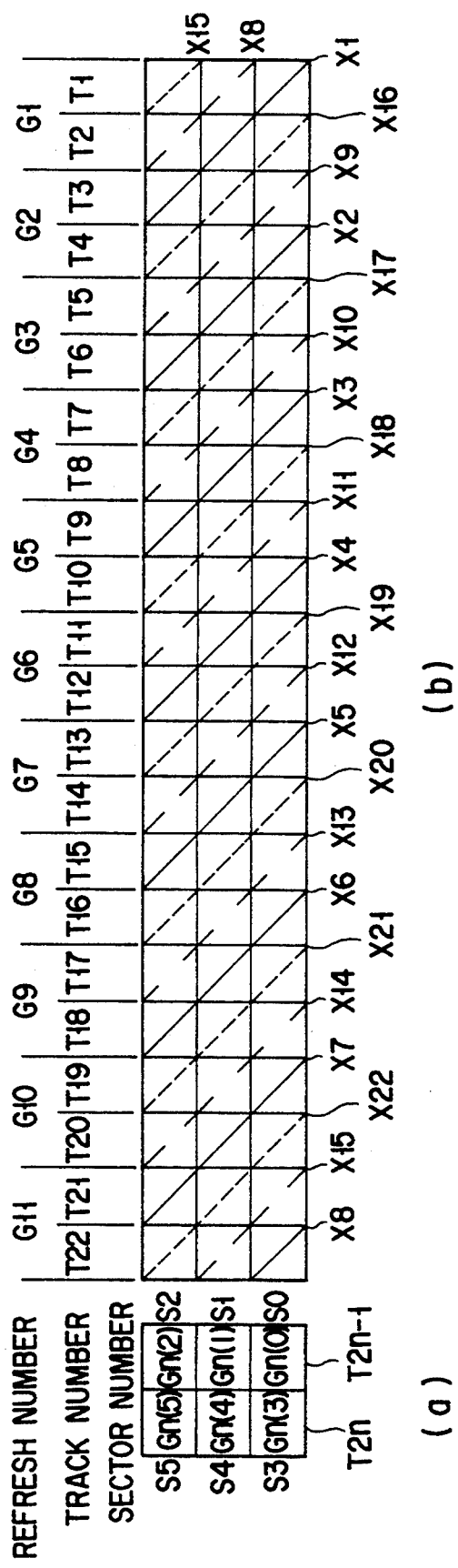
FIG. 67 is a diagram showing the relationship which the head traces and the fresh blocks have in the double-speed reproduction mode.

FIG. 66 is a diagram showing the refresh blocks which can be reproduced by using the actual tape pattern is shown. FIG. 67 is a diagram more simple than FIG. 66, clearly representing the relationship between the head traces and the refresh blocks. Shown at (a) in FIG. 67 is a table explaining how to record the refresh block Gn of frame Fn on tracks T2n−1 and T2n. The sector numbers, S0 to S5, are indicated outside the table, whereas the positions where to record refresh blocks Gn(0) to Gn(5) are shown inside the table. As is clearly understood from (a) in FIG. 67, refresh block group Gn(0) is recorded at position of S0. As is shown at (b) in FIG. 67, the 11 refresh blocks shown at (a) in FIG. 67 are arranged in the horizontal direction since the refresh operation is performed for a period of 11 frames. Refresh numbers G1 to G11 are assigned to 11 frames. The 11 frames are sequentially refreshed for a period of 11 frames, whereby the refresh operation is accomplished.

T1 to T22 denote recorded tracks on which frames G1 to G11 are recorded. To record data or to reproduce data in the normal reproduction mode, the magnetic head is moved over head traces T1 to T22. Block Gn for each frame consists of 240 refresh blocks. Hence, when the 11 frames G1 to G11, which defines one image, are refreshed, the 2640 super blocks for one image are all refreshed. In this case, the refresh blocks of one frame are recorded on two tracks, the 2640 refresh blocks can be reproduced as the magnetic head moves over 22 traces (=2×11).

Fast reproduction will now be described. First, triple-speed reproduction will be explained, with reference to FIG. 67 which is a simplified form of FIG. 66. In FIG. 67, X1 to X22 are head traces over which the magnetic head are moved in the triple-speed reproduction mode. X2n−1 to X2(n+1) correspond to x1 to X22 shown at (b) in FIG. 67. The solid lines, broken lines, and dotted lines, all shown at (b) in FIG. 67, indicate that the head-tracing is effected in the order specified. More precisely, the magnetic head first moves over traces X1 to X8 as is indicated by the solid lines. In trace X8, the head traces refresh block G12(1) after tracing refresh block Gn(3). Since the refresh operation is repeated for a 11-frame period, refresh blocks G12 and G1 are at the same position. Thus, refresh block G12 is identified by "G1," and the magnetic head traces the portion G1(1).

Then, the magnetic head moves over traces X8 to X15 as is indicated by the broken lines. In trace X15, the head traces refresh block G1(2) after tracing refresh block G11(4). Further, the head moves over traces X15 to X22 as is indicated by the dotted lines, completing the head tracing. In this head tracing, the magnetic head traces all sectors, or 22 traces, whereby the 2640 refresh blocks are reproduced. In other words, the 2640 super blocks for one image can be refreshed by moving the magnetic head over 22 traces. Namely, one image can be refreshed by effecting a minimum head tracing. The refresh operation can thus be accomplished, erasing all data blocks previously recorded.

In the triple-speed reproduction mode, the number c of head scannings required for recording one frame is 2, the refresh period f is 11, and the fast reproduction speed i is 3. Hence, f×c (=2×11) and i (=3) have such relationship that each is an element to the other. In this case, all sectors of the track are traced as is illustrated at (b) in FIG. 67. One image is refreshed, without fail, within a predetermined time, provided that the image and the sectors for c×f tracks are set in a fixed relationship.

Figure 68:
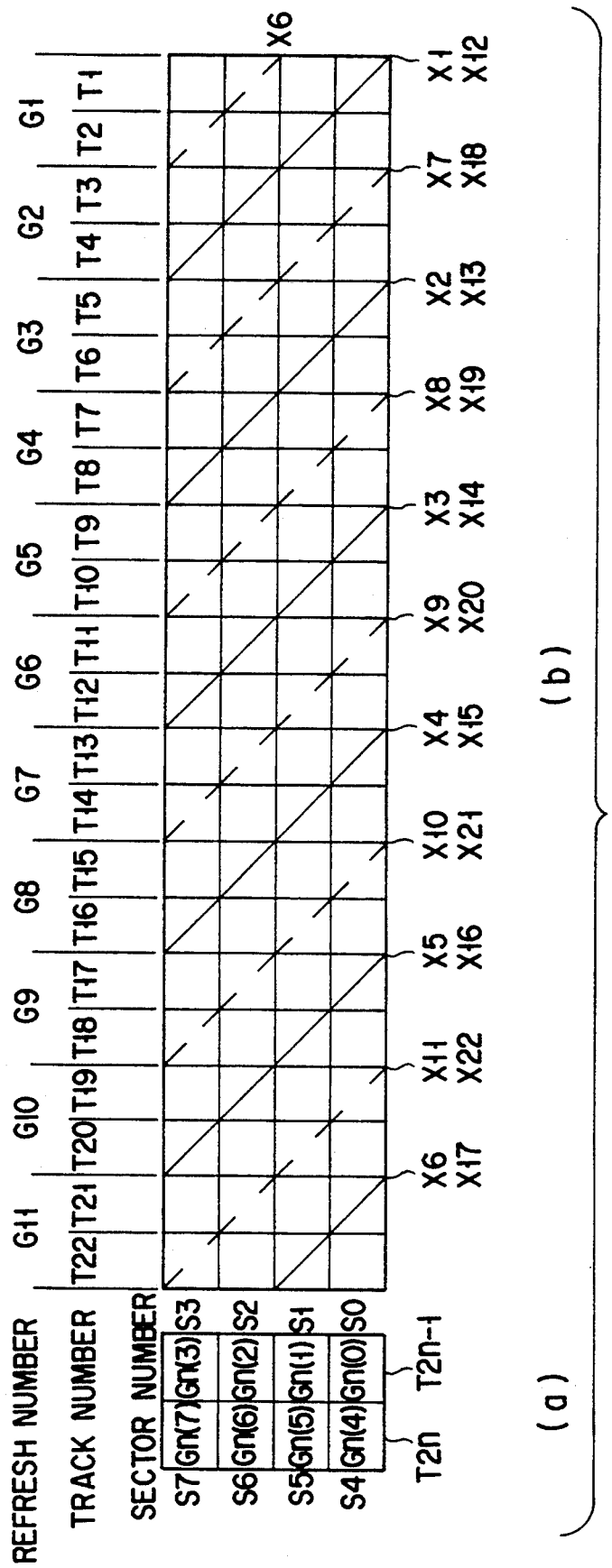
FIG. 68 is a diagram showing the relationship which the head traces and the fresh blocks have in the quadruple-speed reproduction mode.
Figure 71:
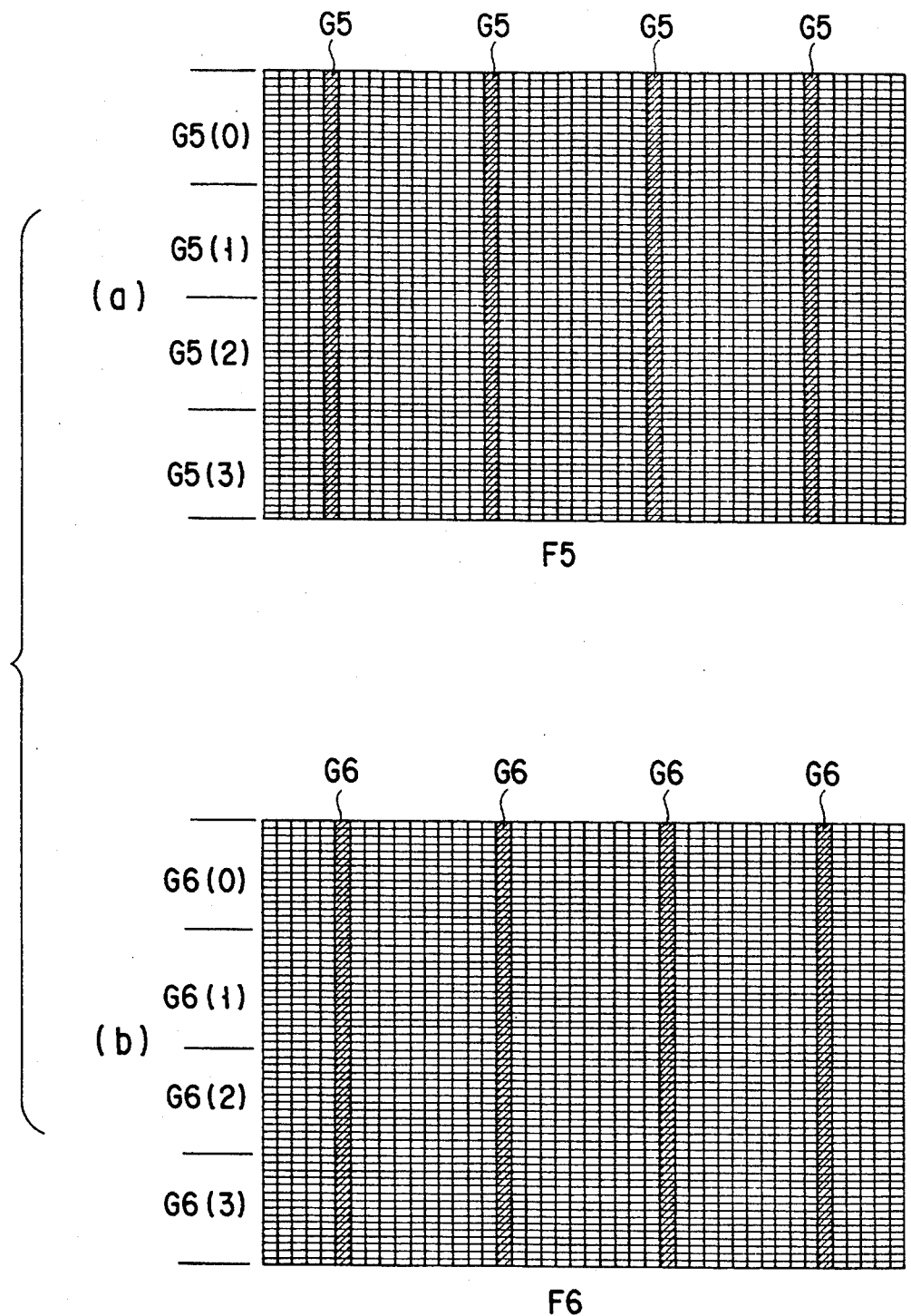
FIG. 71 is a diagram representing the relationship which the refresh blocks and non-refresh blocks of frame $F_5$ and $F_6$ will have if the present invention is not applied.
Figure 73:
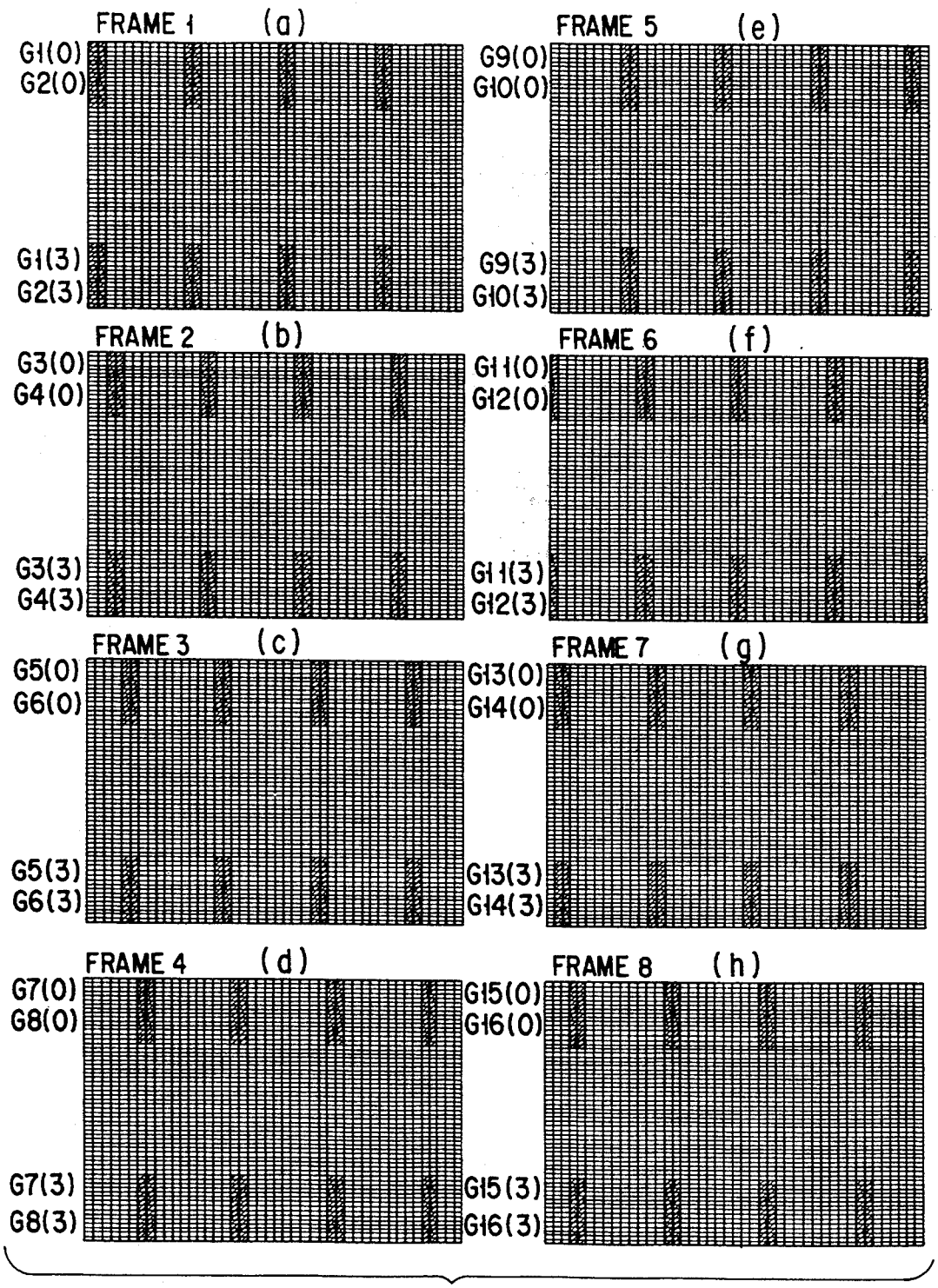
FIG. 73 is a diagram showing the refresh blocks which can be reproduced if the invention is not applied.

The case where f×c is not an element to i, and vice versa, will be described. FIG. 68 is a diagram representing the track pattern formed on a magnetic tape in the quadruple-speed reproduction mode, and is similar to FIG. 67 in meaning. In the quadruple-speed reproduction mode, the head tracing is effected, first in the way indicated by the solid lines, and then in the way indicated by the broken lines. To be more precise, refresh block group G1(0) is reproduced first as the magnetic head moves over traces X1 to x6 as is indicated by the solid lines. In trace X6, refresh block group G1(2) is reproduced after refresh block group G11(5). Then, the head moves over traces X6 to X11 as is indicated by the broken lines. In trace X11, refresh block group G1(0) is reproduced after refresh block G11(7). That is, the head traces the same positions as traces X1 to X6.

Hence, some refresh blocks remain not traced. Those of the squares shown at (b) in FIG. 68, which have not traced, cannot be reproduced. This means that data items previously recorded remain in the reproduced image. In other words, the desired image cannot be reproduced. Obviously, $c \times f$ ($=2 \times 11$) is not an element to i ($=4$), or vice versa. In other words, an image cannot be reproduced at a speed if $c \times f$ and i are not each an element to the other.

Generally, if $f \times c$ and i have such relationship that each is an element to the other, where f is the refresh period, c is the number of head scannings required for recording one frame, and i is the fast reproduction speed, $(c \times f)$ mod i has a remainder. The remainder and i have no common measure, and $(c \times f)$ mod i and i have the relationship that each is an element to the other. Due to the remainder, the tracks for f frames are at different trace positions and can, therefore, be traced. All refresh blocks can therefore be reproduced.

Assume that $(c \times f)$ mod i and i are each an element to the other if $c \times f$ and i are each an element to the other. Then, $c \times f = g1 \times i + h0$ (g1 is a positive integer) if $(c \times f)$ mod $i = j$. If j and i are not each an element to the other, $j = g2 \times j0$, and $i = g2 \times i0$, where g2 is a positive integer other than 1 and 0. Therefore:

$$\begin{aligned} c \times f &= g1 \times i + j \\ &= g1 \times (g2 \times i0 + g2 \times j0) \\ &= g2 \times (g1 \times i0 + j0) \end{aligned}$$

Since $j = g2 \times i0$, $c \times f$ and i have common measure, i.e., g2. It follows that $c \times f$ and i are not each an element to the other. Hence, $(c \times f)$ mod i and i will be each an element to the other if $c \times f$ and i have the relationship that each is an element to the other.

FIG. 69 is a table of various speeds at which data can be reproduced in the fast reproduction mode. In this example, refresh period f of 11 and the number c of head scannings required for recording one frame is 2. The data can be reproduced at any speed which is an element to $f \times c$ of 22 ($=11 \times 2$). In FIG. 69, the circles indicates those speeds at which fast reproduction can be achieved. The values specified as $(11 \times 2)$ mod i are the offset values, each for starting head tracing after f frames have been traced in one refresh period f. Since each offset value and the corresponding speed i, data is reproduced from all positions on each track.

The smaller the offset values, the better. It is desirable that an image immediate in term of time be reproduced at the nearest position on the screen. Hence, in this embodiment, the data should better be reproduced at a speed three times higher, seven times higher, or 21 times higher, than the normal reproduction speed, where $(11 \times 2)$ mod $i = 1$.

FIG. 70 shows a image which is reproduced in the triple-speed reproduction mode, wherein $i = 3$ and $(11 \times 2)$ mod $i = 1$. In FIG. 70, G1 to G11 indicate refresh blocks which are intra-frame coded during the 11-frame period. Gn(0) to Gn(5) in the left column represent six groups of refresh blocks as in FIG. 65. The 0's, 1's, and 2's shown in the table represent the refresh blocks which are reproduced as the magnetic head moves along the solid lines, the broken lines and dotted lines, respectively, in this order.

As is evident from FIG. 70, 0, 1 and 2 recur in the order mentioned. This means that, of any refresh blocks immediate to each other in terms of time can be reproduced on the screen, at the close positions. In other words, when $j = (c \times f)$ mod $i = 1$ or $i - j = 1$, the blocks immediate can be reproduced at close positions on the screen.

In the case where any refresh blocks are remote in terms of time and yet close to one another on the screen, the corresponding images may not be recognized, with high probability, if the images are altered. This problem, however, can be solved by selecting a reproduction speed, where $j = (c \times f)$ mod $i = 1$ or $i - j = 1$.

Fast inverse reproduction will be explained. The relationship between the VTR fast reproduction and the fast inverse reproduction is symmetrical to normal reproduction mode. This is because, the data is recorded at normal speed and is reproduced at a higher speed. Fast reproduction speed i and fast inverse reproduction speed k correspond, such that $k = 2 - i$. Hence, when $i = 3$, $k = -1$. In other words, fast inverse reproduction can be achieved at the speed k of $2 - i$, provided $f \times c$ and i are each an element to the other, where f is the refresh period, c is the number of head scannings required for recording one frame, and i is the fast reproduction speed.

31. Tape Pattern 2

Problems, which will arise unless the above embodiment is not applied, will be described with reference to FIG. 71 to 74. In this instance, one opposing magnetic head is used, i.e., $p = 1$, and a image regions are set in a fixed relationship with $d \times c \times f$ regions on a recording medium, so that possible reproduction speeds are not each an element to another. Assume that, as is shown in FIG. 72, refresh blocks Gn(0), Gn(1), Gn(2), and Gn(3) are recorded on tracks T2n and T2n+1. Similarly, refresh blocks Gn(0), Gn(1), Gn(2), and Gn(3) are recorded on tracks T2(n+1) and T2(n+1)+1. In the double-speed reproduction mode, the magnetic head moves over traces X2n and X2n+1. Only Gn(0) and Gn(3) can be reproduced while the head is moving over trace X2n, and only Gn+1(0) and Gn+1(3) can be reproduced while the head is moving over trace X2n+1. In this case, due to the accumulated refresh blocks of 11 frames, shown at (a) to (h) in FIG. 73 and (a) to (c) in FIG. 74, only those refresh blocks shown at (d) in FIG. 74 can be obtained. Obviously, some portions cannot be reproduced on the screen.

The second embodiment of the present invention will now be described. In the second embodiment, the average generation amount of codes per frame may be recorded on two tracks. In the household use analog VTR available at present, a one-field video signal is recorded on one track. Thus, video signals for one frame are recorded on two tracks. Therefore, the second embodiment uses the transport of the household-use analog VTR, in order to record data.

Figure 75:
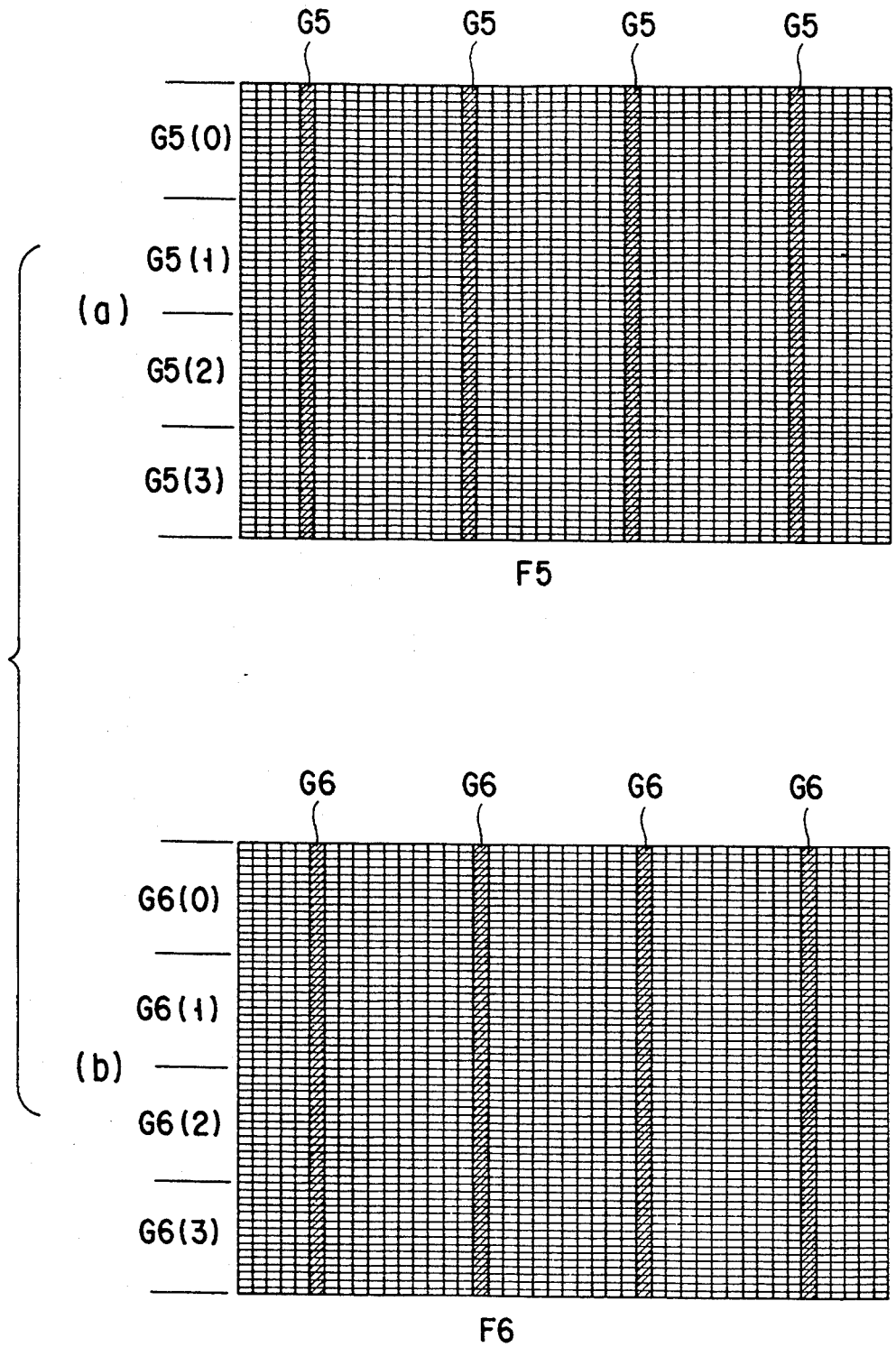
FIG. 75 is a diagram illustrating the relationship between the refresh blocks and non-refresh blocks of frames $F_5$ and $F_6$.

The input video signals of frames 5 and 6 are shown at (a) and (b) in FIG. 75. At (a) in FIG. 75, G5 and G6 are refresh blocks, and G5(0), G5(1), G5(2), and G5(3) are positions of the refresh blocks groups arranged in the vertical direction. G5(0), G5(1), G5(2), and G5(3) form refresh block G5. Generally, Gn(m) indicates a refresh block of the nth frame, which is the mth block counted from the top down.

Figure 76:
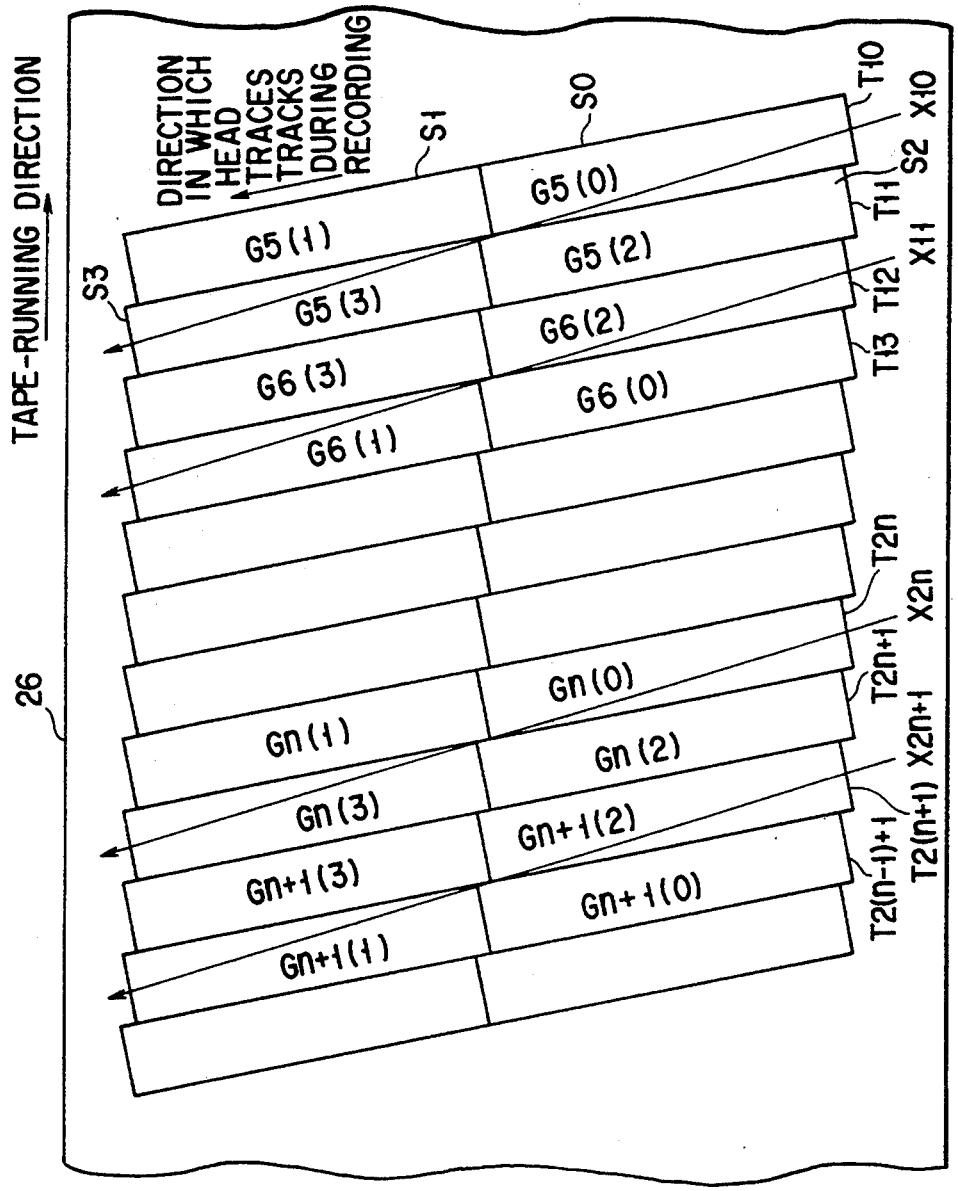
FIG. 76 is a diagram showing the track pattern on a magnetic tape.

FIG. 76 is a diagram showing a track pattern, explaining how to record the input video signals. Refresh blocks G5(0), G5(1), G5(2) and G5(3) are sequentially recorded on tracks T10 and T11, and refresh blocks G6(0), G6(1), G6(2) and G6(3) are sequentially recorded on tracks T12 and T13. More precisely, refresh blocks G5(0) and G5(1) are recorded on track 10, refresh blocks G5(2) and G5(3) are recorded on track 11, refresh blocks G6(2) and G5(3) are recorded on track 12, and refresh blocks G6(0) and G6(1) are recorded on track 13.

Figure 77:
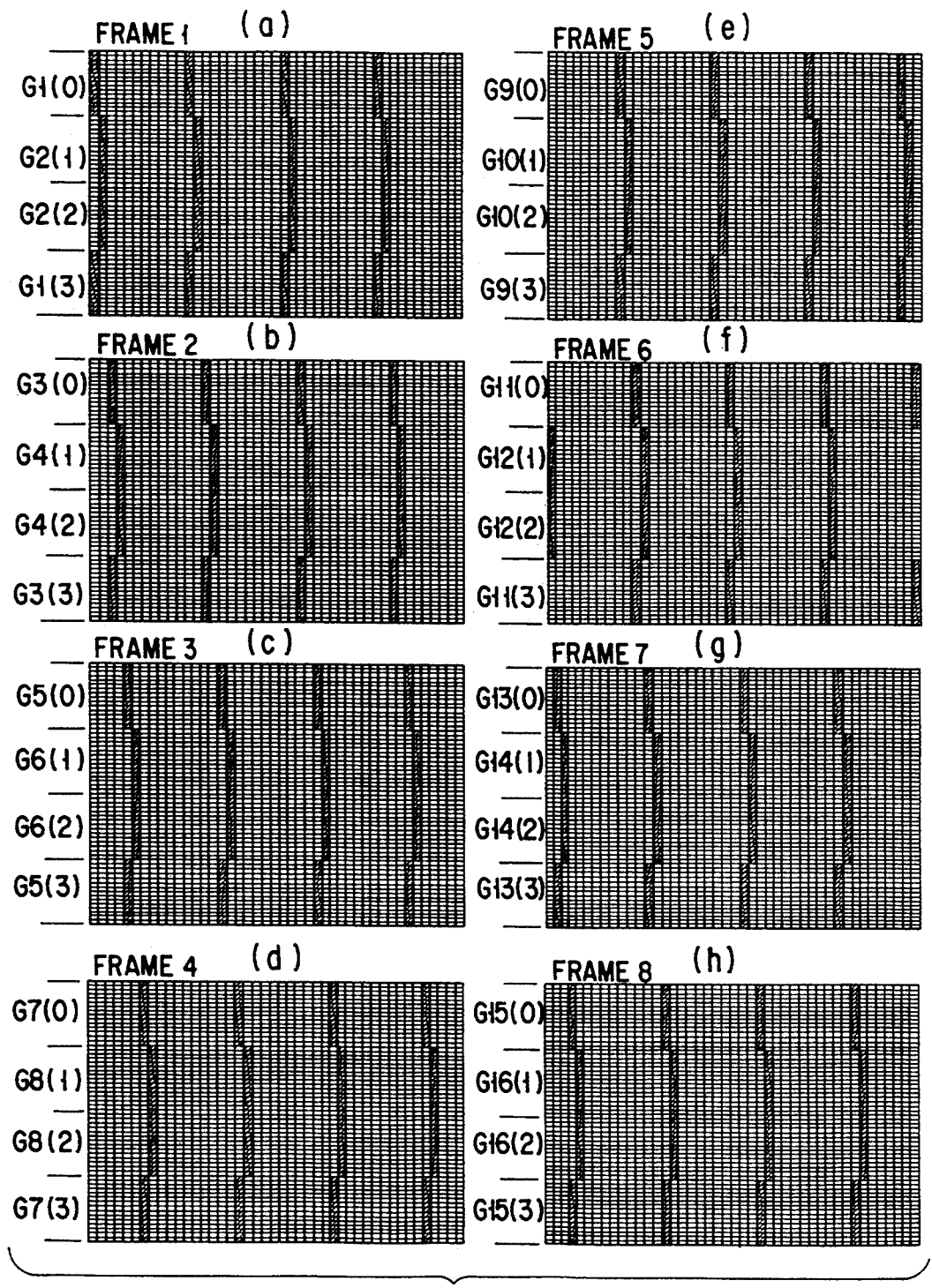
FIG. 77 is a diagram showing the refresh blocks of frames 1 to 8, which can be reproduced.
Figure 78:
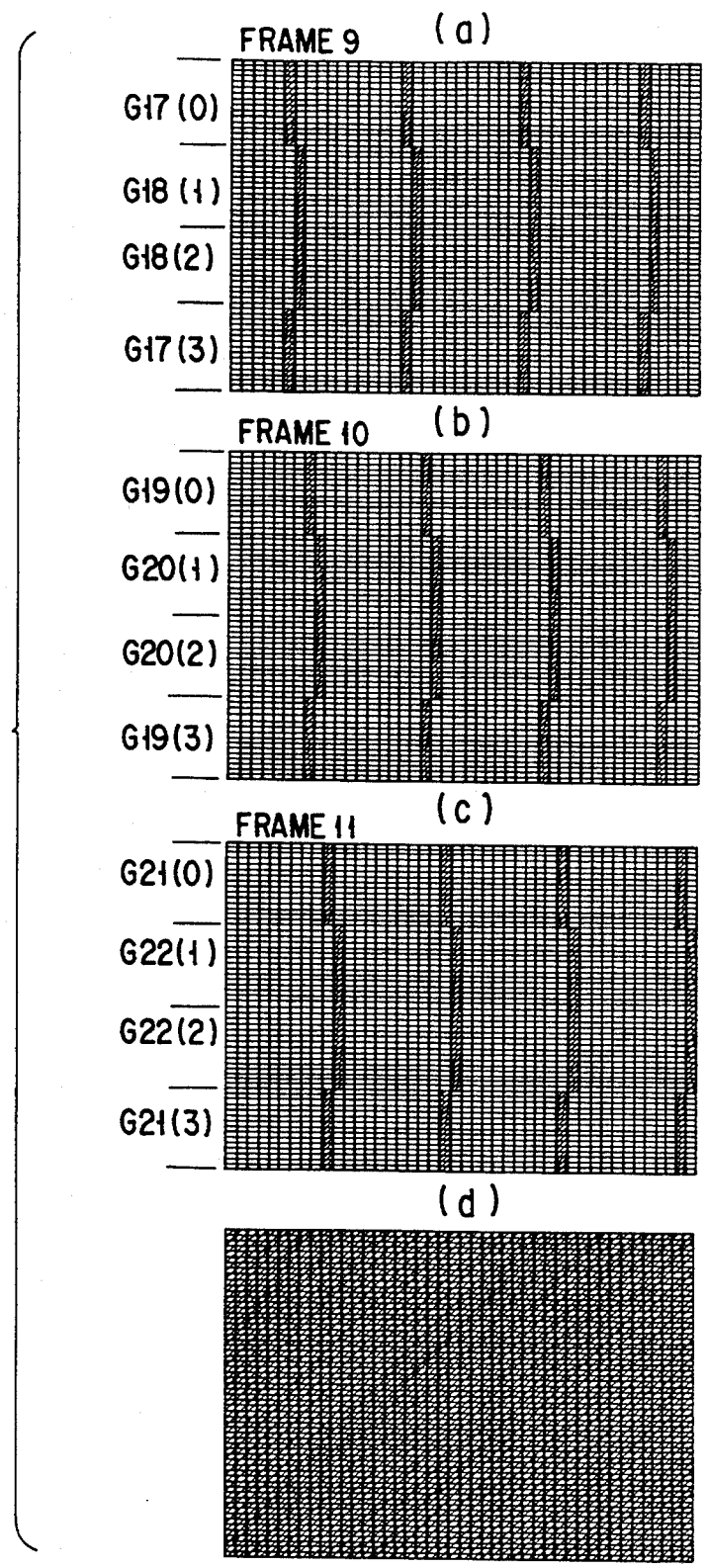
FIG. 78 is a diagram showing the refresh blocks of frames 1 to 8, which can be reproduced, and the accumulated refresh blocks of 11 frames.

In the double-speed reproduction mode, the magnetic head moves over traces X10 and X11, whereby refresh blocks G5(0), G5(3), G6(2) and G6(1) are reproduced. Generally, when the refresh blocks Gn of frame Fn are recorded on two tracks T2n and T2n+1, refresh blocks Gn(0) and Gn(1) are recorded on tracks T2n; refresh blocks Gn(2) and Gn(3) are recorded on track T2n+1; refresh blocks Gn+1(2) and Gn+1(3) are recorded on track T2(n+1); and refresh blocks Gn+1(0) and Gn+1(1) are recorded on track T2(n+1)+1. In other words, to record the refresh block codes on two tracks, the positions the blocks assume on the screen and the track on which the blocks are to be recorded are switched for each frame. Merely by performing this process, the refresh blocks obtained by accumulating the refresh blocks of 11 frames, all shown at (a) to (h) in FIG. 77 and at (a) to (c) in FIG. 78, can be reproduced in the form of a one-screen image, as is shown at (d) in FIG. 78.

The switching of the signals recorded on the tracks, described above, corresponds to the case where one opposing magnetic heads is used (i.e., p=1), and two types (q=2) of correspondence between a image regions and $d \times c \times f$ recording medium regions, where a is the number of image-forming regions in one screen, f is the refresh period, c is the number of head scannings required for recording one frame, and d is the division count of a track. The two types of correspondence (q=2) are alternately used, each time for one frame, one screen is refreshed for the refresh period f.

Figure 80:
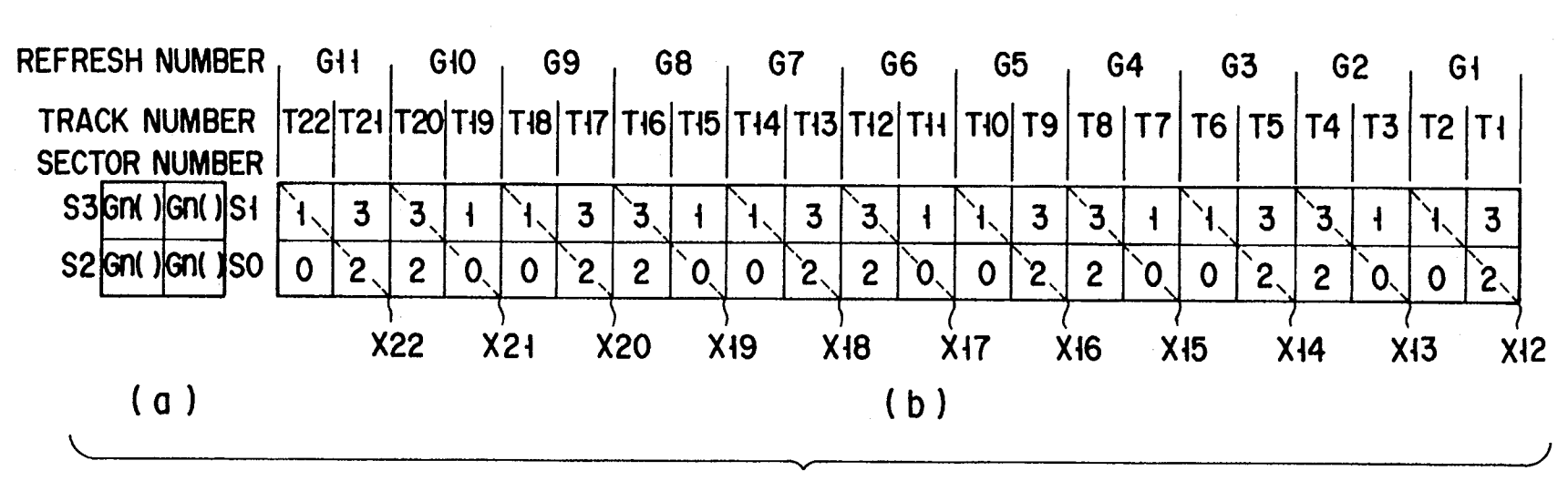

With reference to FIGS. 79 and 80, it will now be explained how the image regions correspond to the regions recording medium regions. FIGS. 79 and 80 are similar, in meaning, to FIG. 67. Shown at (a) in FIG. 79 and (a) in FIG. 80 are sectors S0 to S3 of each track and the positions Gn of these sectors on the screen. The average generation amount of codes per-frame may be recorded on two tracks. Each track has four sectors S0, S1, S2, and S3, so that data may be reproduced at a speed twice higher than the normal speed. These sectors S0 to S3 correspond to those shown in FIG. 76. Items Gn shown within the table correspond to the regions on the screen.

Since the refresh operation is effected for a period of 11 frames, the 11 frames are identified by G1 to G11. Since each frame is recorded in four sectors, four image regions for each frame are identified by Gn(0) to Gn(3). Hence, there are 44 image regions G1(0) to G11(3) ($=2 \times 2 \times 11$). The numerals in the parentheses added to Gn are shown in the tables represented at (b) in FIGS. 79 and 80. T1 to T22 shown at (b) in FIGS. 79 and 80 are the numbers assigned to the tracks on which data has been recorded. G1 to G11 are the refresh numbers assigned to the 11 frames. The diagonal dotted lines X1 to X22 are the traces over which the magnetic head moves in the double-speed reproduction mode.

In this embodiment, $f \times c = 11 \times 2$, where f is the refresh period and c is the number of recorded tracks. In the double-speed reproduction mode, $f \times c$ and i (=2) are not each an element to the other. (Note: i is the fast reproduction speed.) Therefore, the head traces the same part. More specifically, the head tracing shown at (b) in FIG. 79 is first carried out, and the head tracing shown at (b) in FIG. 80 is then performed. Thus, all image regions of one screen are refreshed if two types of correspondence (q=2) are alternately used and if the head tracing is repeated 22 times.

Fast reproduction is accomplished in the following manner. To reproduce data i times faster, where $i = 2 \times (2m-1)$ (m is a positive integer), it suffices to switch the relation between the positions on the screen, on the one hand, and the tracks, on the other, as in the double-speed reproduction mode. Since the average generation amount of codes per frame is recorded on two tracks, $2 \times i$ sectors, or $2 \times 2 \times (2m-1)$ sectors, are provided for each frame, and the division count of a track, d, is set at the value of $2 \times (2m-1) = i$.

The refresh blocks Gn of frame Fn are recorded in the scheme specified below:

Gn(0), ..., Gn(i−1) on track T2n
Gn(i), ..., Gn(2i−1) on track T2n+1
Gn+1(i), ... Gn+1(2i−1) in track T2(n+1)
Gn+1(0), ... Gn(i−1) in Track T2(n+1)

Six-times speed reproduction (m=2, i=6) will be described in detail. In this fast reproduction mode, each frame consists of 12 sectors ($= c \times i = 2 \times 6$). In FIG. 81, the refresh blocks Gn+2 for frame Fn+2 are shown at (a), and the refresh blocks Gn+3 for frame Fn+3 at (b). The portions shaded with diagonal lines are the refresh blocks. Each refresh block is divided into 12 smaller refresh blocks Gn+2(0) to Gn+2(11), or Gn+3(0) to Gn+3(11), arranged in the vertical direction. Refresh blocks Gn+2(0) and Gn+3(0) are aligned in the horizontal line, but not in the vertical direction.

Figure 82:
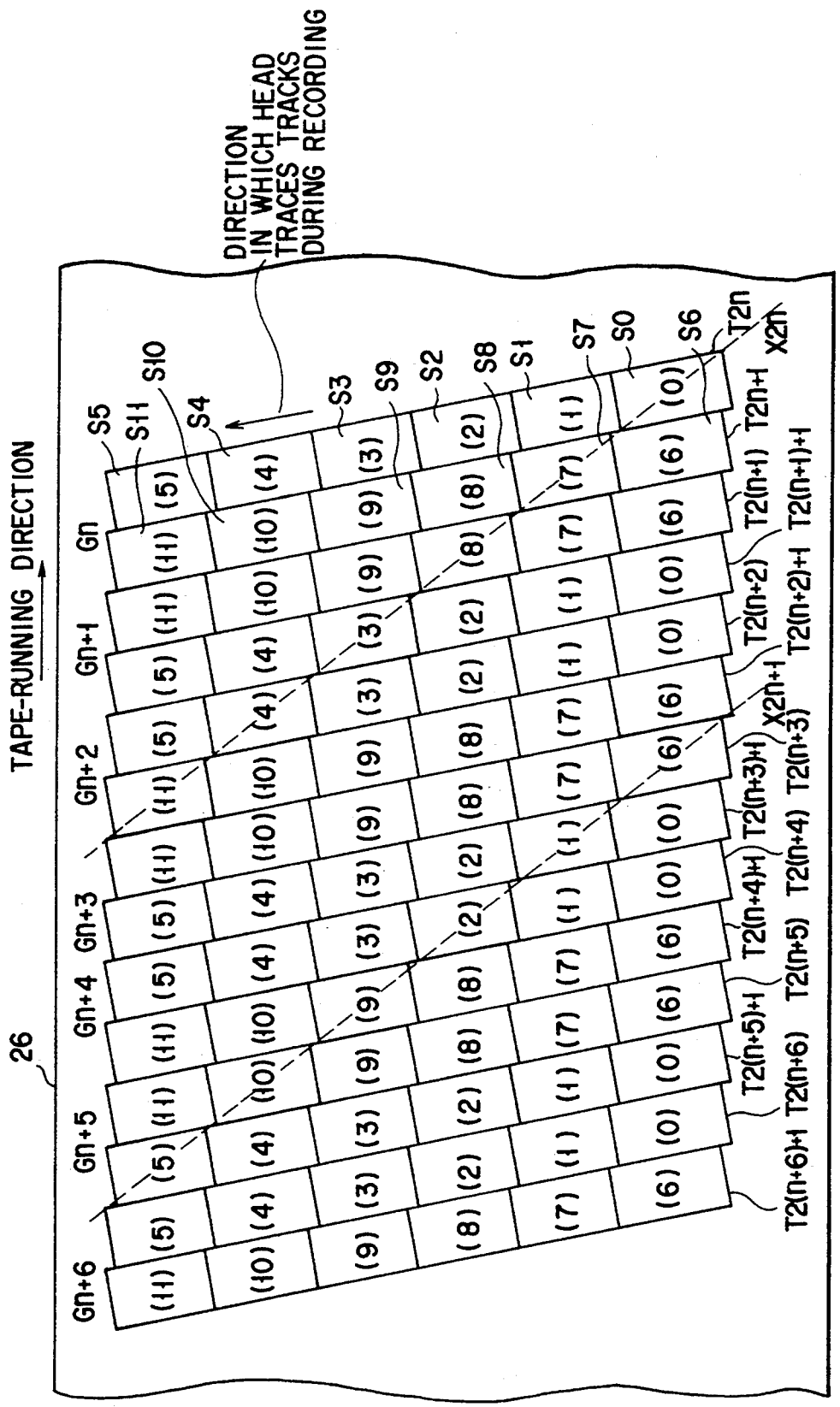
FIG. 82 is a diagram showing the track pattern on a magnetic tape.
Figure 85:
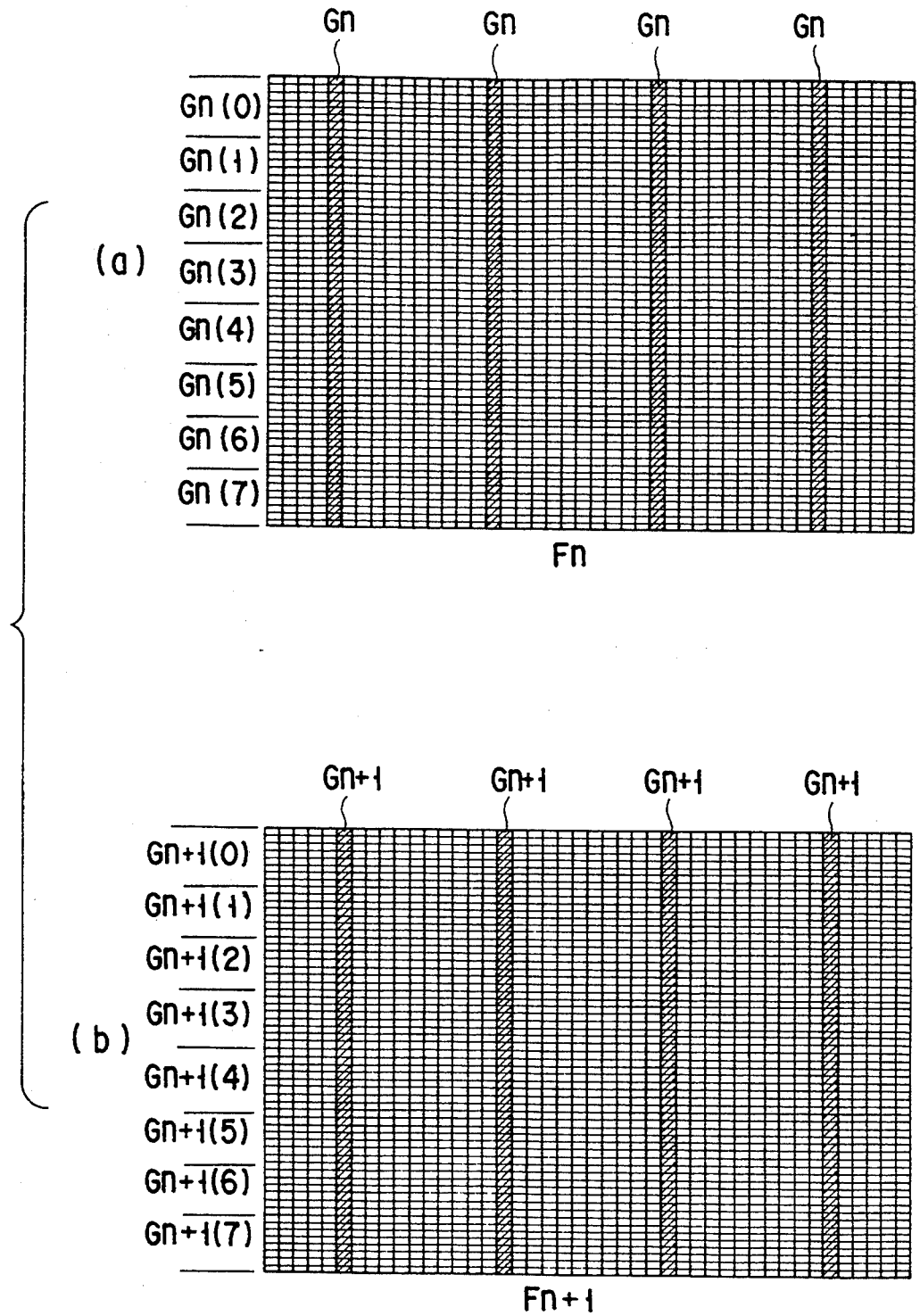
FIG. 85 is a diagram illustrating the relationship between the refresh blocks and non-refresh blocks of frames $F_n$ and $F_{n+1}$.
Figure 86:
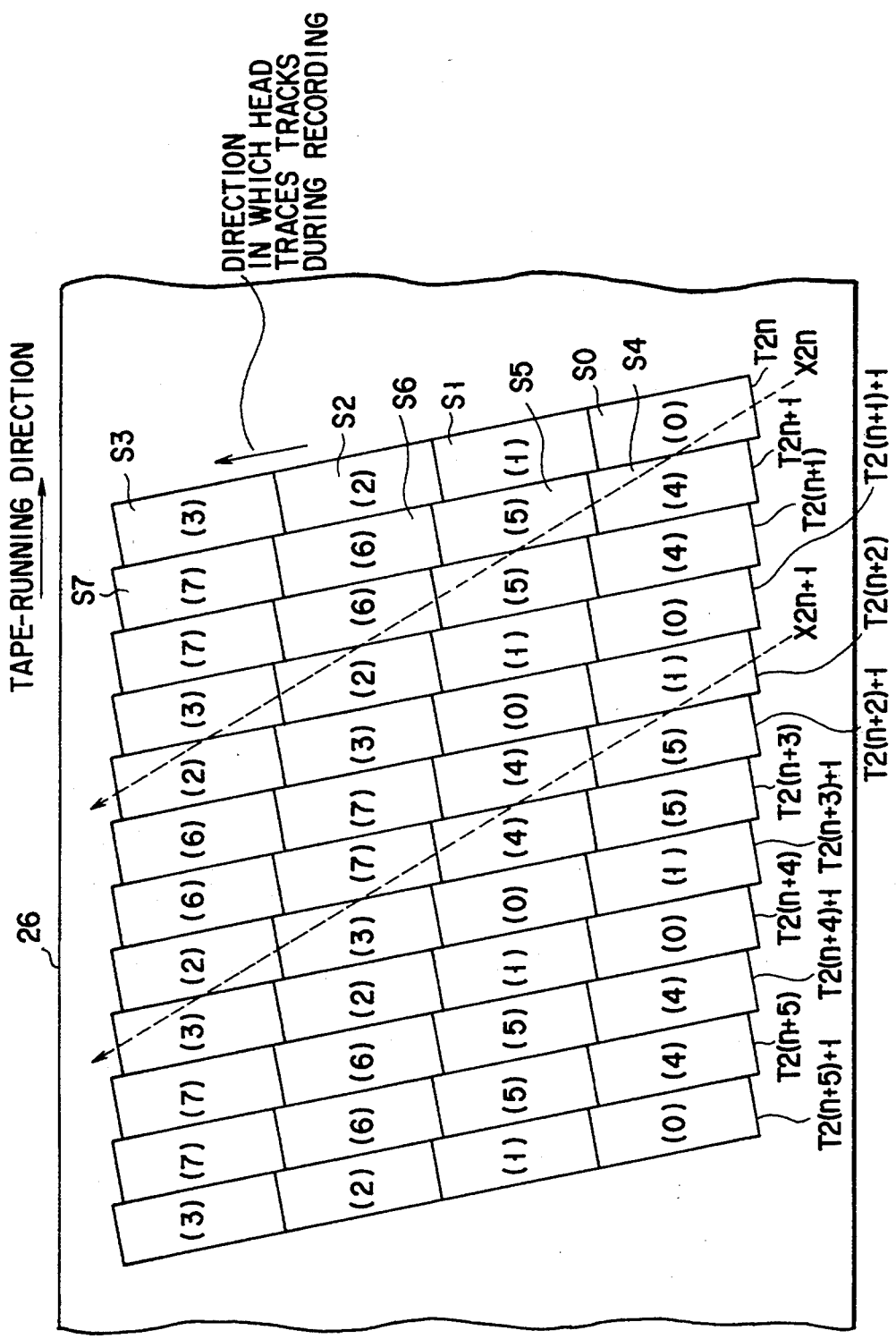
FIG. 86 is a diagram showing the track pattern on a magnetic tape.

Twelve sectors are recorded on two tracks, as is illustrated in FIG. 82. The refresh blocks Gn to Gn+6 recorded on the two tracks are those of frames Fn to Fn+6, respectively. The numerals in parentheses, all shown in tracks T2n to T2(n+6)+1, indicate the positions Gn(0) to Gn(11), Gn+1(0) to Gn+1(11), ..., Gn+6(0) to Gn+6(11) which refresh blocks Gn to Gn+6 take on Gn(11) on the screen.

Figure 83:
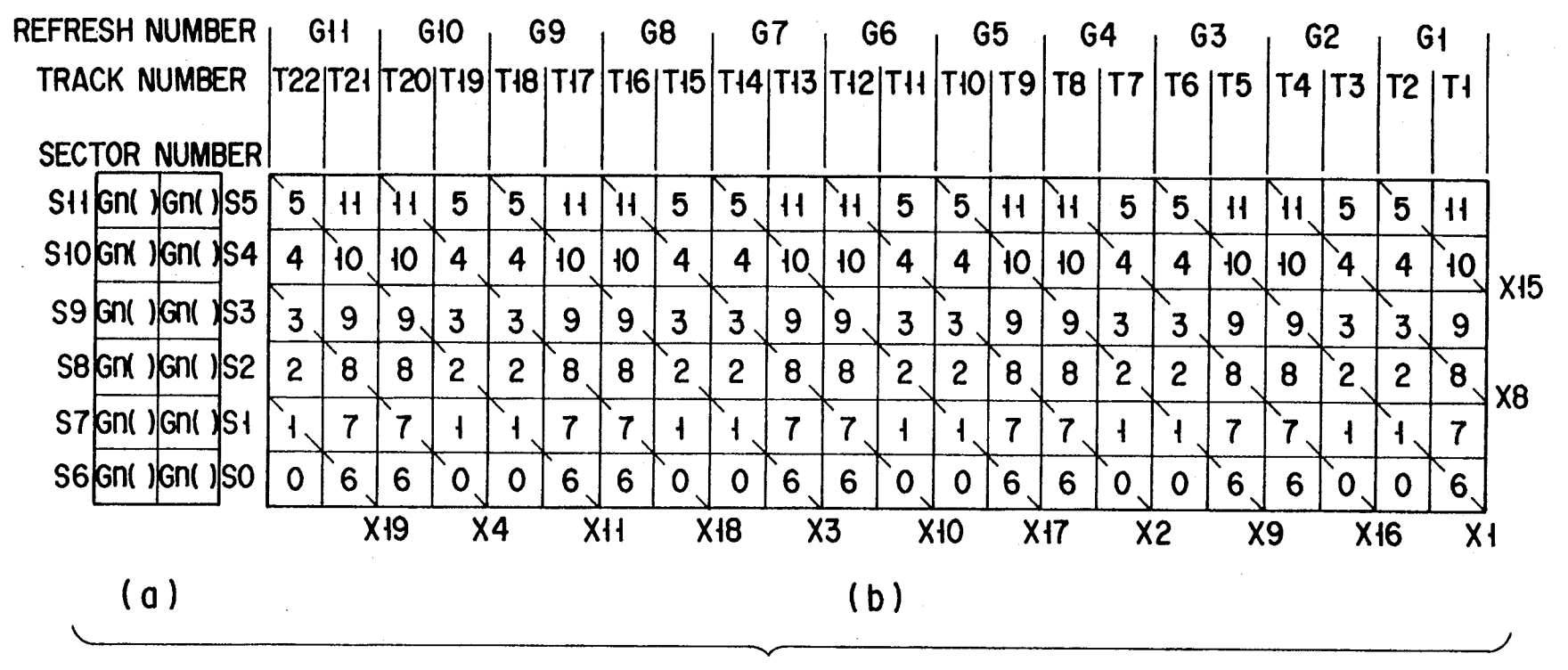
Figure 84:
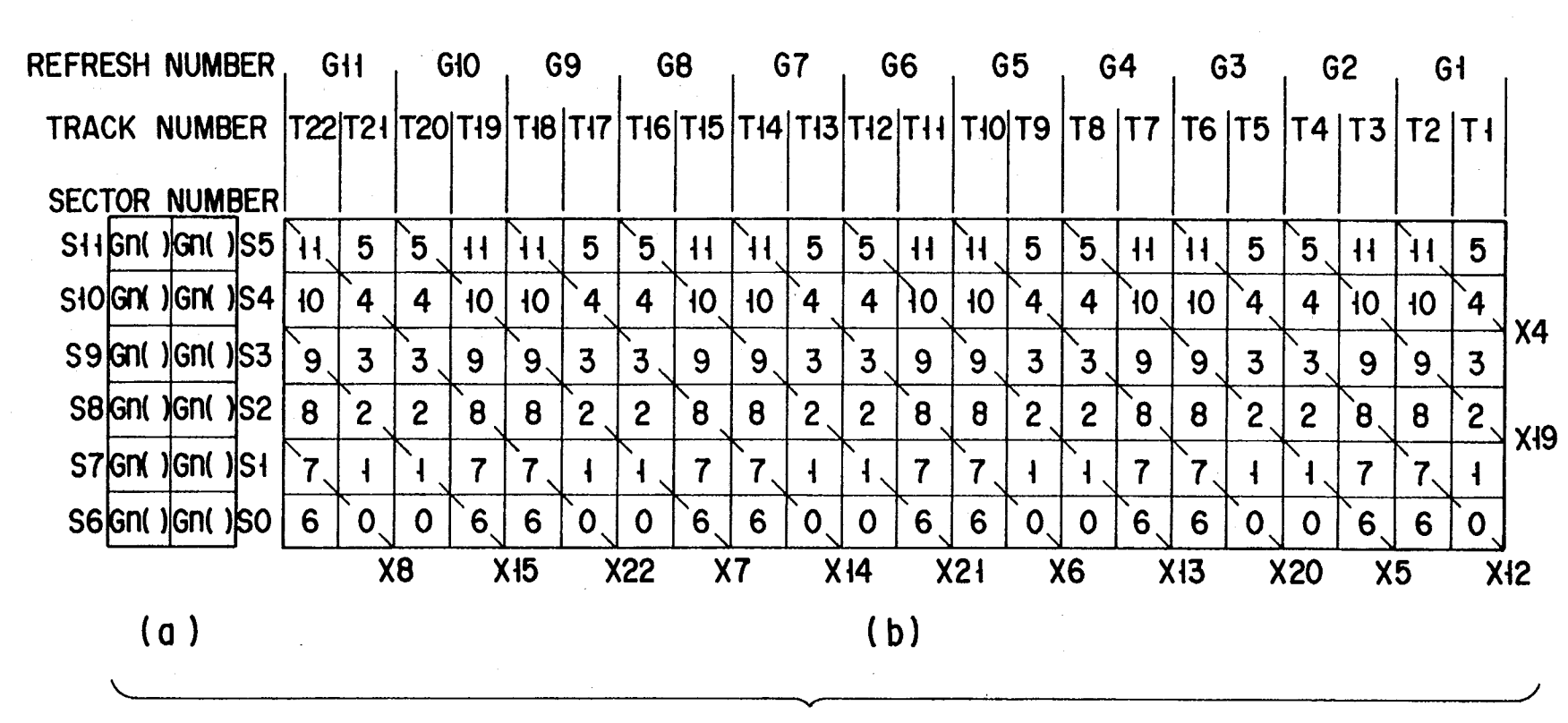

To reproduce the refresh blocks arranged as is shown in FIG. 82, six times faster than the normal speed, the magnetic head is moved over the traces X2n and X2n+1. The refresh blocks that can be reproduced in this instance are: Gn(0), Gn(7), Gn+1(8), Gn+1(3), Gn+2(4), Gn+2(11), Gn+3(6), Gn+3(1), Gn+4(2), Gn+4(9), Gn+5(10), and Gn+5(5). The relation between the head traces and the reproduced image positions on the screen is shown at (a) and (b) in FIG. 83, and also at (a) and (b) in FIG. 84. FIGS. 83 and 84 are similar in meaning to FIGS. 79 and 80.

Each frame consists of 12 sectors ($=2 \times 6$) since the frame is reproduced from two tracks at six times faster than the normal reproduction speed. X1 to X22 are head traces in the six-time speed reproduction mode. One cycle of reproduction starts at trace X1 shown at (b) in FIG. 83, and ends at trace X22 shown at (b) in FIG. 84. Since two types of correspondence between the image regions and the medium regions (q=2) are alternately used, all image regions of one screen are refreshed by repeating the head tracing 22 times.

To achieve $2^S$-times speed reproduction (S is an integer 2 or more), the relationship between the positions on the screen, on the one hand, and the tracks, on the other, is changed, and the codes in one track are switched. Quadruple-speed reproduction mode, for example, will be described, with reference to FIGS. 85 to 90. FIGS. 87 to 90 are similar, in meaning, to FIGS. 79 and 80. Since the frame is reproduced from two tracks at four times faster than the normal reproduction speed, each frame is formed of eight sectors S0 to S7

(=2×4), and each refresh block is divided into 8 smaller refresh blocks Gn(0) to Gn(7) arranged in the vertical direction.

In the quadruple-speed reproduction mode, X1 to X22 are head traces. One cycle of reproduction starts at trace X1 shown at (b) in FIG. 87, and ends at trace X22 shown at (b) in FIG. 90, whereby the entire one-screen region is refreshed. Since four types of correspondence between the image regions and the medium regions are provided (q=4) as is shown at (a) and (b) in FIGS. 87, 88, 89 and 90, all image regions of one screen are refreshed by repeating the head tracing 22 times.

32. Recording of Refresh Blocks in High Density

It will be described lows to record refresh blocks in high density.

In this instance, one opposing magnetic heads is used, i.e., p=1. If the amount of codes is small which can be recorded on one track, it suffices to use p opposing magnetic heads (p is a positive integer), not altering the gist of the present invention. In this embodiment, the average amount of codes generated per frame corresponds to two tracks, and the drum 43 is rotated at 1800 rpm. Even if the rotational speed of the drum 43 is changed to 900×c rpm, where c is the number of tracks on which to record the average amount of codes per frame, the gist of the invention remains unchanged.

The VTR track pattern will now be described with reference to FIG. 91 which shows the track pattern on a magnetic tape 26. In FIG. 91, T indicates a track on which data is recorded by means of rotary heads. In this instance, the average amount of codes per frame is recorded on two tracks. To be more specific, the refresh blocks Gn of frame Fn are recorded on two tracks T2n and T2n+1.

Figure 92:
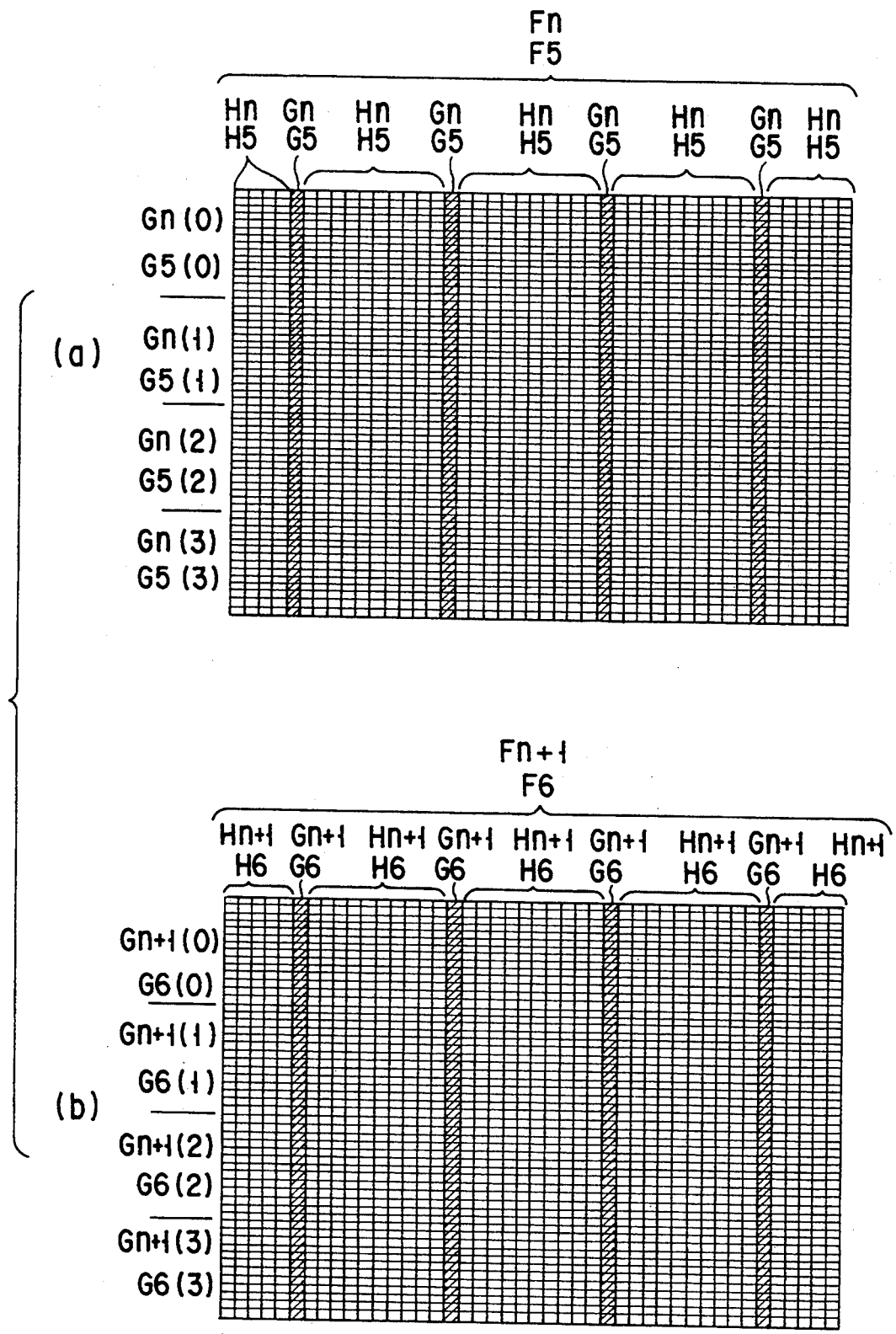
FIG. 92 is a diagram illustrating the relationship between the refresh blocks and non-refresh blocks of frames $F_n$ and $F_{n+1}$.

Division of the refresh blocks will be explained, with reference to FIG. 92. More precisely, FIG. 92 illustrates how to divide one frame into refresh blocks, and how to divide each refresh block into smaller refresh blocks. Fn shown at (a) in FIG. 92 is the image of the nth frame. Gn, also shown at (a) in FIG. 92, are the refresh blocks in the nth frame Fn. One frame consists of 240 refresh frames. Gn(0) to Gn(3), also shown at (a) in FIG. 92, are four refresh blocks obtained by dividing the 240 refresh blocks and arranged in the vertical direction. To be precise, Gn(0) consists of 60 uppermost refresh blocks, and Gn(1), Gn(2) and Gn(3) are lower blocks each consisting of 60 refresh blocks. Shown at (b) in FIG. 92 are the refresh blocks Gn+1 of the next frame, i.e., frame Fn+1. Refresh blocks Gn+1(0) to Gn+1(3) are of the same definition as refresh blocks Gn(0) to Gn(3) shown at (a) in FIG. 92.

The relation between the refresh blocks, on the one hand, and the sectors, on the other, will be described. The refresh blocks Gn of frame Fn are recorded on the sectors S0 to S3 of two tracks T2n and T2n+1, in the scheme specified below:

Gn(0) on sector S0
Gn(1) on sector S0
Gn(2) on sector S3
Gn(3) on sector S3

In FIG. 91, Gn to Gn+1 shown above the rectangles denoting the tracks identify the refresh blocks, and Gn(0) to Gn(3) and Gn+1(0) to Gn+1(3) shown in the rectangle identify the four regions of each refresh block which are arranged in the vertical direction.

Thus, each refresh block and each sector have one-to-one relationship. This relationship is fixed, never changing with time. In the conventional method, a refresh block and a sector do not have such relation ship, and the position where refresh block exists is determined arbitrarily. Hence, in the conventional method, some parts of the tape will remain not refreshed after the fast reproduction has been effected, and high-quality images cannot be reproduced in the fast reproduction mode.

In FIG. 91, X2n to X2n+1 are the traces along which the magnetic head moves in the double-speed reproduction mode. As the head is moved over trace X2n, data can be reproduced from the sector S0 (i.e., refresh blocks Gn(0) and Gn(1)) of track T2n, the sector S3 (i.e., refresh blocks Gn(2) and Gn(3)) of track T2n+1.

Figure 93:
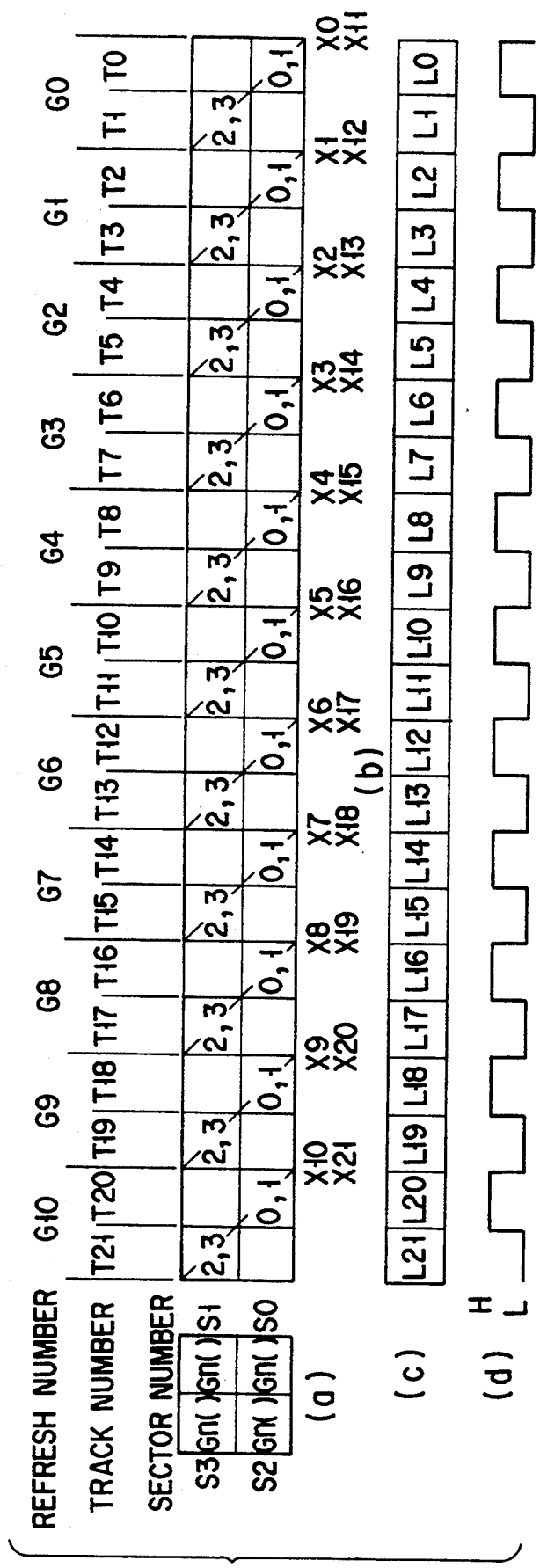
FIG. 93 is a diagram illustrating the relationship which the head traces and the refresh blocks have in the double-speed reproduction mode.

The refresh blocks which can be reproduced by using the actual tape pattern have been explained with reference to FIG. 91. FIG. 93 is a diagram more simple than FIG. 91, clearly representing the relationship between the head traces and the refresh blocks. Shown at (a) in FIG. 93 are the sectors S0 to S3 of each track and the positions Gn the sectors assume on the screen. Four sectors S0, S1, S2, and S3 are provided in order to record the average amount of codes per frame on two tracks and to effect the double-speed reproduction. These sectors are identical to those shown in FIG. 91. Items Gn() shown at (a) in FIG. 93 correspond to the image regions on the screen. Since the refresh operation is performed for a 11-frame period, the 11 frames are identified by G0 to G10. Since each frame is recorded in four sectors, the corresponding four image regions are identified by Gn(0) to Gn(3). Hence, there are 44 image regions G0(0) to G10(3) (=2×2×11). The numerals in the parentheses added to Gn are shown in the tables represented at (b) in FIGS. 93. T0 to T21 shown at (b) in FIG. 93 are the numbers assigned to the tracks on which data has been recorded. G0 to G10 are the refresh numbers assigned to the 11 frames. The diagonal dotted lines X1 to X22 shown at (b) in FIG. 93 are the traces over which the magnetic head moves in the double-speed reproduction mode.

In this embodiment, f×c=11×2, where f is the refresh period and c is the number of recorded tracks. In the double-speed reproduction mode, f×c (=11×2) and i (=2) are not each an element to the other. (Note: i is the fast reproduction speed.) Therefore, the head traces the same part. More specifically, the head moves along traces X11 to X21 after moving over traces X0 to x10, thereby tracing the same part. Thus, all image regions of one screen are refreshed by repeating the head tracing 11 times, if refresh blocks are concentrated in the double-speed head traces and if the image regions are associated, in a specific relation, with the regions on the recording medium, as is shown at (b) in FIG. 93.

In this case, the image regions in which to intra-frame-code video signals have a fixed relation with the f×d×c regions on the recording medium. All image regions of one screen are refreshed by repeating the head tracing 22 times at the speed i, since i and f×c (=11×2) are each an element to the other. The gist of this invention resides in that image areas are concentratedly arranged in a prescribed portion of the recording medium, and a flag signal representing this fact is recorded. Hence, the gist of the invention remains unchanged even if the image regions are related to the regions on the recording medium in one way or another.

33. Tape-feeding Control Circuit

Since refresh blocks are arranged densely in the double-speed head traces as is shown at (b) in FIG. 93, they exist on some portions of the recording medium and do not exist on other portions thereof. It is therefore necessary to trace the portions of the medium which has the refresh blocks, in the double-speed reproduction mode. In the present invention, flag signals representing the positions of those portions having refresh blocks are recorded on a magnetic tape 26.

Flag signals can be recorded on the magnetic tape 26 by two methods. The first method is to record the flag signals on a linear track formed by a stationary magnetic head. The second method is to record the flag signals on a helical track formed by rotary heads.

Figure 94:
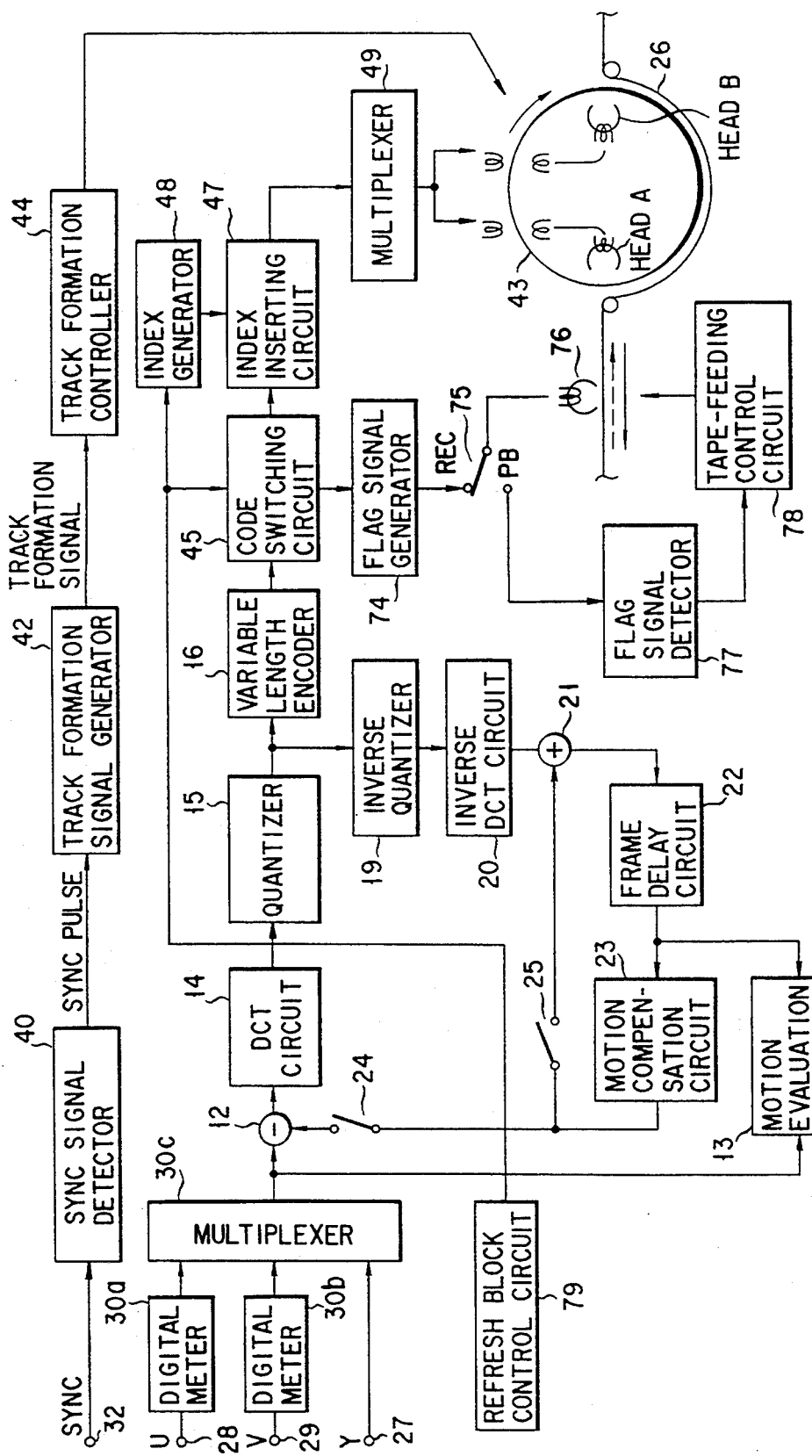
FIG. 94 is a block diagram showing means for recording flag signals on a linear track.

The first method, wherein the flag signals are recorded on a linear track, will be explained with reference to FIG. 94. The code switching circuit 45 shown in FIG. 94 switches the codes of refresh blocks so that all refresh blocks may be reproduced in the double-speed reproduction mode. As a result, the refresh blocks are concentratedly recorded on a part of the linear track as is illustrated at (b) in FIG. 93. At this time, a flag signal generator 74 generates a flag signal indicating that refresh blocks are recorded on that part of the linear track. The flag signal is supplied to a linear track head 76 through a switch 75, and the head 76 records the flag on the magnetic tape 26.

Those portions of the linear track, labeled "L" at (c) in FIGS. 91 and 93, are the regions in which to record flag signals. The flag signals corresponding to tracks T2n and T2n+1 on which the refresh blocks of frame Fn are recorded on linear tracks L2n and L2n+1. To indicate that a refresh block exists or does not exist at the start position of track T, a flag signal is recorded on linear track L2n. Shown at (d) in FIG. 93 is the flag signal recorded on linear track L. The flag signal indicates a trace along which to move the rotary heads while remaining at the high level, and indicates a trace along which not to move the rotary heads while remaining at the low level.

In the double-speed reproduction mode, the flag signal generated by the linear track head 76 is supplied via the switch 75 and detected by a flag signal detector 77. The detector 77 supplies the flag signal to a tape-feeding control circuit 78. The circuit 78 controls the speed of feeding the magnetic tape 26 in accordance with the flag signal. The rotary heads A and B can thereby move along the traces in which refresh blocks exist.

Since the flag signal is recorded on the linear track, indicating that region of a recording medium in which refresh blocks are concentratedly recorded, it is possible to reproduce the refresh blocks from said region of the recording medium. In this embodiment, a special reproduced image can be obtained in the double-speed reproduction mode, by moving the heads along 11 traces X0 to X10. Since one frame is recorded on two tracks, the refresh period is a 5.5 frame period.

The linear track L on which to record the flag signal may be a time code track for recording time codes or a control track for recording VTR tape-running control data. If the control track is used as linear track L, control signals having different duty ratios can be used so as to record the flag signal of this invention on the control track.

In the embodiment described above, the image regions have a fixed relation with the regions on the recording medium. All image regions of one screen are refreshed by repeating the head tracing 22 times at the speed i, since i and $f \times c$ ($=11 \times 2$) are each an element to the other, where f is the refresh period and c is the number of recorded tracks per frame. In other words, the refresh operation is effected for a 11-frame period. Since the refresh blocks are concentratedly arranged, the refresh period is shorter than in the case where i and $f \times c$ are each an element to the other.

Figure 95:
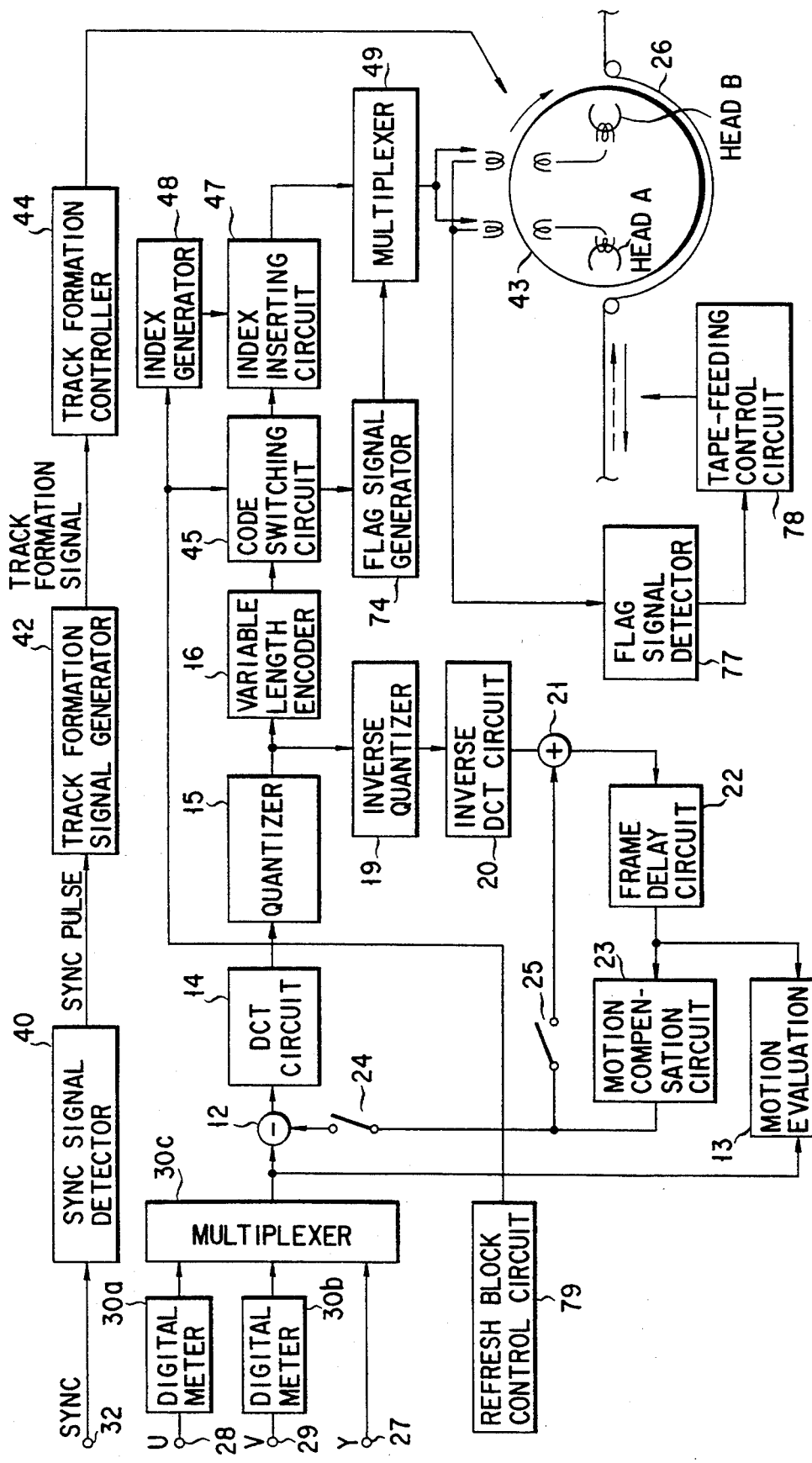
FIG. 95 is a block diagram showing means for recording flag signals on a helical track.
Figure 96:
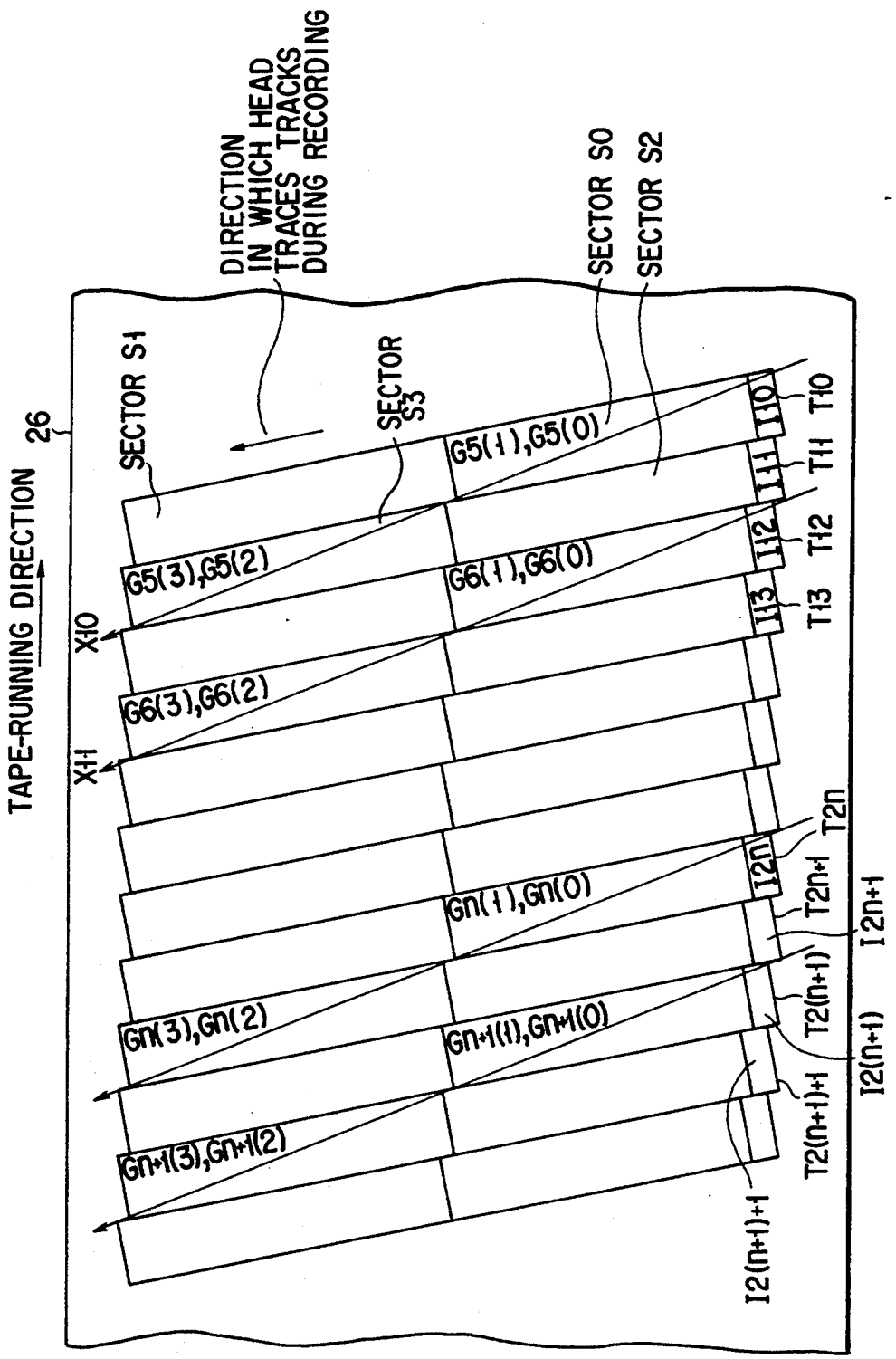
FIG. 96 is a diagram showing a track pattern on a magnetic tape having helical tracks in which flag signals have been recorded.
Figure 97:
FIG. 97 is a diagram illustrating the relationship which the head traces and the refresh blocks have in the double-speed reproduction mode.

FIGS. 95 to 97 illustrate another embodiment of the present invention. As may be understood from FIG. 95, a flag signal output by a flag signal generator 74 is input to a multiplexer 49 and hence to rotary heads A and B. The rotary heads A and B record the flag signal on a helical track. FIG. 96 shows the track pattern formed on a magnetic tape 26. As is shown in FIG. 96, the flag signal is recorded on the portions I of the helical track. More precisely, flag signals I2n and I2n+1 are recorded on tracks T2n and T2n+1 on which recorded are the refresh blocks of frame Fn. These flag signals indicate that refresh blocks are recorded on tracks T2n and T2n+1.

To reproduce the refresh blocks, a flag signal detector 77 detects the flag signal from the signal reproduced by the rotary heads A and B. The flag signal is supplied to a tape-feeding control circuit 78. The circuit 78 controls the speed of feeding the magnetic tape 26 in accordance with the flag signal. The rotary heads A and B can thereby move along the traces in which the refresh blocks exist and reproduce the refresh blocks.

Figure 98:
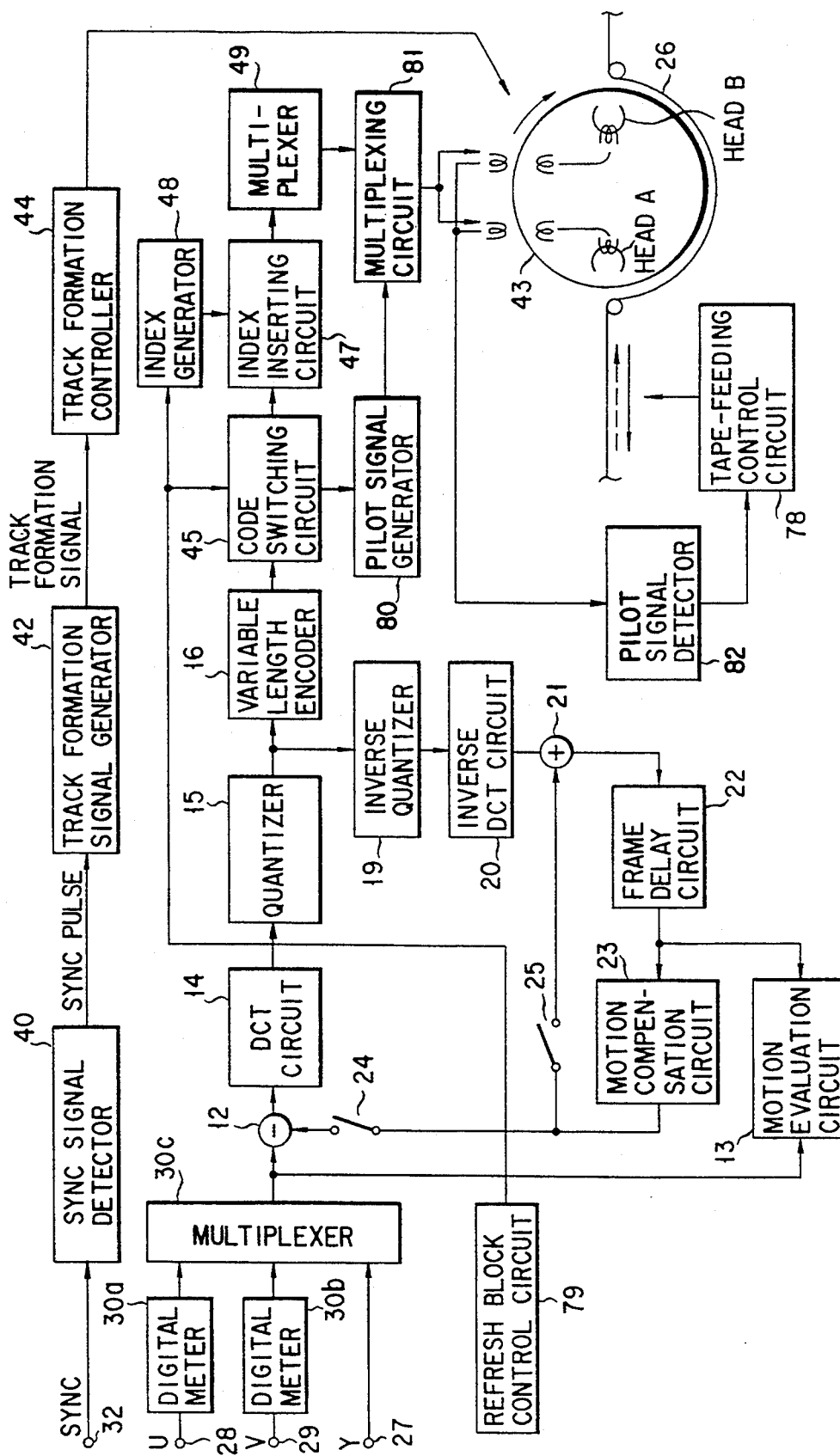
FIG. 98 is a block is a block diagram showing means for recording flag signals on a helical track.
Figure 99:
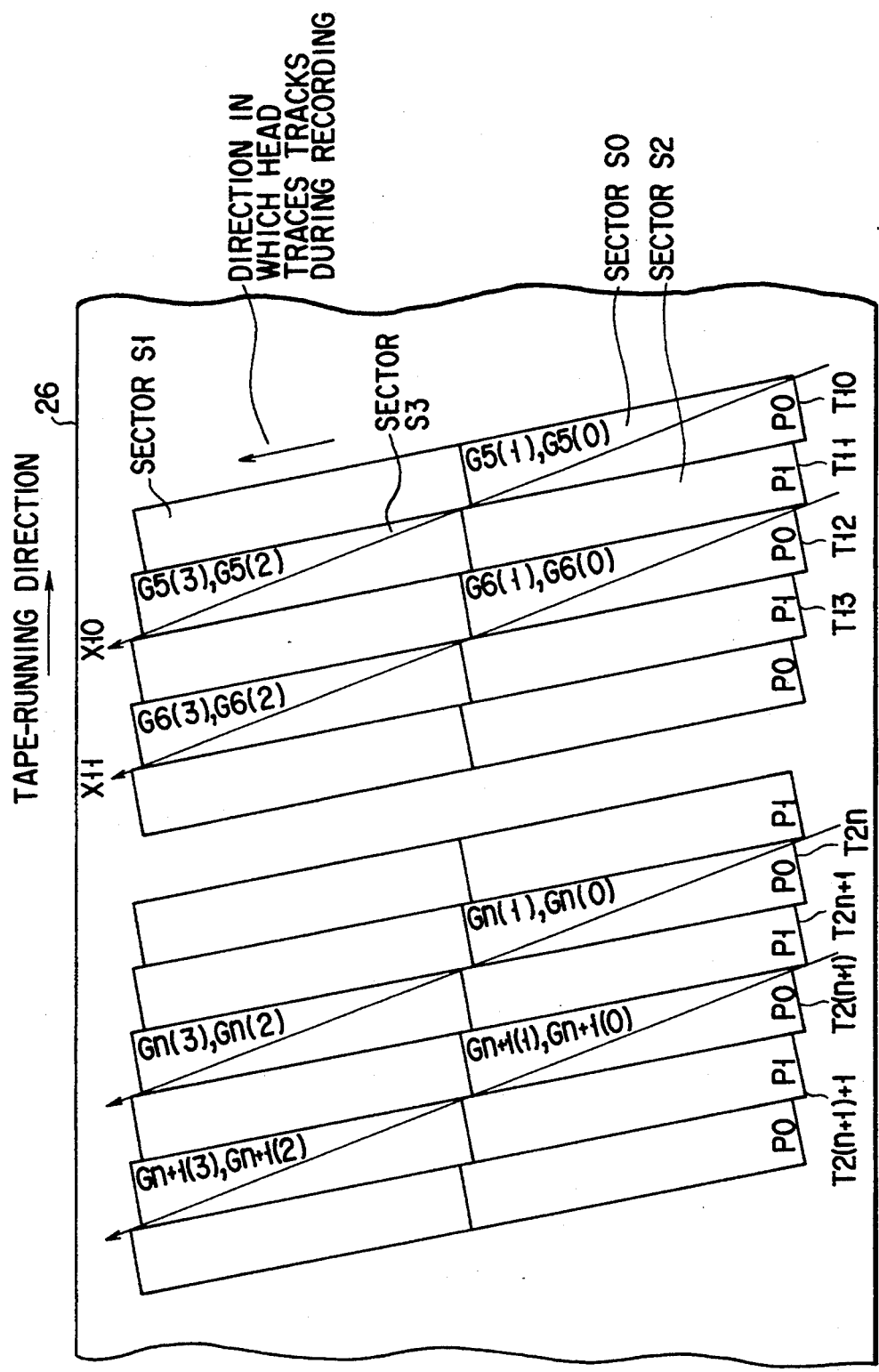
FIG. 99 is a diagram showing a track pattern on a magnetic tape having helical tracks in which pilot signals have been recorded.
Figure 100:
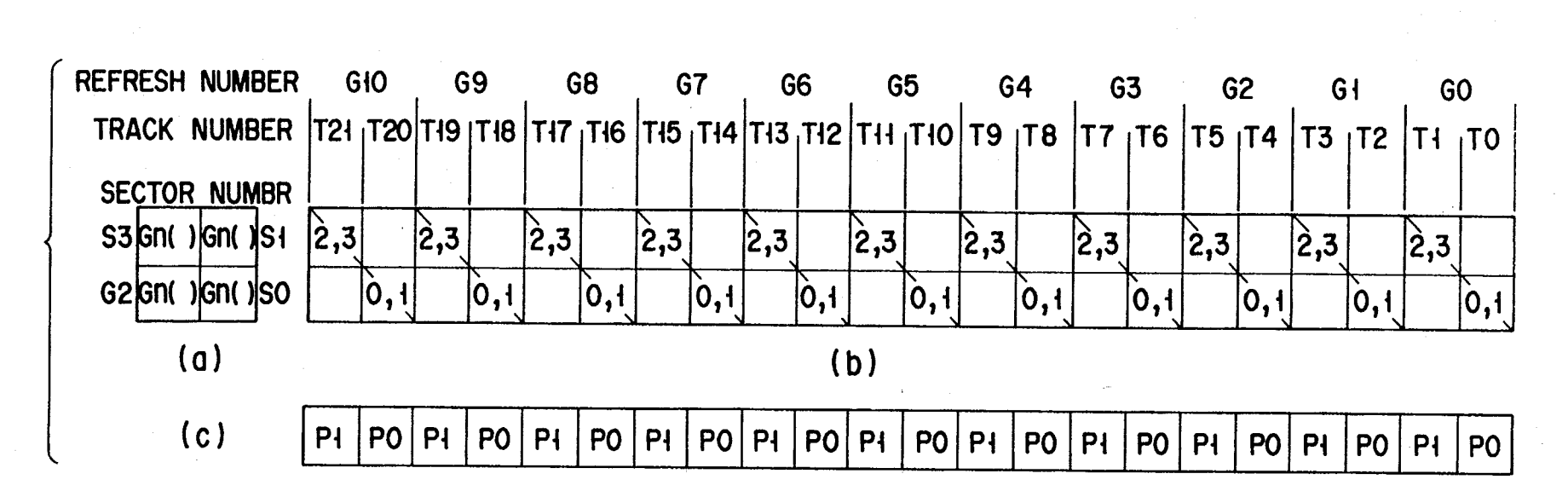

FIGS. 98 to 100 show another embodiment of the present invention, which is applied to a 8 mm VCR of the known type.

In a 8 mm VCR, ATF pilot signals are used in a servo system. Four pilot signals of different frequencies f0, f1, f2 and f3 are recorded on four adjacent tracks, respectively. Frequencies f0, f1, f2 and f3 are 102.544 kHz, 118.951 kHz, 165.210 kHz, and 148.689 kHz.

To reproduce data, these pilot signals are detected and used to perform tracking servo so that a maximum output may be obtained.

As is shown in FIG. 98, a pilot signal generator 80 generates pilot signals. The pilot signals are supplied to a multiplexing circuit 81. The circuit 81 frequency-multiplexes the pilot signals with video, audio and data signals, generating multiplexed signals. Rotary heads A and B record the multiplexed signals on a magnetic tape 26.

Data representing the relation between the frequencies of the pilot signals, on the one hand, and the tracks, on the other, is supplied to a code switching circuit 45. The circuit 45 switches the codes of refresh blocks so that all refresh blocks may be reproduced in double-speed head trace mode. As a result of this, the refresh blocks are concentratedly recorded on a part of a helical track as is illustrated in FIGS. 99 and 100.

More precisely, the refresh blocks Gn are recorded on the sectors S0 and S3 of tracks T2n and T2n+1, in the following specific scheme:

Gn(0) and Gn(1) on sector S0
Gn(2) and Gn(3) on sector S3

In the double-speed reproduction mode, the heads traces sectors S0 and S3, thereby reproducing an image at high speed. When the heads trace sectors S2 and S1, no image can be reproduced at high speed since no refresh blocks are recorded on sector S2 or sector S1. Therefore, servo is applied to make the heads trace sectors S0 and S3 only.

To accomplish this servo, the pilot signals are related to the sectors on which to record refresh blocks when they are recorded on the magnetic tape 26.

As is shown in FIG. 100, pilot signals P0 are recorded on track T2n, and pilot signals P1 are recorded on track T2n+1. It suffices to assign frequency f0 or f1 to pilot signals P0, and frequency f1 or f2 to pilot signals P1. This is because four pilot signals of different frequencies are used in the 8 mm VCR.

In the reproduction mode, a pilot signal detector 82 detects the pilot signals and supplies them to a tape-feeding control circuit 78. The circuit 78 controls the speed of feeing the magnetic tape 26 in accordance with the pilot signals.

In the double-speed reproduction mode, the heads A and B straddle two tracks as can be understood from FIGS. 99 and 100. Servo is applied such that pilot signals P0 are at the highest level when the heads straddle the tracks, and pilot signals p1 are at the highest level when the heads do no straddle the tracks. Data can thereby be reproduced from sectors S0 and S3. Hence, the refresh blocks can be reproduced at high speed.

Figure 101:
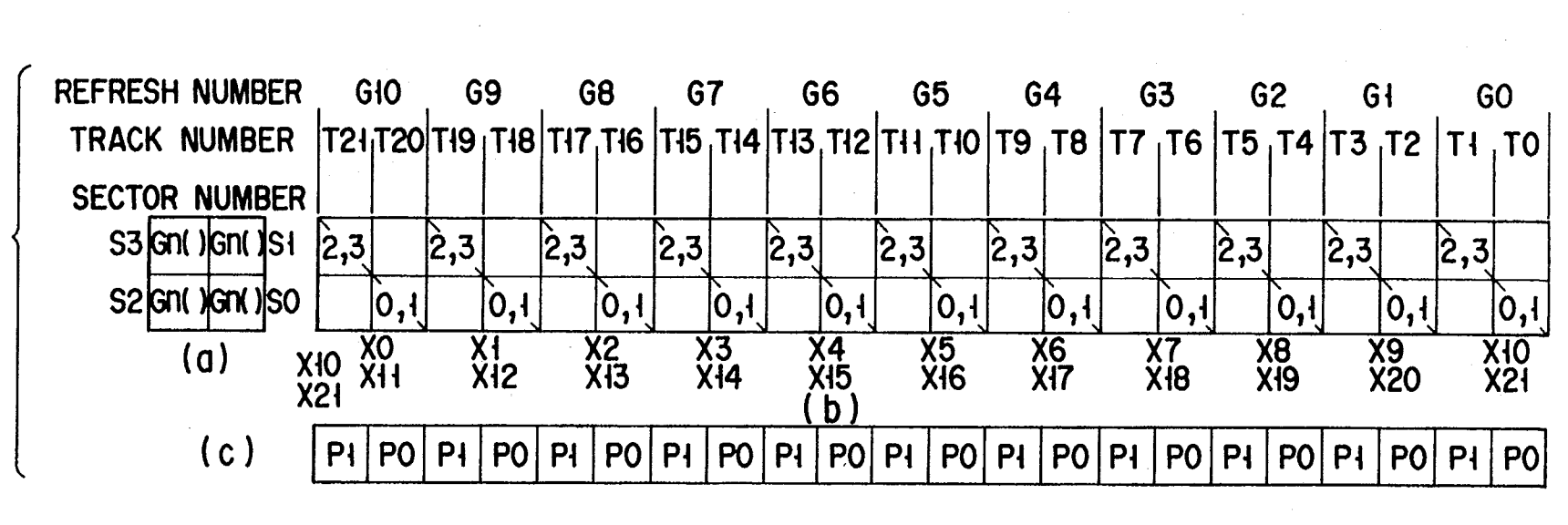

In the present embodiment, the inverse normal reproduction can be realized by moving the heads as is shown in FIG. 101. In this case, too, servo is applied to the positions where refresh blocks are recorded in accordance with the pilot signals detected by the pilot signal detector 82. Hence, the refresh blocks can be reproduced at high speed from the regions where they are recorded.

35. Code Division and Code Amount Control

Two method is available for controlling code amounts. The first method is to control the quantization level of refresh blocks, as has been described in Paragraph 10.3, Chapter 10. The second method is to divide a quantized code into two portions so that the code amount of an MSB or a low-frequency component is limited to a code amount which allows the codes to be read out when fast reproduction is performed by a recording medium such as a VTR.

Figure 102:
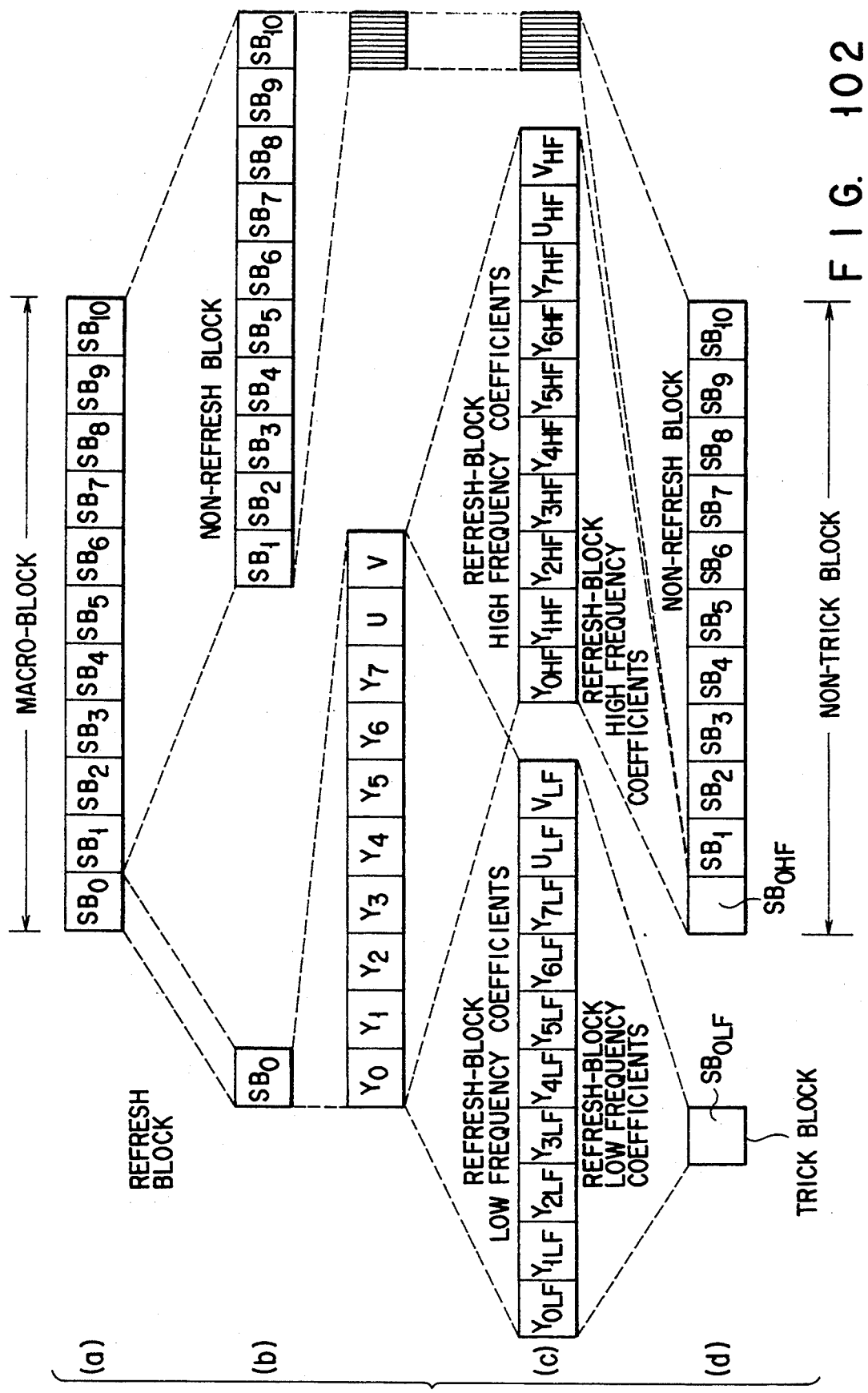
FIG. 102 is a diagram explaining how to divide blocks.

Code division will be explained in detail, with reference to FIG. 102. Shown at (a) in FIG. 102 is the structure of a conventional macro-block. The first super block $SB_0$ of the macro-block is a refresh block, and the remaining super blocks are non-refresh blocks. In the present invention, the macro-block is divided into the refresh block and the non-refresh blocks, as is illustrated at (b) in FIG. 102. Then, the DCT coefficients of the refresh block only are divided into low-frequency coefficients $Y_{LF}$, $U_{LF}$ and $V_{LF}$ and high-frequency coefficients $Y_{HF}$, $U_{HF}$ and $V_{HF}$, as is shown at (c) in FIG. 102. Further, as is shown at (d) in FIG. 102, only the low-frequency coefficients of the refresh block are combined into a trick block, and the high-frequency coefficients of the refresh block and the non-refresh blocks are added, forming a non-trick block.

Four methods are available for dividing the DCT coefficients of the refresh block into low-frequency coefficients and high-frequency coefficients, as will be described in Chapter 36 with reference to FIGS. 105 to 108. The circuits used to divide the DCT coefficients, and the operation of these circuits will be described in detail in Chapters 36 to 38. The code amount control, described in Paragraph 10.3, Chapter 10 need not be performed in this case.

36. Coefficient Division Switching Circuit

Figure 103:
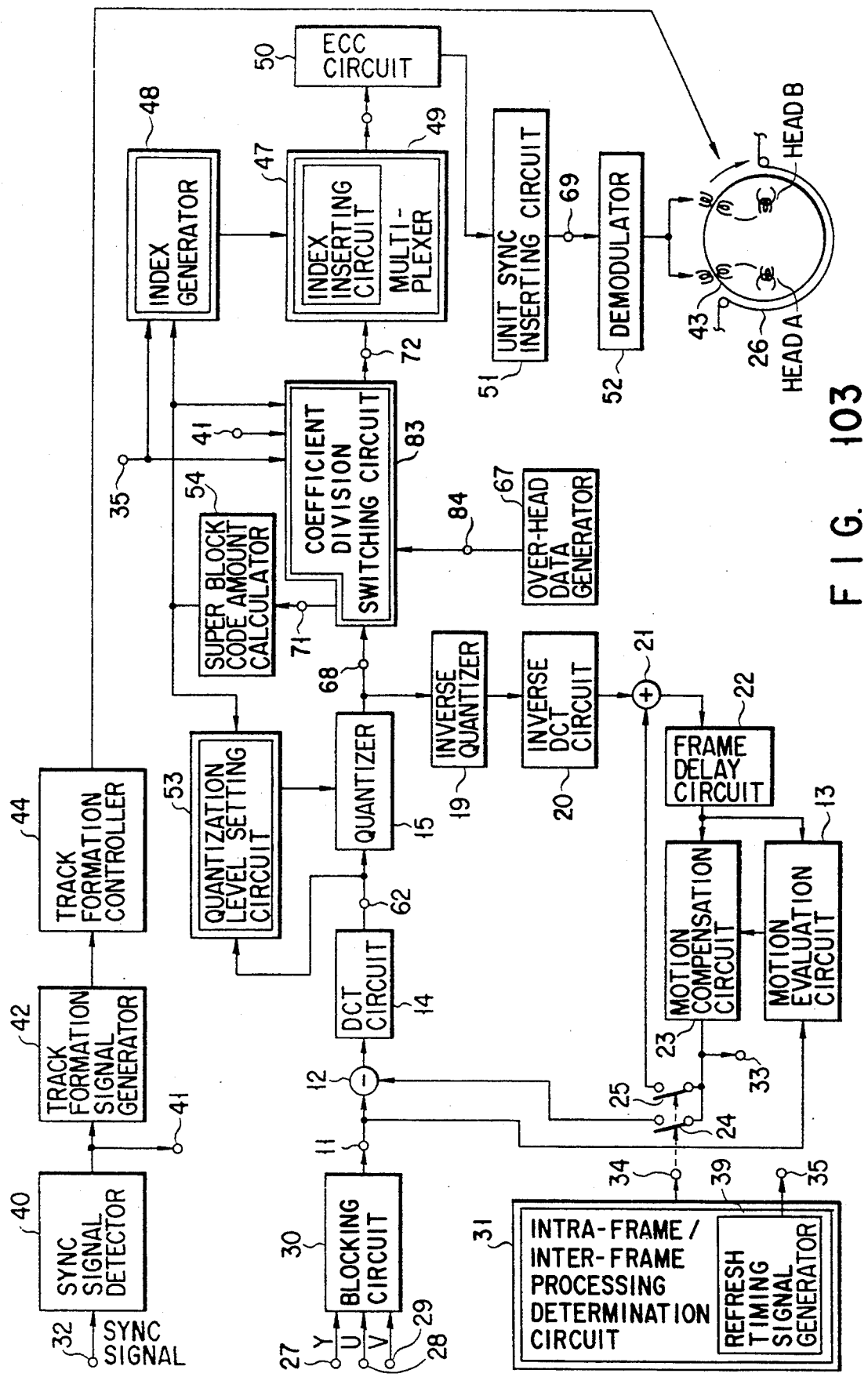
FIG. 103 is a block diagram showing another band compression signal processor according to the present invention, which has a coefficient-division switching circuit in the encoder side.

FIG. 103 is a block diagram illustrating an embodiment of the present invention, in particular the connection of the components. This embodiment is applied to the encoder side of a band compression signal processor. Nonetheless, it can be applied to the decoder side of the processor, provided that necessary signals are obtained from the output of the variable length decoding circuit of the decoder or from any other internal component.

Figure 104:
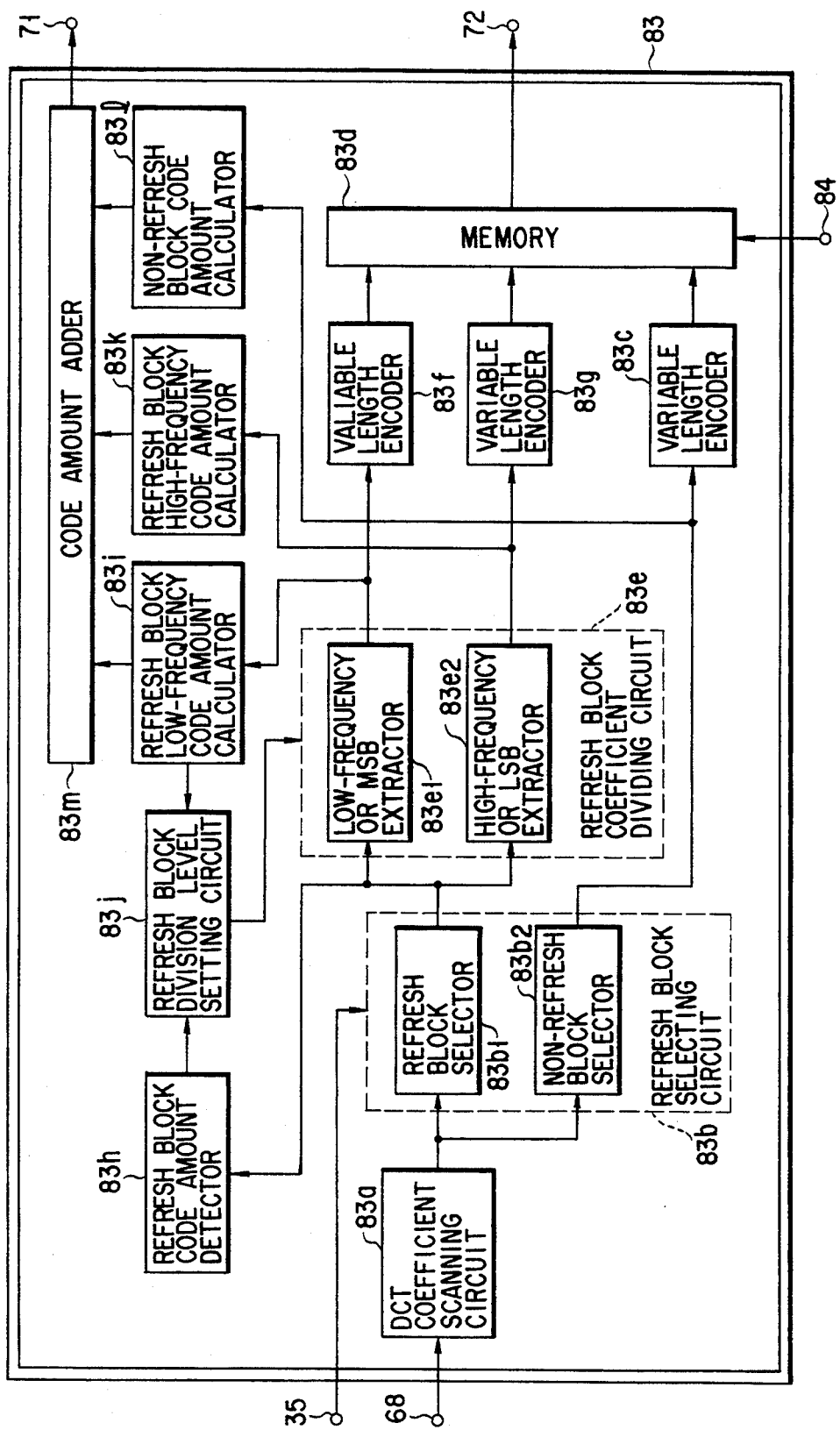
FIG. 104 is a block diagram showing, in detail, the coefficient-division switching circuit.

FIG. 104 is a block diagram showing, in detail, the coefficient division switching circuit 83 shown in FIG. 103. First, the signal output by a quantizer 15 is input to a zigzag scanning circuit 16a. The circuit 16a rearrange 8×8 DCT coefficients by the scanning method which has been explained with reference to FIG. 18.

The coefficient division switching circuit 83 performs the same function as the code switching circuit 45 which has been described with reference to FIG. 9. More precisely, the circuit 83 is designed to record the signals defining refresh blocks in prescribed regions on a magnetic tape. Especially, in the present invention, the circuit 83 divides the code of a refresh block into portions so that the MSB or low-frequency component is reduced to such a code amount that it may be recorded in a predetermined region.

The output of a DCT coefficient scanning circuit 83a is supplied to a refresh block selector 83b1 and a non-refresh block selector 83b2. The selector 83b1 selects refresh blocks from the input, whereas the selector 83b2 selects non-refresh blocks from the input. The non-refresh blocks selected by the selector 83b2 are supplied to a variable length encoder 83c. The encoder 83c converts the non-refresh blocks into variable length codes. The codes, thus formed, are temporarily stored in a memory 83d, as in the conventional band compression signal processor.

The refresh block coefficient dividing circuit 83e, which is shown in FIG. 104, comprises a low-frequency or MSB extractor 83e1 and a high-frequency or LSB extractor 83e2. Both extractors are connected to the output of the refresh block selector 83b1. The signals output by the extractors 83e1 and 83e2 are stored into the memory 83d through variable length encoders 83f and 83g, respectively. The MSB extractor 83e1 extracts the MSB or low-frequency codes from the refresh blocks supplied from the selector 83b1, by the method which will be explained later in detail. Thus, the code amounts of the refresh blocks is reduced to such a value which can be reproduced in a special VTR reproduction mode.

The memory 83d rearranges the low-frequency (or MSB) components of the refresh blocks, so that these components may be reproduced in a special reproduction mode.

It will now be described the coefficients of the refresh blocks are divided.

Before the method of dividing the coefficients is explained, the features of the refresh blocks of the known type will be described:
1) The refresh block is a super block which has been intra-frame-processed.
2) The super block includes 8 luminance signal blocks and 2 chrominance signal blocks. The DC components of the 8 luminance signal blocks are subjected to differential pulse-code modulation (DPCM) and thereby converted into Huffman codes.

3) The AC component of each luminance signal, and each chrominance signal are converted into Huffman codes by means of zigzag-scanning.

There are four methods of dividing refresh blocks. These methods will be explained, with reference to FIGS. 105 to 108. Note that non-refresh blocks are not divided in the present invention, and are processed in the same way as in the conventional band compression signal processor.

Like FIGS. 22 and 23, FIGS. 105 to 108 show DCT coefficients plotted on the abscissa and arranged in a zigzag scan sequence, and the number of quantizing bits on the ordinate. Shown at (a) in FIGS. 105, 106, 107 and 108 are the numbers of quantizing bits which have yet to be divided. The quantization level j of these bits is 0, that is, j=0.

Figure 105:
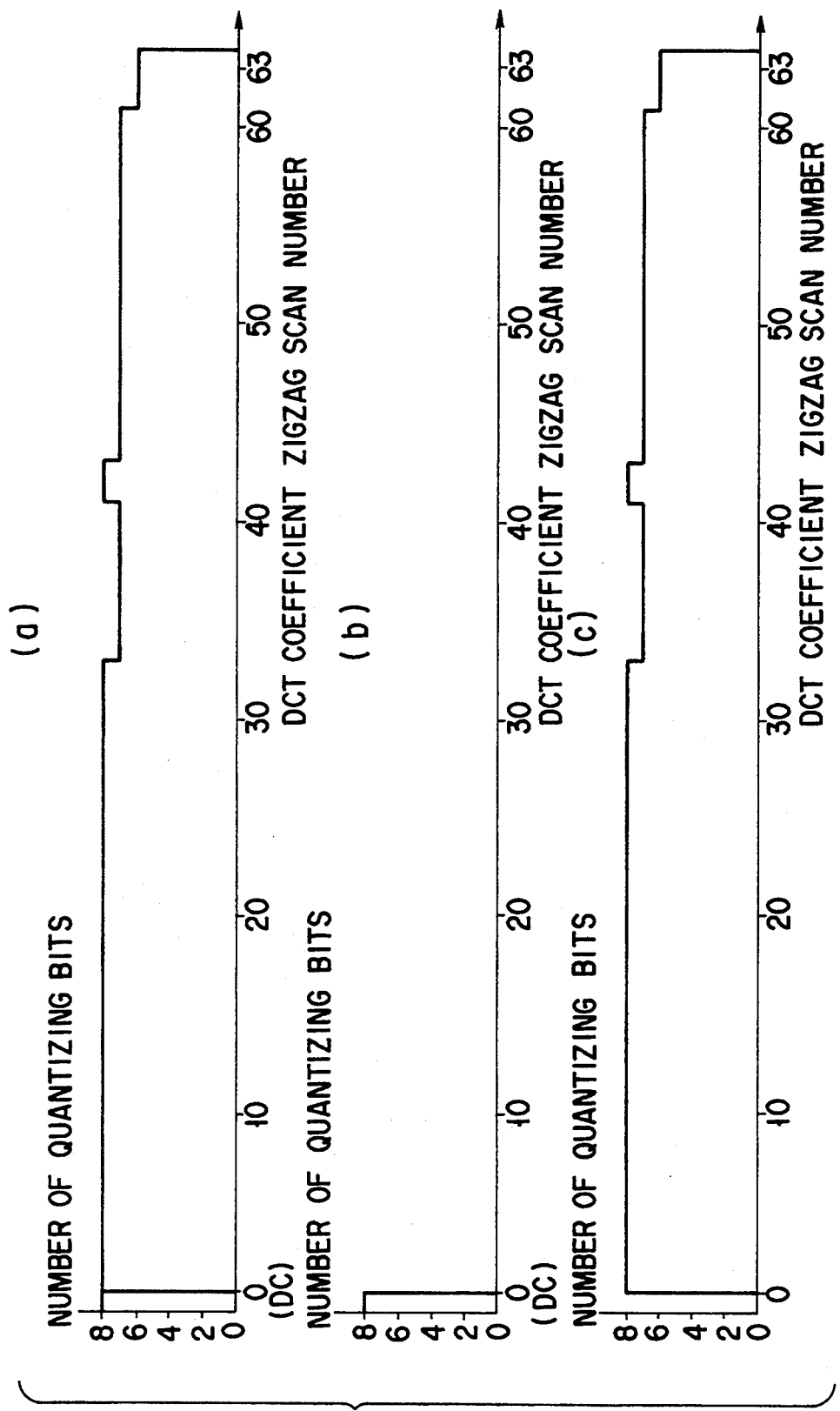
FIG. 105 is a chart representing the relationship between the DCT coefficient zigzag-scanning number and the quantized bit number.

The first method is to divide each refresh block into a DC component and an AC component, as is shown in FIG. 105. More specifically, the code shown at (a) in FIG. 105 is divided into a DC component shown at (b) in FIG. 105 and an AC component shown at (b) in FIG. 105. The DC component is encoded so that it may be recorded in a trick sector. The "trick sector" is any of the sectors forming a track of the magnetic tape, from which data will be reproduced in a special reproduction mode.

One of the methods which require least alteration of the conventional processor is to record only the DC component of a luminance signal on a trick sector. The remaining codes shown at (c) in FIG. 105 are recorded in the region other than the region indicated at (b) in FIG. 105. (In the conventional processor, the DC component is quantized with identical bits, and data showing the number of quantizing bits need not be added.)

If the code amount of the refresh block DC component is greater than the maximum code amount which can be recorded in the trick sector of the magnetic tape, the MSB bits of the DC component may be transmitted together with additional data showing the quantization level.

Figure 106:
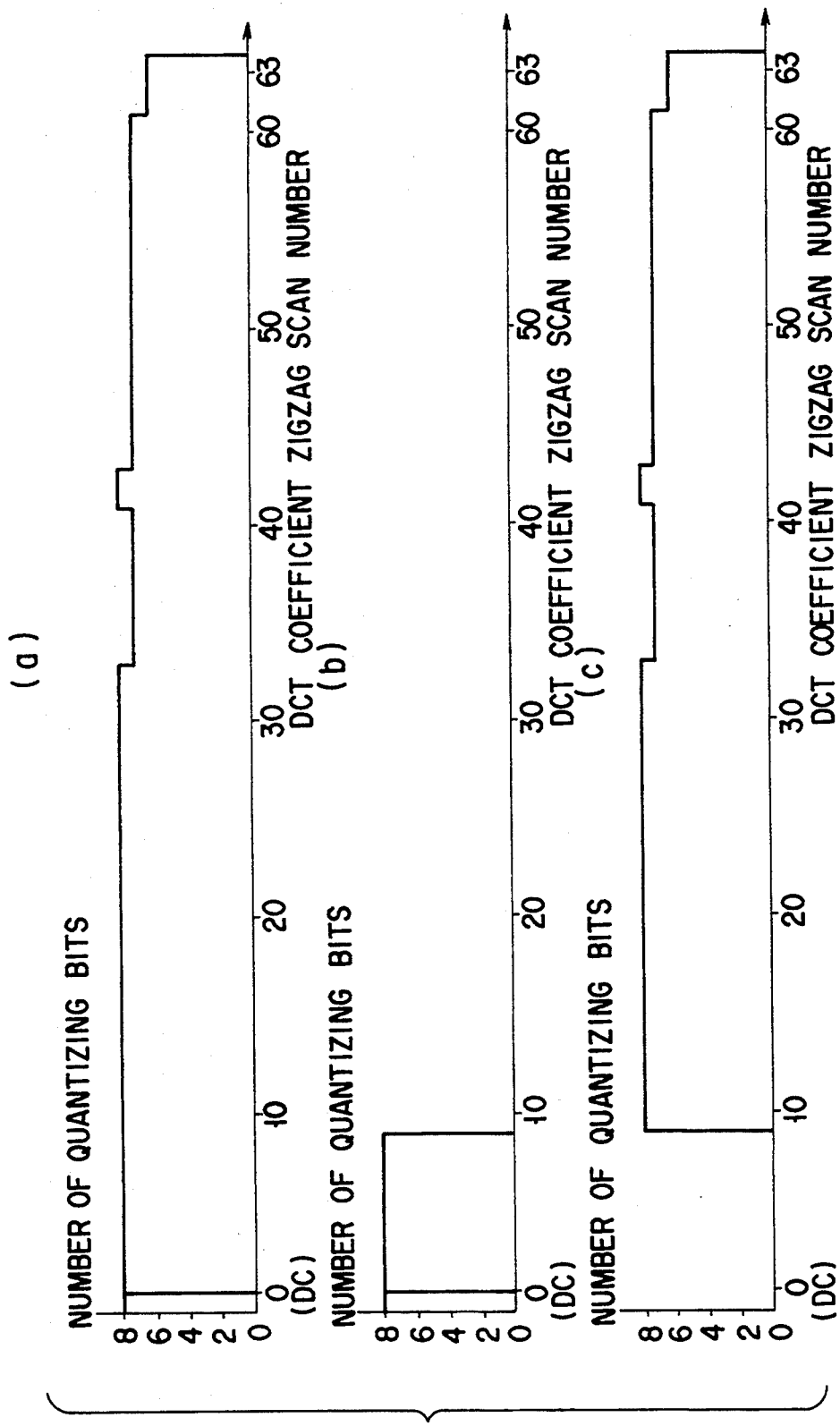
FIG. 106 is also a chart representing the relationship between the DCT coefficient zigzag-scanning number and the quantized bit number.

The second method is to divide each refresh block into a low-frequency component shown at (b) in FIG. 106 and a high-frequency component shown at (c) in FIG. 106. The non-refresh blocks are not divided at all. In the second method, the DC component and low-frequency AC component of the refresh block, both shown at (b) in FIG. 106, are recorded in the trick sector of the track, and the high-frequency component of the refresh block and the codes of the non-refresh blocks are recorded in the other sectors (i.e., non-trick sectors) of the track. The AC component shown at (b) in FIG. 106 is transmitted in the form of a block code, by means of zigzag scanning and then by adding an EOB (End-of-Block) code to the block codes.

In the case of (b) in FIG. 106, EOB is inserted at the end of the 9th zigzag AC component.

The high-frequency AC component shown at (c) in FIG. 106 will be described. Since the low-frequency AC component shown at (b) in FIG. 106 has been already transmitted, that portion of the high-frequency AC component which corresponds to the low-frequency AC component has an amplitude of 0. Thus, the high-frequency AC component is converted into a Huffman code showing an amplitude defined by non-zero coefficients, after a Huffman code representing consecutive 0's has been assigned to the portion corresponding to the low-frequency AC component.

In the normal reproduction mode or the slow reproduction mode, the low-frequency component recorded in the trick sector and the high-frequency components recorded in the non-trick sectors are synthesized, reproducing an image having high resolution. These components are synthesized by converting both types of components into Huffman codes and arranging these Huffman codes during the inverse zigzag scanning, thereby obtaining DCT coefficients.

In the fast reproduction mode, the low-frequency component of the refresh block is reproduced from the trick sector, and an image is reproduced at high speed from the low-frequency component. The image, thus reproduced, has but low resolution, inevitably because the high-frequency AC component is not used. However, this does not matter at all, in selecting and retrieving the image.

Figure 107:
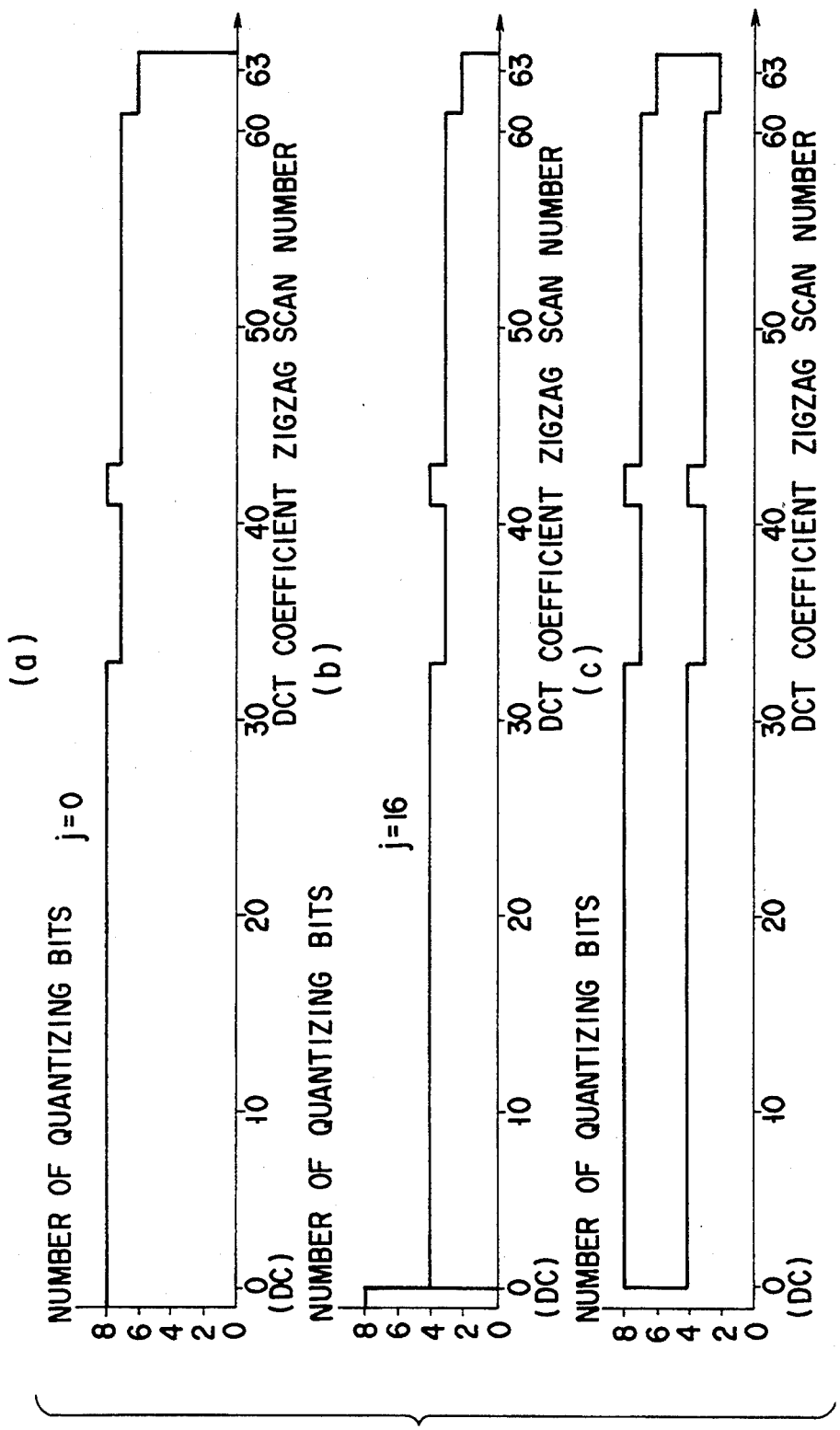
FIG. 107 is still another chart representing the relationship between the DCT coefficient zigzag-scanning number and the quantized bit number.

The third method is to record the MSB component of a code on the trick sector. In the conventional method of preparing a quantization table, a weighting coefficient is first applied to a refresh block, and quantization scale data is then applied thereto. The quantization level j corresponding to the quantization scale data is transmitted. By contrast, in the present invention, the code at the quantization level j (=0), which is shown at (a) in FIG. 107, is Huffman-decoded, and DCT conversion coefficients are obtained. There after, the quantization level j is set at a great value, so that the MSB component of a code may be quantized.

More specifically, the input code at the quantization level j of 0 (j=0) is converted to a code at the level j of 16 (j=16), which is recorded in the trick sector, as is illustrated at (b) in FIG. 107. The quantization level j (=16) is recorded in the trick sector, too. The code recorded in the trick sector is equivalent to a code obtained by coarsely quantized the original image. Hence, the code at the level j of 16 represents the MSB component of the code at the level J of 0, as can be understood from the comparison between (a) and (b) in FIG. 107.

The code shown at (c) in FIG. 107 corresponds to a difference between the level j of 0 and the level j of 16, and represents the LSB component of the code at the level of 0. This code is converted into a Huffman code. The Huffman code, thus obtained, is recorded in the sectors other than the trick sector in which the code at the level j of 16 is recorded.

In the normal reproduction mode or the slow reproduction mode, the code shown at (b) in FIG. 107 is reproduced from the trick sector, while the code shown at (c) in FIG. 107 is reproduced from other sectors. These codes are combined, forming an image having little quantization noise. In the special reproduction mode, only the code obtained by coarse quantization is reproduced from the trick sector. Although this code has much quantization noise, it does not cause no problems in selecting and retrieving the image.

Figure 108:
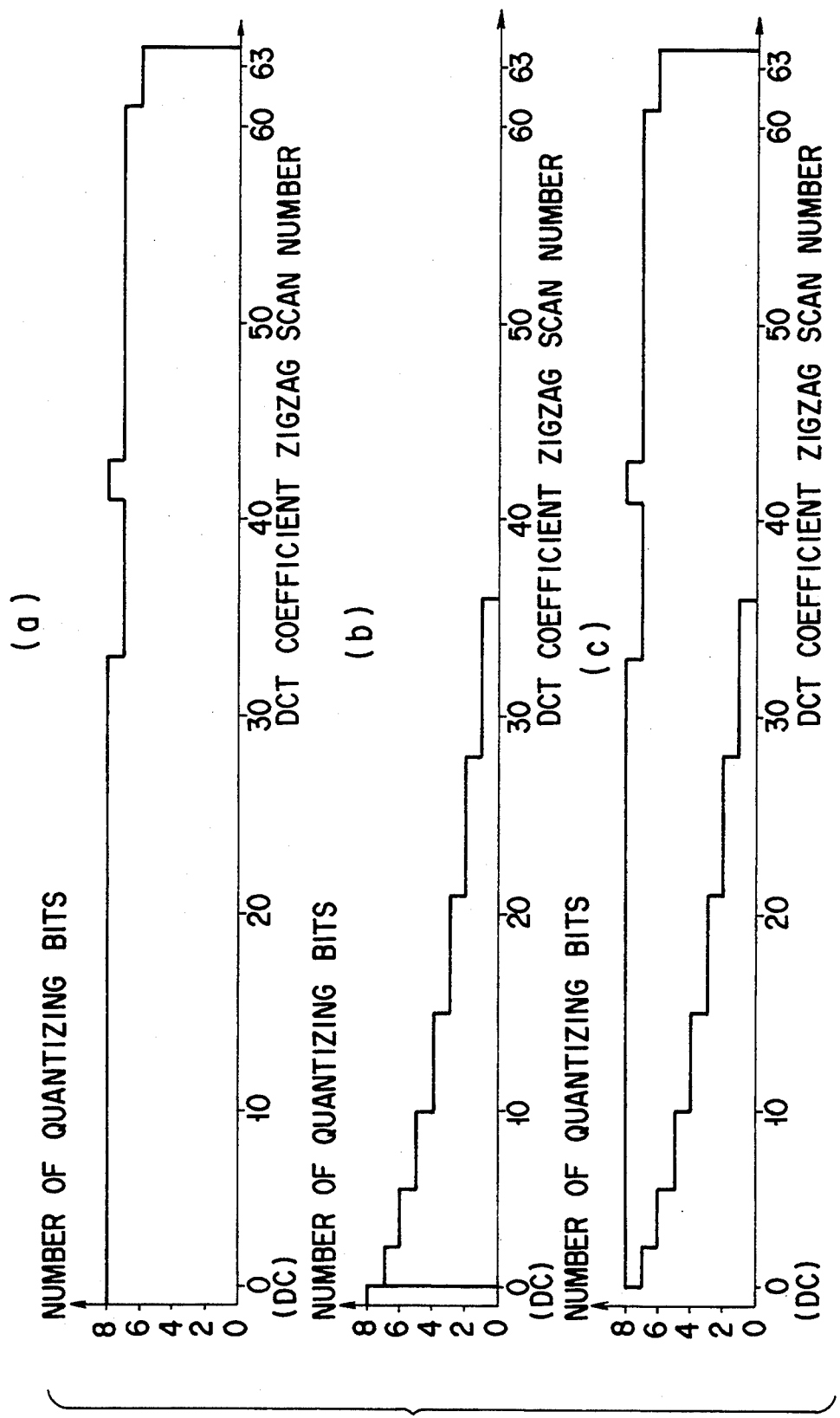
FIG. 108 is another chart representing the relationship between the DCT coefficient zigzag-scanning number and the quantized bit number.

The fourth method is to record the MSB component of a code, in low-frequency region, on the trick sector. Shown at (b) in FIG. 108 is the distribution of the numbers of quantizing bits (i.e., a quantization table). An input refresh block is minutely quantized in low-frequency region, and coarsely in high-frequency region.

A code (shown at (b) in FIG. 108), using a quantization table for fast reproduction, is recorded in the trick sector of the track. In the meantime, a code shown at (c) in FIG. 108 is formed, which represents the difference between the input code and the code, shown at (a) and (b) in FIG. 108, respectively. This code and the codes of non-refresh blocks are recorded on the sectors other than the trick sector in which the code shown at (b) in FIG. 108 is recorded. Due to the use of the quantization table described above, it is possible to reproduce an image slightly better in quality than the image reproduced by the second method, despite the limited amount of codes generated.

The encoding technique used in the fourth method is similar to the technique employed in the third method. Namely, a code is formed by using the quantizing-bit distribution illustrated at (b) in FIG. 108, and are recorded in the trick sector. The code shown at (c) in FIG. 108 is converted into a Huffman code, which is recorded in a sector other than the trick sector.

As has been described above, the code of a refresh block is divided into a low-frequency or MSB component and a high-frequency or LSB component, and the low-frequency or MSB component is recorded in the trick sector. The trick block can therefore be reproduced at high speed, with high reliability. Thus, the image reproduced in the special reproduction mode has an improved quality.

The coefficient division switching circuit 83 is shown in FIG. 104. In FIG. 104, the components which are identical or similar to those incorporated in the conventional switching circuit are denoted at the same reference numerals. The circuit of FIG. 104 is the least possible modification of the prior-art switching circuit. Needless to say, any changes can be made, without departing the scope of the present invention.

The gist of this invention is to divide a refresh block into components, which block is one of those to be intra-frame processed for f frames forming one whole image, so that the code amount of an MSB or a low-frequency component is limited enough to be reproduced from a recording medium such as a VTR. To attain this gist, the code amount of the low-frequency or MSB component of the refresh block is independently calculated, and the division level of the block is determined from the calculated code amount. Four methods of dividing the code are available. In each of these methods, the code amount of the low-frequency or MSB component can be controlled. For the simplicity of description, it will be described how to divide the codes into low-frequency ones and high-frequency ones, with reference to FIG. 106.

The refresh block code amount detector 83$h$, the refresh block low-frequency code amount calculator 83$i$, and the refresh block division level setting circuit 83$j$ play major roles in dividing the codes into low-frequency ones and high-frequency ones.

Each input refresh block is input from the refresh block selecting circuit 83$b$ to the refresh block code amount detector 83$h$. In the detector 83$h$, the number of consecutive 0's in the DCT coefficient of the refresh block is detected, and detects the amplitude of the non-zero coefficient of the refresh block is also detected. The number of consecutive 0's and the amplitude of the non-zero coefficient are input to a ROM storing such a table as is illustrated in FIG. 37, whereby the code amount of the refresh block is calculated. The code amount is supplied to the refresh block division level setting circuit 83$j$.

In the refresh block division level setting circuit 83$j$, the code amount is compared with a target low-frequency code amount for the refresh block. The circuit 83$j$ sets a division level appropriate for the refresh block, based on the difference between the calculated code amount and the target low-frequency code amount, and outputs a signal representing the division level. The division level signal is input to the refresh block coefficient dividing circuit 83$e$. The target low-frequency code amount may be the same for every refresh block.

In order to enhance the accuracy of controlling the low-frequency code amount, it suffices to utilize the refresh block low-frequency code amount calculator 83$i$. The calculator 83$i$ calculates the low-frequency code amount which each refresh block has for a predetermined period of time.

As VTR servo means, the head scanning may be carried out only once (i.e., $c=1$) per frame, without using DTF, thereby to record a video signal and reproduce it in, for example, the double-speed reproduction mode ($i=2$). In this instance, the code amounts of the refresh blocks must be calculated for every $1/c \times i$ ($=\frac{1}{2}$) region of a one-frame image. How to calculate these code amounts will be explained below.

Assume that the code amount of the refresh blocks is the maximum amount $\alpha$ which can be recorded in p tracks by one scanning operation. The refresh block division level setting circuit 83$j$ sets such a division level that the code amount for half a frame (i.e., $\frac{1}{2}$ frame) may be equal to or less than $\alpha/c \times i = \alpha/2$.

FIG. 39 is a graph explaining how the quantization level is set in accordance with the signal output by the refresh block low-frequency code amount calculator 83$i$. In this case, the average amount of codes per frame is recorded by one VTR scanning, and the recorded data is reproduced in the double-speed reproduction mode. Since each frame consists of 240 refresh frames, 120 refresh blocks are recorded on one sector. The amount of data which can be recorded on sectors $S_0$ and $S_1$ on the magnetic tape is limited. Hence, the code amount of refresh blocks $G_n(0)$ and $G_n(1)$ must be limited to such an amount as can be recorded on sectors $S_0$ and $S_1$.

In FIG. 39, the abscissa indicates refresh block numbers. The refresh block numbers corresponding to sectors $S_0$ and $S_1$ are shown since, as has been described, the refresh blocks of one frame are recorded on two sectors $S_0$ and $S_1$. In this case, 120 refresh blocks are set so as not to exceed the maximum code amount $\alpha/2$ which can be recorded on one sector.

In FIG. 39, the ordinate indicates the code amounts of the refresh blocks. As has been described, the maximum code amount is $\alpha/2$. Assume that $\alpha/2$ is 250 Kbits. The solid line C shown at (a) in FIG. 39 represents the target code amount of a refresh block. A generation amount of codes is controlled so as not to exceed this line C. The solid line C is no more than an example, and it need not be straight. Only is it required that the generation amount of codes per sector be limited to $\alpha/2$ or less. The polygonal line D represents changes in the amount of accumulated refresh block codes. The line D corresponds to a signal output from the refresh block low-frequency code amount calculator 83$i$. A division level is set at such a value as not to make the code amount exceed the target code amount (the line C).

The output of the refresh block code amount detector 83$h$ is input to the refresh block division level setting circuit 83$j$. The code amount of each refresh block is compared with the target code amount per refresh block. A division table is selected in accordance with the difference between the actual code amount and the target code amount, so that the actual code amount may not exceed the target code amount.

In order to divide the codes into low-frequency ones and high-frequency ones as is illustrated in FIG. 106, the position at which to divide the codes must be determined by zigzag-scanning the coefficients for determining the division level, one after another. This operation will be described in detail, with reference to FIG. 39.

Shown at (b) in FIG. 39 is a graph with its abscissa shown magnified. With reference to this graph, it will be explained how to determine a division level for refresh blocks No. 80 and No. 81. Assume that the refresh block low-frequency code amount calculator 83$i$ has already calculated the code amounts of refresh blocks up to refresh block No. 80, that the code amounts calculated are of the values indicated by E at (b) in FIG. 39, and that the target code amount of refresh block No. 81 is of the value indicated by F at (b) in FIG. 39.

The signal input to the refresh block low-frequency code amount calculator 83$i$ is the signal output by the refresh block code amount detector 83$h$, which a coefficient obtained by subjecting a refresh block to DCT process. Hence, the generation amount of codes of the refresh block can be obtained.

Assume that the low-frequency code amounts of the zigzag scan numbers $\delta=6, 7, 8$ and $9$ (FIG. 18) corresponding to refresh block division levels become J, I, H, and G shown at (b) in FIG. 39, zigzag scan number $\delta=7$ is selected since this scan number has code amount I which does not exceeds the target value F. The low-frequency code amount of the refresh block can thereby be controlled to an amount which can be recorded on the trick sector. Hence, high-quality images can be obtained even in the fast reproduction mode.

The present invention is not limited to the embodiments described above. Various changes and modifications can be made without departing the scope and spirit of the invention.

37. Bit Stream Structure at Code Division

To form (non-) trick blocks as is illustrated in FIG. 102, the bit stream structure is changed in the following manner:

(1) In FIGS. 45, 46, 48 to 52, 55, 56, and 59 to 61:

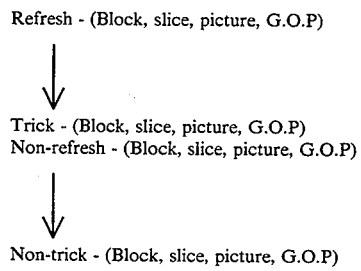

Figure 111:
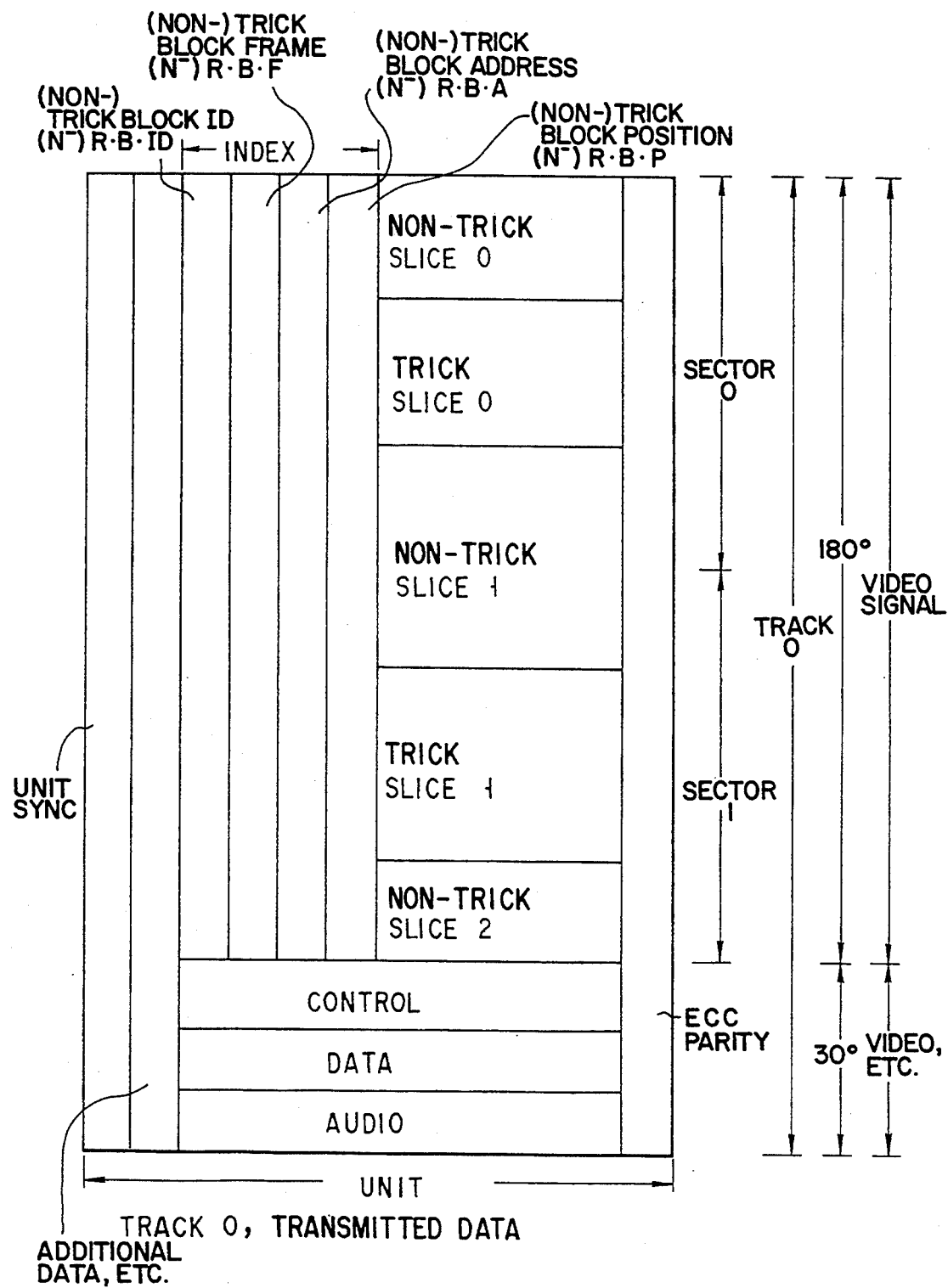
FIG. 111 is a chart showing the data multiplex format of the VCR, defined by (non-) trick blocks.

The structure shown in FIG. 52 is changed finally to the form illustrated in FIG. 111.

(2) In FIGS. 43, 53, 59, and 64:

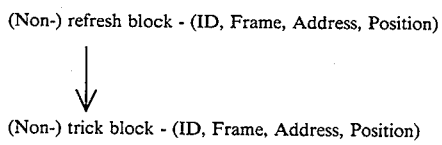

Figure 109:
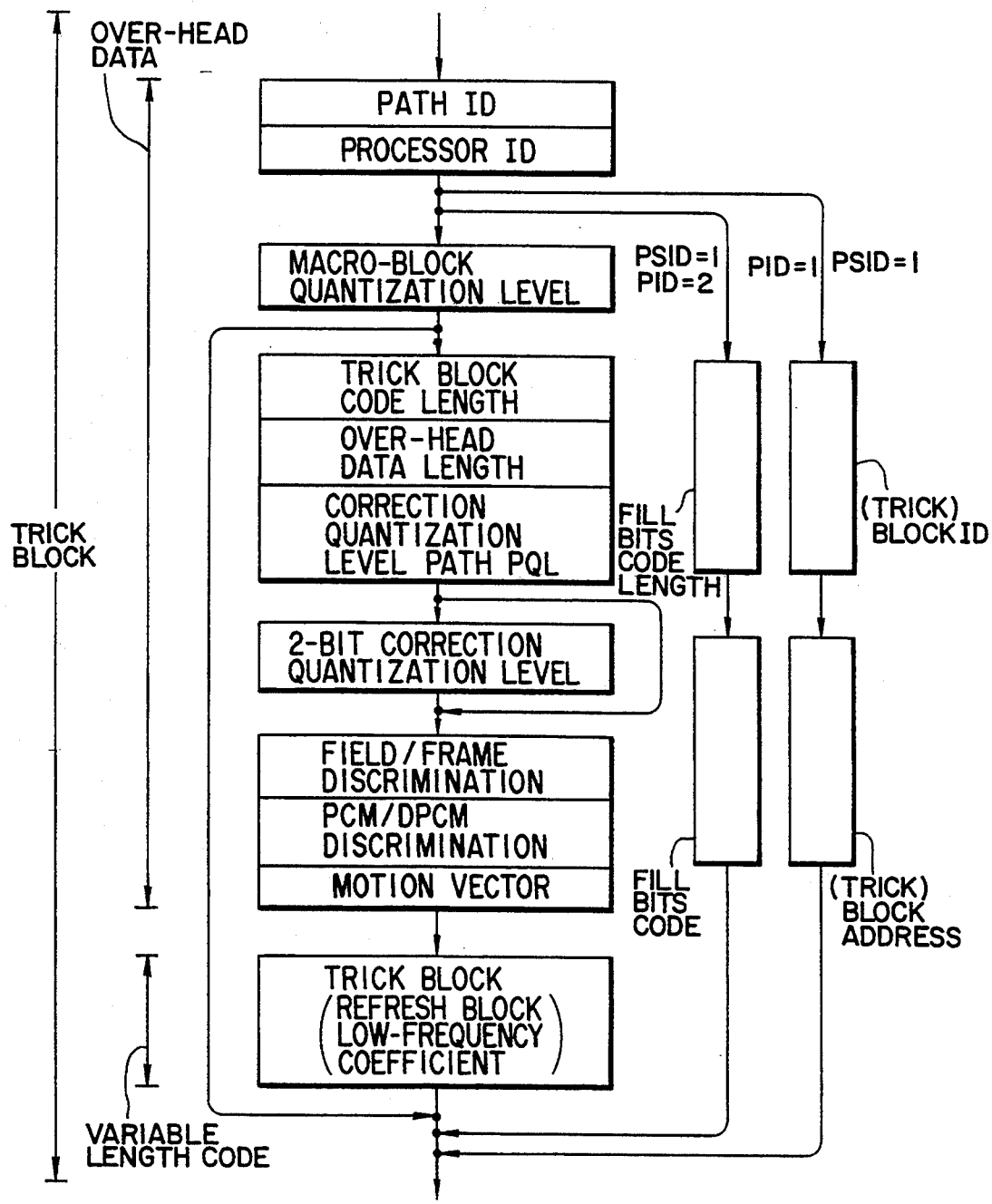
FIG. 109 is a diagram illustrating the bit stream structure of trick blocks.

(3) In FIG. 45, the trick block bit stream is changed to the form shown in FIG. 109.

Figure 110:
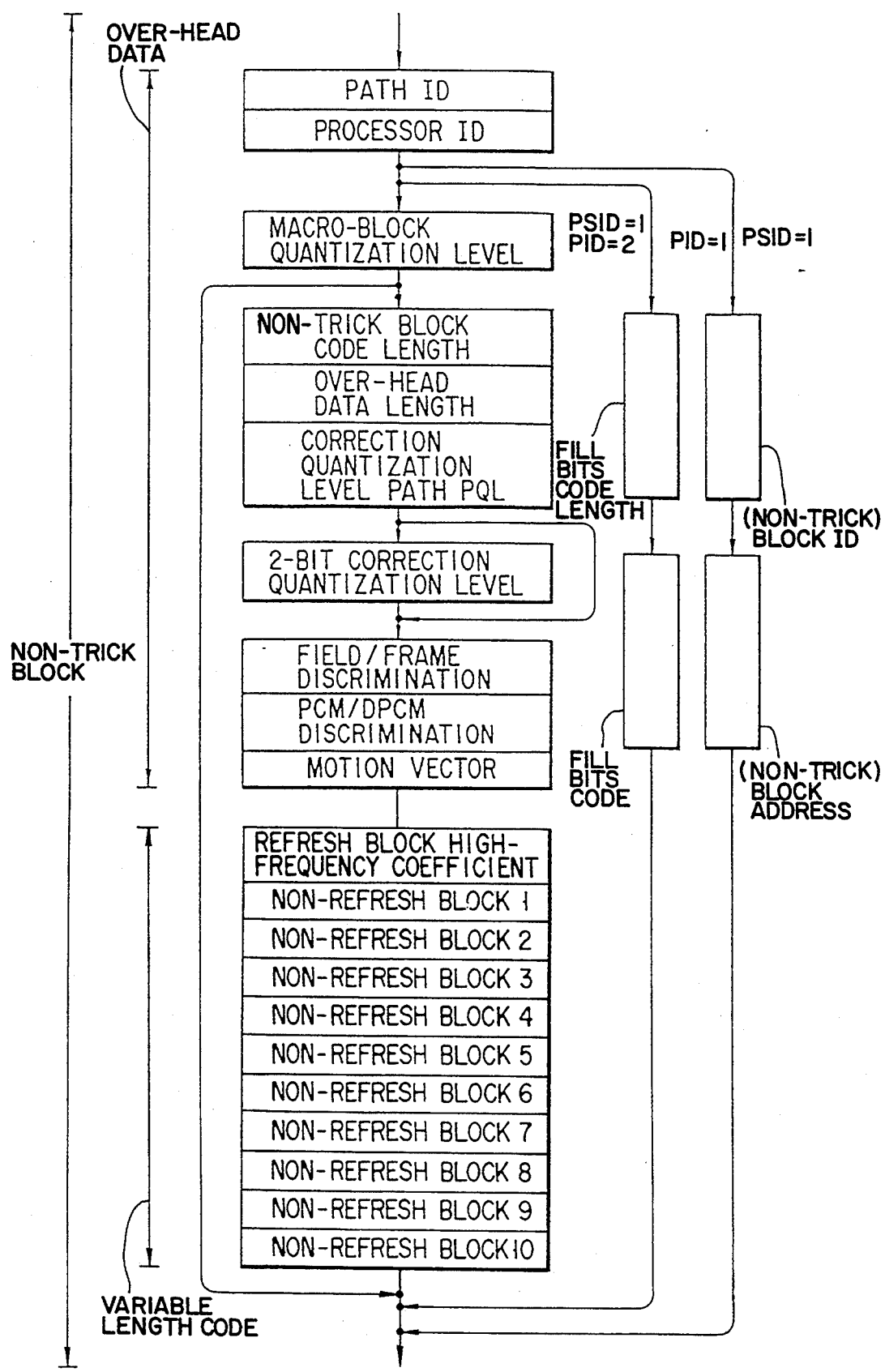
FIG. 110 is a diagram illustrating the bit stream structure of non-trick blocks.

(4) In FIG. 46, the non-trick block bit stream is changed to the form shown in FIG. 110.

Along with the changes described above, the description in Chapters 13 to 23, Chapter 25 and Chapter 28 are changed.

Chapter 24, "Code switching circuit," is changed to Chapter 36, "Coefficient division switching circuit." Also, Chapter 27, "Code re-switching circuit," is changed to Chapter 38, "Code synthesis re-switching circuit."

38. Code Synthesis Re-switching Circuit

Figure 112:
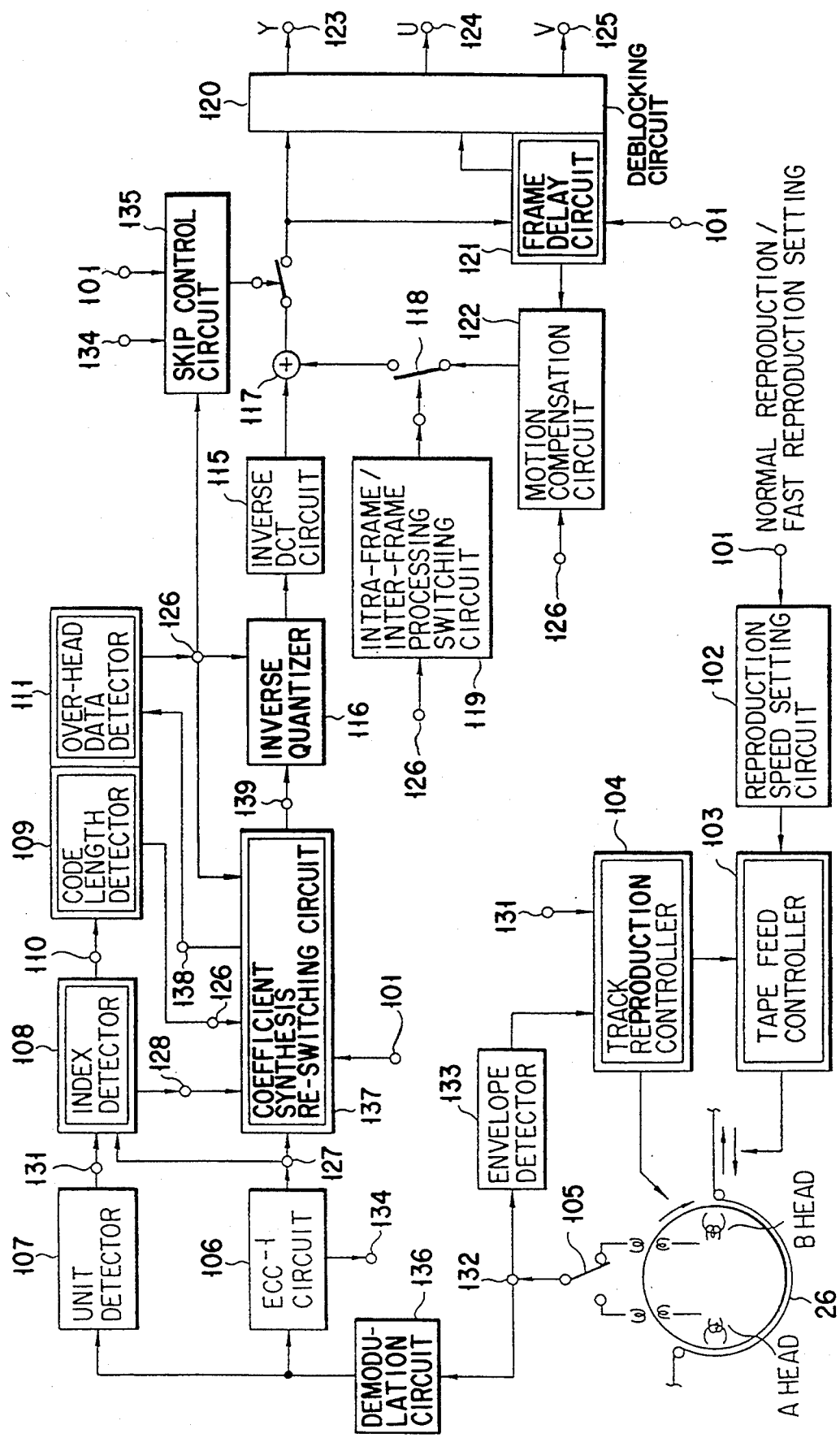
FIG. 112 is a block diagram showing still another band compression signal processor according to the present invention, which has a coefficient-synthesis re-switching circuit in the decoder side.
Figure 113:
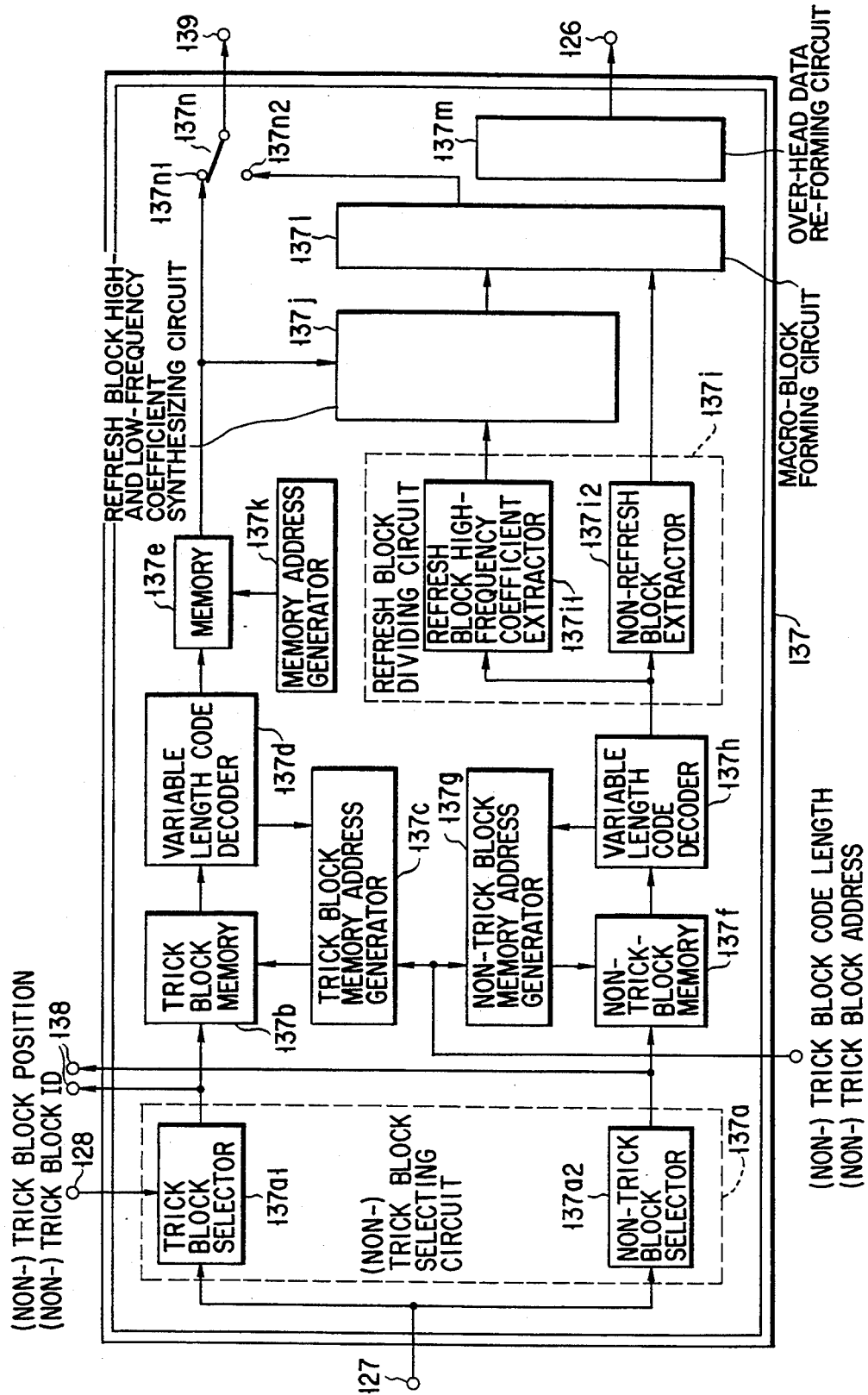
FIG. 113 is a block diagram illustrating, in detail, the coefficient-synthesis re-switching circuit.

The coefficient synthesis re-switching circuit 137 shown in FIG. 112 will be described, with reference to FIG. 113. A signal represented by VCR Data Multiplex Format is input to a (non-) trick block selecting circuit 137$a$. The circuit 137$a$ divides the signal into the codes of trick blocks and the codes of non-trick blocks, by using a (non-) trick block position signal and a (non-) trick block ID. The codes of the trick block have the bit stream shown in FIG. 109.

An over-head data detector 111 (FIG. 112) detects vertical ID, a quantization level, a field/frame discrimination signal, a trick block code table, and a trick block address. The variable length code of a trick block shown in FIG. 109 is selected by a trick block selector 137$a$1 and is stored into a trick block memory 137$b$.

At the time the variable length code is stored into the trick block memory 137$b$, a trick block memory address generator 137$c$ generates an address from the trick block address signal, the vertical ID and the trick block code length. To read data from the memory 137$b$, the trick block memory address generator 137$c$ uses the signal fed back from a variable length code decoder 137$d$, as well as the signal has been used to write data into the memory 137$b$. The variable length code is decoded, and the bit stream is compared with the Huffman table, thereby determining a dividing point in the code. The variable length code is decoded by feeding back the signal output by the variable length code decoder 137$d$.

The trick block code, which has undergone variable length decoding, is stored into a memory 137$e$, and is set in phase with the address of the non-trick block code in the normal reproduction mode.

The non-trick block selector 137$a$2 of the (non-) trick block selecting circuit 137$a$ outputs a non-trick block code, which is input to the over-head data detector 111 and also to a non-trick block memory 137$f$. The detector 111 detects the over-head data of the non-trick block, i.e., a channel ID, a non-trick block code length, a quantization level, field/frame discrimination, PCM/DPCM discrimination, and a motion vector.

The non-trick block memory 137$f$ stores the variable length code illustrated in FIG. 110. To write this code into the non-trick block memory 137$f$, a non-trick block memory address generator 137$g$ generates an address from a non-trick block address signal, a non-trick block code length, a channel ID, and the frame count reproduced from the trick block. To read data from the non-trick block memory 137$f$, the non-trick block memory address generator 137$g$ uses the signal fed back from a variable length code decoder 137$h$, as well as the signal used to write data into the memory 137$f$.

The signal output by the variable length code decoder 137h is input to a refresh block dividing circuit 137i.

A non-refresh block is of the non-trick block structure shown in FIG. 110. A refresh high-frequency code and a non-refresh block are separated by counting an EOB.

The output of the refresh block dividing circuit 137i, i.e., a refresh high-frequency coefficient, and the output of the memory 137e, i.e., a refresh low-frequency coefficient, are input to a refresh block low/high-frequency coefficient synthesizing circuit 137j. To perform this operation, a memory address generator 137k generates a necessary address.

The circuit 137j performs synthesis which is an operation of (c)→(b) shown in FIG. 102. More precisely, low-frequency codes and high-frequency codes are sequentially located in the order of the zigzag scanning, thereby forming codes of refresh blocks.

A macro-block forming circuit 137l combines the non-refresh blocks extracted by the refresh block dividing circuit 137i with the refresh block, thereby synthesizing a macro-block. The forming of the macro-block is an operation of (b)→(a) shown in FIG. 102. More precisely, the refresh block and the non-refresh blocks are sequentially arranged, thereby forming a macro-block.

An over-head data re-forming circuit 137m re-form over-head data from the output of the over-head data detector 111.

41. Block Address Generator

Figure 114:
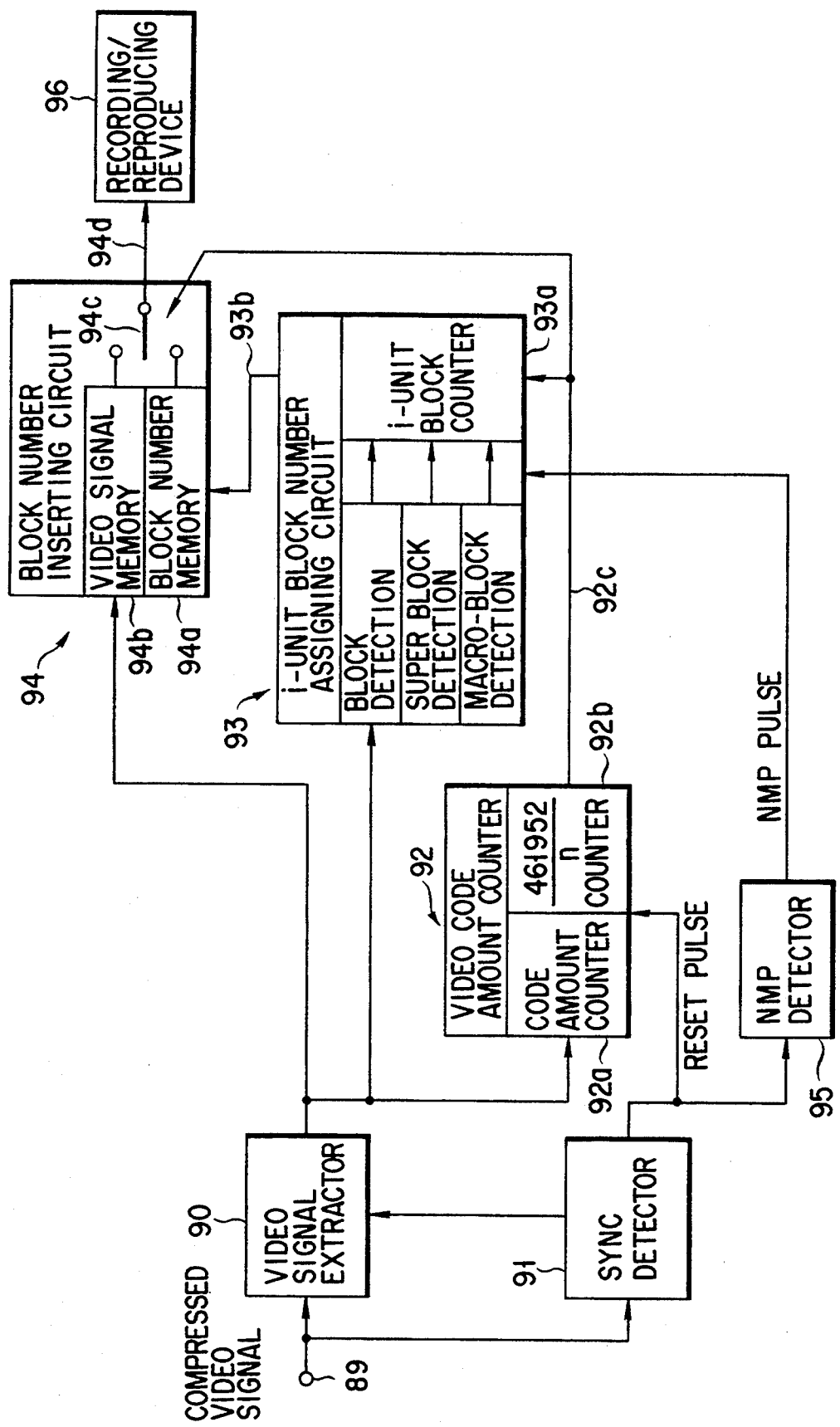
FIG. 114 is a block diagram showing a modification of the encoder side of the band compression signal processor.
Figure 120:
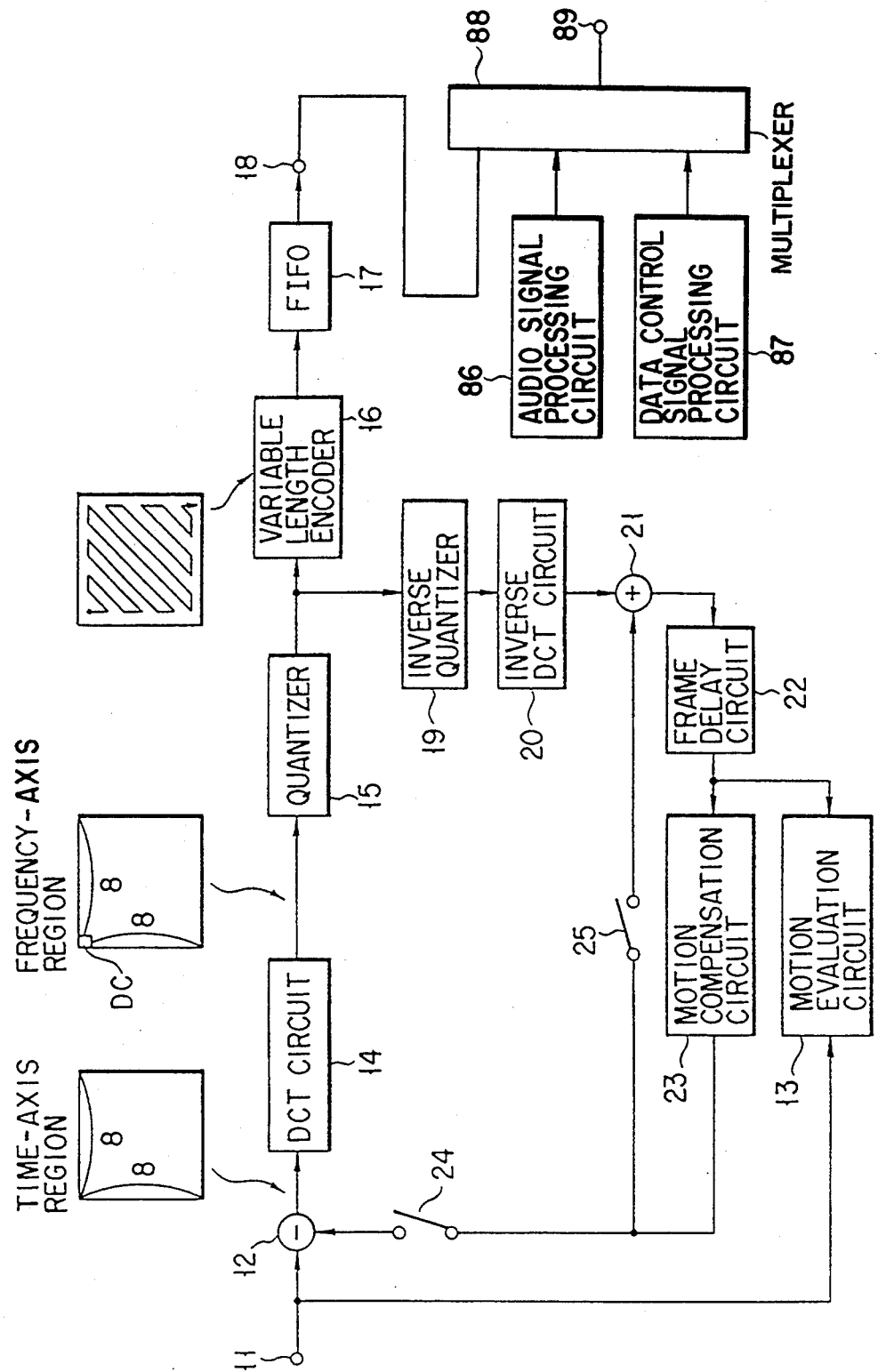
FIG. 120 is a block diagram illustrating another band compression signal processor according to the present invention.

Another embodiment of the invention will now be described, with reference to FIG. 114. A recorded signal (i.e., a band-compressed video signal) is supplied from the multiplexer 88 (shown in FIG. 120) to an input terminal 85. The multiplexer 88 is same as the multiplexer 49 in FIG. 49. The signal output by the multiplexer 88 is of the format shown in FIG. 2. In this format, 392 bits of video signal are allotted to the first line, and 440 bits of video signal to each of the second to 1050th lines. Hence, the first line to the 1050th line can contain 461,952 bits.

An input signal is supplied from the input terminal 89 to a video signal extractor 90 and also to a sync detector 91. The sync detector 91 detects a sync signal (24 bits), and supplies a timing signal to the video signal extractor 90. In response to the timing signal, the video signal extractor 90 extracts a video signal for each line. The video signal, which is identical to the signal output by the FIFO circuit 17 (FIG. 120), is supplied to a video code amount counter 92, to an i-unit block number assigning circuit 93, and to a block number inserting circuit 94.

The video code amount counter 92 comprises a code amount counter 92a and a counter (462952/n) 92b. The code amount counter 92a is cleared by a reset pulse generated by the sync detector 91. Once so cleared, the counter 92a can count all bits, i.e., 461952 bits, forming a video code amount. The counter 92b (461952/n) is reset by a similar reset pulse, and outputs a pulse to a terminal 92c, every time it finishes performing 461952/n counting. Hence, n or n+1 pules are generated during every sync signal period.

Figure 115:
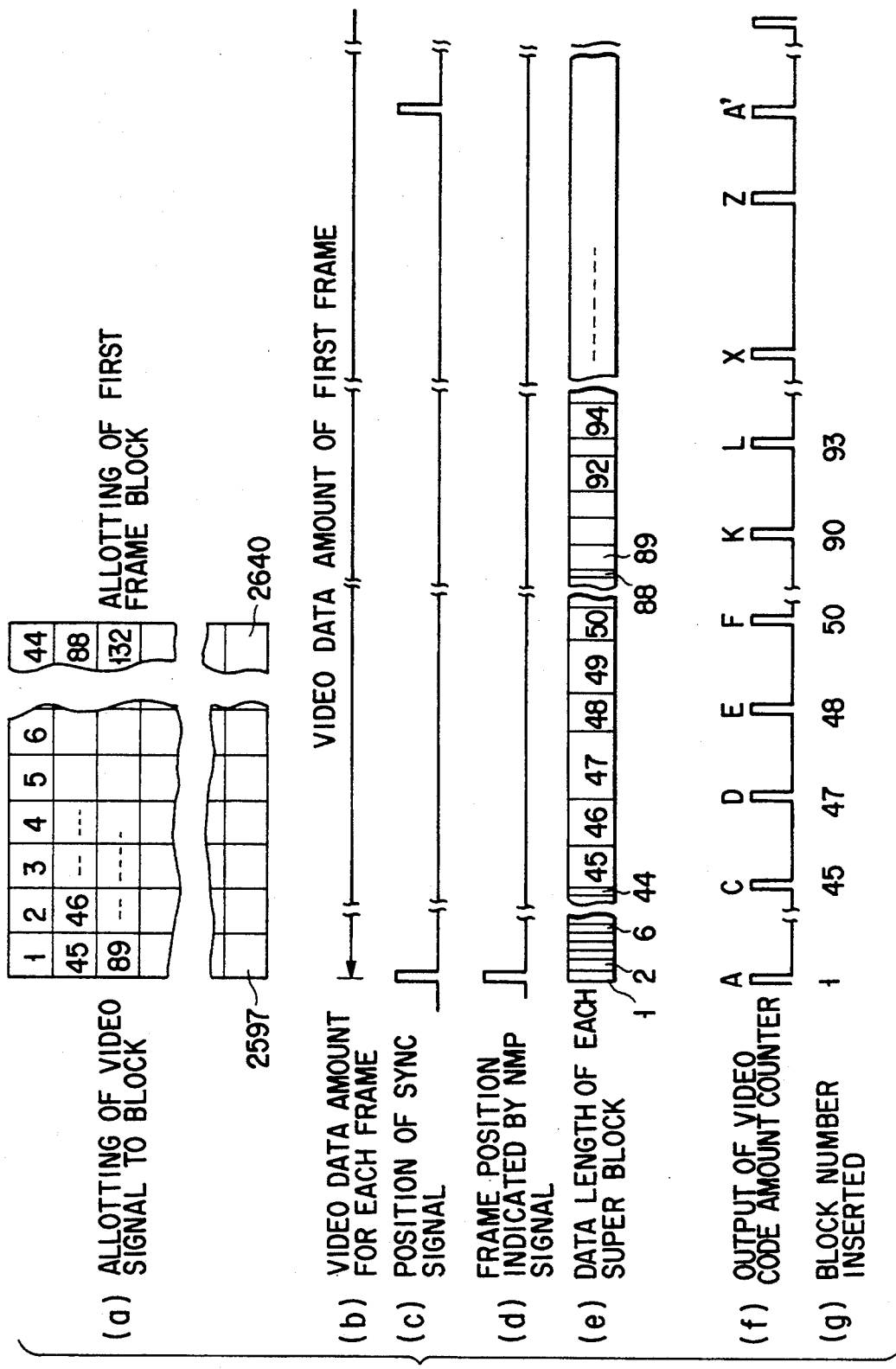
Figure 116:
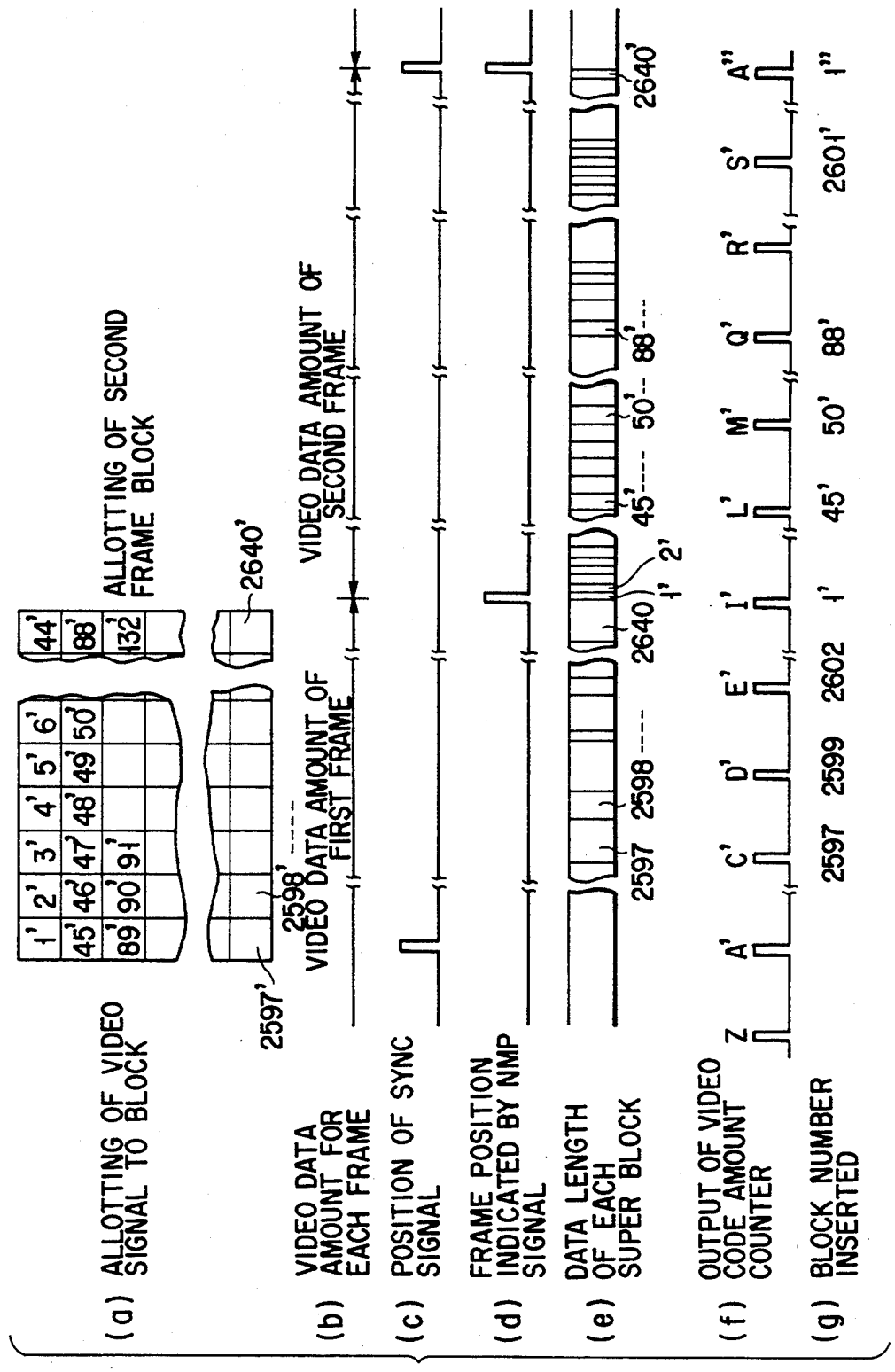

FIGS. 115 and 116 are timing charts which partly overlap each other in the time axis. Shown at (f) in FIGS. 115 and 116 is the output of the (461952/n) counter 92b incorporated in the video code amount counter 92. The block allotting of the input video signal is indicated at (a) in FIGS. 115 and 116. The video data amount of each frame is represented at (b) in FIGS. 115 and 116. The position of the frame indicated by an NMP signal is shown at (d) in FIGS. 115 and 116. Also, the data length of each super block is indicated at (e) in FIGS. 115 and 116.

The i-unit block number assigning circuit 93 detects the blocks forming the video signal, in units of i, and assigns block numbers in units of i. Here, i=1 to detect the blocks one by one, i=10 to detect the blocks in units of super blocks, and i=8×10=80 to detect blocks in units of macro-blocks. Assume that the blocks are counted in units of super blocks in the present embodiment. Namely, i=10, the luminance signal blocks are counted in units of 8, and the color signal blocks U and V are counted in units of 1. In the band compression signal processor shown in FIG. 120, each frame of an image consists of super blocks arranged in 44 columns an 60 rows as is illustrated at (a) in FIGS. 115 and 116. Block numbers are assigned to these super blocks, in accordance with their positions in the image frame. Since the frame is formed of 2640 super blocks (=44×60), block numbers 1 to 2640 are assigned to the super blocks, respectively. The i-unit block number assigning circuit 93 detects the blocks forming the video signal in units of super blocks, though it can detect the blocks in units of individual blocks and in units of macro-blocks as well. In this instance, the i-unit block counter 93a incorporated in the circuit 93 outputs the numbers assigned to the super blocks to a terminal 93b.

An NMP signal indicates the position of super block 1 shown at (a) in FIGS. 115 and 116. An NMP detector 95 detects the NMP signal in response to the signal output from the sync detector 91, and output an NMP pulse. The NMP pulse is input to the i-unit block number assigning circuit 93. In response to the NMP pulse the circuit 93 resets the i-unit block counter 93a to the count of 1. As is shown at (e) in FIGS. 115 and 116, each super block has a specific data length and a specific block number. When the circuit 93 receives, for example, the 45th super block, it outputs block number 45.

The output at the terminal 93b (i.e., the number of the block detected) is supplied to the block number inserting circuit 94. The circuit comprises a block number memory 94a, a video memory 94b, and a selector 94c. In the block number inserting circuit 94, the block number is stored into the block number memory 94a, the video signal supplied from the video signal extractor 90 is stored into the video memory 94b, and the selector 94c selects the output of the memory 94a or that of the memory 94b.

The selector 94c is controlled by the pulses generated at predetermined intervals by the video code amount counter 92, and periodically selects the output of the block number memory 94a. During the periods for which the pulses are at low level, the selector 94c selects the video data read from the video memory 94b. As a result of this, the block numbers (assigned to the super blocks) are inserted into the video data. In this way, the video data containing the block numbers arranged in specific time intervals is supplied via an output terminal 94d to a recording/reproducing device 96.

The period during which to insert each block number is determined by the pulse output by the (461952/n) counter 92b. Hence, the block number inserting period can be adjusted by changing the value for n. For the same of simplicity, it is assumed here that five block numbers are inserted in each track, and that the data for the duration of one sync signal is recorded on each track. Each frame consists of 2640 blocks, but it is assumed that it consists of only 20 blocks for simplicity.

FIG. 117 is a timing chart. Shown at (a), (b), (c), (d) and (e) in this figure are the pulses representing the positions of sync signals, NMP pulses, the code length of each super block, the output of the video code amount counter 92, and the block numbers inserted, respectively.

Figure 118:
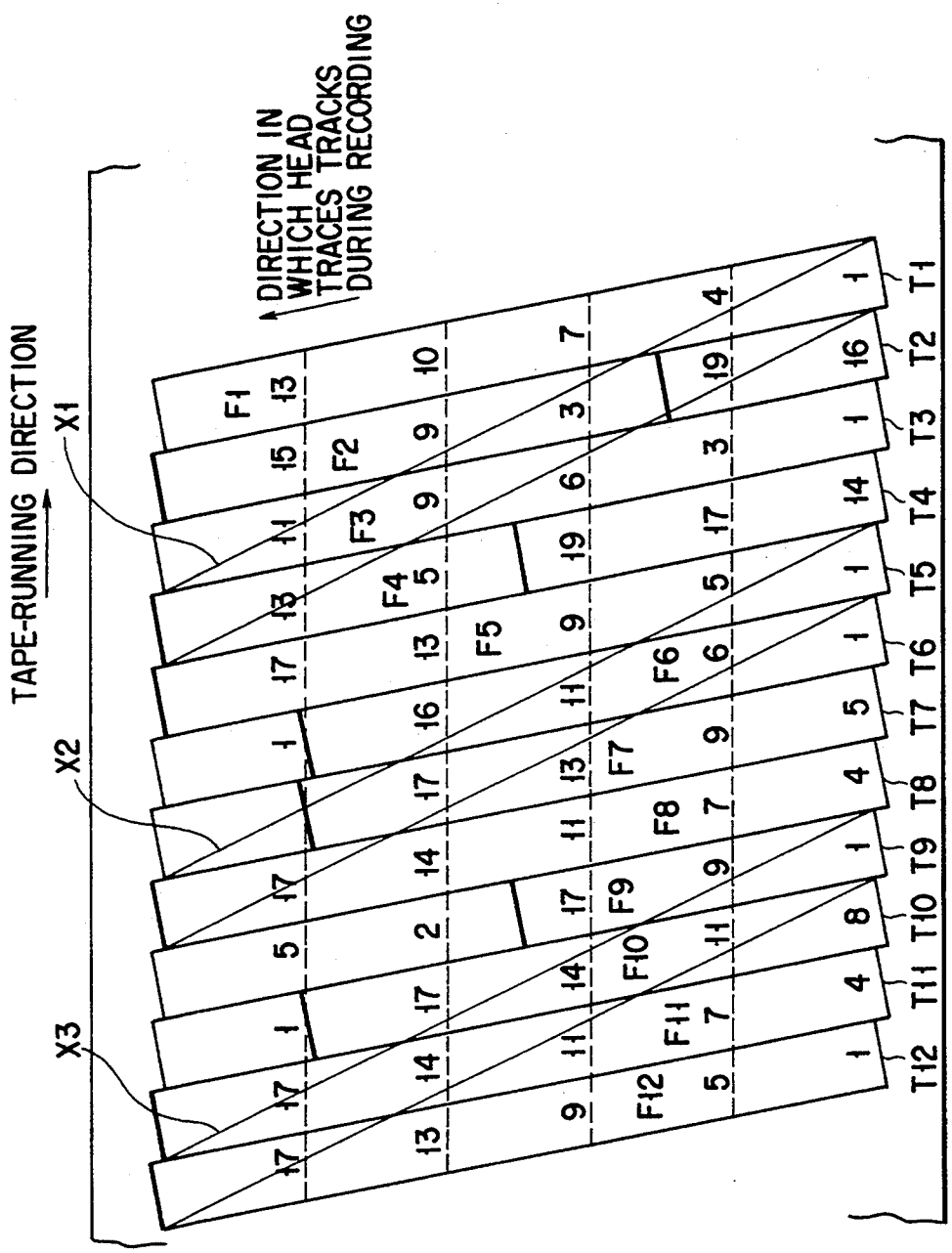
FIG. 118 is a diagram showing a track pattern on a magnetic tape.

The track will have the pattern shown in FIG. 118 when the block numbers are inserted. As is evident from FIG. 118, the block numbers 1, 4, 7, 10, 13, 16, 19, 3, 9, 15, and 1—all shown at (e) in FIG. 117—sequentially recorded on tracks T1, T2, and T3. The block numbers do not increment orderly, but are recorded at regular intervals.

In the quadruple-speed reproduction mode, the magnetic head is moved along traces X1, X2 and X3—all shown in FIG. 118. As the head moves along trace X1, it can reproduce data from parts of tracks T1, T2, T3 and T4. The signals thus read are as follows:

Track T1: Super block number 1 of frame F1, and the video signals recorded before or after super block numbers 1 to 3

Track T2: Super block number 19 of frame F1, the video signals recorded before and after super block number 19, super block number 3, and the video signals recorded before and after super block number 3

Track T3: Super block numbers 6, 9 and 11 of frame F3, and the video signals recorded before and after super block numbers 6 to 11

Track T4: Super block 13 of frame F4, the video signals recorded before super block 13, and the video signals of super blocks 13 to 20

The super block numbers and the video signals, specified above, can be reproduced. The super blocks can be reproduced without fail if the code-division number n is greater than or equal to the maximum speed for the special reproduction mode, that is, if $n \geq x$.

Once any super block number is known, the position where the super block is displayed can be determined. This is because the block number has been assigned with respects to the position the block takes in the image (FIG. 115). In practice, the image data reproduced is stored into a display memory at the address designated by the super block number.

Figure 119:
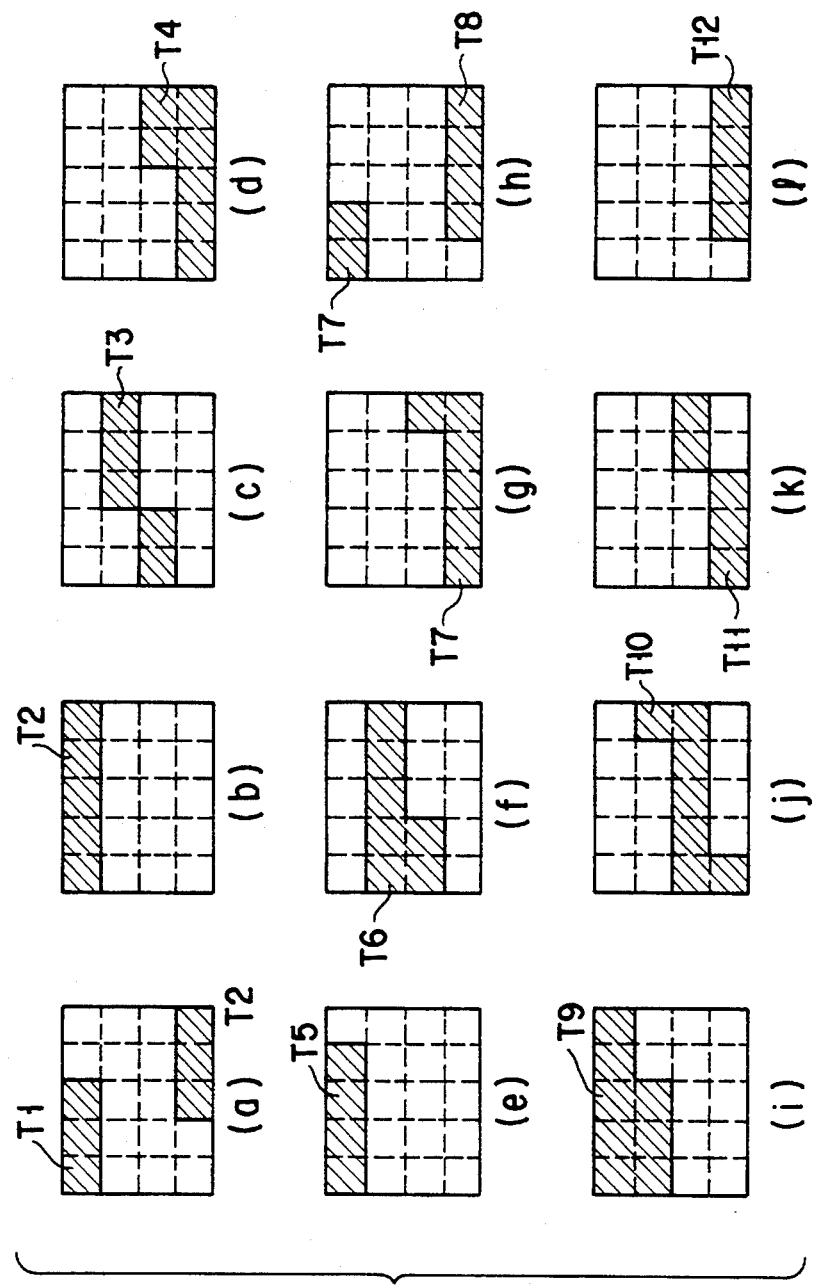
FIG. 119 is a diagram showing the images displayed in the quadruple-speed reproduction mode.

FIG. 119 shows the images displayed by using video signals reproduced in the quadruple-speed reproduction mode, as has been explained with reference to FIG. 118. Shown at (a) to (d) in FIG. 119 are the display positions of the video signals reproduced by moving the magnetic head along the trace X1. Similarly, shown at (e) to (h) in FIG. 119 are the display positions of the video signals reproduced by moving the magnetic head along the trace X2, and shown at (i) to (l) in FIG. 119 are the display positions of the video signals reproduced by moving the magnetic head along the trace X3. These display positions are indicated by slant lines in FIG. 119. The head used to reproduce the signal has an azimuth identical to that of the recording head. Even if the recording head has a different azimuth, the same results can be obtained by using a double-azimuth head. In FIG. 119, the tracks recording the image displayed at these positions are indicated by shaded portions, in correspondence to the tracks shown in FIG. 118.

The second feature of the recording/reproducing device 96 will now be described, with reference to FIG. 117. This embodiment is applied to the case where a video signal is subjected to the intra-frame processing or the inter-frame processing. The signal inter-frame processed cannot form an image without assistance of an intra-frame-processed signal. Therefore it is necessary to reproduce the intra-frame-possessed codes reliably in the fast reproduction mode. To this end, the super blocks are arranged again after they have been subjected to the intra-frame processing. Further, super block numbers may be inserted at predetermined time intervals after they have been subjected to both the intra-frame processing and the inter-frame processing.

Shown at (f) in FIG. 117 is a video code. The numerals indicated in the squares represent super block numbers. The numerals in circles indicate intra-frame-processed super blocks. The numerals not encircled represent inter-frame-processed super blocks. The arrows explain how the intra-frame-processed super blocks have been switched to locate them at substantially regular intervals. The results of the super block switching are illustrated at (g) in FIG. 117. The signal shown at (g) in FIG. 117 is an input to a multiplexer. In the present invention, the super block numbers of the codes subjected to the intra-frame processing and the inter-frame processing are inserted among the codes to be transmitted. The numbers of the intra-frame-processed blocks inserted are shown at (h) in FIG. 117, and the numbers, and the inter-frame-processed blocks inserted are shown at (i) in FIG. 117.

The numbers of the intra-frame-processed blocks and inter-frame-processed blocks, which exist at predetermined time intervals, are extracted and added to the codes, forming recorded signals. The display positions of the signals intra-frame-processed in the fast reproduction mode can, thereby, be made definite, making it possible to reproduce an image. Since the positions of the signals are definite, the video signal can be reproduced, even in the normal reproduction mode or the slow reproduction mode. The image thus reproduced has a sufficiently high quality because all codes, intra-frame-processed and inter-frame-processed, have been used.

According to the present invention, sync signals may be inserted at the same positions as the block numbers, thereby to reproduce the block numbers reliably at desired times. Moreover, the block numbers may be recorded indirectly, instead of recording them directly. More precisely, each track may be divided into n parts, and super block numbers may be assigned to the n parts in accordance with the code amounts considered most associated with these n parts. Then, the difference between each super block number and the actual corresponding block number is encoded and recorded. Each super block may be considered to be detected when the motion vector contained in the super block arrives. Further, instead of inputting each block number directly to the block number memory 94a from the i-unit block number assigning circuit 93, the count output by the circuit 93 may be used as an address input to the memory 94a so that the block number is recorded in the form of a code. The present invention can be applied to any case where a video signal is converted into a variable length code. This variable length code is, for example, a Huffman code, an arithmetic code, an intra-frame prediction code, an inter-frame prediction code, a hybrid code, or one obtained by image signal processing such as time-axis-to-frequency-axis conversion, vector quantization, or the like.

As has been described above, it is possible with this invention to detect the display area of a video signal recorded on a recording medium such as magnetic tape and reproduced in a special reproduction mode, and to form an image from the video signal thus reproduced.

50. Intra-frame Processing of One Image

Figure 2:
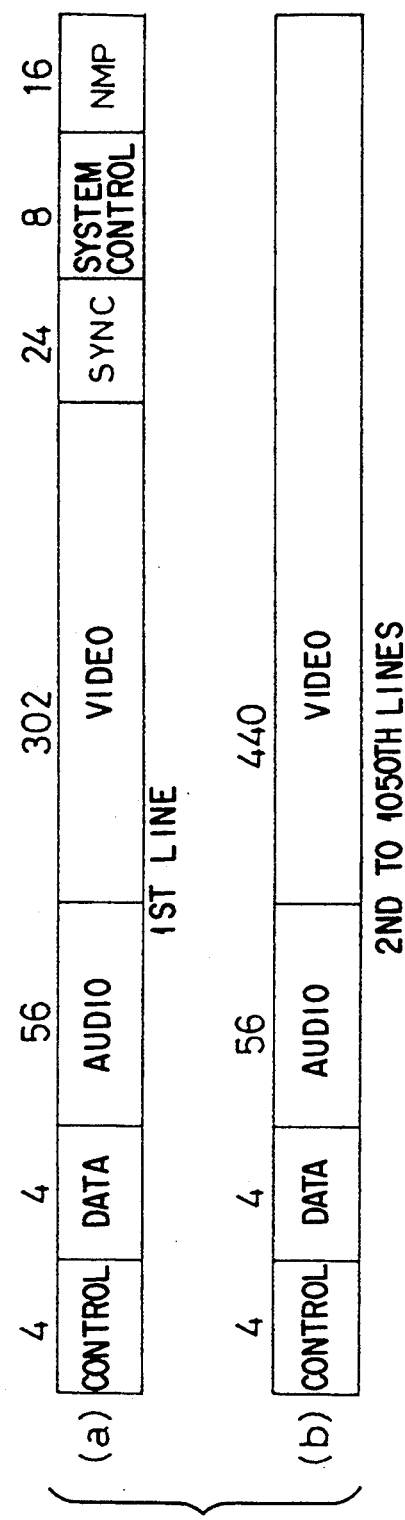
FIG. 2 is a diagram illustrating the signals transmitted from the processor shown in FIG. 1.
Figure 4:
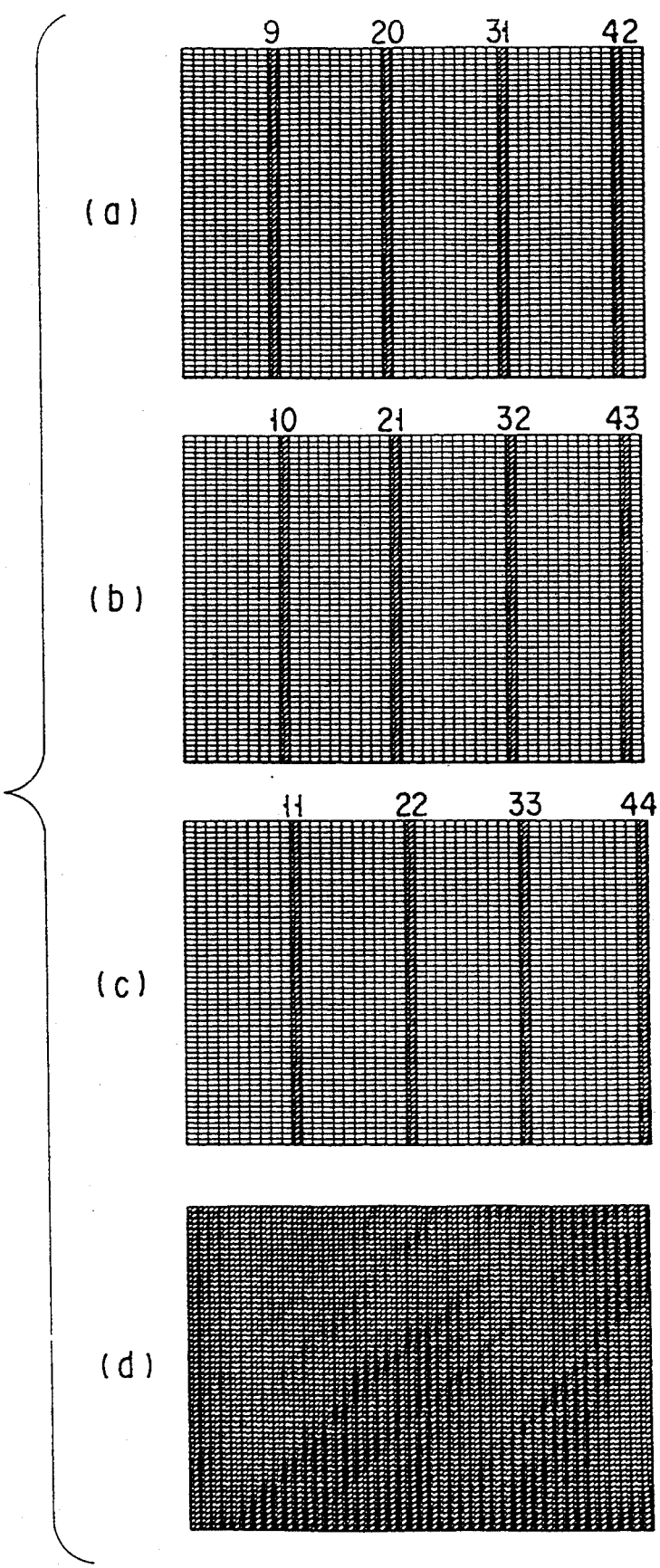
FIG. 4 shows the refresh blocks in the frames 9 to 11, which can be reproduced in the normal reproduction mode of the processor shown in FIG. 1, and also the accumulated refresh blocks of 11 frames.
Figure 5:
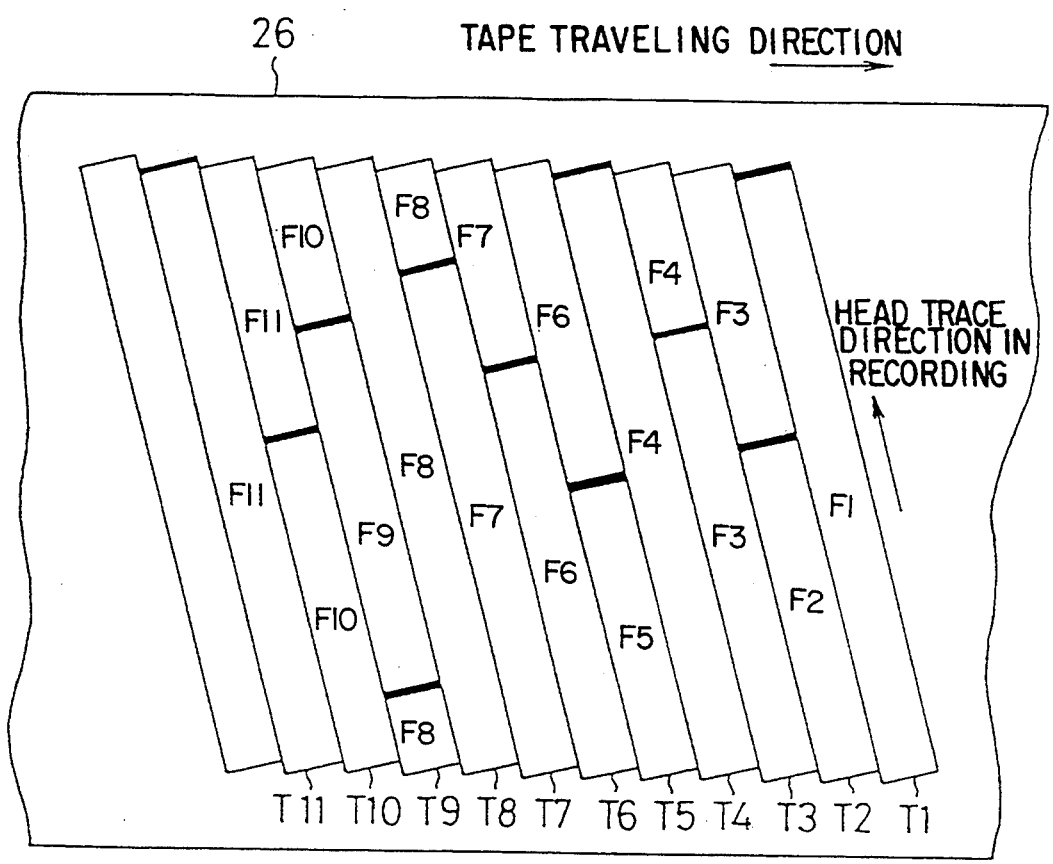
FIG. 5 shows the track pattern of the magnetic tape used in the processor shown in FIG. 1.
Figure 6:
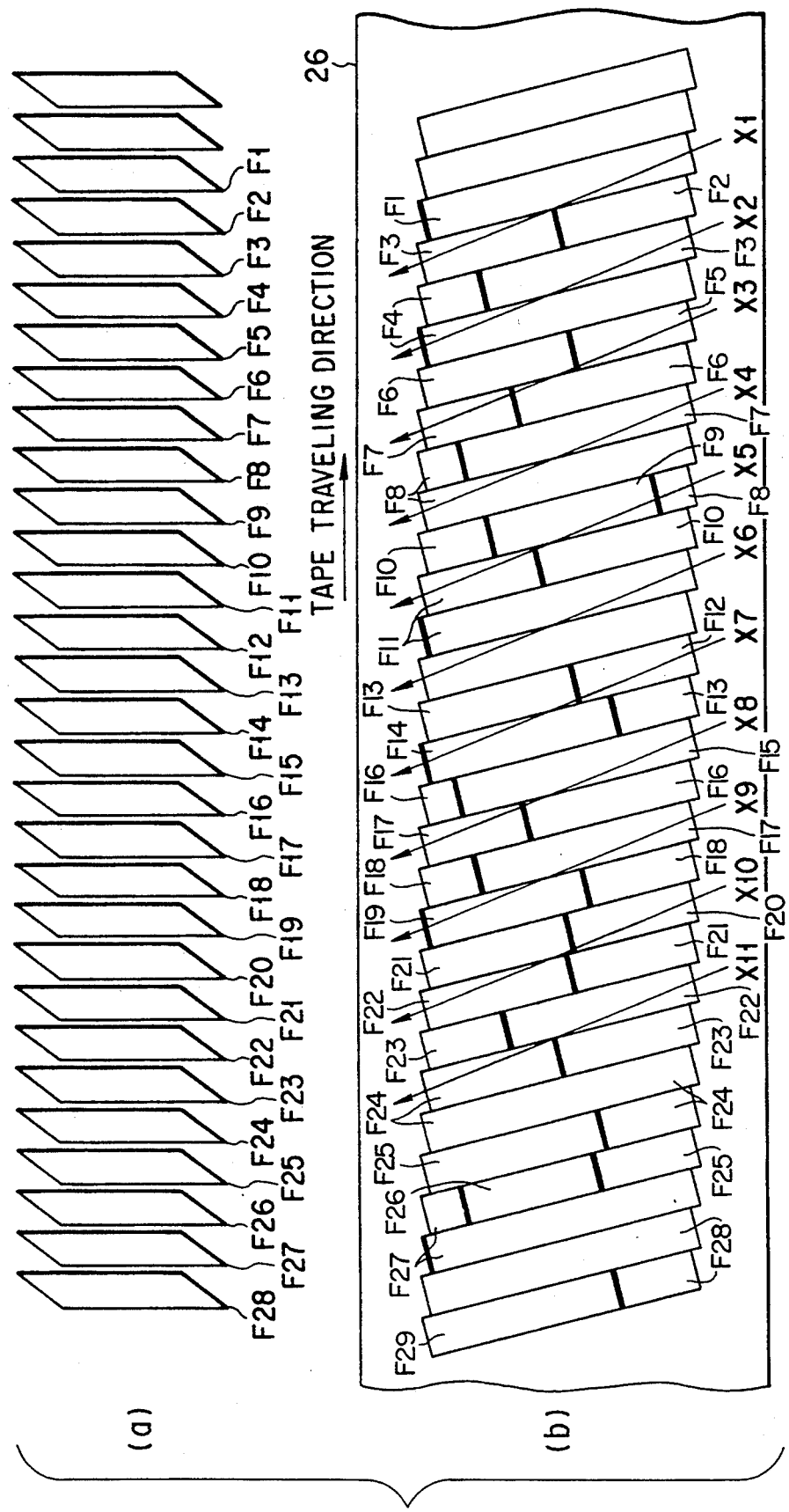
FIG. 6 is a diagram illustrating the traces in which the magnetic head moves in the double-speed reproduction mode of the processor shown in FIG. 1.
Figure 7:
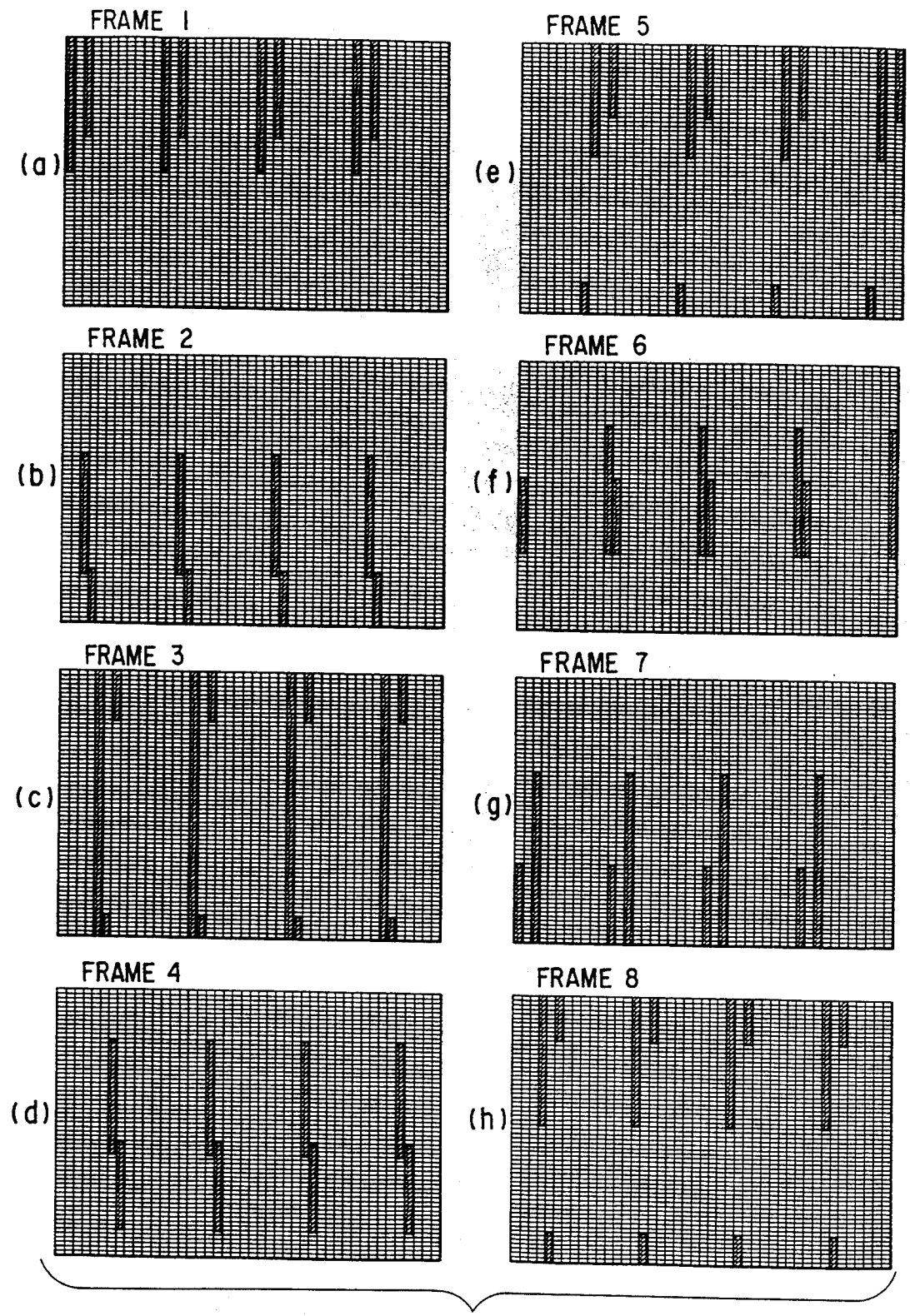
FIG. 7 shows the refresh blocks in the frames 1 to 8, which can be reproduced in the double-speed reproducing mode of the processor of FIG. 1.

The signal to be transmitted, which is shown in FIG. 2, will be explained further. The sync signal in the first line is used as a frame sync signal in the decoder. All timing signals for the decoder is generated, one from the sync signal for each frame. The NMP signal in the first line represents the number of video data items recorded between it and the head of the macro-block of the next frame. The NMP signal needs to be recorded to indicate the position of the one-frame codes, since the codes are formed, some by the intra-frame processing and the others by the inter-frame processing, and the code amounts of the frames are therefore different.

The system described above is used as an encoder for band-compressing television signals. The band-compressed signals are decoded in a receiving station. Assume that the decoded signals will be recorded by means of a video tape recorder (VTR). A VTR of the ordinary type converts a one-field video signal into a fixed length code, and produce a predetermined amount of data from the fixed length code, and records the data on X tracks (X is a positive integer).

It is variable length codes, not fixed length codes, that are processed in the system according to the present invention.

Figure 121:
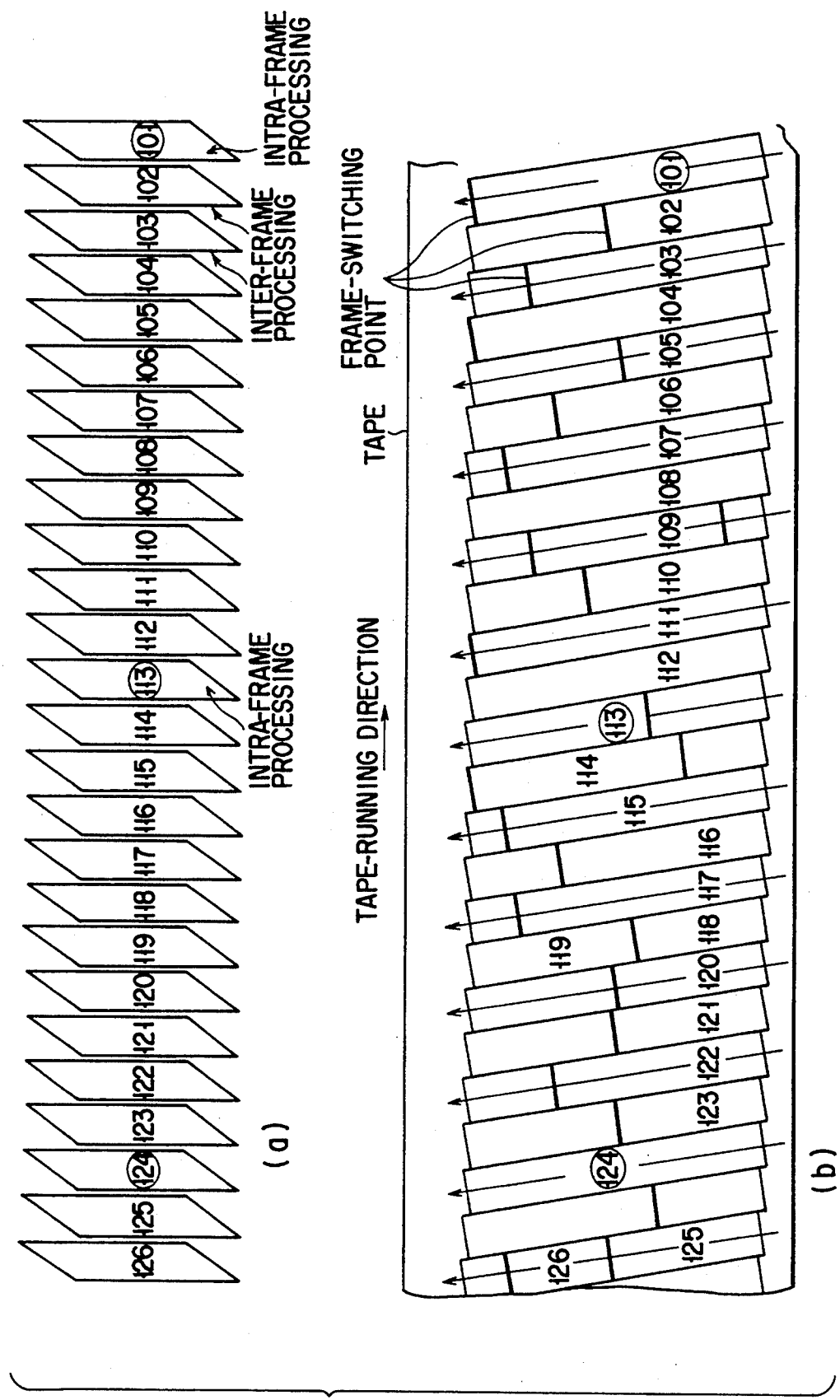
FIG. 121 is a diagram showing the traces of the magnetic head moving in a double-speed reproduction operation.

FIG. 121 is a diagram representing the relation ship between intra-frame-processed signals, inter-frame-processed signals, and the tracks of a magnetic tape on which these signals are recorded. Assume that the signals of the frame identified by the numbers in circles, as is shown at (a) in FIG. 121, have been intra-frame processed. Then, the tape has the track pattern shown at (b) in FIG. 121. The frames are switched at the positions indicated by the thick solid lines at (b) in FIG. 121. In the normal reproduction mode, all tracks are scanned one after another. It is therefore possible to obtain normal video signals by supplying the data reproduced from the tracks to the decoder. However, the VTR may produce data from some of the tracks only, in a special reproduction mode such as double-speed reproduction mode. In the special reproduction mode, the magnetic head jumps over some tracks to pick up signals from some of the tracks only. If all tracks scanned sequentially are those on which intra-frame-processed signals are recorded, no problems will arise at all. If all these tracks are those on which inter-frame processed signals are recorded, an image can be reproduced but from difference signals. The arrows shown at (b) in FIG. 121 indicate the traces along which the head moves in the double-speed reproduction mode. When the head traces track 101, it detects the intra-frame-processed signals for one frame, whereby a normal image can be reproduced. When the head traces track 113, however, it cannot pick up all intra-frame-processed signals for one frame, failing to obtain the latter half of the data representing the frame. In this case, the lower half of the image will be, as the case may be, no more than an outline. This means that signals processed by this system and recorded by the VTR cannot be reproduced in any special reproduction mode. Note that, as is know in the art, dynamic tracking following (DTF) may be used to control the head tracking in the special reproduction mode.

Figure 122:
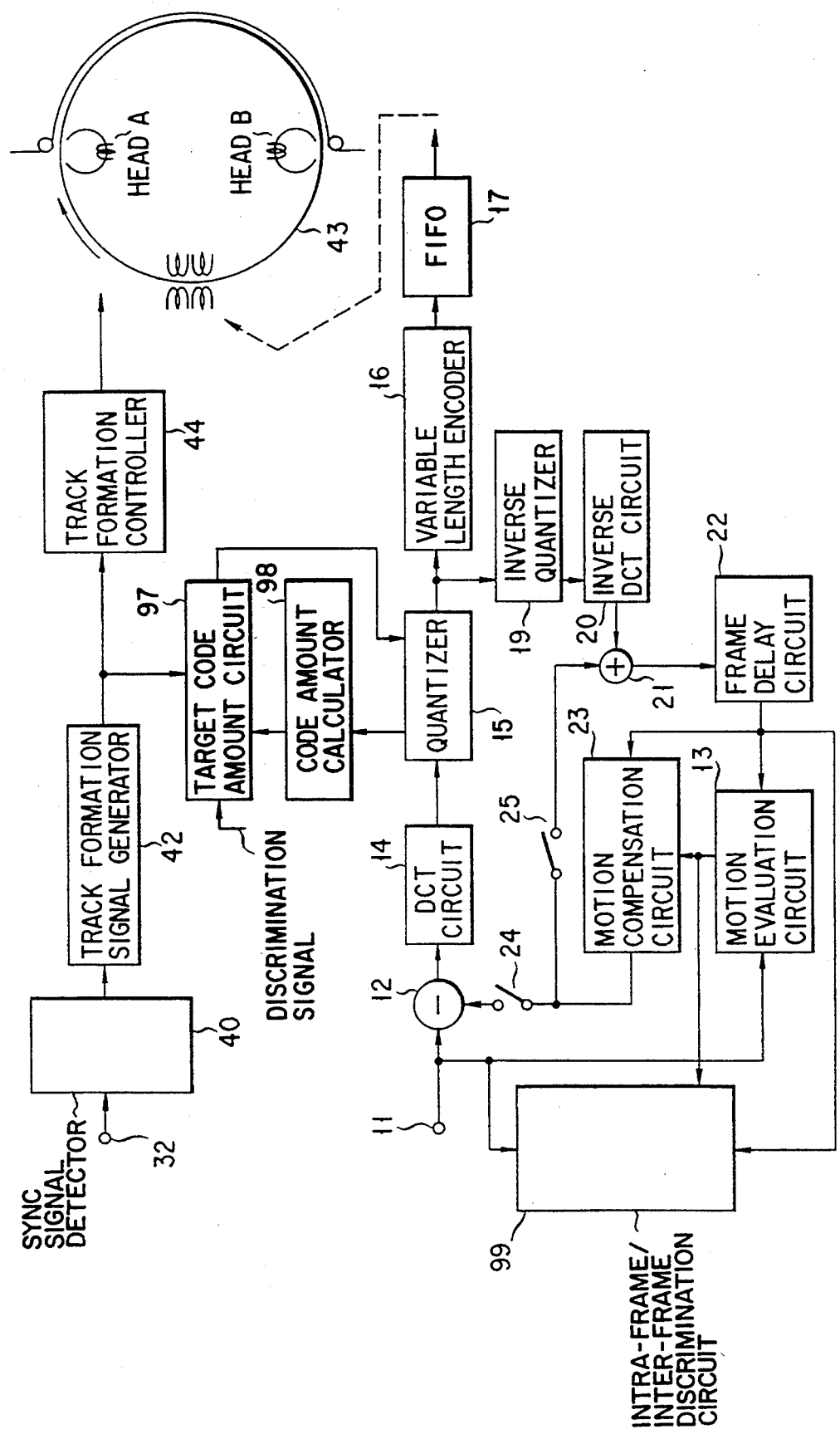
FIG. 122 is a block diagram illustrating a modification of the encoder side of the processor shown in FIG. 120.
Figure 123:
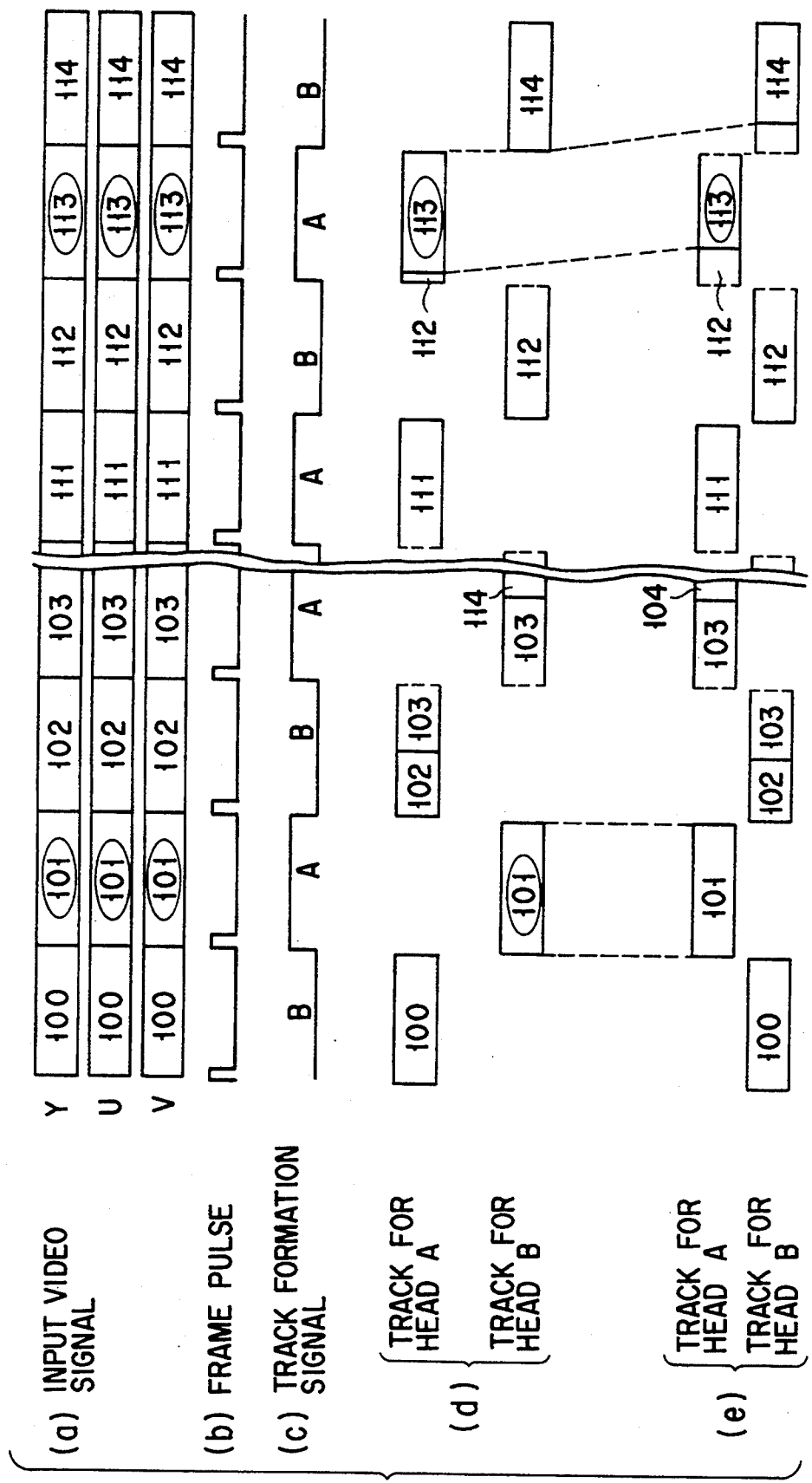
FIG. 123 is a timing chart explaining the operation of the encoder side shown FIG. 122.

FIG. 122 is a block diagram showing another embodiment of the present invention. In FIG. 122, the components identical to some of the components shown in FIG. 1 are denoted at the same reference numerals. The components which are different from those of the conventional system will be described detail. FIG. 123 is a timing chart explaining the operation of the system shown in FIG. 122.

First, the sync signal of an input video signal is supplied to an input terminal 32. The sync signal is input to a sync signal detector 40. The detector 40 detects the sync signal and generates a frame pulse which is synchronous with the sync signal. The pulse is supplied to a track formation signal generator 42. Shown at (a) in FIG. 123 is a video signal which is formed of a luminance signal Y and color signals U and V. The numerals in the rectangles are frame numbers, corresponding to track numbers. The numerals in the circles indicates intra-frame-processed frames. Shown at (b) in FIG. 123 is the frame path generated by the sync signal detector 40. Shown at (c) in FIG. 123 are the track formation signals output by the track formation signal generator 42. "A" and "B" added to the track formation signals indicate the periods during which the heads A and B form tracks. As is shown in FIG. 122, the heads A and B are attached to the inner surface of a rotary drum 43, diametrically opposing each other. Shown at (d) in FIG. 123 are tracks formed by the heads A and B. Shown at (e) in FIG. 123 are tracks formed in the system illustrated in FIG. 1. The numerals in the rectangulars representing the tracks are the numbers identifying the frames recorded on the tracks.

The track formation signal generated by the track formation signal generator 42 is supplied to a track formation controller 44. The controller 44 controls the rotational phase of the rotary drum 43 and the timing of supplying the data signals to the heads A and B.

The system shown in FIG. 122 comprises a target code amount circuit 97, a code amount calculator 98, and an intra-frame/inter-frame distrimaination circuit 99, which constitute a encoding system. The circuit 99 determines the timing of performing intra-fame processing and inter-frame processing. The output of the circuit 99 turns switches 24 and 25 on or off. The circuit 99 generates a discrimination signal, which is supplied to the target code amount circuit 97. After selecting the intra-frame processing, the circuit 99 compares the data output by a frame delay circuit 22 with the search area data contained in the input video signal, thereby finding a difference between these data items. If identical still images are continuously input, there is no difference between these data items, and the output of a motion evaluation circuit 13 is a value close to "0." In this case, it is determined that the intra-frame processing should be effected. If a moving picture is input, the motion vector increases. Nonetheless, it is advisable to find the difference and achieve data compression, if a motion compensating circuit 23 can correct the motion vector, that is, if the input video signal may coincide with the predicted output of the frame delay circuit 22. Hence, the intra-frame/inter-frame discrimination circuit 99 selects the inter-frame processing even if the search area data is different from the output data of the frame delay circuit 22, provided that the motion vector is less than a predetermined value. When the motion vector increases too much to be corrected by means of the motion compensating circuit 23, the circuit 99 selects the interframe processing. In the case where the search area data greatly differs from the output data of the frame delay circuit 22, the intra-frame processing will be carried out.

If predetermined conditions are satisfied, the target code amount circuit 97 can switch the quantization table in the quantizer 15, thereby control the amount of codes to be generated before the next frame is processed.

A DCT circuit 14 supplies coefficients to the quantizer 15. Quantizer 15 converts the coefficients into codes, using the bits of the quantization table. The data showing which quantization table is used is transmitted, as part of the video data which is the head portion of the macro-block. The quantization tables are shown in FIG. 19. They are identified by quantization levels q.

Which quantization table should be used is determined by the target code amount circuit 97. The circuit 97 monitors the output value of a code amount calculator 98. The code amount calculator 98 calculates the amount of codes which the quantizer 15 outputs. Whenever the code amount exceeds a reference value, the calculator 98 supplies a switching signal to the target code amount circuit 97. Alternatively, the calculator 98 may monitor the rate at which the amount of codes the quantizer 15 produces, and may predict whether or not the codes amount overflows one track. The amount of codes output by the quantizer 15 during the intra-frame coding is thereby limited such that all codes may be readily recorded within one track.

The code amount calculator 98 may calculate the code amounts for the two frames preceding and following the intra-frame processed frame, respectively, and then may adjust these code amounts calculated.

As is evident from FIG. 123, frame 101 can recorded within one track, not overflowing the track. Thus, frame 101 need not be subjected to any special processing whatever. Frame 113, however, cannot be recorded within one track, overflowing onto tracks 112 and 114. In this embodiment, the code amount of track 114 is calculated and is controlled to reduce the amount of codes to be recorded on track 112 (by selecting a lower quantization level q). As a result, the codes obtained by intra-frame processing and destined to be recorded on track 113 can be recorded within one track. The amount of codes to record on track 114 is far less than the maximum amount, and a high quantization level q is selected for the frame which corresponds to track 114.

Since the code amounts for the two frames preceding and following the intra-frame processed frame, respectively, are calculated and adjusted, each to an appropriate value, a circuit is required which adjusts the signal timing in each signal path.

It will now be explained how to increase and decrease the code amounts for each frame.

An video signal is divided into blocks and is subjected to discrete cosine conversion. More specifically, the signal is quantized by means of the quantizer 15. DCT coefficients are quantized, using ten quantization tables specified different quantization levels. In practice, each DCT coefficient is first quantized into a 9-bit data. The 9-bit data is input to a shift register. The shift register shifts the bits to the left or the right, thereby controlling the amount of output data. In other words, the number of bits to output in parallel is controlled. The bit-shifting conducted by the shift register depends on the values of the quantization table applied. If $q = 9$, all DCT coefficients are converted into 9-bit data items, and the data bits need not be shifted. If $q = 8$, the DCT coefficients in the lower-right region are quantized into 8-bit data items. In this region, the shift register shift the data bits by one bit, whereby the data is output. By changing the quantization level q, the generated code amount is controlled by means of the target code amount circuit 97.

Generally, the higher the quantization level, the better. In practice, DCT coefficients are quantized by using as many bits as is possible.

In the embodiment described above, the code amounts for the two frames preceding and following the intra-frame processed frame, respectively, are calculated and adjusted, each to an appropriate value. Alternatively, the code amounts for the intra-frame processed frame may be adjusted to an amount that can be recorded with a single track. This alternative adjustment can be accomplished by various methods.

Described above is the case where codes obtained by intra-frame processing are numerous and need to be recorded on two tracks, and is therefore limited so as to be recorded within one track. In some cases, however, such codes may be so numerous that they need to be recorded on three tracks, as in the case of track 124 shown at (b) in FIG. 121.

FIG. 124 is a block diagram illustrating an embodiment designed for use n a magnetic recording/reproducing apparatus having two pairs of magnetic heads. Both pairs of heads are provided within a rotary drum 43 and can simultaneously record and reproduce data. The first pair consists of magnetic heads A and a, and the second pair consists of magnetic heads B and b. These heads scan two tracks at the same time. The embodiment of FIG. 124 differs from the embodiment of FIG. 122 in two respects, since recording signals are simultaneously supplied to two magnetic heads. First, the output of a variable length encoder 16 is distributed into two memories 17a and 17b. Secondly, the outputs of the memories 17a and 17b are supplied to the two pairs of heads, respectively, through a multiplexer. In any other respect, this embodiment is identical to that of FIG. 122. Hence, the components identical to those shown in FIG. 122 are designated at the same reference numerals in FIG. 124.

Figure 125:
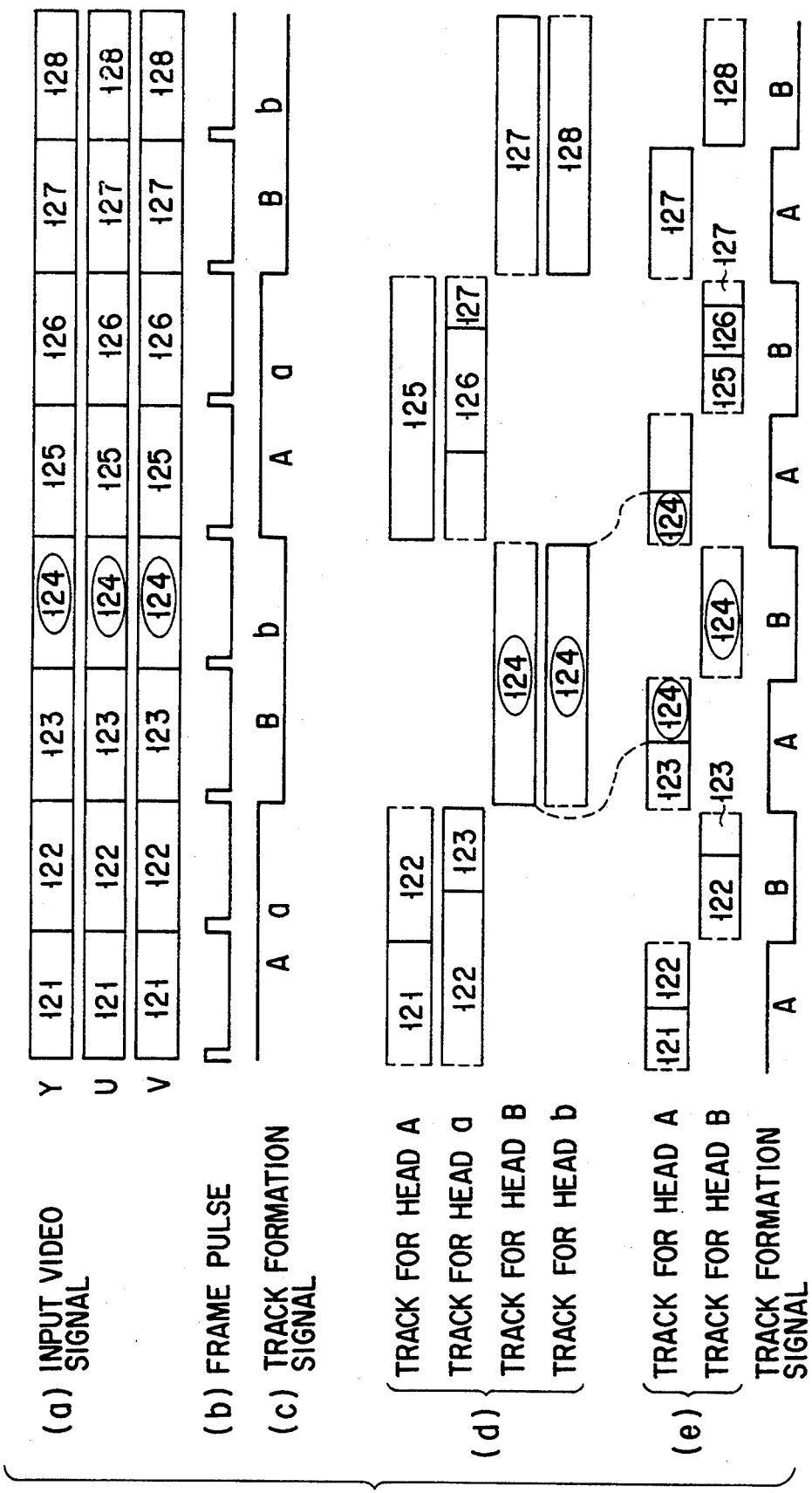
FIG. 125 is a timing chart explaining the operation of the encoder side shown FIG. 124.

Since the magnetic heads are controlled to record signals for two frames, track formation signals are generated at such timing as is shown at (b) in FIG. 125 with respect to frame pulses. The drum 43 needs to be rotated at only half the speed in the embodiment of FIG. 122. Shown at (a), (b), (c) and (d) in FIG. 125 are an input video signal, frame pulses, track formation signals, and frame numbers, respectively. When the code amount of a signal is so large to overflow two tracks, as the signal of frame 124, the quantization table in a quantizer 15 is switched to another, so that the amount of codes obtained by quantization may be small enough to be recorded on one track. Shown at (e) in FIG. 125 are the tracks, frames, and track forming signals, which are formed in the recording/reproducing apparatus illustrated in FIG. 1, for comparison with those shown at (b), (c) and (d) in FIG. 125 which are formed in the present embodiment.

The recording/reproducing apparatus of FIG. 124 is advantageous, as compared with the apparatus of FIG. 122, in that the positions of the heads can be more changed to effect dynamic tracking control in a special reproduction mode, and that the data can be reproduced at more various speeds. This is because more intra-frame-processed signals are available, i.e., the intra-frame-processed signals of two frames for two tracks, respectively. In addition, since two heads can simultaneously reproduce signals from two tracks even in the fast reproduction mode, provided that the signals are recorded in the form of codes, not overflowing the two tracks.

Figure 126:
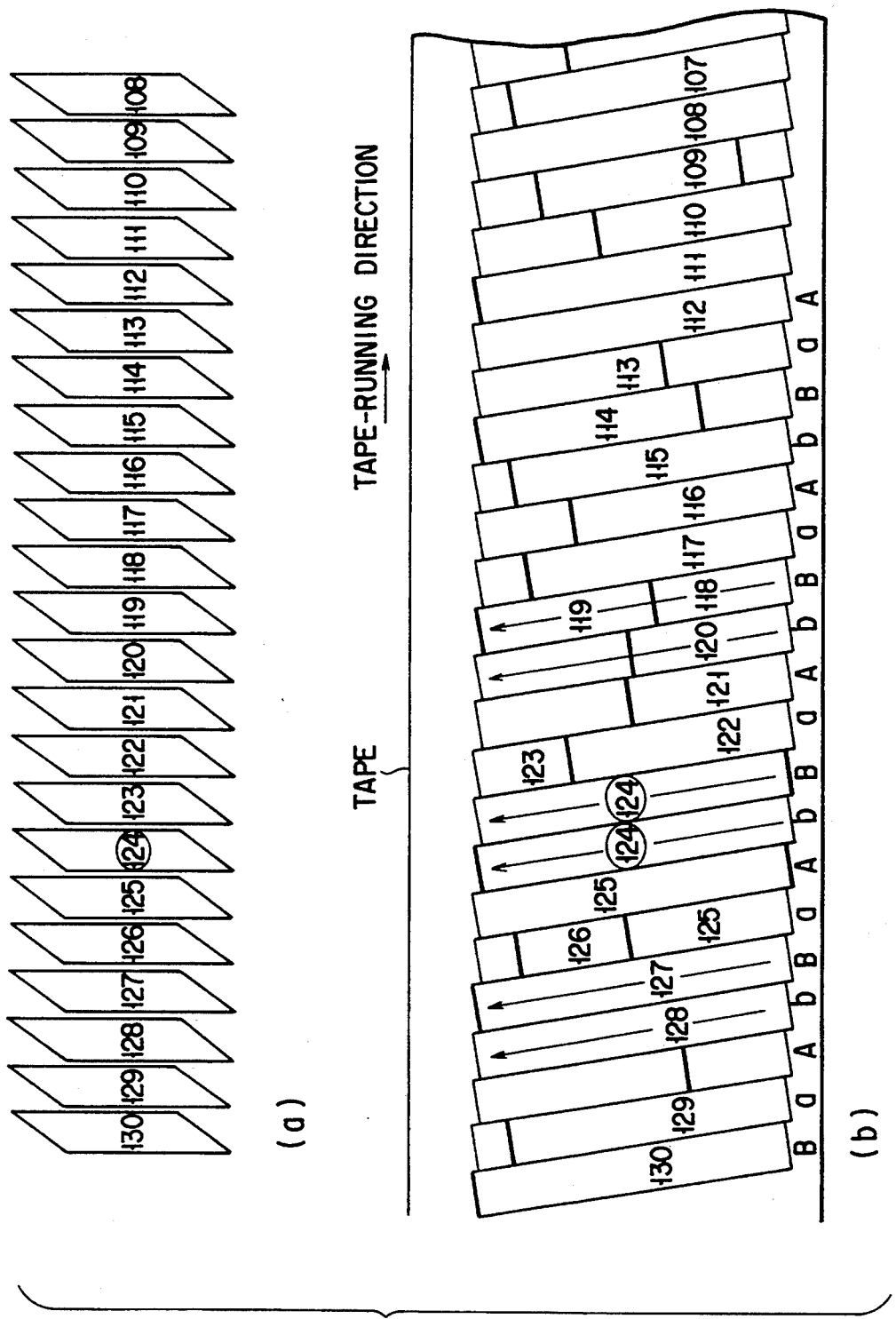
FIG. 126 is a diagram showing the traces of the magnetic head moving in a double-speed reproduction operation.

At (a) in FIG. 126, the frames are identified by numerals. The numerals in the circles indicate the frames which are subjected to the intra-frame processing. Shown at (b) in FIG. 126 are the tracks on which the frames are recorded. The arrows shown at (b) in FIG. 126 indicate the traces along which the magnetic heads move in the double-speed reproduction mode. The frames are switched at the positions indicated by the thick solid lines at (b) in FIG. 126. Frame 124 pertains to the signal exemplified above. The frame is intra-frame processed, so that the resultant codes can be recorded on two tracks only. In this instance, the code amount of frame 123 is reduced, whereas the code amount of track 125 is increased. "A," "a," "B," and "b" assigned to the respective tracks indicate which magnetic head traces each track.

The head assembly used is not limited to the type shown in FIG. 124, wherein the two pairs of heads diametrically oppose, spaced by 180° along the circumference of the drum. A head assembly can be used instead, in which tape is wrapped around the entire circumference of the drum, and n magnetic heads are used as a single set. Alternatively, use can be made of a head assembly in which tape is wound about 270° around the drum, n magnetic heads are located in four sets, and the four sets of heads are sequentially operated.

Further, two methods can be utilized to control the amount of generated codes. The first method is to add dummy data, and the second method is to discard excessive ones of the codes.

The various embodiments described above are band compression signal processors for use in magnetic recording/reproducing apparatuses. Needless to say, the data compression technique of the invention can be applied to signals which are to be supplied to a transmission system.

Figure 128:
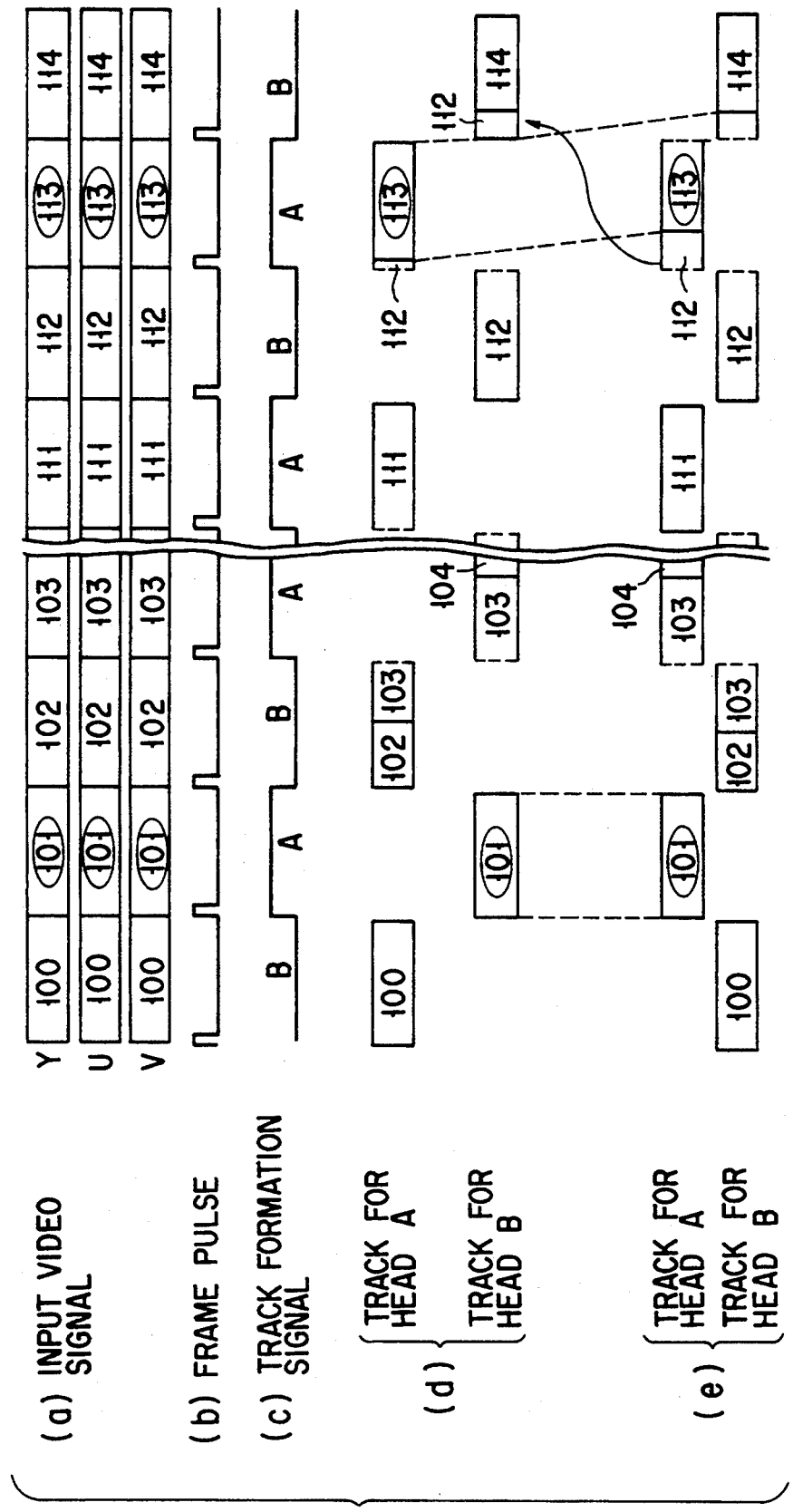
Figure 129:
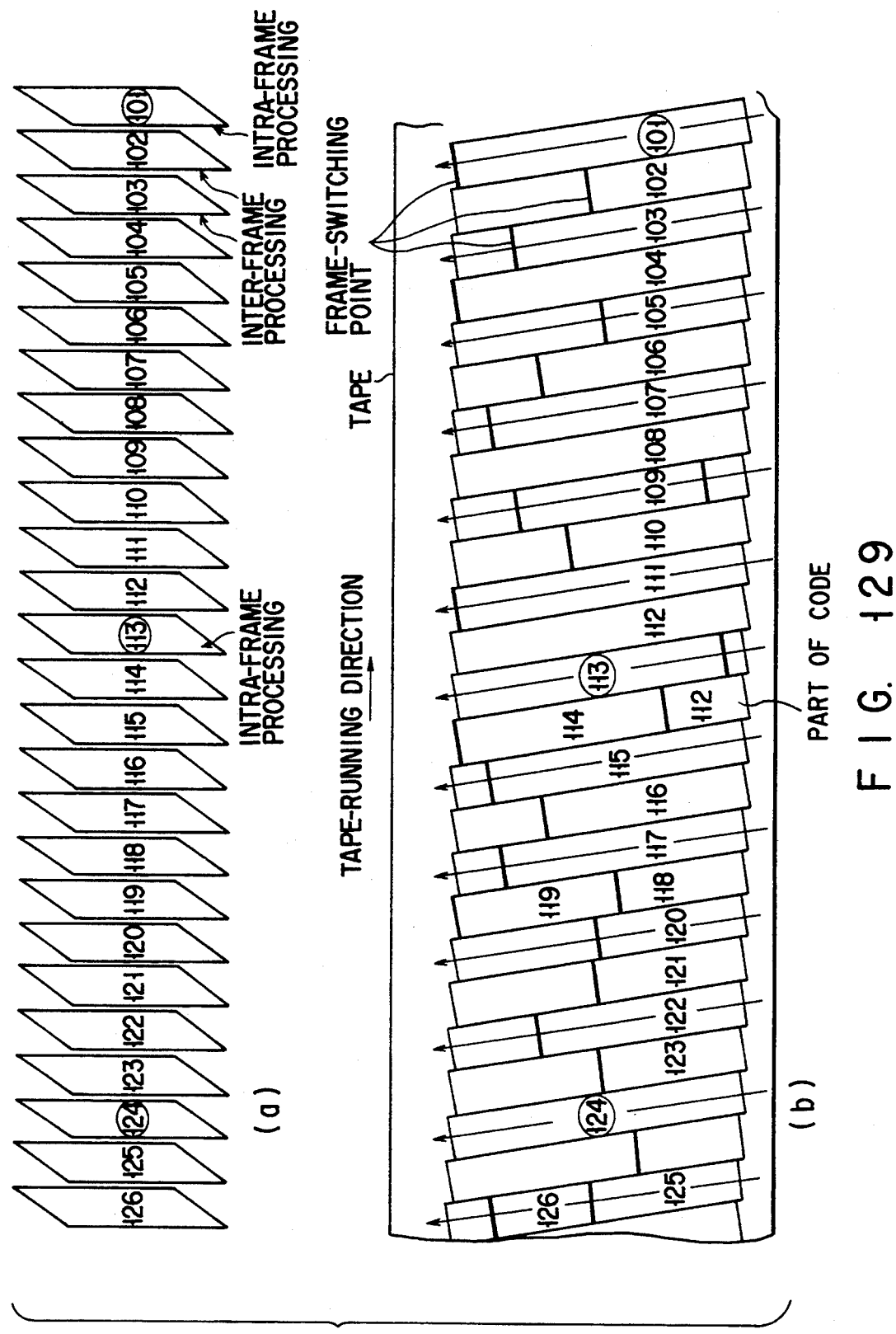

FIG. 127 is a block diagram showing still another embodiment of the invention. FIG. 128 is a timing chart explaining how this embodiment operates. FIG. 129 is a diagram showing the track pattern formed in the embodiment. Of the components of this embodiment, those which are identical to some components of the embodiment shown in FIG. 122 are denoted at the same reference numerals in FIG. 127.

Assume that frame 113 is intra-frame-processed as is illustrated in FIG. 121, the resultant codes will be recorded on two tracks. The code amount must be controlled such that the codes of frame 113 are recorded on one track only. In the embodiment of FIG. 122, the code amount of the preceding frame 112 is reduced, allowing the codes of frame 113 to be recorded on one track, and the code amount of the following frame 114 is increased.

In the embodiment of FIG. 127, some of the codes of frame 112 are separated from the other codes, so that the codes of frame 113 may be recorded on one track only as is shown in FIG. 128. None of the codes of frame 113 is thereby recorded on the track for recording frame 114. Hence, the track for recording frame 114 has unrecorded regions. On these regions, the codes separated from the other codes of frame 112 are recorded.

To record the codes of frames 112, 113 and 114 in this specific scheme, the output of a variable length encoder 16 is input to a code switching circuit 200. The circuit 200 detects the arrival of any intra-frame-processed signal, from a discrimination signal output by an intra-frame/inter-frame discrimination circuit 99. More specifically, if the code amount of frame 112 preceding frame 113 which is intra-frame-processed is too large to be recorded on one track only, the excessive codes are held until the signal of the next frame 114 arrives. When the signal of frame 114 comes, this signal is transmitted, and then the excessive codes are transmitted. In this case, an index inserting circuit 201 inserts an index signal in the control data section of frame 112, 113 or 114. The index signal is detected in the reproduction mode, indicating that some of the codes of frame 112 have been recorded not on track 112, but on track 114. The index signal is generated by an index generator 202 from the discrimination signal supplied from the intra-frame/inter-frame discrimination circuit 99. The code switching circuit 200 counts the codes output from the variable length encoder 16, thereby finding the code amount.

Thus, any signal intra-frame-processed can be recorded within one track. A high-quality image can be reproduced by tracing the track on which intra-frame-processed signals are recorded in a special reproduction mode such as fast reproduction mode.

As has been described above, it is possible with the present invention to obtain band compression signals which can be recorded by a VTR on one track of a magnetic tape, in the form of codes, and which can be easily reproduced from the tape in a special reproduction mode.

70. Video Disk

The methods thus far described can be used also in a DAT, a type of a recording/reproducing apparatus using tape as recording medium. Known as a recording/reproducing apparatus using a recording medium other than tape is a video disk apparatus. Two types of video disks are available. The first type is a CAV (Constant Angular Velocity) disk, and the second type is a CLV (Constant Linear Velocity) disk. When a signal is intra-frame-processed, the amount of codes generated from one frame differs from that of codes generated from another frame, though the average code amount has a predetermined value since a fixed amount of codes is transmitted through a transmission path.

The average amount of codes is recorded on a CAV disk in one method, and on a CLV disk in another method. The present invention can be applied to record the average amount of codes on both a CAV disk and a CLV disk. To record a signal on a CAV or CLV disk, the signal is supplied through the terminal 73 shown in FIG. 9. Any signal detected from the disk by a pickup is input to a decoder via the terminal 132 shown in FIG. 58.

First, it will be described how to record signals on a CAV disk according to the present invention, with reference to FIGS. 130 and 131.

FIG. 130 shows the track pattern of a CAV disk. The circles of broken lines indicate the concentric tracks formed on the CAV disk. Each track starts and ends at point a. Assume that the average code amount per frame is recorded on each track. It is at point a of each track that the recording of the average code amount starts. Since the code amount of one frame differs from that of another frame, the switching points of frames are different.

In FIG. 130, the spiral represented by a thick solid line is a trace along which a pickup scans in the double-speed reproduction mode, as it is moved in the radial direction of the disk as is indicated by the arrows. As can be understood from the arrows, the pickup jumps to one track to the next one at point b. Each track is divided into two sectors S0 and S1, or two half tracks, in the case the signals is reproduced from the tracks in the double-speed reproduction mode. Each sector S0 extends from point a to point b, and each sector S1 from point b to point a.

F0 to F8, shown at point a, are frame numbers, not the frame switching points. (The switching points of frames are different because the code amount of one frame differs from that of another frame.) F0 and F8 also indicate the regions where to locate refresh blocks. As in the case of a VCR, refresh blocks and non-refresh blocks are switched in order to record the refresh blocks in the regions which the pickup traces in the double-speed reproduction mode.

In FIG. 131, the solid-line arcs indicate the positions where to record the refresh blocks, or the codes refresh by means of periodical intra-frame processing. Since the refresh blocks have variable lengths, the solid-line arcs differ in length. The refreshed codes are combined, forming refresh blocks and refresh slices, as is illustrated in FIGS. 45, 48, and 49. The refresh slices are recorded in the following scheme:

Refresh slice 0 on sector 0
Refresh slice 1 on sector 1

Since use is made of variable length codes, the refresh slices have variable code lengths defined by the solid-line arcs, each representing the code amount of a one-frame video signal. A plurality of refresh blocks are concentrated in particular sectors, forming refresh slices, so as to be reproduced in the fast reproduction mode. If one refresh block exists in each macro-block as in the conventional band compression signal processing, the refresh blocks are located sparsely, making it difficult for the pickup to read the refresh blocks only.

In the present invention, the refresh blocks are concentrated in specific sectors, forming refresh slices. Hence, an image can be reproduced in the fast reproduction mode, merely by moving the pickup to trace only the specific sectors.

It will now be described how to record signals on a CLV disk according to the present invention, with reference to FIGS. 132 and 133.

Figure 132:
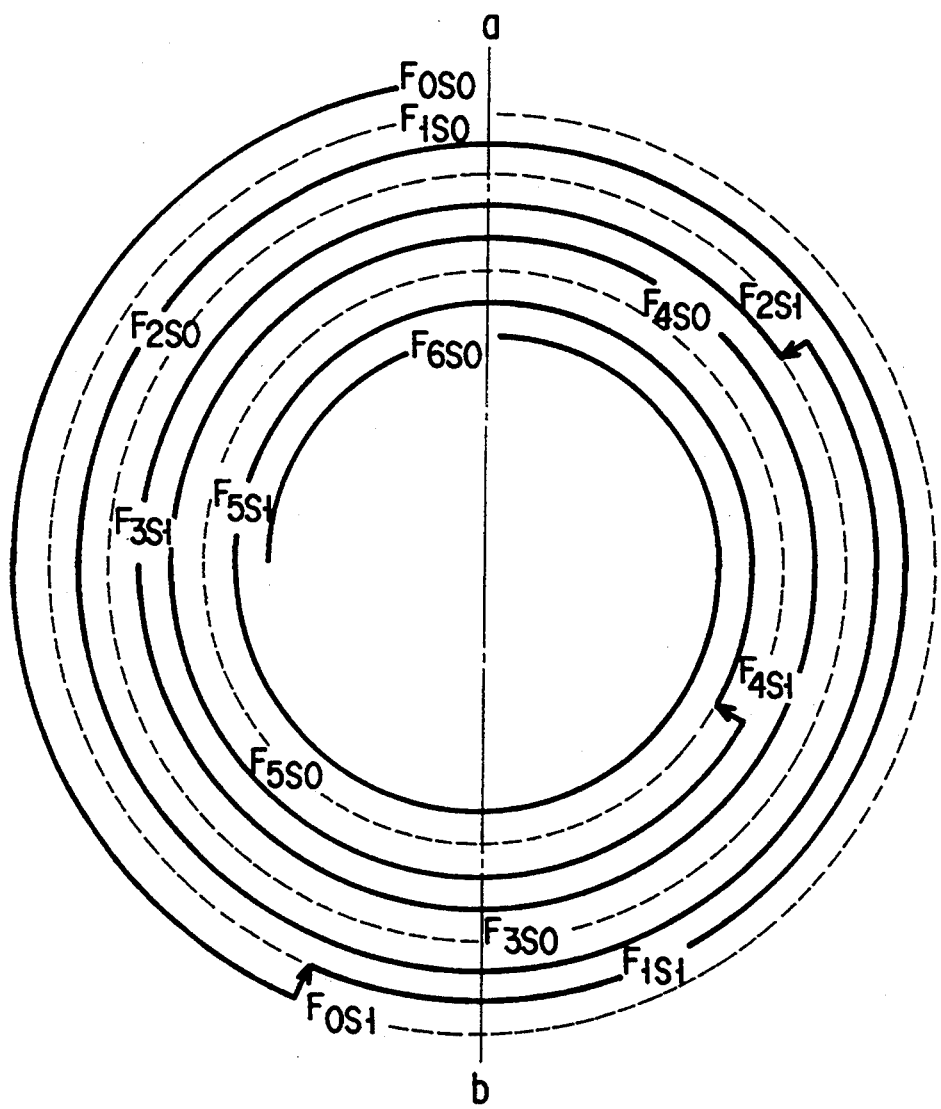

FIG. 132 shows the track pattern of a CLV disk. The broken-line circles indicate the tracks formed on the CLV disk. Regions $F_0S_0$, $F_1S_0$, $F_2S_0$, . . . are sectors formed by dividing the tracks. The solid-line arcs are traces which the pickup has in the double-speed reproduction mode.

Figure 133:
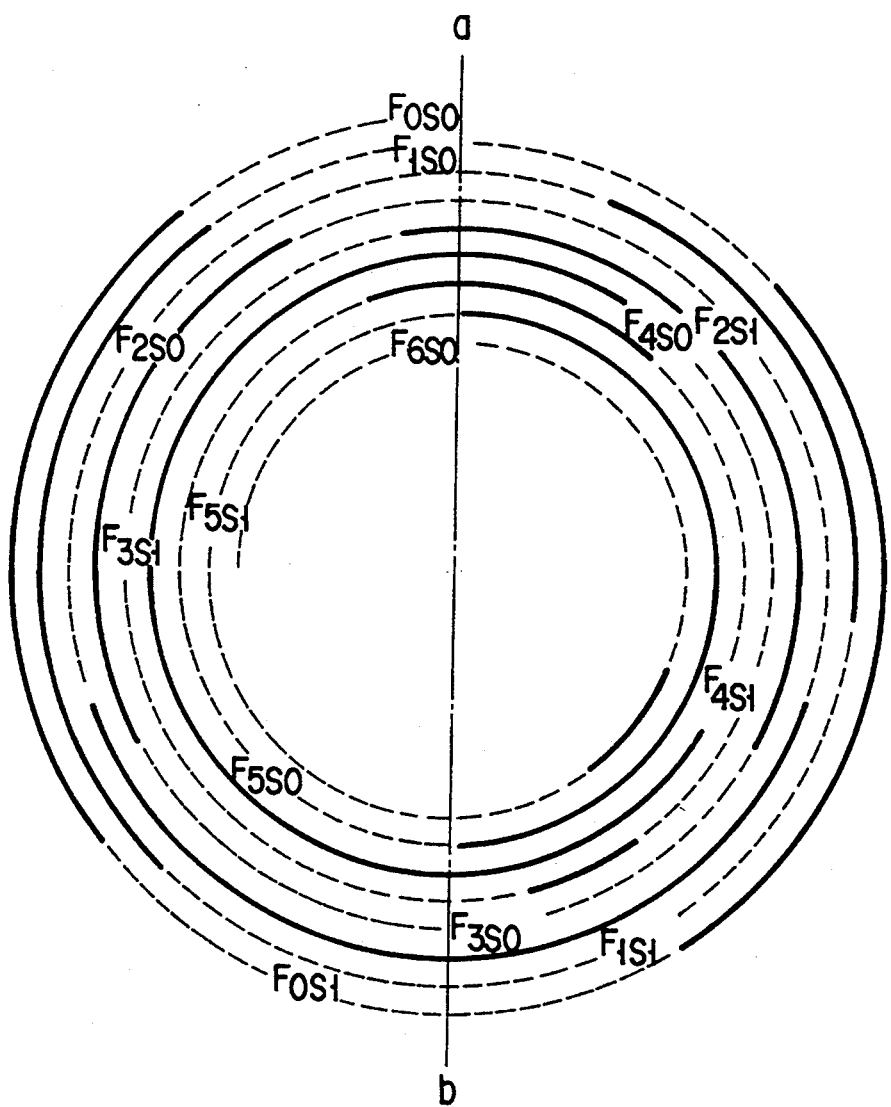

FIG. 133 is a diagram showing the positions where to record refresh slices. In FIG. 133, the solid-line arcs represent the positions where the refresh slices are actually recorded. Since the refresh slices are located at the positions which the pickup traces in the fast reproduction mode, an image can be reproduced at high speed.

The circuits which serve to record signals on a CAV disk or a CLV disk in the methods described with reference to FIGS. 130 to 133 are identical to those described in Chapters 1 to 28 and Chapters 35 to 50.

What is claimed is:

1. A band compression signal processor comprising:
a signal processing unit having:
intra-frame encoding means for performing intra-frame encoding on an input video signal by using intra-frame information contained in the input video signal; and
inter-frame encoding means for performing inter-frame encoding on the input video signal by using inter-frame information contained in the input video signal; and
the intra-frame encoding means adaptively repeating the intra-frame encoding so as to output intra-frame encoded signals and the inter-frame encoding means adaptively repeating the inter-frame encoding so as to output inter-frame encoded signals; and
a recording/reproducing unit having:
a recording/reproducing element;
recording means for sequentially recording the intra-frame encoded signals and the inter-frame encoded signals on a recording medium by the use of the recording/reproducing element, wherein the recording means divides each intra-frame encoded signal into either a low-frequency component and a high-frequency component or a MSB-component, which includes a most significant bit of each intra-frame encoded signal, and a LSB-component, which includes a least significant bit of each intra-frame encoded signal, and records the low-frequency component or MSB-component in the designated region of the recording medium; and
reproducing means for sequentially reproducing the intra-frame encoded signals and inter-frame encoded signals from the recording medium by the use of the recording/reproducing element, the reproducing means reproducing, during a fast forward or reverse mode of operation, only selected signals from a designated region on the recording medium, thereby achieving fast reproduction of the signals;
wherein the recording/reproducing unit includes means for recording, by the use of the recording/reproducing element, the intra-frame encoded signals and the inter-frame encoded signals in a designated region on the recording medium, in which the recording/reproducing unit is capable of reading a maximum code amount during the fast forward or reverse mode of operation.

2. The band compression signal processor according to claim 1, wherein the recording/reproducing unit reproduces, during the fast forward or reverse mode of operation, only the low-frequency component, the MSB-component, the high-frequency component, or the LSB-component of each intra-frame encoded signal recorded on the recording medium.

3. The band compression signal processor according to claim 1, wherein the recording/reproducing unit combines, during a normal mode of operation, either the high-frequency component and the low-frequency component or the MSB-component and the LSB-component of each intra-frame encoded signal recorded on the recording medium.

4. The band compression signal processor according to claim 1, wherein the signal processing unit includes means for dividing a picture region of the input video signal into n picture areas and for performing intra-frame encoding on b of the n picture areas, thereby generating a trick data stream comprised of either the low frequency components or the MSB-components of the intra-frame encoded signals that correspond to the b picture areas, wherein n and b are positive integers and $0 < b \leq n$.

5. The band compression signal processor according to claim 1, wherein the signal processing unit includes means for dividing a picture region of the input video signal into n picture areas and for performing intra-frame encoding on b of the n picture areas, thereby generates a non-trick data stream comprised of either the high-frequency components or the LSB-components of the intra-frame encoded signals that correspond to the b picture areas, wherein n and b are positive integers and $0 < b \leq n$.

6. The band compression signal processor according to claim 1, wherein the signal processing unit includes means for dividing a picture region of the input video signal into n picture areas and for performing intra-frame encoding on b of the n picture areas, wherein n and b are positive integers and $0 < b \leq n$, and wherein the recording means divides each of the intra-frame encoded signals, which correspond to the b picture areas, into a plurality of codes such that a code amount of either the low-frequency components or the MSB-components is less than or equal to the maximum code amount.

7. The band compression signal processor according to claim 6, wherein the recording/reproducing unit is a magnetic recording/reproducing unit having a magnetic head, and the maximum code amount is a number of codes that the magnetic head is capable of recording in p tracks, which are formed by scanning the recording medium one time.

8. The band compression signal processor according to claim 6, wherein:
the recording/reproducing unit records an average code amount for a frame while the recording/reproducing element scans the recording medium c times, wherein c is a positive integer;
the recording/reproducing element is moved, relative to the recording medium, at a speed i during the fast forward mode of operation and at a speed k in the fast reverse mode of operation, wherein $k = 2 - i$; and
the recording/reproducing element includes code amount restricting means for restricting a code amount $\alpha$, which the recording/reproducing element is to record while scanning the recording medium one time, to the maximum intra-frame encoded signal amount, which is equal to $\alpha/(c \times i)$.

9. A band compression signal processor comprising:
a signal processing unit having:
intra-frame encoding means for performing intra-frame encoding of an input video signal by using intra-frame information contained in the input video signal; and
inter-frame encoding means for performing inter-frame encoding of the input video signal by using inter-frame information contained in the input video signal; and
the intra-frame encoding means adaptively repeating the intra-frame encoding so as to output intra-frame encoded signals and the inter-frame encoding means adaptively repeating the inter-frame encoding so as to output inter-frame encoded signals; and a recording/reproducing unit having:
a recording/reproducing element;
recording means for sequentially recording the intra-frame encoded signals and the inter-frame encoded signals, on a recording medium by the use of the recording/reproducing element; and
reproducing means for sequentially reproducing the intra-frame encoded signals and inter-frame encoded signals from the recording medium by the use of the recording/reproducing element, the reproducing means reproducing, during a fast forward or reverse mode of operation, only selected signals from a designated region on the recording medium, thereby achieving fast reproduction of the signals;

wherein the recording means restricts an amount of the intra-frame encoded signals to a value, which is less than or equal to a maximum intra-frame encoded signal amount, which the recording/reproducing element is capable of reading from the designated region on the recording medium during the fast forward or reverse mode of operation, and sequentially records the restricted amount of intra-frame encoded signals in the designated region on the recording medium by the use of the recording/reproducing element, together with the inter-frame encoded signals;

wherein the recording/reproducing unit records an average code amount for a frame while the recording/reproducing element scans the recording medium c times, wherein c is a positive integer; and wherein the recording/reproducing element is moved, relative to the recording medium, at a speed i during the fast forward mode of operation and at a speed k in the fast reverse mode of operation, wherein $k = 2 - i$, and wherein the recording/reproducing element includes code amount restricting means for restricting a code amount $\alpha$, which the recording/reproducing element is to record while scanning the recording medium one time, to the maximum intra-frame encoded signal amount, which is equal to $\alpha/(c \times i)$.

10. A band compression signal processor comprising:
signal processing unit having:
intra-frame encoding means for performing intra-frame encoding on an input video signal by using intra-frame information contained in the input video signal; and
inter-frame encoding means for performing inter-frame encoding on the input video signal by using inter-frame information contained in the input video signal; and
the intra-frame encoding means adaptively repeating the intra-frame encoding so as to output intra-frame encoded signals and the inter-frame encoding means adaptively repeating the inter-frame encoding so as to output inter-frame encoded signals; and a recording/reproducing unit having:
a recording/reproducing element;
recording means for sequentially recording the intra-frame encoded signals and the inter-frame encoded signals on a recording medium by the use of the recording/reproducing element, wherein the recording means comprises:
signal generating means for generating a signal that is representative of a designated region on the recording medium, the designated region being a region on the recording medium in which the recording/reproducing unit is capable of reading a maximum code amount during the fast forward or reverse mode of operation and in which the recording/reproducing element is capable of reading the inter-frame encoded signals during a normal mode of operation;

signal amount calculating means for calculating an amount of the intra-frame encoded signals and an amount of the inter-frame encoded signal; and means for comparing the signal representing the designated region with the amount of the intra-frame encoded signals and the amount of the inter-frame encoded signals, and for producing a result indicative thereof; and reproducing means for sequentially reproducing the intra-frame encoded signals and inter-frame encoded signals from the recording medium by the use of the recording/reproducing element, the reproducing means reproducing, during a fast forward or reverse mode of operation, only selected signals from the designated region on the recording medium, thereby achieving fast reproduction of the signals; and wherein the result produced by the comparing means is provided to the recording means so as to cause the recording means to record the intra-frame encoded signal and the inter-frame encoded signal in the designated region.

11. The band compression signal processor according to claim 10, wherein the signal processing unit converts the intra-frame encoded signals and the inter-frame encoded signals into variable-length codes, and wherein the recording means includes calculating means for calculating an amount of the variable-length codes obtained from the intra-frame encoded signals and an amount of the variable-length codes obtained from the inter-frame encoded signals, for comparing the signal representing the designated region with the amount of the variable-length codes obtained from the intra-frame encoded signals and the amount of the variable-length codes obtained from the inter-frame encoded signals, and for recording the intra-frame encoded signals in the designated region of the recording medium.

12. The band compression signal processor according to claim 10, wherein the recording means further includes memory means for storing the intra-frame encoded signals, controls writing of the intra-frame encoded signals into the memory means in accordance with the amount of the intra-frame encoded signals and the amount of the inter-frame encoded signal and with a result of the comparison between the signal representing the designated region, and the amount of the intra-frame encoded signals and the amount of the inter-frame encoded signals, and records the intra-frame encoded signals in the designated region of the recording medium.

13. The band compression signal processor according to claim 10, wherein the recording means records the intra-frame encoded signals so that a central intra-frame encoded signal is recorded at a center of the designated region on the recording medium.

14. The band compression signal processor according to claim 10, wherein:

the signal processing unit further comprises refresh encoding means for dividing a picture region of the input video signal into n picture areas and for performing refresh encoding on a portion of the input video signal that corresponds to b of the n picture areas for an f frame period, wherein $f \geq 2$; and the recording means further comprises signal-arranging means for arranging the intra-frame encoded signals so that the arranged intra-frame encoded signals are capable of being recorded, along with the inter-frame encoded signals, by the recording/reproducing element in the designated region of the recording medium.

15. The band compression signal processor according to claim 14, wherein the refresh encoding means performs intra-frame encoding on a portion of the video signal that corresponds to $n/f$ picture areas of the n picture areas, for each frame of the input video signal.

16. The band compression signal processor according to claim 14, wherein the signal-arranging means records the inter-frame encoded signals and the intra-frame encoded signals other than the intra-frame encoded signals that are produced by the refresh encoding means, in a region of the recording medium other than the region in which the refresh encoded signals are recorded.

17. The band compression signal processor according to claim 14, wherein the signal-arranging means records inter-frame encoded signals, which are produced by the refresh encoding means, in the designated region on the recording medium.

18. The band compression signal processor according to claim 10, wherein the intra-frame encoded signals, which are sequentially output from the signal processing unit, are separated from one another, and wherein the recording means collects the intra-frame encoded signals that are separated from one another, and records the intra-frame encoded signals in the designated region on the recording medium.

19. The band compression signal processor according to claim 10, wherein the recording medium is a tape having a plurality of discontinuous recording tracks, and the designated region is a region of the recording tracks in which the recording/reproducing element moves across during the fast forward or reverse mode of operation.

20. The band compression signal processor according to claim 19, wherein the designated region is a region of the recording tracks in which the recording/reproducing element moves linearly across during the fast forward or reverse mode of operation.

21. The band compression signal processor according to claim 20, wherein the designated region is a specific part of a region of the recording tracks in which the recording/reproducing element moves linearly across during the fast forward or reverse mode of operation.

22. The band compression signal processor according to claim 10, wherein the recording medium is a tape having a plurality of discontinuous recording tracks, and the designated region is a selected one of the recording tracks in which the recording/reproducing element traces during the forward or reverse mode of operation.

23. The band compression signal processor according to claim 10, wherein the recording medium is a disk having a continuous spiral recording track, and one of the intra-frame encoded signals is recorded in the recording track such that a subsequent intra-frame encoded signal, which is to be reproduced after the one of the intra-frame encoded-signals, is not recorded on a line connecting a center of the disk and an end of the one of the intra-frame encoded signals.

24. The band compression signal processor according to claim 10, wherein the recording/reproducing element is capable of reading, during the fast forward or reverse mode of operation, intra-frame encoded signals from the recording medium, wherein a position signal, which represents a position of a region in which the intra-frame encoded signals are recorded, is recorded on the recording medium, and wherein the position represented by the position signal does not always correspond to a position of a first one of intra-frame encoded signals.

25. The band compression signal processor according to claim 24, wherein the recording/reproducing unit is a video tape recorder, the recording medium is a tape, the position signal is recorded on the tape, and the recording/reproducing unit reproduces, during the fast forward or reverse mode of operation, signals from the designated region on the tape, while controlling a running of the tape in accordance with the position signal.

26. The band compression signal processor according to claim 24, wherein the recording/reproducing unit is a disk recorder having a pickup, and the pickup is moved at high speed, in accordance with the position signal during the fast forward or reverse mode of operation, so as to reproduce signals from the designated region on the disk.

27. The band compression signal processor according to claim 25, wherein the recording/reproducing unit is a video tape recorder having a fixed head, and the head records the position signal in a linear track on the tape.

28. The band compression signal processor according to claim 25, wherein the recording/reproducing unit is a video tape recorder having a rotary head, and the rotary head records the position signal in helical tracks on the tape.

29. The band compression signal processor according to claim 25, wherein the recording medium is a tape having a plurality of discontinuous recording tracks, and pilot signals are recorded on the tape for controlling running of the tape, the pilot signals being assigned to the recording tracks so that the pilot signal assigned to any one of the recording track differs in frequency from the pilot signals assigned to an adjacent recording tracks, and wherein the recording/reproducing unit records the pilot signals on the tape in accordance with the designated region on the tape, and further comprises tape-running control means for controlling a running of the tape in accordance with the pilot signals.

30. A band compression signal processor comprising: signal processing unit having:
   intra-frame encoding means for performing intra-frame encoding on an input video signal by using intra-frame information contained in the input video signal;
   inter-frame encoding means for performing inter-frame encoding on the input video signal by using inter-frame information contained in the input video signal, the intra-frame encoding means adaptively repeating the intra-frame encoding so as to output intra-frame encoded signals and the inter-frame encoding means adaptively repeating the inter-frame encoding so as to output inter-frame encoded signals;
   refresh encoding means for dividing a picture region of the input video signal into n picture areas and for performing refresh encoding on a portion of the input video signal that corresponds to the n picture areas for an f frame period, wherein $f \geq 2$; and
a band compression decoder unit comprising:
   intra-frame decoding means for performing intra-frame decoding of the intra-frame encoded signals and the refresh encoded signals, thereby producing intra-frame decoded video signals;
   a frame memory for storing, as reference signals, the intra-frame decoded video signals;
   inter-frame decoding means for performing, in accordance with the intra-frame decoded video signals stored in the frame memory, inter-frame decoding of the inter-frame encoded signals, thereby producing inter-frame decoded video signals, and for recording the inter-frame decoded video signals in the frame memory; and
   readout means for reading the intra-frame decoded video signals and inter-frame decoded video signals from the frame memory in an order corresponding to an order of television scanning lines, thereby producing a band compression decoded image; and
a recording/reproducing unit having:
   a recording/reproducing element;
   recording means for sequentially recording the intra-frame encoded signals and the inter-frame encoded signals on a recording medium by the use of the recording/reproducing element; and
   reproducing means for sequentially reproducing the intra-frame encoded signals and inter-frame encoded signals from the recording medium by the use of the recording/reproducing element, the reproducing means reproducing, during a fast forward or reverse mode of operation, only selected signals from a designated region on the recording medium, thereby achieving fast reproduction of the signals;
wherein the recording means records the intra-frame encoded signals and the inter-frame encoded signals in a designated region on the recording medium, in which the recording/reproducing unit is capable of reading a maximum code amount during the fast forward or reverse mode of operation; and
wherein the recording/reproducing unit:
   records a display position signal representing a position on the picture region in which an image defined by the intra-frame encoded signals is to be displayed;
   reproduces, during the fast forward or reverse mode of operation, one of the intra-frame encoded signals and the refresh encoded signals from the recording medium; and
   outputs one of the intra-frame encoded signals and the refresh encoded signals along with the display position signal in a random order which is not always identical to the order in which the intra-frame encoded signals and the inter-frame encoded signals have been recorded on the recording medium and reproduced during a normal mode of operation.

31. The band compression signal processor according to claim 30, wherein the band compression decoder unit writes, during the fast forward or reverse mode of operation, signals into the frame memory from a selected picture area of the frame memory, which has been designated by the display position signal and which is used by the band compression signal processor as a write-start position.

32. The band compression signal processor according to claim 31, wherein the band compression decoder unit writes, during the fast forward or reverse mode of operation, only the intra-frame encoded signals into the frame memory.

33. The band compression signal processor according to claim 32, wherein the frame memory has a first memory section and a second memory section, and wherein signals are temporarily stored in the second memory section and are transferred to the first memory section after signals stored in the first memory section have been read, when a write address and a read address, corresponding to the first memory section, have been generated.

34. A band compression signal processor comprising:
a signal processing unit having:
intra-frame encoding means for performing intra-frame encoding of an input video signal by using intra-frame information contained in the input video signal; and
inter-frame encoding means for performing inter-frame encoding of the input video signal by using inter-frame information contained in the input video signal; and
the intra-frame encoding means adaptively repeating the intra-frame encoding so as to output intra-frame encoded signals and the inter-frame encoding means adaptively repeating the inter-frame encoding so as to output inter-frame encoded signals; and
a recording/reproducing unit having:
a recording/reproducing element;
recording means for sequentially recording the intra-frame encoded signals and the inter-frame encoded signals, on a recording medium by the use of the recording/reproducing element; and
reproducing means for sequentially reproducing the intra-frame encoded signals and inter-frame encoded signals from the recording medium by the use of the recording/reproducing element, the reproducing means reproducing, during a fast forward or reverse mode of operation, only selected signals from a designated region on the recording medium, thereby achieving fast reproduction of the signals;
wherein the recording means restricts an amount of the intra-frame encoded signals to a value, which is less than or equal to a maximum intra-frame encoded signal amount, which the recording/reproducing element is capable of reading from the designated region on the recording medium during the fast forward or reverse mode of operation, and sequentially records the restricted amount of intra-frame encoded signals in the designated region on the recording medium by the use of the recording/reproducing element, together with the inter-frame encoded signals; and
wherein the signal processing unit further includes:
means for dividing a picture region of the input video signal into n picture areas and for restricting the amount of intra-frame encoded signals, for b of the n picture areas, to a value, which is less than or equal to the maximum intra-frame encoded signal amount that is capable of being recorded in the designated region on the recording medium, where b and n are positive integers and $0 < b \leq n$;
intra-frame code amount calculating means for performing intra-frame encoding a portion of the input video signal that corresponds to the b picture areas, and for calculating an amount of intra-frame codes generated from the b picture areas;
intra-frame quantization level determining means for determining a quantization level of the intra-frame encoding performed by the intra-frame encoding means, so that the intra-frame code amount calculated by the intra-frame code amount calculating means is equal to or less than the maximum intra-frame encoded signal amount;
refresh encoding means for generating refresh code signals by performing refresh encoding on the portion of the input video signal that corresponds to the b picture areas for an f frame period, wherein $f \geq 2$;
refresh code amount calculating means for calculating an amount of the refresh code signals generated from the b picture areas by the refresh encoding means; and
refresh quantization level determining means for determining, in accordance with the refresh encoded signals and the maximum intra-frame encoded signal amount, a quantization level for the refresh encoding performed by the refresh encoding means.

35. The band compression signal processor according to claim 34, wherein the signal processing unit performs one of the intra-frame encoding and the inter-frame encoding on the n picture areas, and the recording means records h intra-frame encoded signals in the designated region on the recording medium, where $0 < h < b$.

36. The band compression signal processor according to claim 34, wherein the recording/reproducing unit is a magnetic recording/reproducing unit having a magnetic head, and the maximum intra-frame encoded signal amount is a number of codes that the magnetic head is capable of recording in p tracks, which are formed by scanning the recording medium one time.

37. A band compression signal processor comprising:
signal processing unit having:
intra-frame encoding means for performing intra-frame encoding on an input video signal by using intra-frame information contained in the input video signal; and
inter-frame encoding means for performing inter-frame encoding on the input video signal by using inter-frame information contained in the input video signal, the intra-frame encoding means adaptively repeating the intra-frame encoding so as to output intra-frame encoded signals and the inter-frame encoding means adaptively repeating the inter-frame encoding so as to output inter-frame encoded signals;
refresh encoding means for dividing a picture region of the input video signal into n picture areas and for performing refresh encoding on a portion of the input video signal that corresponds to the n picture areas for an f frame period, wherein $f \geq 2$; and
a band compression decoder unit comprising:

intra-frame decoding means for performing intra-frame decoding of the intra-frame encoded signals and the refresh encoded signals, thereby producing intra-frame decoded video signals;

a frame memory for storing, as reference signals, the intra-frame decoded video signals;

inter-frame decoding means for performing, in accordance with the intra-frame decoded video signals stored in the frame memory, inter-frame decoding of the inter-frame encoded signals, thereby producing inter-frame decoded video signals, and for recording the inter-frame decoded video signals in the frame memory; and readout means for reading the intra-frame decoded video signals and inter-frame decoded video signals from the frame memory in a order corresponding to an order of television scanning lines, thereby producing a band compression decoded image; and a recording/reproducing unit having:

a recording/reproducing element;

recording means for sequentially recording the intra-frame encoded signals and the inter-frame encoded signals on a recording medium by the use of the recording/reproducing element; and reproducing means for sequentially reproducing the intra-frame encoded signals and inter-frame encoded signals from the recording medium by the use of the recording/reproducing element, the reproducing means reproducing, during a fast forward or reverse mode of operation, only selected signals from a designated region on the recording medium, thereby achieving fast reproduction of the signals;

wherein the recording/reproducing unit includes means for recording, by the use of the recording/reproducing element, the intra-frame encoded signals and the inter-frame encoded signals in a designated region on the recording medium, in which the recording/reproducing unit is capable of reading a maximum code amount during the fast forward or reverse mode of operation.

* * * * *